(12) United States Patent
Good et al.

(10) Patent No.: US 6,457,642 B1
(45) Date of Patent: Oct. 1, 2002

(54) AUTOMATED SYSTEM AND METHOD FOR IDENTIFYING AND MEASURING PACKAGES TRANSPORTED THROUGH A LASER SCANNING TUNNEL

(75) Inventors: Timothy A. Good, Blackwood, NJ (US); Xiaoxun Zhu, Philadelphia, PA (US); David M. Wilz, Sewell; George B. Rockstein, Audobon, both of NJ (US); Stephen J. Colavito, Brookhaven, PA (US); Robert E. Blake, Woodbury Heights, NJ (US); Ka Man Au; Sankar Ghosh, both of Philadelphia, PA (US); George Kolis, Pennsawken, NJ (US); Ian A. Scott, Haddonfield, NJ (US); Thomas Amundsen, Turnersville, NJ (US); Gennady Germaine, Cherry Hill, NJ (US); Andrew D. Dehennis, Cheltenham, PA (US); LeRoy Dickson, Morgan Hill, CA (US); Carl Harry Knowles, Moorestown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/275,518

(22) Filed: Mar. 24, 1999

Related U.S. Application Data

(63) Continuation-in-part of application No. 09/274,265, filed on Mar. 22, 1999, and a continuation-in-part of application No. 09/243,078, filed on Feb. 2, 1999, and a continuation-in-part of application No. 09/241,930, filed on Feb. 2, 1999, and a continuation-in-part of application No. 09/157,778, filed on Sep. 21, 1998, and a continuation-in-part of application No. 09/047,146, filed on Mar. 24, 1998, and a continuation-in-part of application No. 08/949,915, filed on Oct. 14, 1997, now Pat. No. 6,158,659, and a continuation-in-part of application No. 08/854,832, filed on May 12, 1997, now Pat. No. 6,085,978, and a continuation-in-part of application No. 08/886,806, filed on Apr. 22, 1997, now Pat. No. 5,984,185, and a continuation-in-part of application No. 08/726,522, filed on Oct. 7, 1996, now Pat. No. 6,073,846, and a continuation-in-part of application No. 08/573,949, filed on Dec. 18, 1995, now abandoned.

(51) Int. Cl.$^7$ ................................................. G06K 7/10
(52) U.S. Cl. ........................ 235/462.01; 235/462.35; 235/462.25; 235/472.01
(58) Field of Search ................................. 235/462, 472

(56) References Cited

U.S. PATENT DOCUMENTS

| 4,333,006 A | 6/1982 | Gorin et al. |
| 4,580,894 A | 4/1986 | Wojcik |

(List continued on next page.)

FOREIGN PATENT DOCUMENTS

| GB | 2 189 594 A | 10/1987 | |
| GB | 2189594 A | * 10/1987 | ................. 235/462 |
| WO | WO 97/22082 | 6/1997 | ............ G06K/7/10 |

OTHER PUBLICATIONS

Accu–Sort—Tunnel Scanning System by , www.accusort.com/mktg/as01.html, 1999, p. 1–2.

(List continued on next page.)

Primary Examiner—Thien M. Le
(74) Attorney, Agent, or Firm—Thomas J. Perkowski, Esq. P.C.

(57) ABSTRACT

A fully automated package identification and measuring system, in which an omni-directional holographic scanning tunnel is used to read bar codes on packages entering the tunnel, while a package dimensioning subsystem is used to capture information about the package prior to entry into the tunnel. Mathematical models are created on a real-time basis for the geometry of the package and the position of the laser scanning beam used to read the bar code symbol thereon. The mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

43 Claims, 161 Drawing Sheets

U.S. PATENT DOCUMENTS

| | | | |
|---|---|---|---|
| 5,331,118 A | * 7/1994 | Jensen | 177/25.14 |
| 5,495,097 A | * 2/1996 | Katz et al. | 235/462 |
| 5,547,034 A | 8/1996 | Wurz et al. | |
| 5,555,090 A | * 9/1996 | Schmutz | 356/381 |
| 5,633,487 A | 5/1997 | Schmutz et al. | |
| 5,661,561 A | 8/1997 | Wurz et al. | |
| 5,689,092 A | 11/1997 | Wurz et al. | |
| 5,699,161 A | 12/1997 | Woodworth | |
| 5,737,438 A | 4/1998 | Zlotnick | |
| 5,814,802 A | 9/1998 | Hecht et al. | |
| 5,841,541 A | * 11/1998 | Dlugos | 356/383 |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,969,823 A | 10/1999 | Wurz et al. | |
| 5,979,760 A | 11/1999 | Freyman et al. | |
| 5,984,186 A | 11/1999 | Tafoya | |
| 5,991,041 A | 11/1999 | Woodworth | |
| 6,053,409 A | 4/2000 | Brobst et al. | |
| 6,123,264 A | 9/2000 | Li et al. | |
| 6,147,358 A | 11/2000 | Hecht | |

OTHER PUBLICATIONS

Dimensioning the Right Way: Reliably by , Cargoscan, 1998, p. 1–16.

The Accu–Sort Advantage– The Mini–X by , Accu–Sort Systems, Inc., Telford, PA, 1998.

Omni–Scan Tunnel by , Metrologic Instruments, Inc., 1997.

International Search Report, 2000.

* cited by examiner $R_{ref}$ IS FOR SPECIFYING ONLY
POSITION/ORIENTATION OF
SCANNERS IN TUNNEL SYSTEM

TUNNEL SCANNER POSITIONING DATA:

| SCANNER: | ROTATION ANGLES (degrees): | | | POSITION COORDINATES (inches): | | |
|---|---|---|---|---|---|---|
| | YAW | RITCH | ROLL | X | Y | Z |
| TOP/FRONT | 0 | 80 | 0 | 1 | 73 | -10 |
| TOP/BACK | 0 | 100 | 0 | -1 | 66 | 10 |
| FRONT | 0 | 40 | 0 | 0 | 57 | -40 |
| BACK | 0 | 130 | 0 | 0 | 57 | 40 |
| RIGHT SIDE/FRONT | 60 | 0 | 90 | -45 | 18 | -12 |
| RIGHT SIDE/BACK | 120 | 0 | 90 | -45 | 18 | 12 |
| LEFT SIDE/FRONT | -60 | 0 | 90 | 45 | 18 | -12 |
| LEFT SIDE/BACK | -120 | 0 | 90 | 45 | 18 | 12 |
| L/F CORNER #1 | -30 | 15 | -7 | 29 | 18 | -80 |
| L/F CORNER #2 | -30 | 15 | -7 | 40 | 18 | -69 |
| L/B CORNER #1 | -150 | 15 | 7 | 29 | 18 | 80 |
| L/B CORNER #2 | -150 | 15 | 7 | 40 | 18 | 68 |
| R/F CORNER #1 | 30 | 15 | 7 | -29 | 18 | -80 |
| R/F CORNER #2 | 30 | 15 | 7 | -40 | 18 | -59 |
| R/B CORNER #1 | 150 | 15 | -7 | -29 | 18 | 80 |
| R/B CORNER #2 | 150 | 15 | -7 | -40 | 18 | 68 |

ROTATION OCCURS IN THE ORDER GIVEN: YAW, PITCH, ROLL
POSITIVE YAW IS FROM R-AXIS TO P-AXIS
POSITIVE PITCH IS FROM Y-AXIS TO R-AXIS
POSITIVE ROLL IS FROM P-AXIS TO Y-AXIS

POSITION COORDINATES ARE OF THE CENTER OF THE DISC WITHIN THE FIXED (X,Y,Z) SYSTEM

FIG. 2C

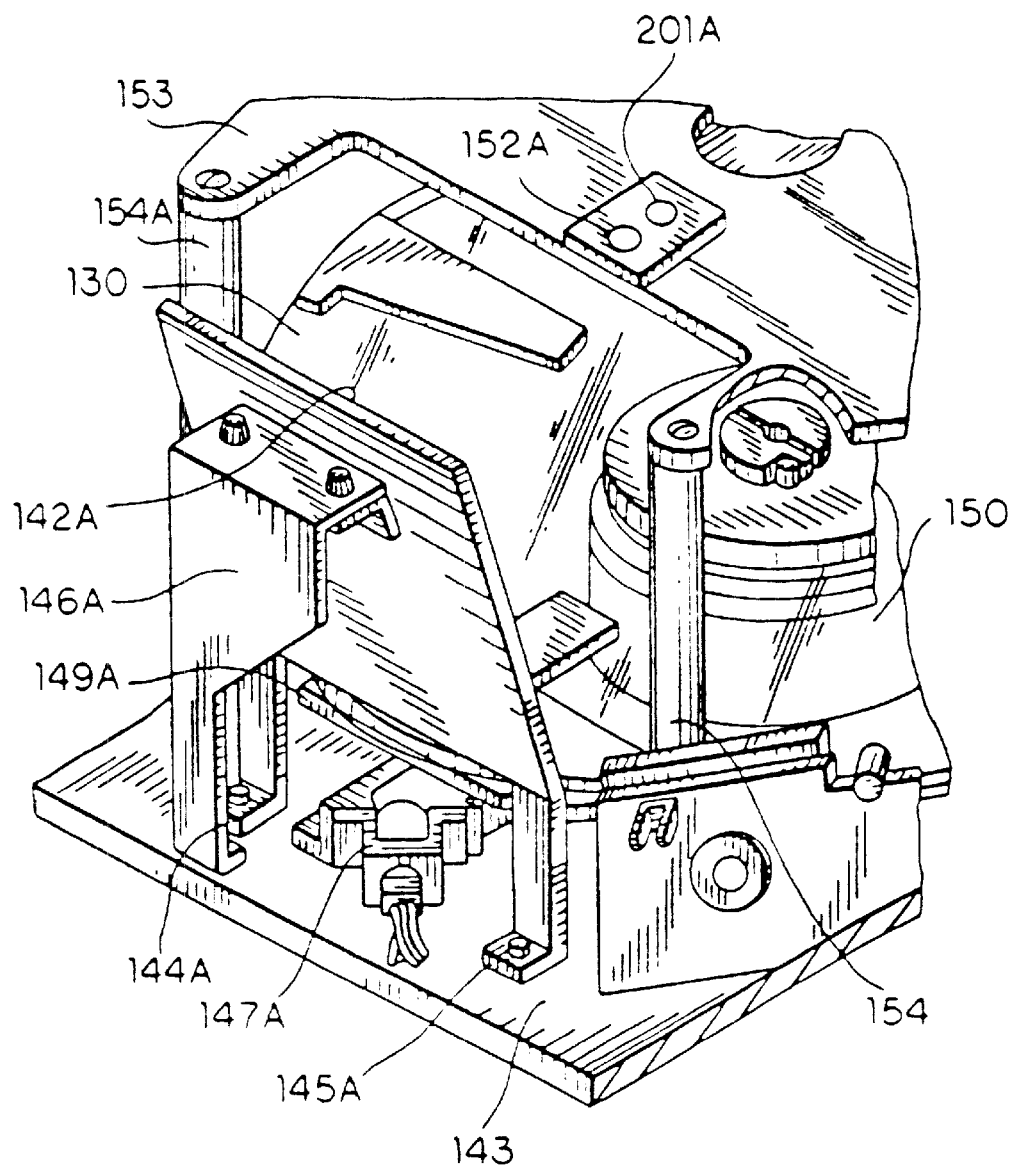
FIG. 3A1

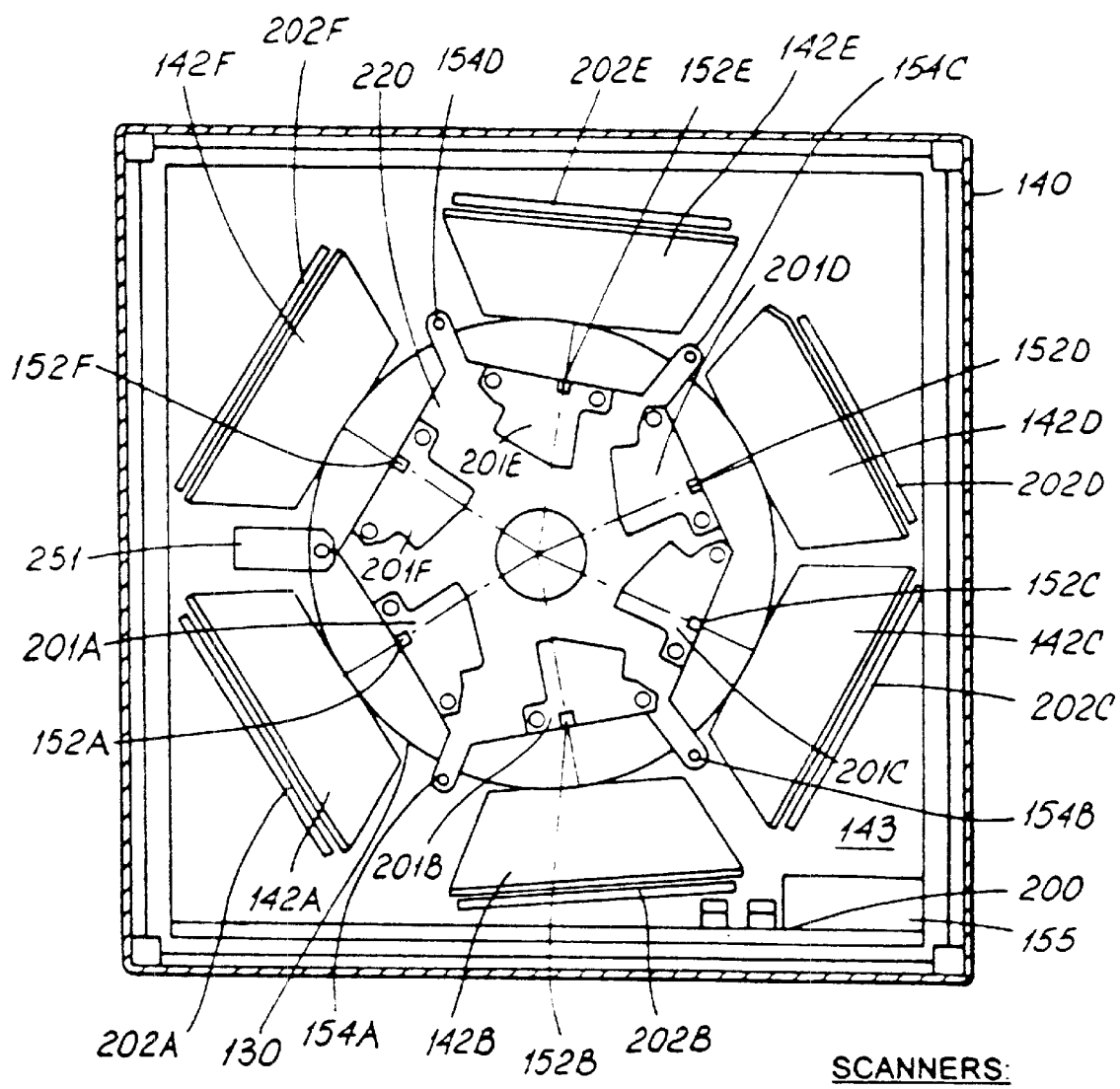
FIG. 3A2

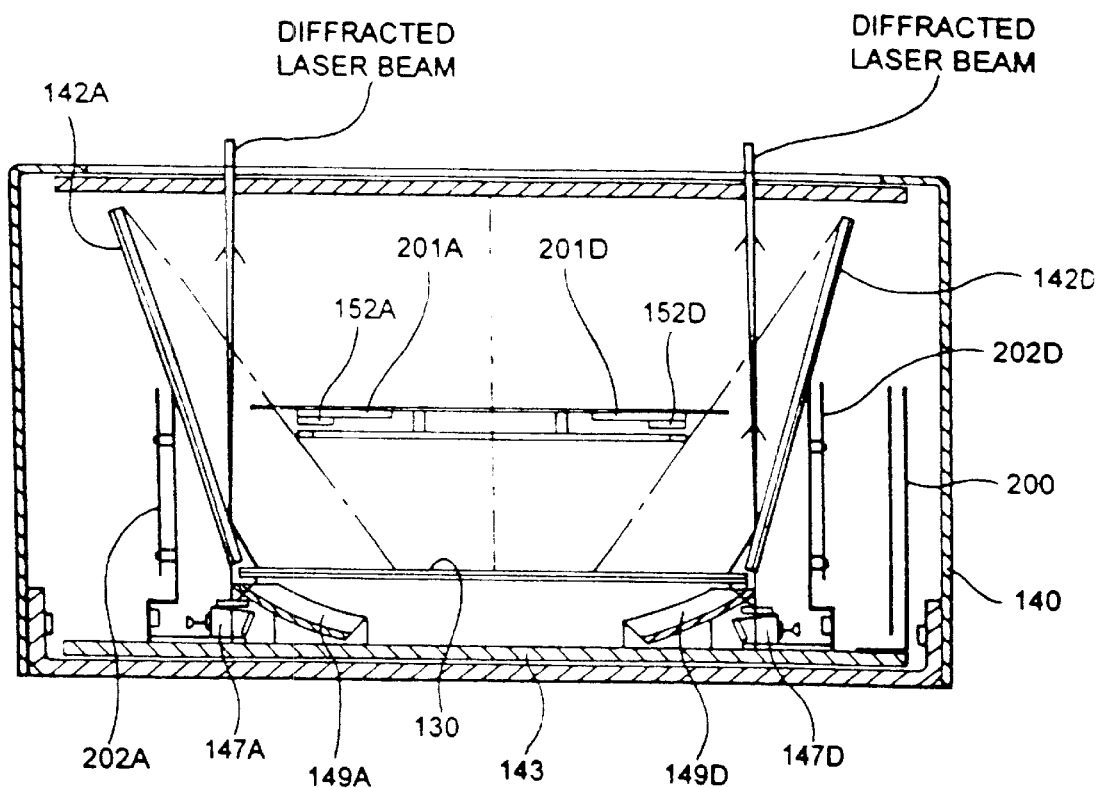
FIG. 3A3

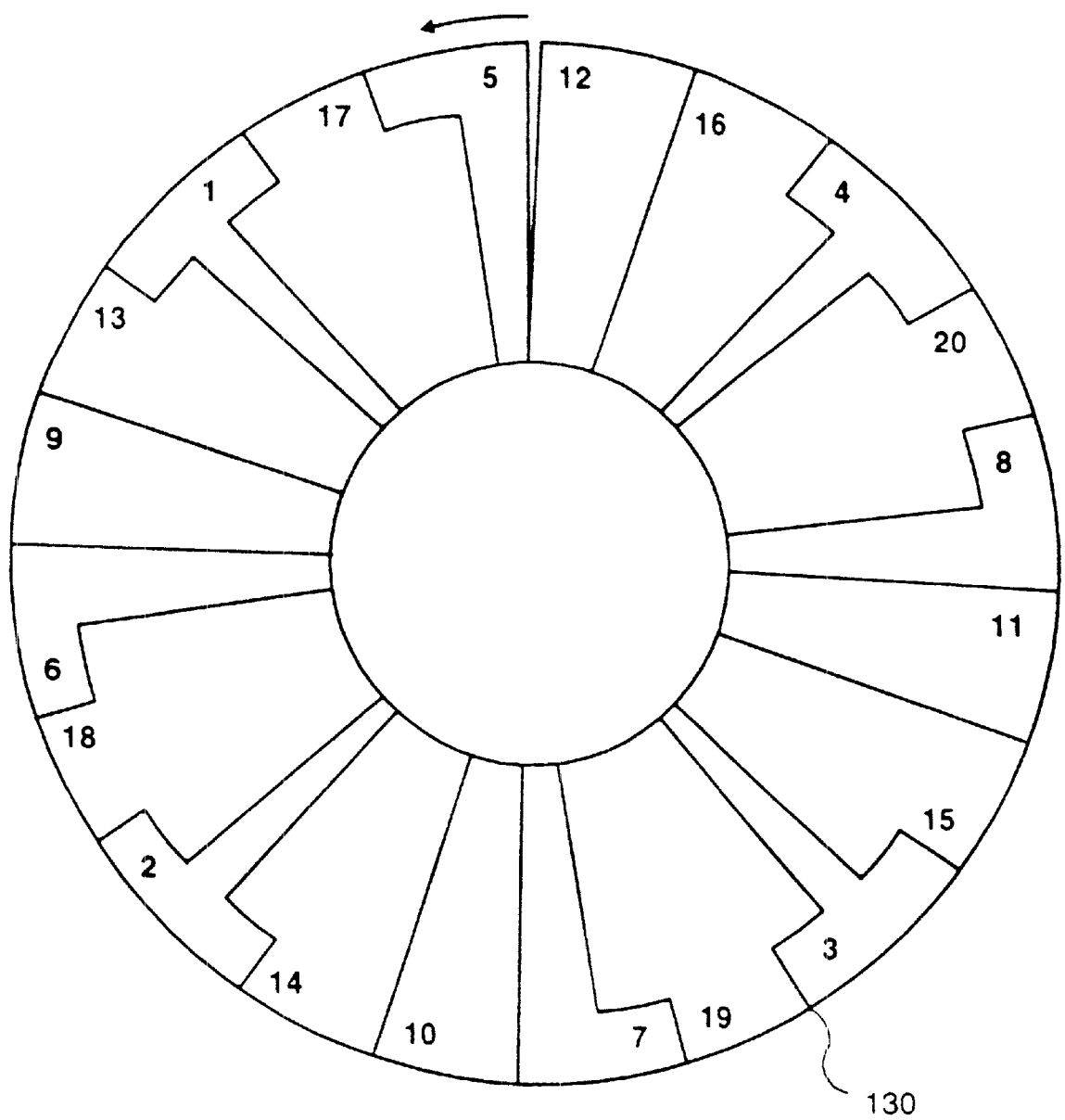
FIG. 3A4

| ROTATIONAL SPEED OF DISK (rpm) | | | | | |
|---|---|---|---|---|---|
| X-SCAN 4 LINES/ 5 FOCAL PLANES (8.66 disk) DISK 4-6fp-8.66DISK xts LDO 1/21/98 WAVELENGTH: | | | | | |
| FACET | DIFFRACTION FOCAL LENGTH (inches) | GEOMETRICAL FOCAL LENGTH (inches) | ANGLE A (degrees) | ANGLE B (degrees) | ANGLE OF DIFFRACTION (degrees) |
| 1 | 39.00 | 39.07 | 45.9 | 57.40 | 32.60 |
| 2 | 39.00 | 39.07 | 45.9 | 57.40 | 32.60 |
| 3 | 39.00 | 39.07 | 45.9 | 57.40 | 32.60 |
| 4 | 39.00 | 39.07 | 45.9 | 57.40 | 32.60 |
| 5 | 45.01 | 45.11 | 45.9 | 57.00 | 33.00 |
| 6 | 45.01 | 45.11 | 45.9 | 57.00 | 33.00 |
| 7 | 45.01 | 45.11 | 45.9 | 57.00 | 33.00 |
| 8 | 45.01 | 45.11 | 45.9 | 57.00 | 33.00 |
| 9 | 51.51 | 51.66 | 45.9 | 56.67 | 33.33 |
| 10 | 51.51 | 51.66 | 45.9 | 56.67 | 33.33 |
| 11 | 51.51 | 51.66 | 45.9 | 56.67 | 33.33 |
| 12 | 51.51 | 51.66 | 45.9 | 56.67 | 33.33 |
| 13 | 58.32 | 58.64 | 45.9 | 56.40 | 33.60 |
| 14 | 58.32 | 58.64 | 45.9 | 56.40 | 33.60 |
| 15 | 58.32 | 58.64 | 45.9 | 56.40 | 33.60 |
| 16 | 58.32 | 58.64 | 45.9 | 56.40 | 33.60 |
| 17 | 64.93 | 65.24 | 45.9 | 56.19 | 33.81 |
| 18 | 64.93 | 65.24 | 45.9 | 56.19 | 33.81 |
| 19 | 64.93 | 65.24 | 45.9 | 56.19 | 33.81 |
| 20 | 64.93 | 65.24 | 45.9 | 56.19 | 33.81 |
| 21 | | | | | |
| 22 | | | | | |
| 23 | | | | | |
| 37 | | | | | |
| 38 | | | | | |
| 39 | | | | | |
| 40 | | | | | |
| | AVERAGE ANGLE B(degrees): | | 56.73 | | |
| APPROXIMATE MINIMUM BOX WIDTH: | | 12.57 inches | | | |
| (BASED ON LARGE MIRROR AS LIMITATION) | | | | | |

FIG. 3A5A

| | 6000 | | | ACCOUNTING FOR DEAD TIME FOR LASER BEAM 2.59 (degrees) |
|---|---|---|---|---|
| | 685 mm | | | |
| ANGLE OF BEAM FROM VERTICAL (degrees) | SCAN ANGLE (degrees) | SCAN MULT. FACTOR(m) | ROTATION ANGLE (degrees) | |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| | AVERAGE: | 1.33 | | |
| SUMS | 407.01 | | 307.00 | 358.88 |
| | TOTAL FACET ANGULAR SWEEP (degrees): | | | 358.88 |

FIG. 3A5B

| LIGHT COLLECTION FACTOR | MAXIMUM COLLECTION AREA (IGNORING NOTCH) (sq. in) | DESIGN COLLECTION AREA (INCLUDES NOTCH LOSS OF 0.15) (sq. inches) | BEAM SPEED AT CENTER OF SCAN LINE (inches/sec) | BEAM SPEED AT MAX DEPTH OF FIELD (inches/sec) | BEAM SPEED AT MIN DEPTH OF FIELD (inches/sec) |
|---|---|---|---|---|---|
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 37.18 | 48.34 | 46.34 | | SUMS | |
| | | Vmax (in/s): | 56908 | | |
| | | Vmin (in/s): | 29409 | | |
| | | RATIO | 1.34 | | |

FIG. 3A5C

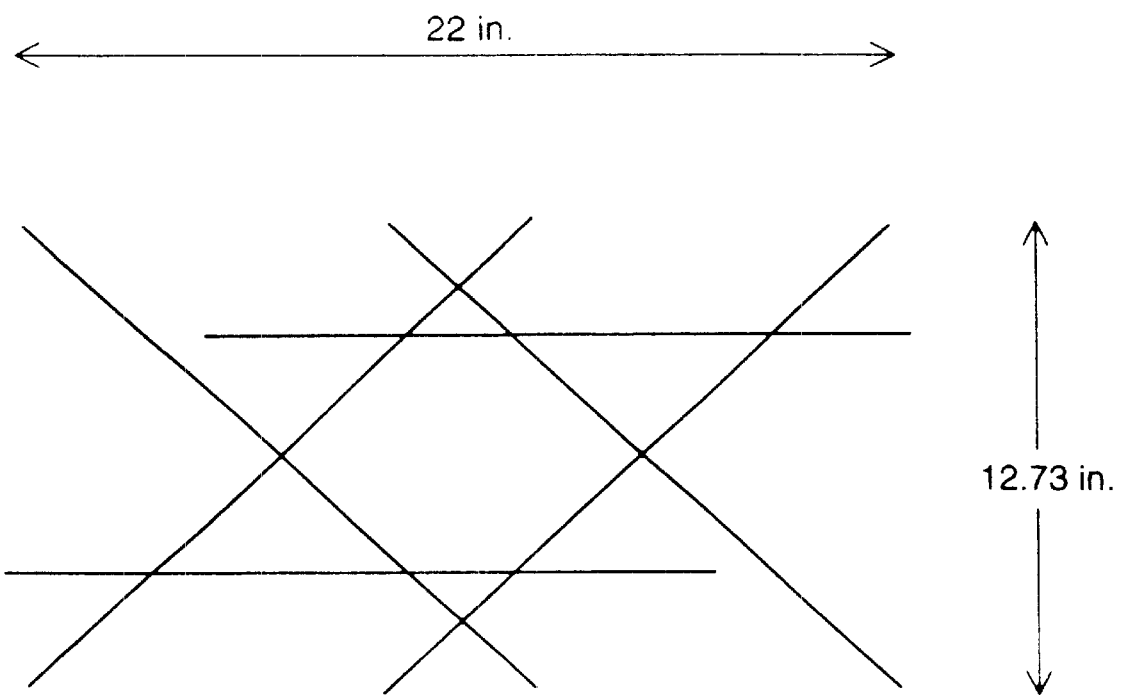
CONVEYOR SCANNER SCAN PATTERN
AT THE MIDDLE FOCAL PLANE
FIG. 3A6

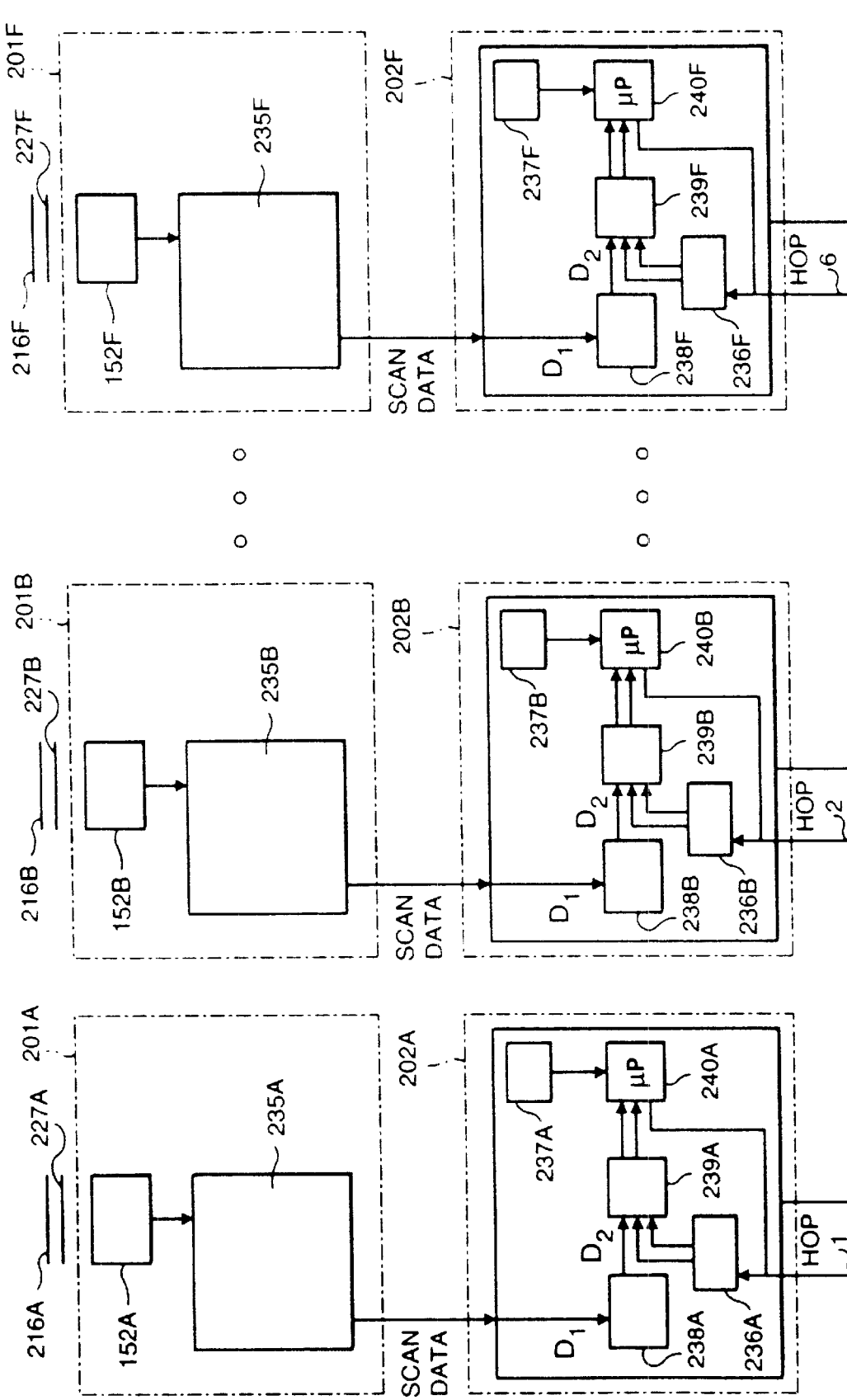
FIG. 3A7A

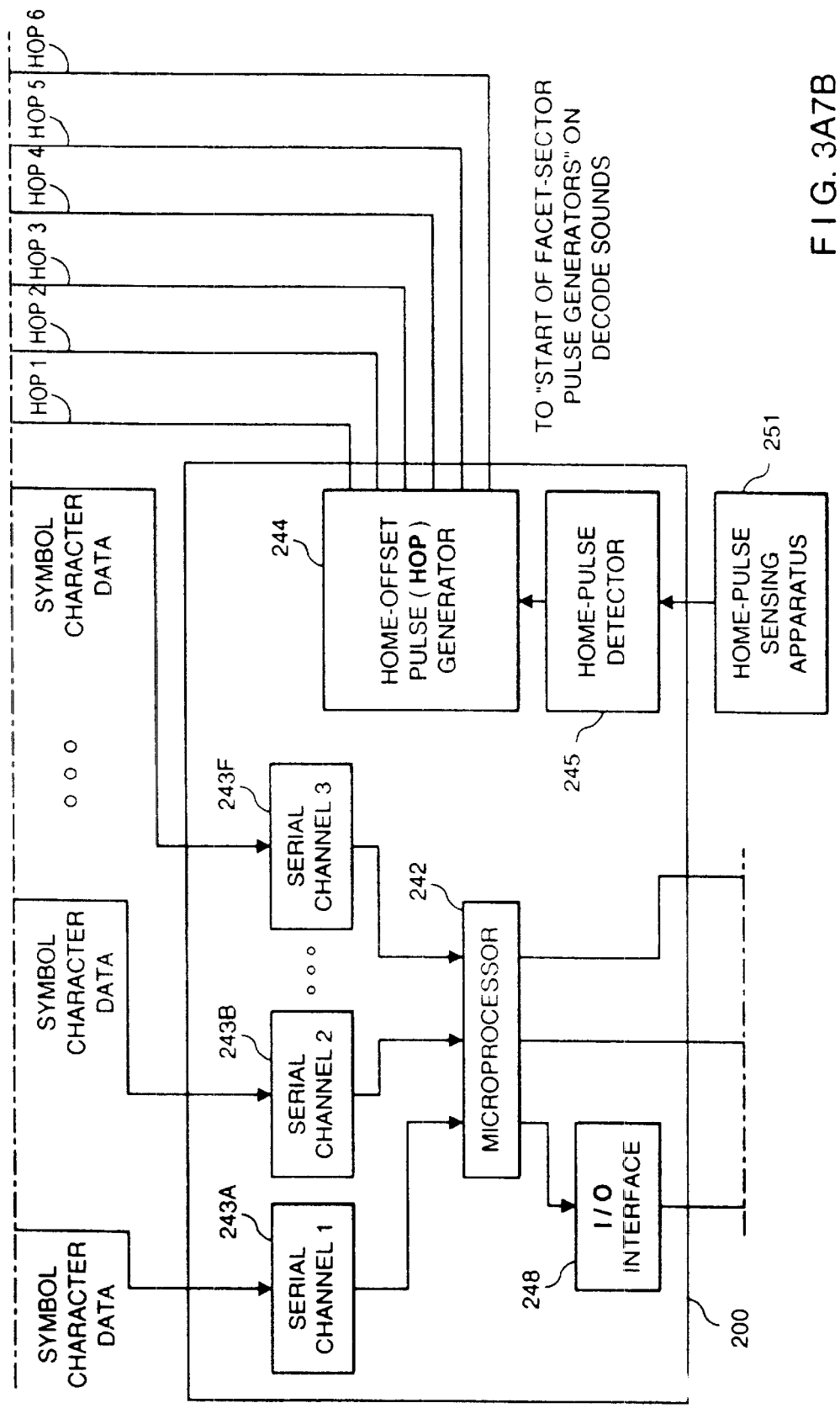
FIG. 3A7B

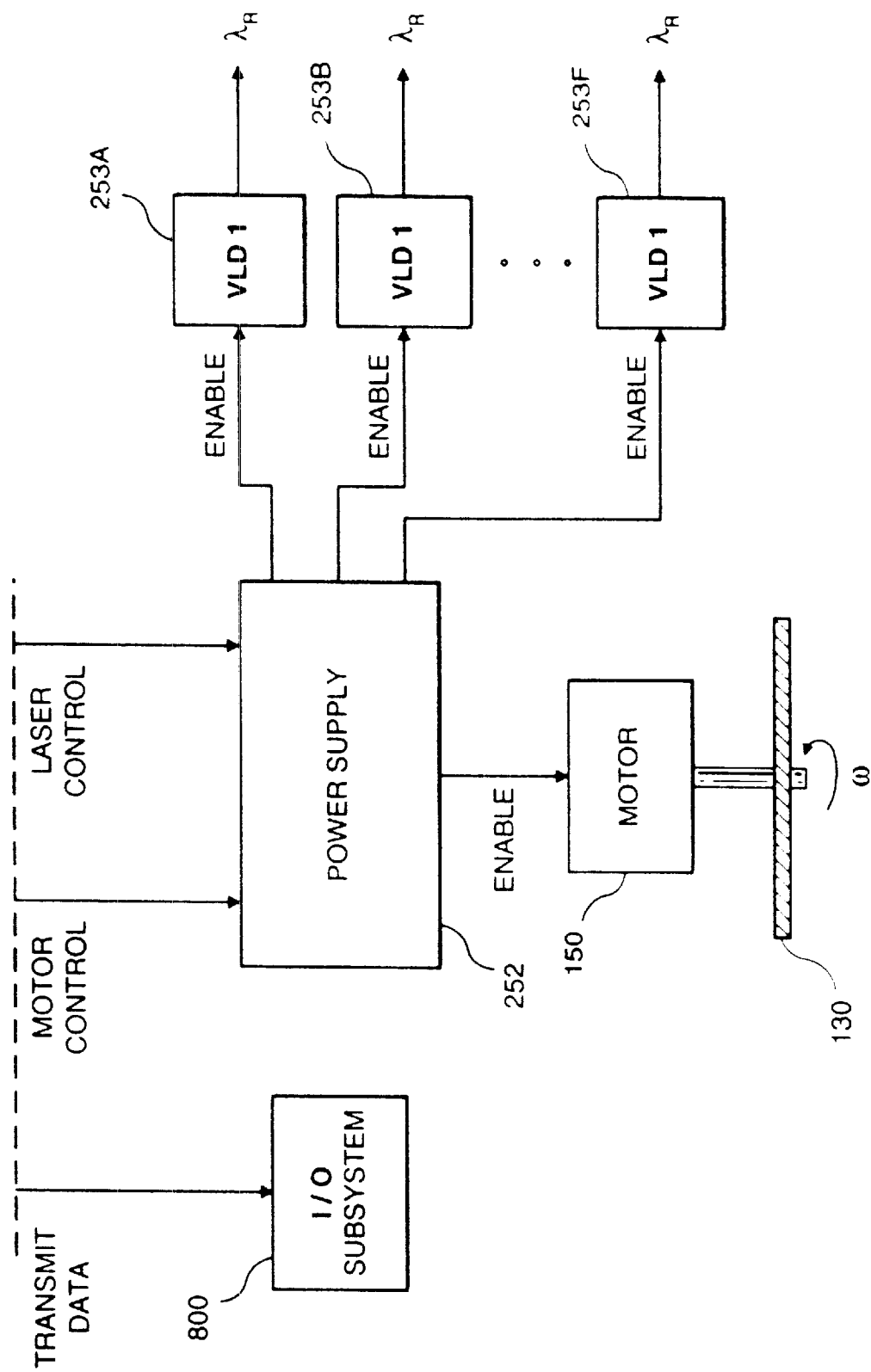
FIG. 3A7C

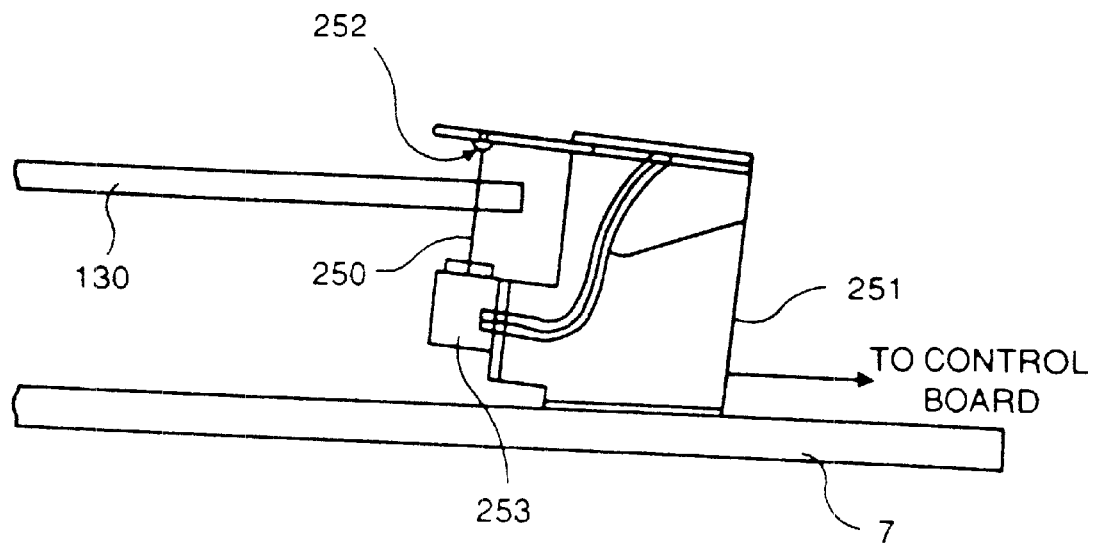
FIG. 3A8A
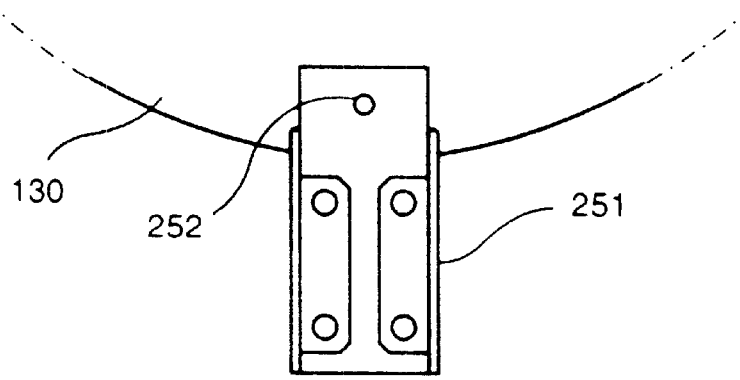
FIG. 3A8B

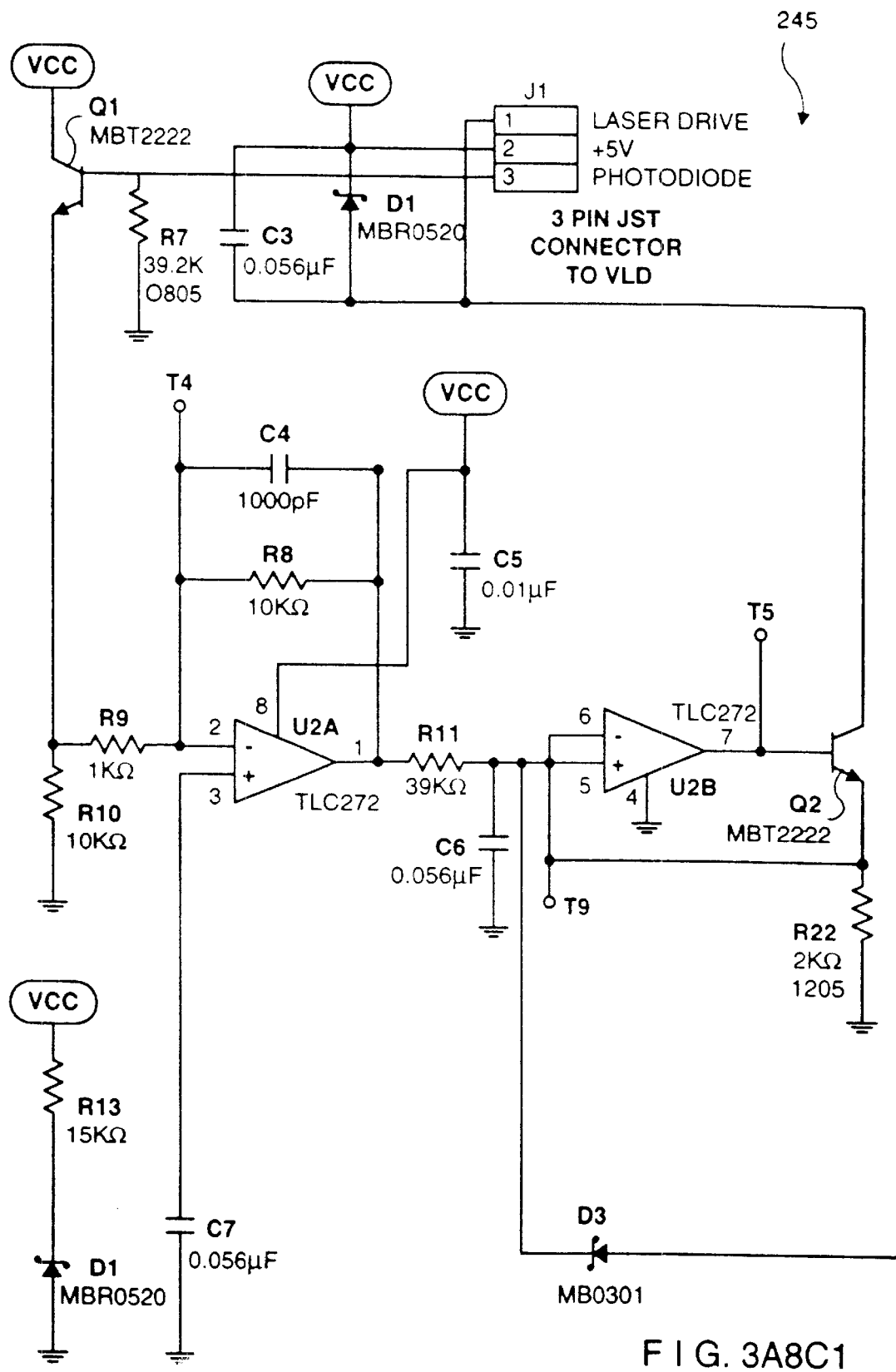
FIG. 3A8C1

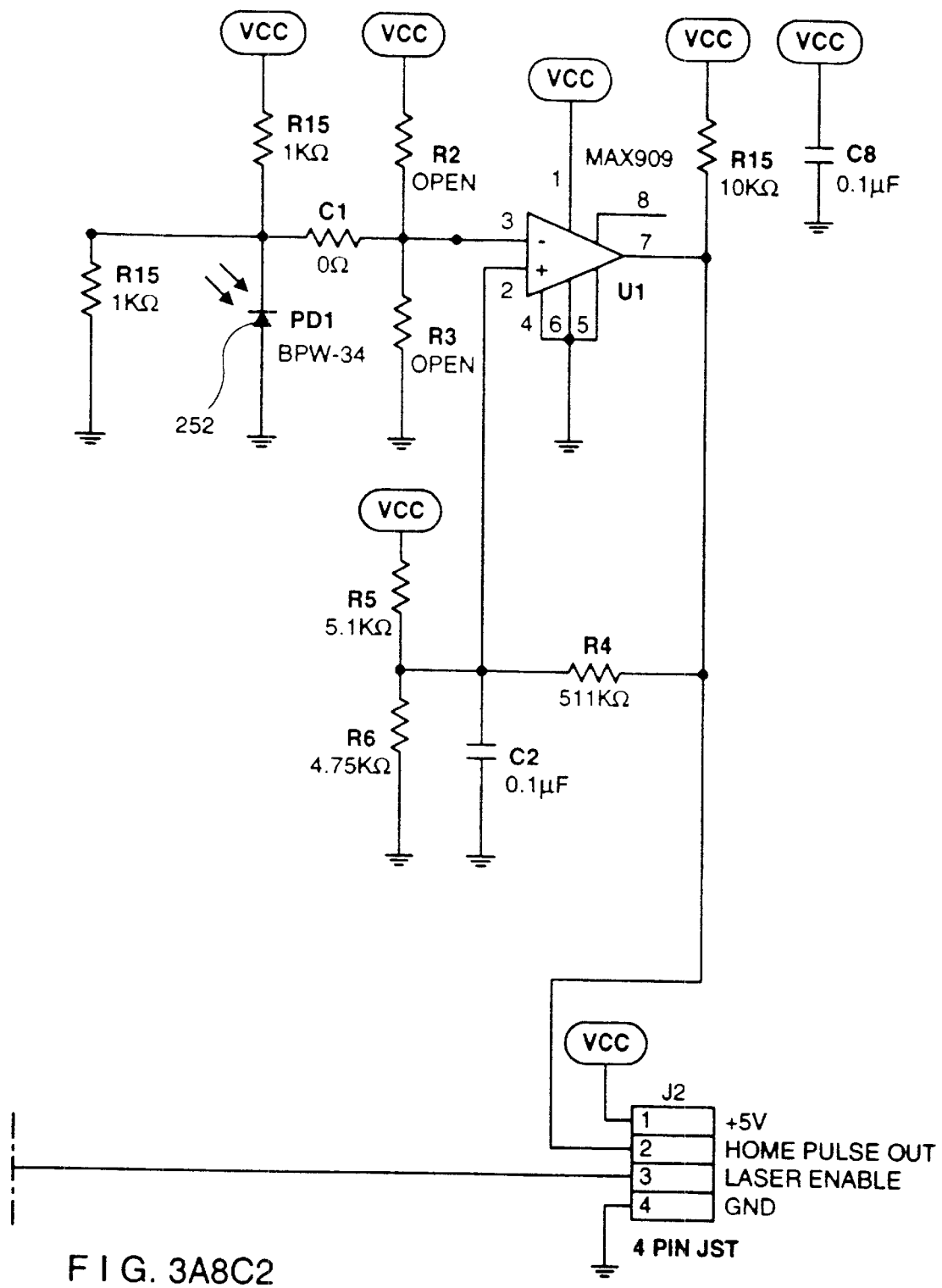
FIG. 3A8C2

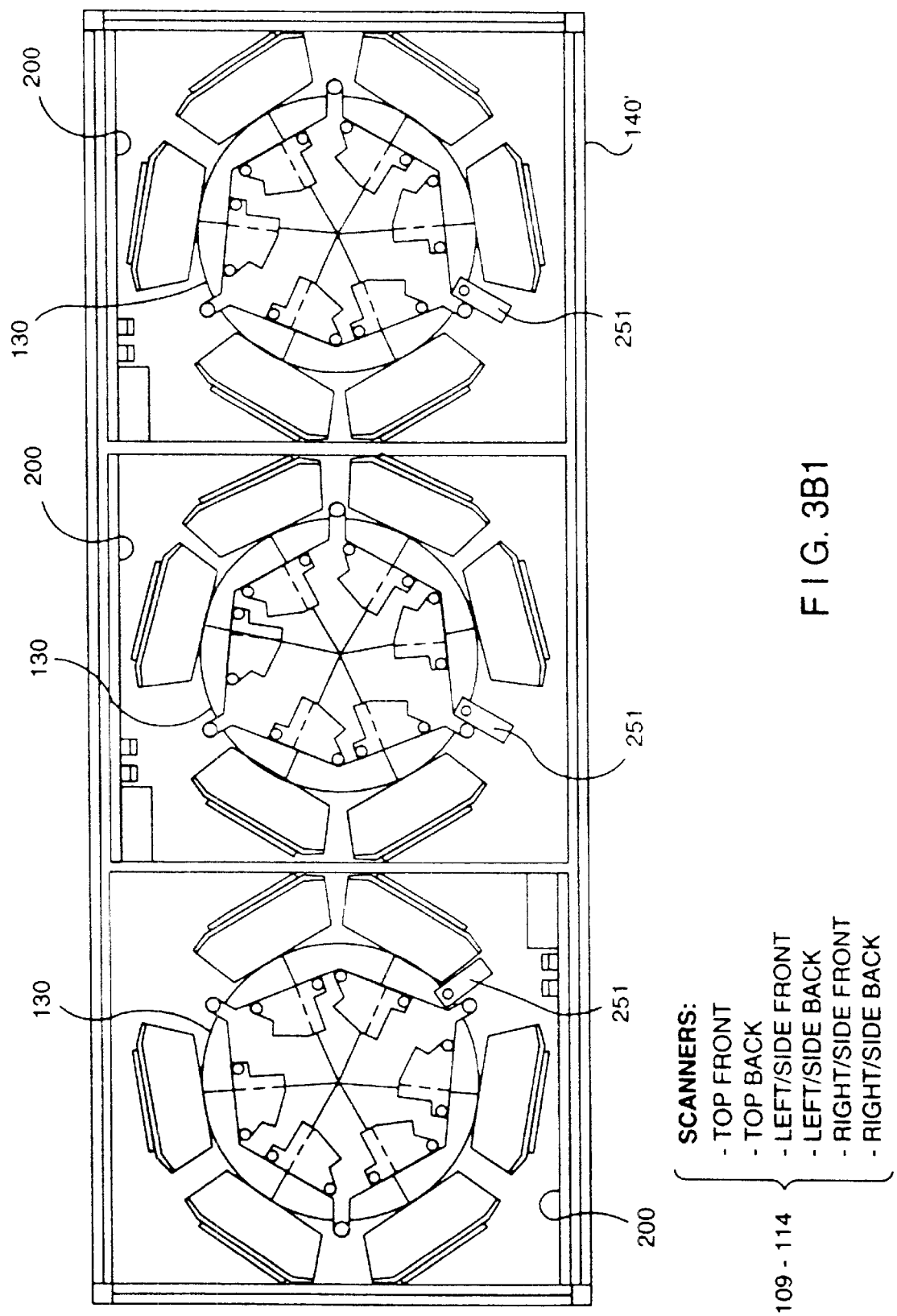
FIG. 3B1

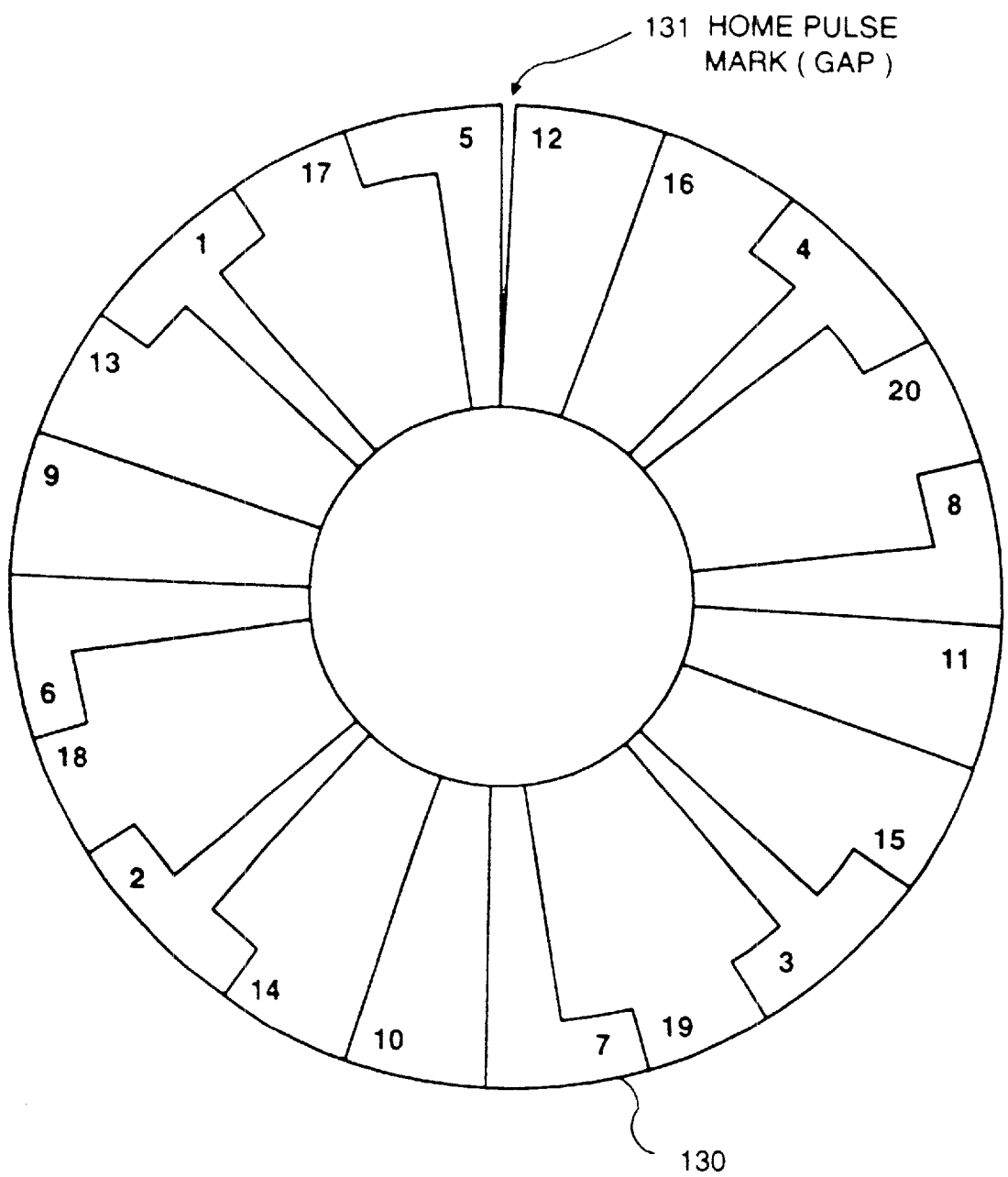
FIG. 3B2

ROTATIONAL SPEED OF DISK (RPM)
TUNNEL SCANNER 1: 4 LINES/5 FOCAL PLANES DISK

WAVELENGTH: 685NM

| FACET | DIFFRACTION FOCAL LENGTH (INCHES) | GEOMETRICAL FOCAL LENGTH (INCHES) | ANGLE A (DEGREES) | ANGLE B (DEGREES) | ANGLE OF DIFFRACTION (DEGREES) | ANGLE OF BEAM FROM VERTICAL (DEGREES) | SCAN ANGLE (DEGREES) |
|---|---|---|---|---|---|---|---|
| 1  | 39.04 | 39.11 | 45.9 | 55.30 | 34.70 | 2.70 | 26.24 |
| 2  | 39.04 | 39.11 | 45.9 | 55.30 | 34.70 | 2.70 | 26.24 |
| 3  | 39.04 | 39.11 | 45.9 | 55.30 | 34.70 | 2.70 | 26.24 |
| 4  | 39.04 | 39.11 | 45.9 | 55.30 | 34.70 | 2.70 | 26.24 |
| 5  | 45.04 | 45.14 | 45.9 | 55.54 | 34.46 | 2.46 | 22.84 |
| 6  | 45.04 | 45.14 | 45.9 | 55.54 | 34.46 | 2.46 | 22.84 |
| 7  | 45.04 | 45.14 | 45.9 | 55.54 | 34.46 | 2.46 | 22.84 |
| 8  | 45.04 | 45.14 | 45.9 | 55.54 | 34.46 | 2.46 | 22.84 |
| 9  | 51.54 | 51.69 | 45.9 | 55.73 | 34.27 | 2.27 | 20.03 |
| 10 | 51.54 | 51.69 | 45.9 | 55.73 | 34.27 | 2.27 | 20.03 |
| 11 | 51.54 | 51.69 | 45.9 | 55.73 | 34.27 | 2.27 | 20.03 |
| 12 | 51.54 | 51.69 | 45.9 | 55.73 | 34.27 | 2.27 | 20.03 |
| 13 | 58.34 | 58.56 | 45.9 | 55.89 | 34.11 | 2.11 | 17.73 |
| 14 | 58.34 | 58.56 | 45.9 | 55.89 | 34.11 | 2.11 | 17.73 |
| 15 | 58.34 | 58.56 | 45.9 | 55.89 | 34.11 | 2.11 | 17.73 |
| 16 | 58.34 | 58.56 | 45.9 | 55.89 | 34.11 | 2.11 | 17.73 |
| 17 | 64.94 | 65.24 | 45.9 | 56.02 | 33.98 | 1.98 | 15.95 |
| 18 | 64.94 | 65.24 | 45.9 | 56.02 | 33.98 | 1.98 | 15.95 |
| 19 | 64.94 | 65.24 | 45.9 | 56.02 | 33.98 | 1.98 | 15.95 |
| 20 | 64.94 | 65.24 | 45.9 | 56.02 | 33.98 | 1.98 | 15.95 |

FIG. 3B3A

| FACET | SCAN MULT. FACTOR (m) | ROTATION. ANGLE (DEGREES) | ACCOUNTING FOR DEAD TIME FOR LASER BEAM 2.59 (DEGREES) | LIGHT COLLECTION FACTOR | MAXIMUM COLLECTION AREA (IGNORING NOTCH) (SQ. IN.) | DESIGN COLLECTION AREA (INCLUDES NOTCH LOSS OF 0.15 SQ.INCHES) |
|---|---|---|---|---|---|---|
| 1 | 1.37 | 19.19 | 21.78 | 1.00 | 1.29 | 1.36 |
| 2 | 1.37 | 19.19 | 21.78 | 1.00 | 1.29 | 1.36 |
| 3 | 1.37 | 19.19 | 21.78 | 1.00 | 1.29 | 1.36 |
| 4 | 1.37 | 19.19 | 21.78 | 1.00 | 1.29 | 1.36 |
| 5 | 1.35 | 16.91 | 19.51 | 1.32 | 1.71 | 1.75 |
| 6 | 1.35 | 16.91 | 19.51 | 1.32 | 1.71 | 1.75 |
| 7 | 1.35 | 16.91 | 19.51 | 1.32 | 1.71 | 1.75 |
| 8 | 1.35 | 16.91 | 19.51 | 1.32 | 1.71 | 1.75 |
| 9 | 1.34 | 14.98 | 17.58 | 1.72 | 2.23 | 2.23 |
| 10 | 1.34 | 14.98 | 17.58 | 1.72 | 2.23 | 2.23 |
| 11 | 1.34 | 14.98 | 17.58 | 1.72 | 2.23 | 2.23 |
| 12 | 1.34 | 14.98 | 17.58 | 1.72 | 2.23 | 2.23 |
| 13 | 1.33 | 13.38 | 15.97 | 2.19 | 2.84 | 2.81 |
| 14 | 1.33 | 13.38 | 15.97 | 2.19 | 2.84 | 2.81 |
| 15 | 1.33 | 13.38 | 15.97 | 2.19 | 2.84 | 2.81 |
| 16 | 1.33 | 13.38 | 15.97 | 2.19 | 2.84 | 2.81 |
| 17 | 1.32 | 12.12 | 14.71 | 2.71 | 3.51 | 3.43 |
| 18 | 1.32 | 12.12 | 14.71 | 2.71 | 3.51 | 3.43 |
| 19 | 1.32 | 12.12 | 14.71 | 2.71 | 3.51 | 3.43 |
| 20 | 1.32 | 12.12 | 14.71 | 2.71 | 3.51 | 3.43 |

FIG. 3B3B

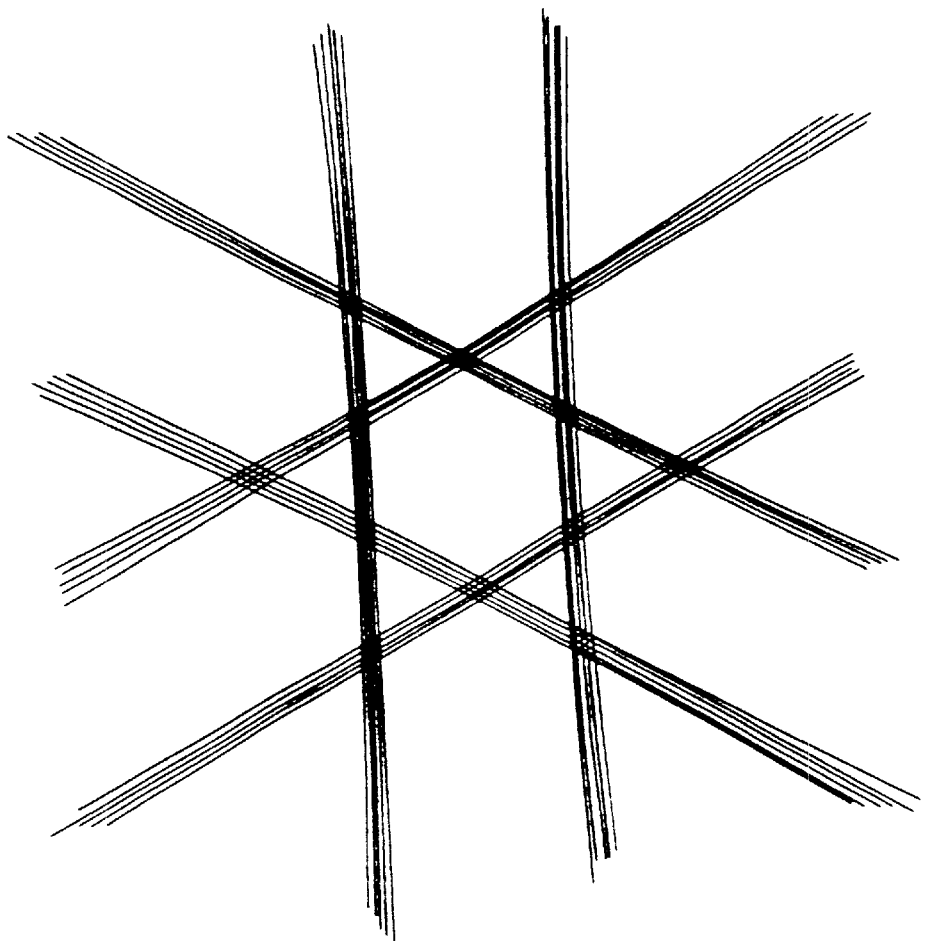
FIG. 3B4

Mirror angles for the 60 degrees Tunnel Scanner

The angle delta is the angular spacing between the mirror and its following neighbour mirror

| Mirror | Angular location of folding mirrors (degrees) | delta | Angular rotation of folding mirrors (degrees) | |
|---|---|---|---|---|
| 1 | 25.61 | 64.39 | 2.28 | CCW |
| 2 | 90.00 | 64.39 | 0.00 | CW |
| 3 | 154.39 | 51.23 | 2.28 | CW |
| 4 | 205.61 | 64.39 | 2.28 | CCW |
| 5 | 270.00 | 64.39 | 0.00 | CW |
| 6 | 334.39 | 51.23 | 2.28 | CW |

FIG. 3B5

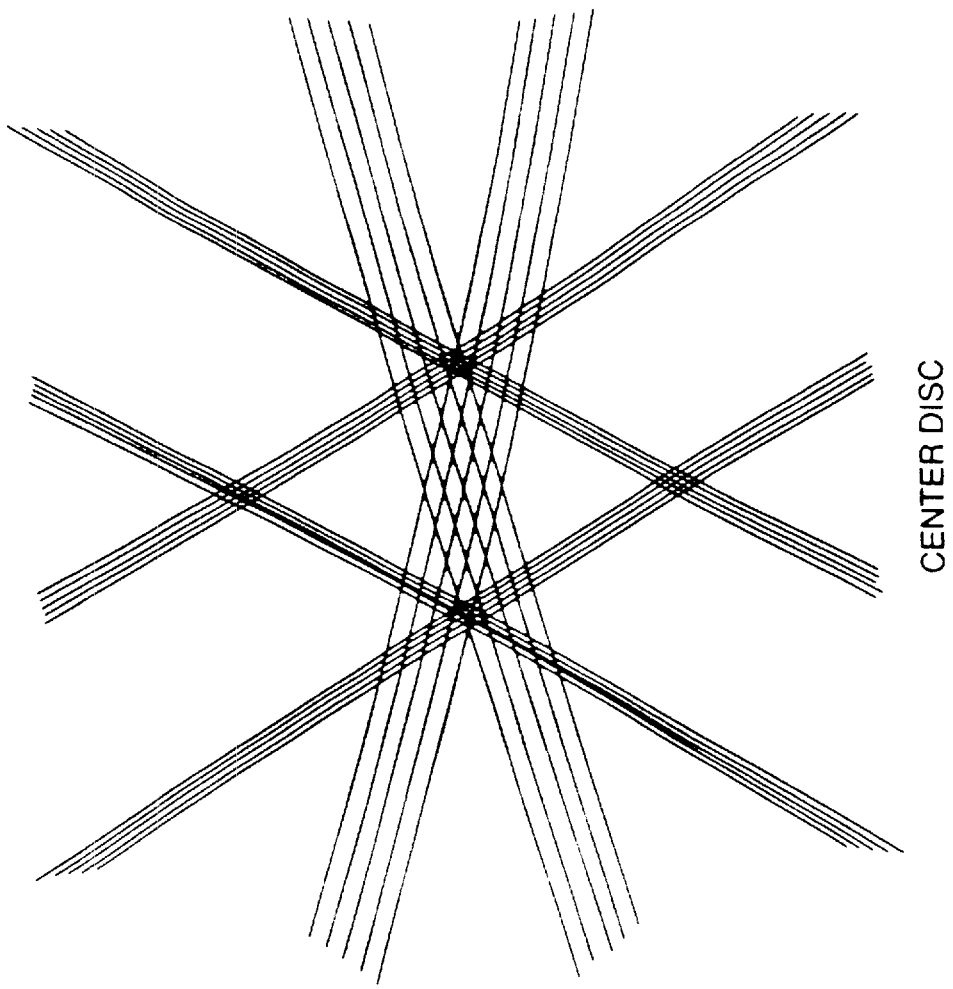
FIG. 3B6  CENTER DISC

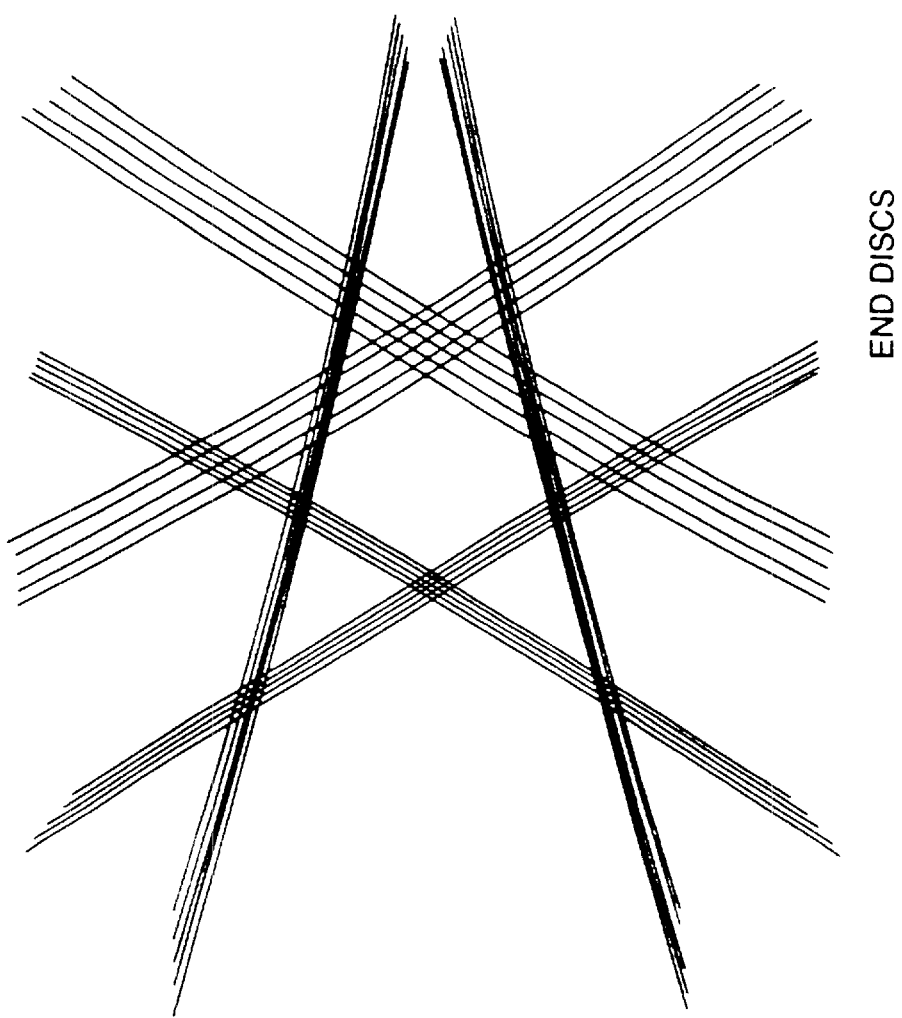
FIG. 3B7
END DISCS

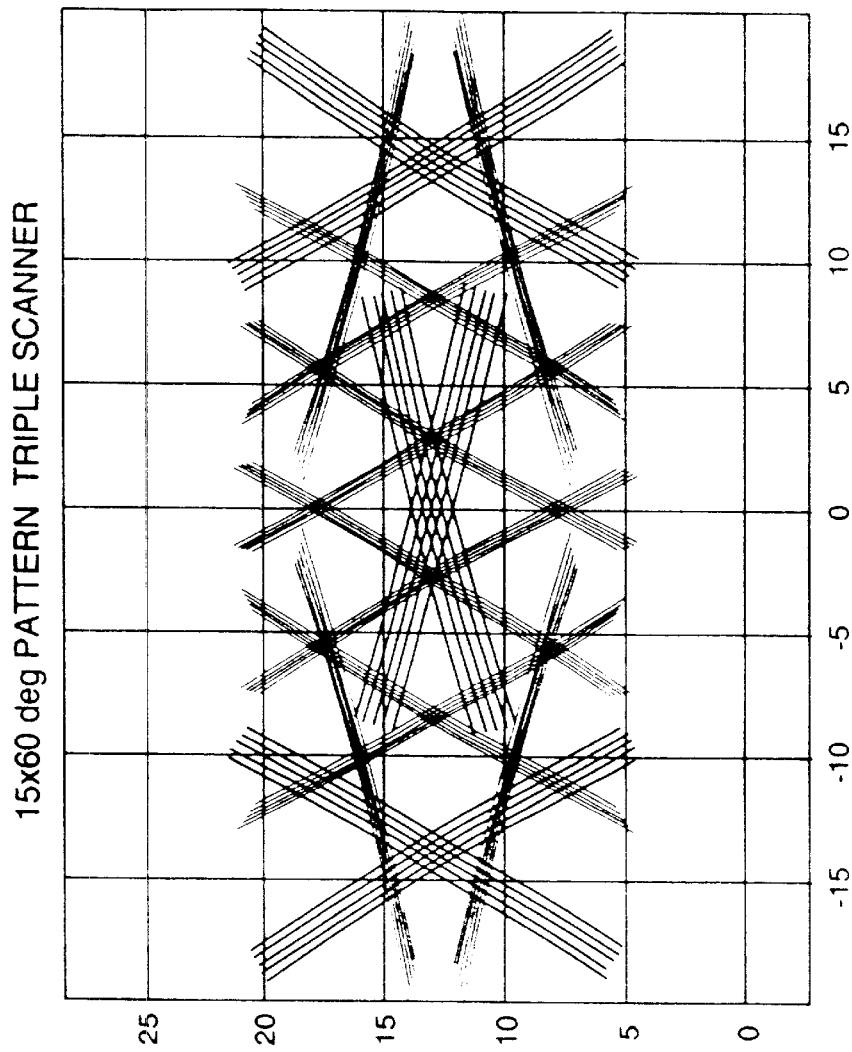
FIG. 3B8

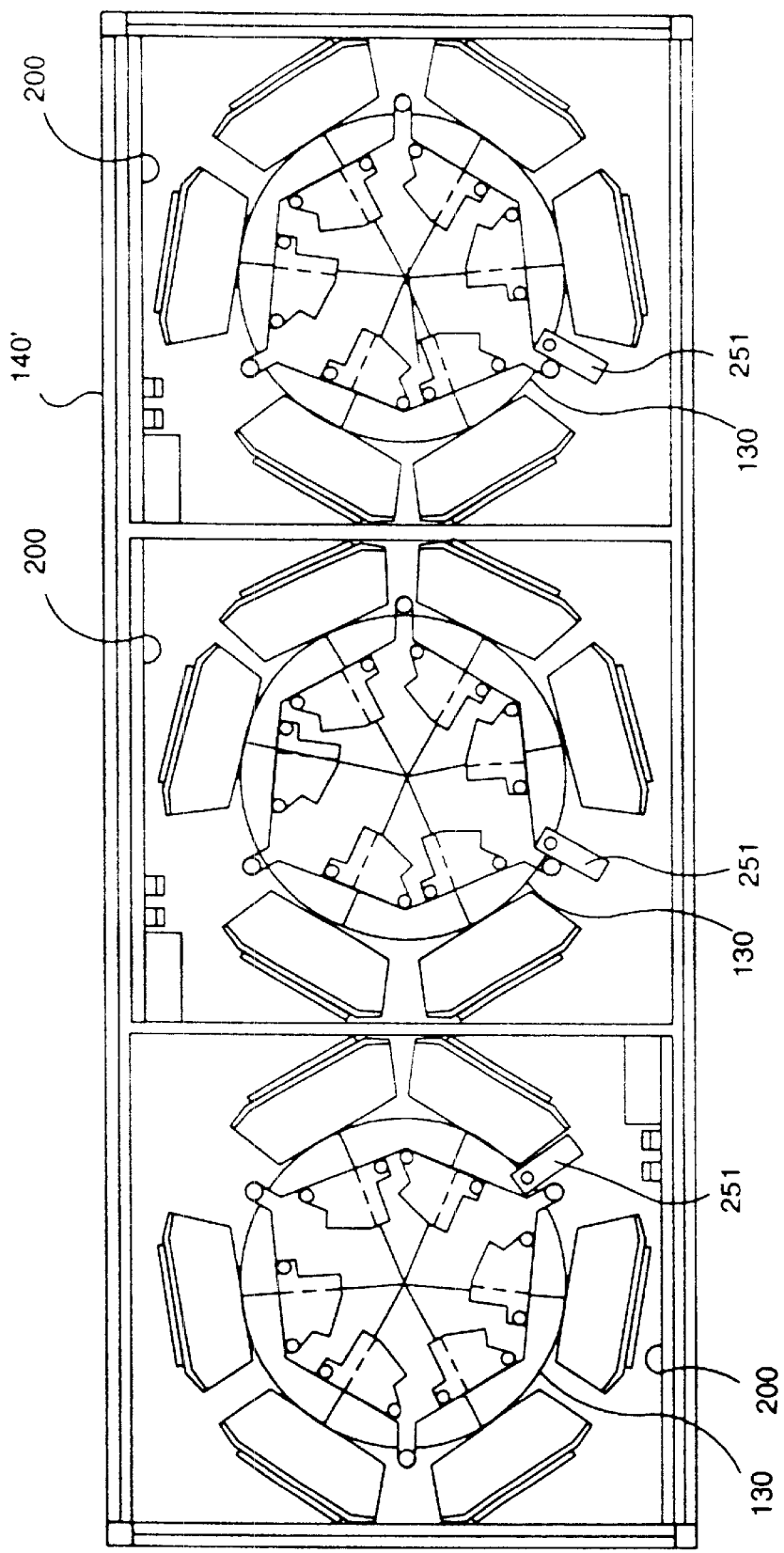
FIG. 3C1

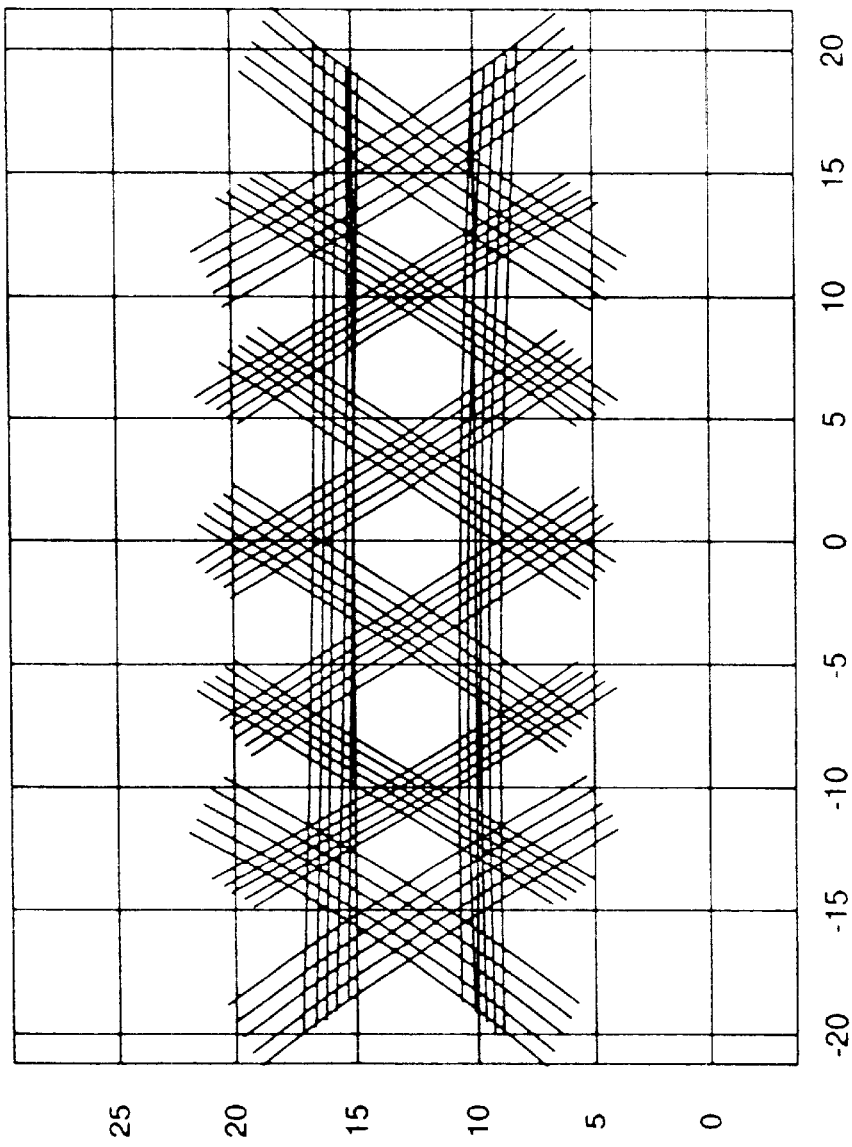
FIG. 3C2

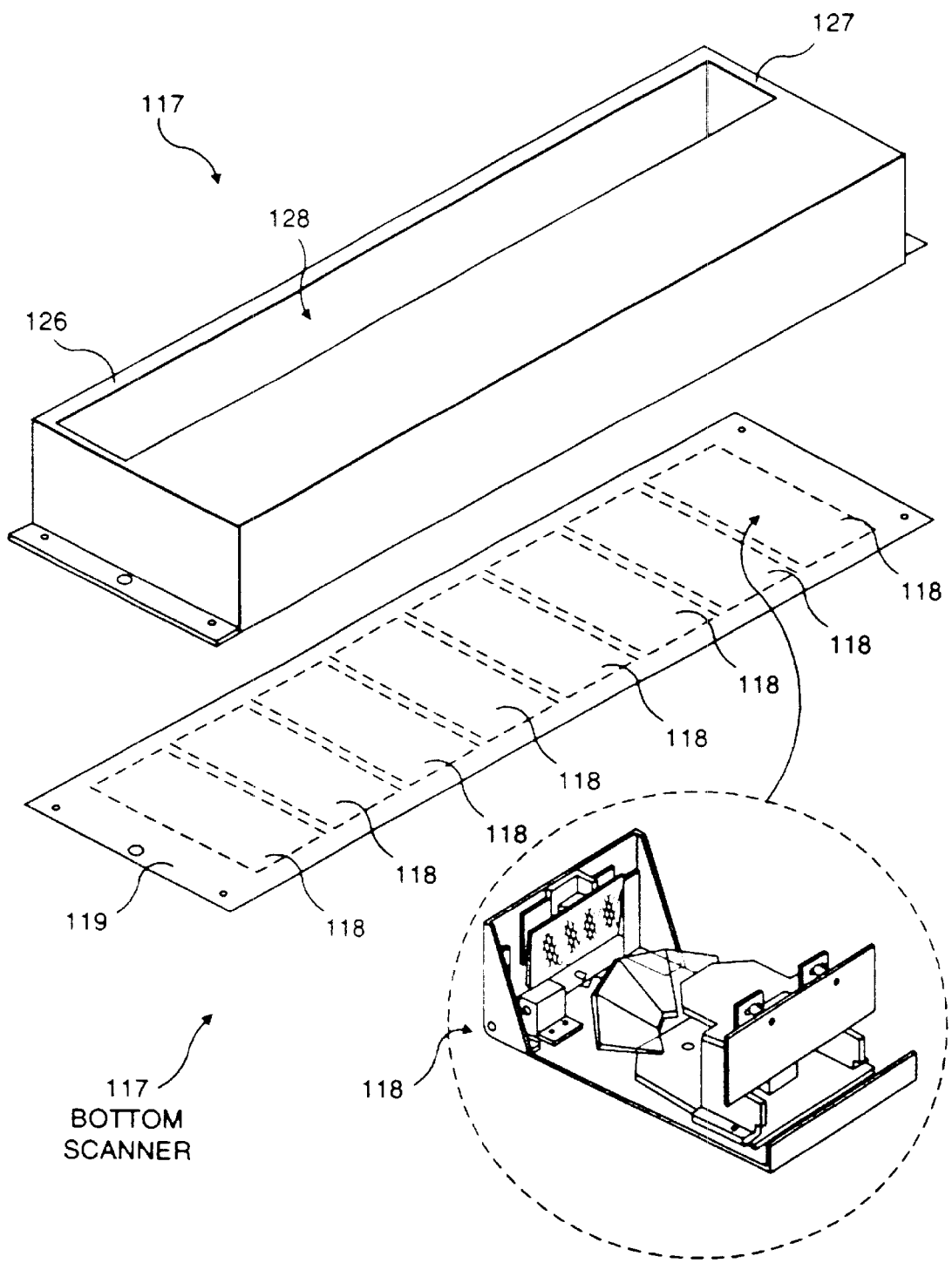
F I G. 3D1

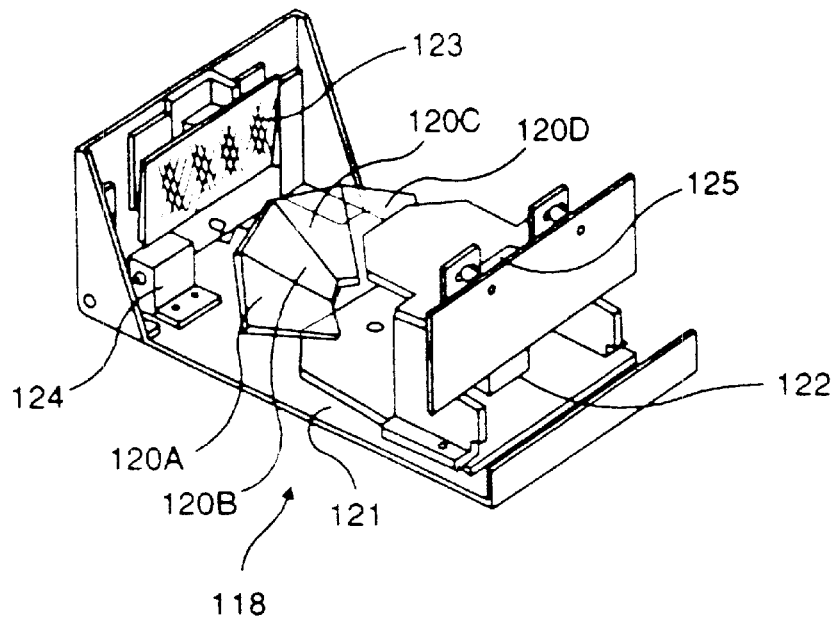
F I G. 3D2
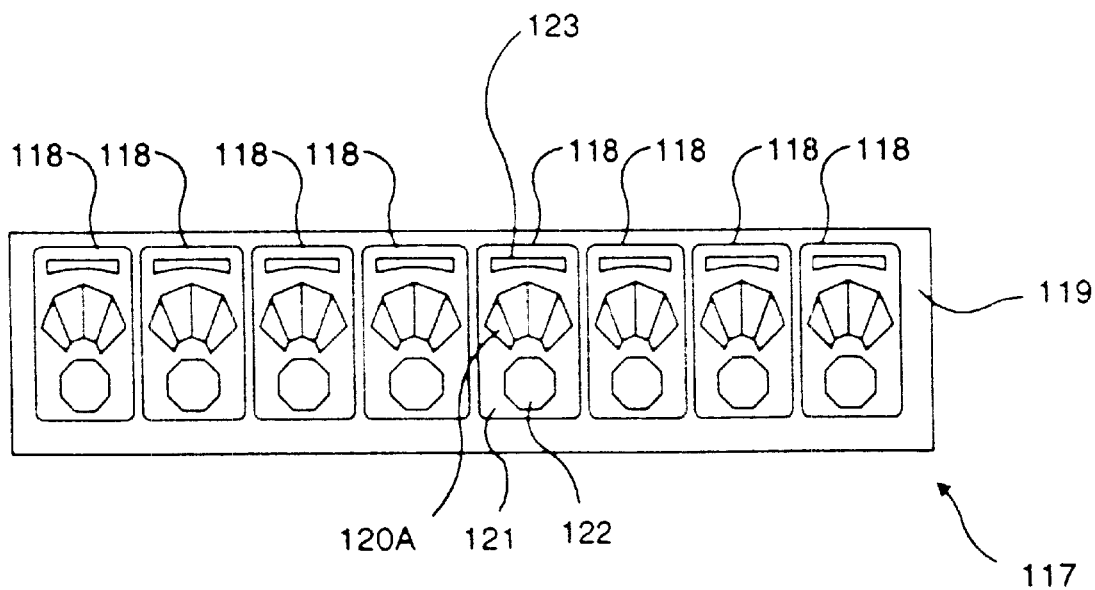
F I G. 3D3A

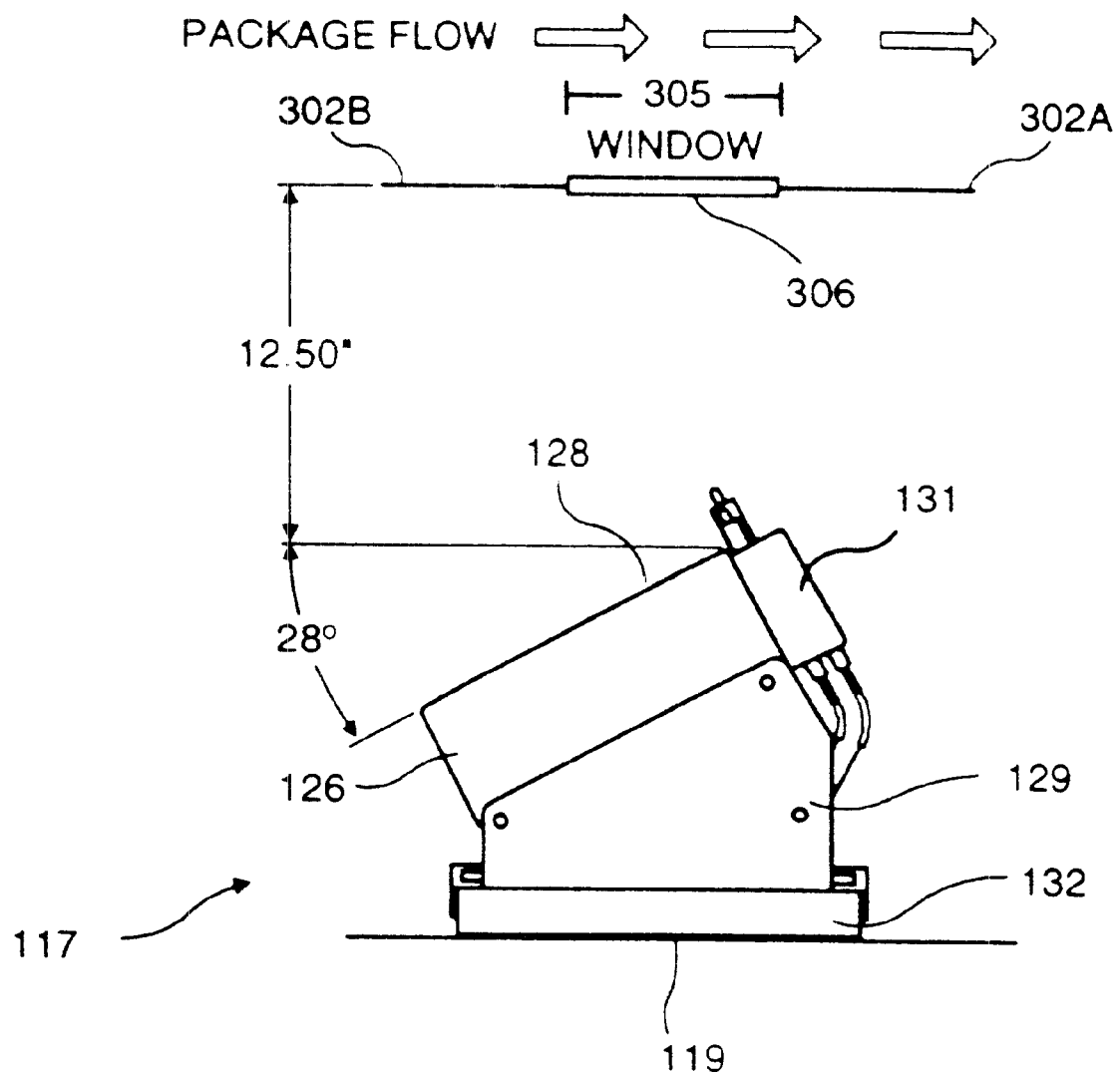
FIG. 3D3B

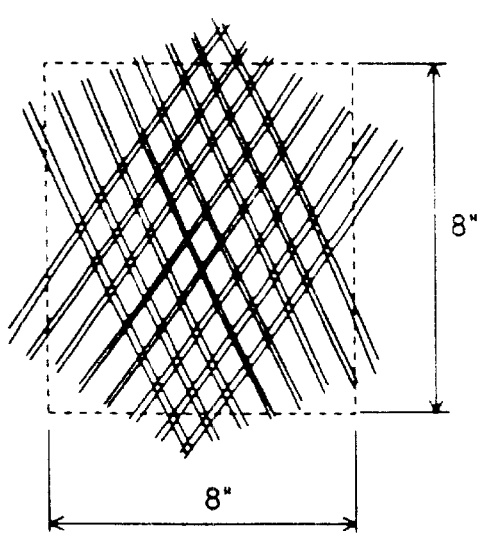
F I G. 3D4
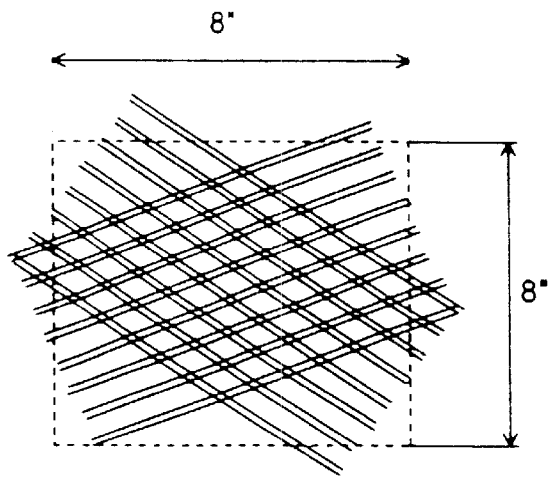
F I G. 3D5
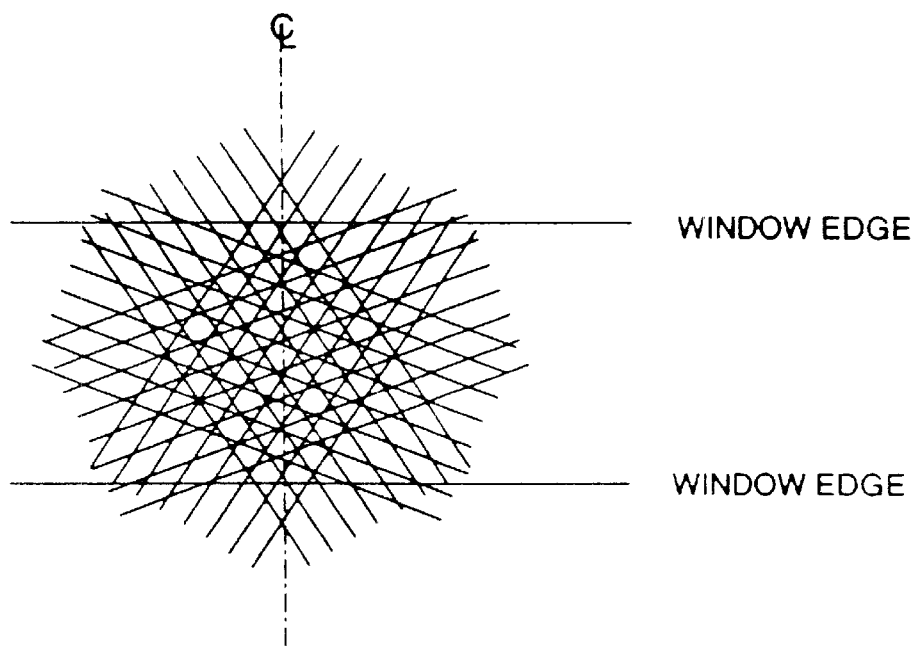
LASER SCAN PATTERN PRODUCED
FROM SINGLE OPTICAL BENCH
F I G. 3D6

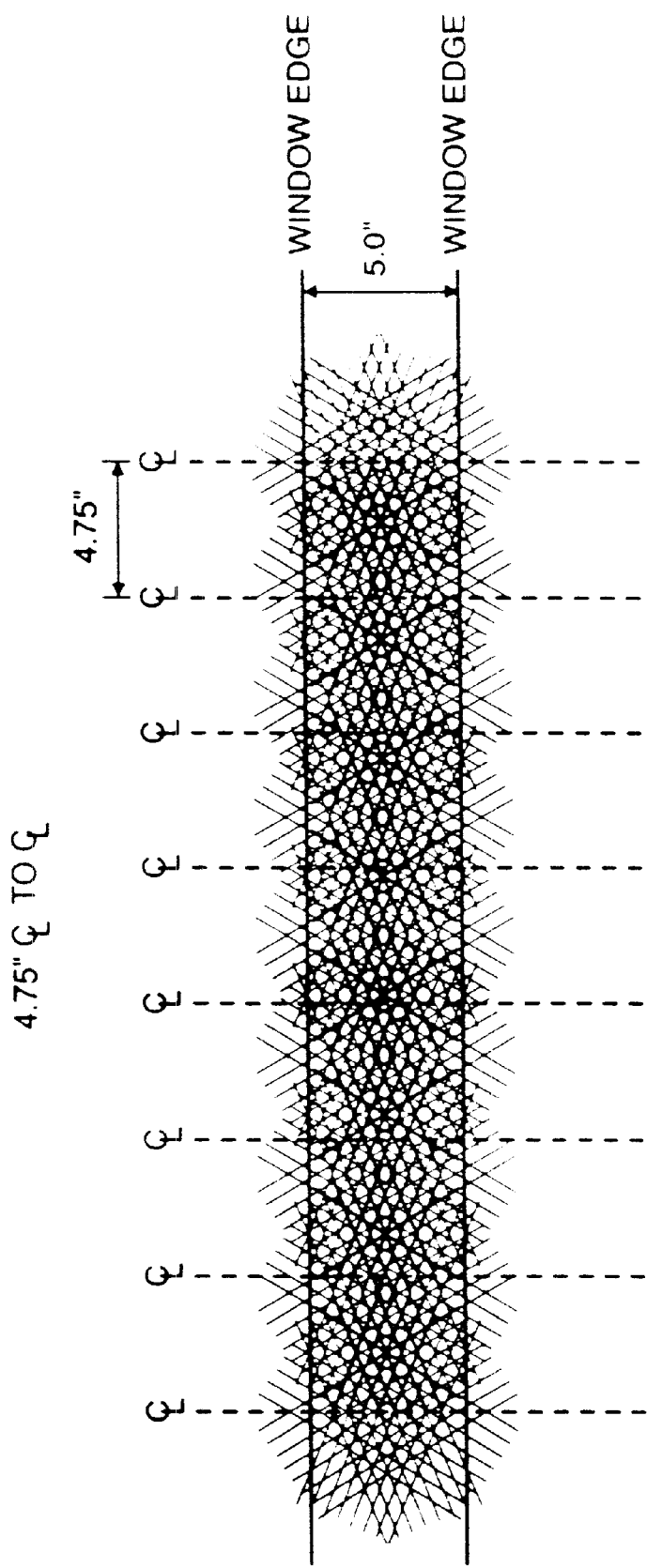
FIG. 3D7

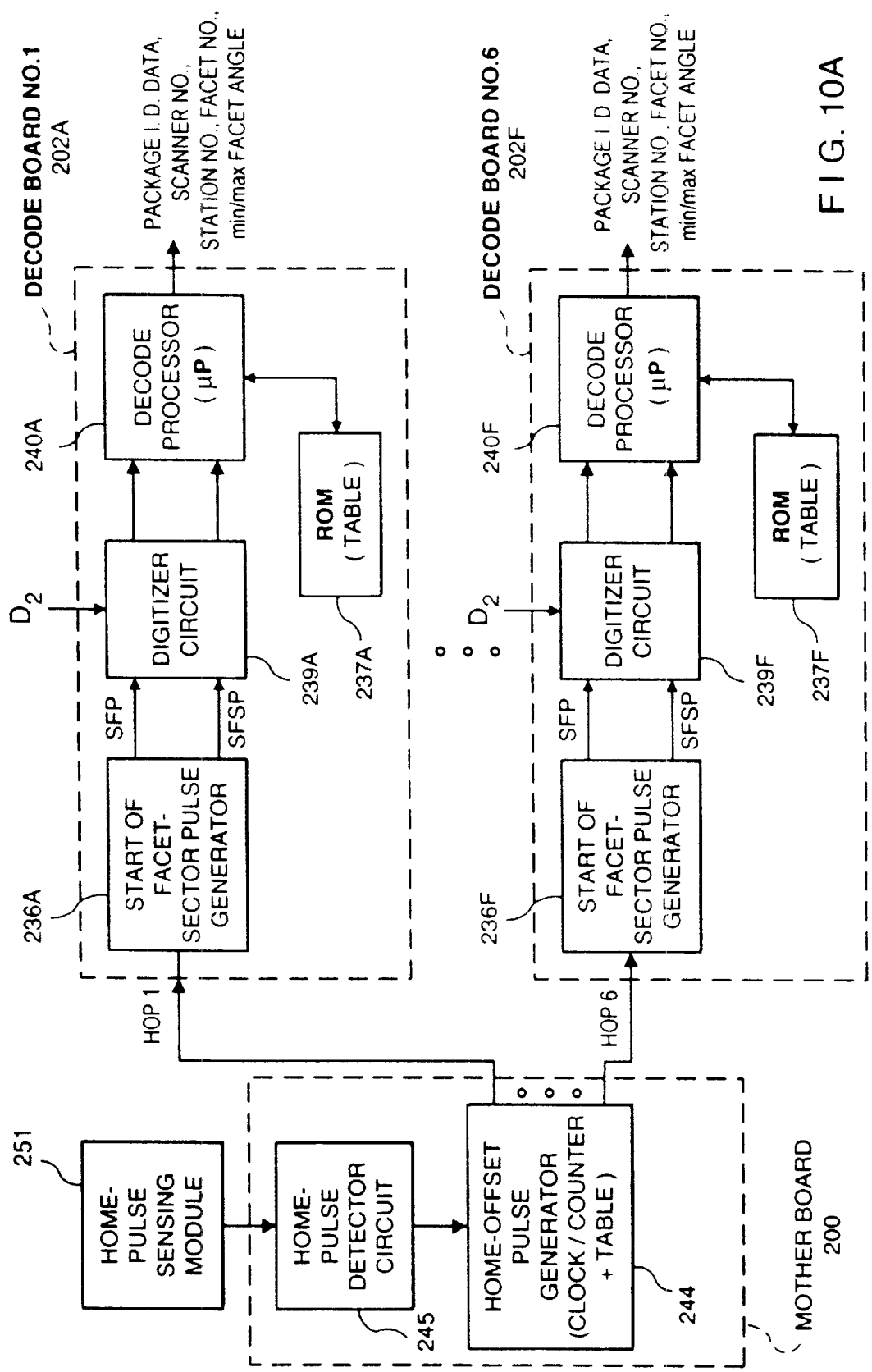

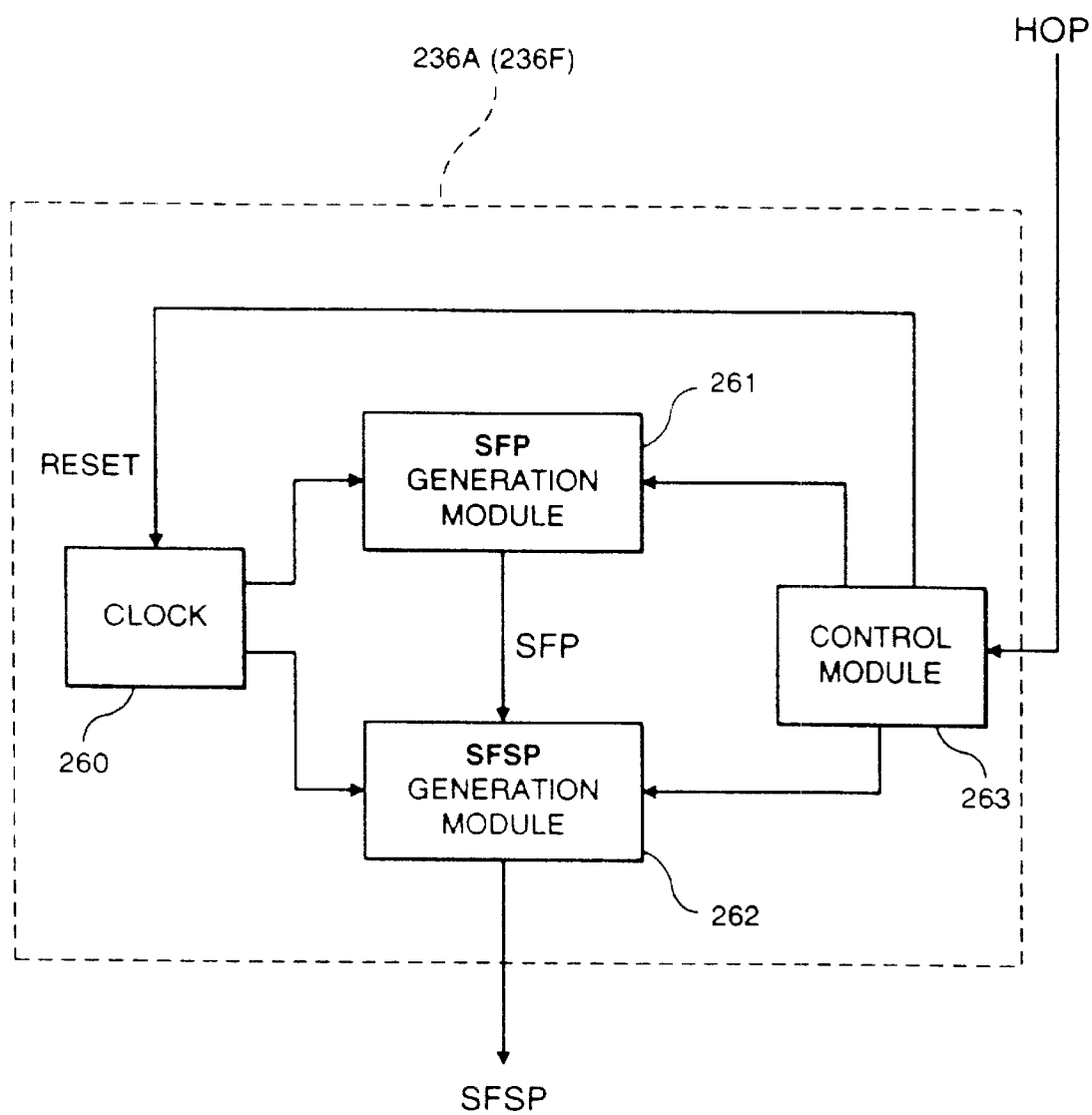
F I G. 10B

DATA TABLE EMBODIED IN SFP GENERATOR ON DECODE PROCESSOR BOARD

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE |
|---|---|---|
| 12 | 7 | SF12P |
| 16 | 146 | SF16P |
| 4 | 271 | SF4P |
| 20 | 446 | SF20P |
| 8 | 561 | SF8P |
| 11 | 716 | SF11P |
| 15 | 855 | SF15P |
| 3 | 980 | SF3P |
| 19 | 1155 | SF19P |
| 7 | 1270 | SF7P |
| 10 | 1425 | SF10P |
| 14 | 1564 | SF14P |
| 2 | 1689 | SF2P |
| 18 | 1864 | SF18P |
| 6 | 1979 | SF6P |
| 9 | 2134 | SF9P |
| 13 | 2273 | SF13P |
| 1 | 2398 | SF1P |
| 17 | 2573 | SF17P |
| 5 | 2688 | SF5P |

W = 5200 RPM

CLOCK PULSE WIDTH = 4 μSEC

FIG. 10C

TABLE EMBODIED IN SFSP GEERATOR DECODE
PROCESSOR BOARD

| SCANNING FACET NO. | SFSP TRIGGERING EVENT | PULSE EVENT FROM SFSP MODULE |
|---|---|---|
| 12 | RULES 1 - 4 IN FIGS. | SFS 12/1P |
|  |  | SFS 12/2P |
|  |  | SFS 12/3P |
|  |  | SFS 12/4P |
| 16 | RULES 1-4 IN FIGS. | SFS 16/1P |
|  |  | SFS 16/2P |
|  |  | SFS 16/3P |
|  |  | SFS 16/4P |
| 4 | RULES 1-4 IN FIGS. | SFS 4/1P |
|  |  | SFS 4/2P |
|  |  | SFS 4/3P |
|  |  | SFS 4/4P |
| 20 | RULES 1-4 IN FIGS. | SFS 20/1P |
|  |  | SFS 20/2P |
|  |  | SFS 20/3P |
|  |  | SFS 20/4P |
| 8 | RULES 1-4 IN FIGS. | SFS 8/1P |
|  |  | SFS 8/2P |
|  |  | SFS 8/3P |
|  |  | SFS 8/4P |
| 11 | RULES 1-4 IN FIGS. | SFS 11/1P |
|  |  | SFS 11/2P |
|  |  | SFS 11/3P |
|  |  | SFS 11/4P |
| ⋮ | ⋮ | ⋮ |
| 17 | RULES 1-4 IN FIGS. | SFS 17/1P |
|  |  | SFS 17/2P |
|  |  | SFS 17/3P |
|  |  | SFS 17/4P |
| 5 | RULES 1-4 IN FIGS. | SFS 5/1P |
|  |  | SFS 5/2P |
|  |  | SFS 5/3P |
|  |  | SFS 5/4P |

FIG. 10E

RULE 1: FOR GENERATING SFSX/1P TYPE PULSES

FOR EACH FACET X BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/1P TYPE PULSES WHEN THE COUNT IS EQUAL TO:

COUNT (SFXP)

RULE 2: FOR GENERATING SFSX/2P TYPE PULSES

FOR EACH FACET X, BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/2P TYPE PULSES WHEN THE COUNT IS EQUAL TO:

$$\text{COUNT (SFXP)} + 1\left[\frac{\text{COUNT (SFX+1P)} - \text{COUNT (SFXP)}}{4}\right]$$

FIG. 10F1

RULE 3: FOR GENERATING SFSX/3P TYPE PULSES

FOR EACH FACET X BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/3 TYPE PULSES WHEN THE COUNT IS EQUAL TO:

$$\text{COUNT (SFXP)} + 2\left[\frac{\text{COUNT (SFX+1P)} - \text{COUNT (SFXP)}}{4}\right]$$

RULE 4: FOR GENERATING SFSX/4P TYPE PULSES

FOR EACH FACET X, BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/4 TYPE PULSES WHEN THE COUNT IS EQUAL TO:

$$\text{COUNT (SFXP)} + 3\left[\frac{\text{COUNT (SFX+1P)} - \text{COUNT (SFXP)}}{4}\right]$$

FIG. 10F2

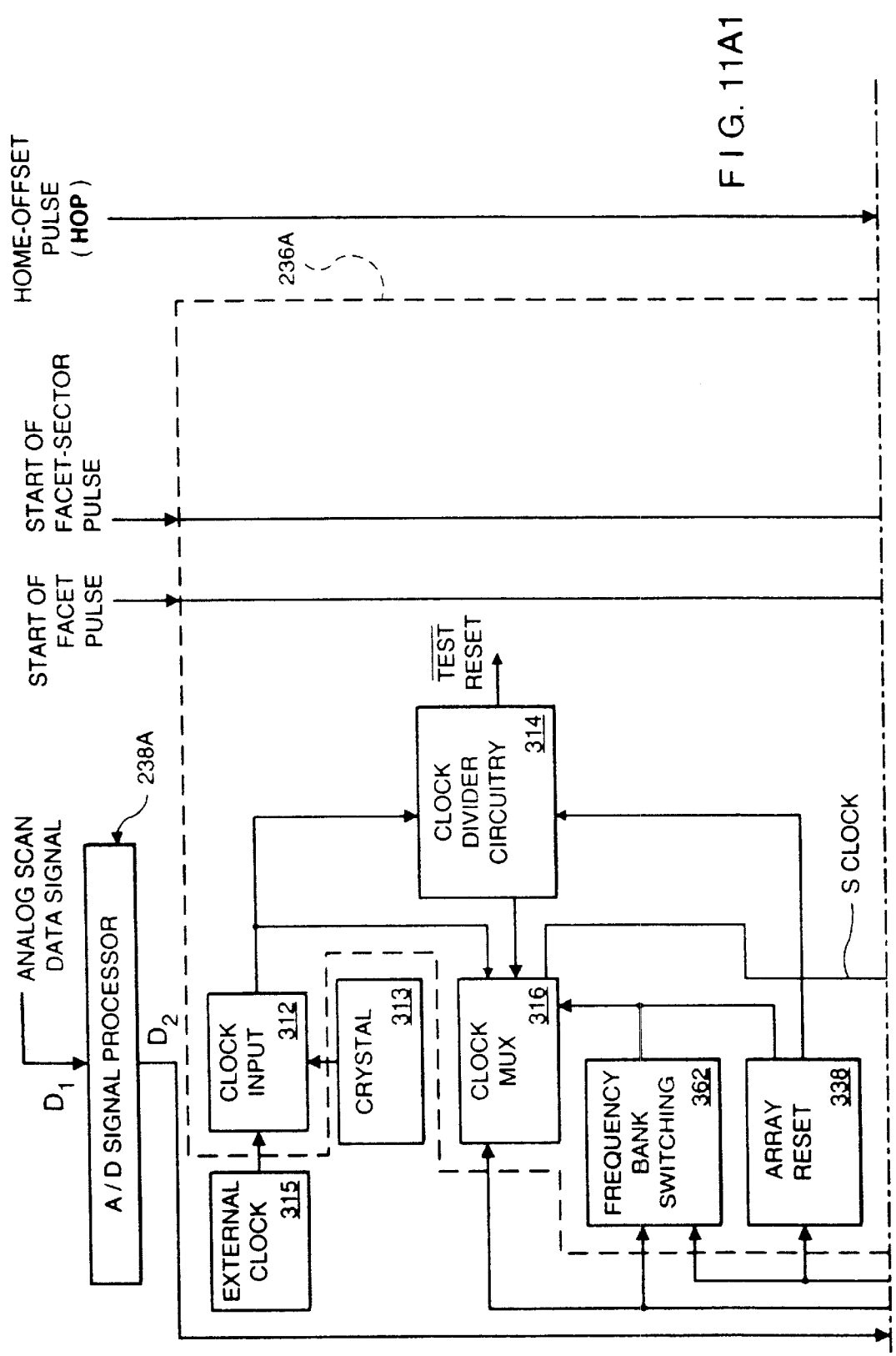
FIG. 11A1

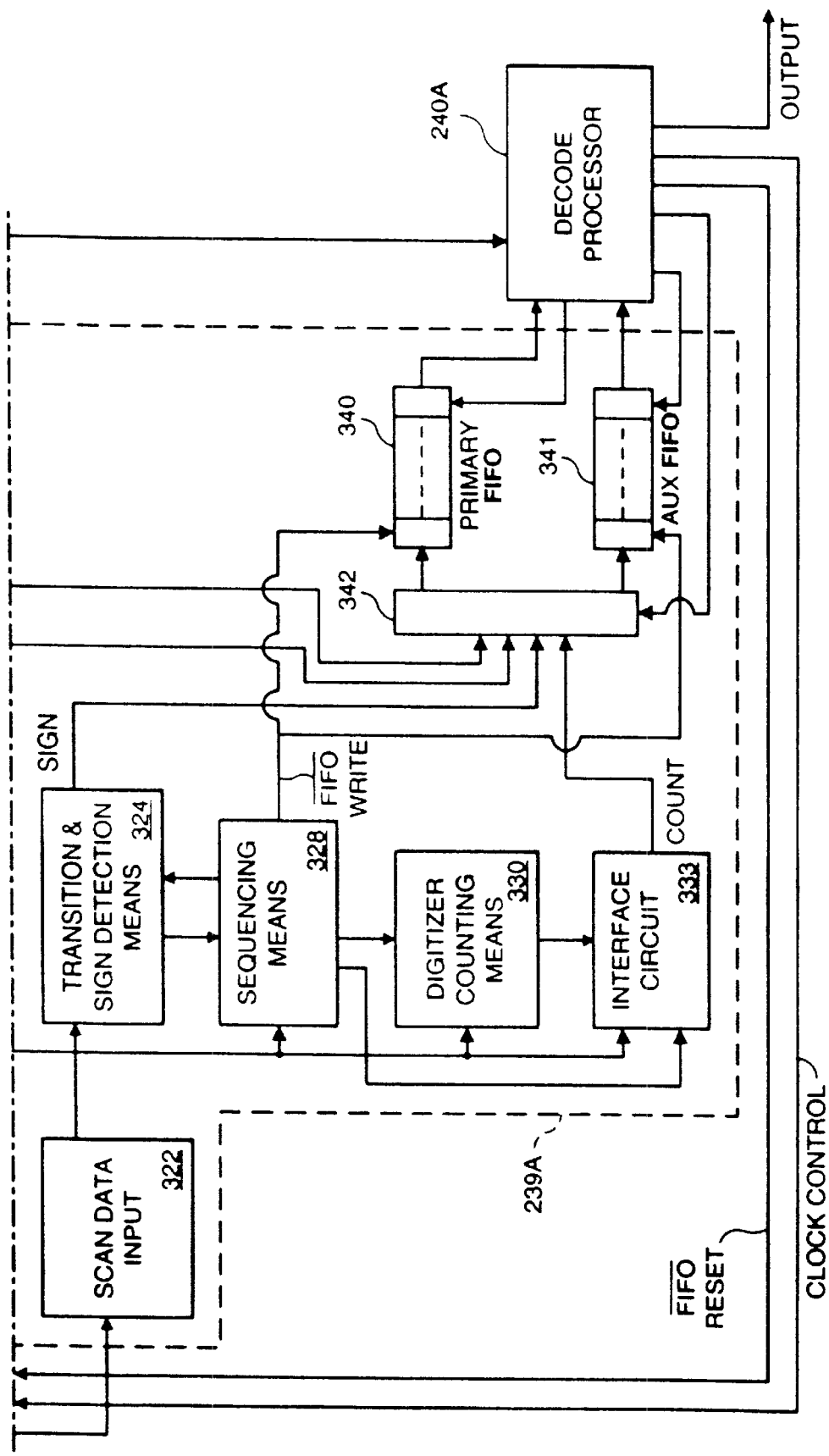
FIG. 11A2

| SCANNER NO. | TOTAL NO OF FACETS ON DISC |
|---|---|
| NO. OF SECTORS / FACET | SCANNING STATION NO. |

FIG. 11C1

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE |
|---|---|---|
| 12 | 7 | SF12P |
| 16 | 146 | SF16P |
| 4 | 271 | SF4P |
| 20 | 446 | SF20P |
| 8 | 561 | SF8P |
| 11 | 716 | SF11P |
| 15 | 855 | SF15P |
| 3 | 980 | SF3P |
| 19 | 1155 | SF19P |
| 7 | 1270 | SF7P |
| 10 | 1425 | SF10P |
| 14 | 1564 | SF14P |
| 2 | 1689 | SF2P |
| 18 | 1864 | SF18P |
| 6 | 1979 | SF6P |
| 9 | 2134 | SF9P |
| 13 | 2273 | SF13P |
| 1 | 2398 | SF1P |
| 17 | 2573 | SF17P |
| 5 | 2688 | SF5P |

TABLES EMBODIED IN DECODE PROCESSOR

W = 5200 RPM

CLOCK PULSE WIDTH = 4.0 μSEC

FIG. 11C2

TABLE EMBODIED IN DECODE PROCESSOR

| SCANNING FACET NO. | SFSP TRIGGERING EVENT | PULSE EVENT FROM SFSP MODULE | MINIMUM AND MAXIMUM FACET ANGLES CORRESPONDING TO FACET-SECTOR IDENTIFIED BY SFSP EVENT |
|---|---|---|---|
| 12 | RULES 1 - 4 IN FIGS. | SFS 12/1P | $\theta$ ROT MIN , $\theta$ ROT MAX |
| | | SFS 12/2P | |
| | | SFS 12/3P | |
| | | SFS 12/4P | |
| 16 | RULES 1-4 IN FIGS. | SFS 16/1P | |
| | | SFS 16/2P | |
| | | SFS 16/3P | |
| | | SFS 16/4P | |
| 4 | RULES 1-4 IN FIGS. | SFS 4/1P | |
| | | SFS 4/2P | |
| | | SFS 4/3P | |
| | | SFS 4/4P | |
| 20 | RULES 1-4 IN FIGS. | SFS 20/1P | |
| | | SFS 20/2P | |
| | | SFS 20/3P | |
| | | SFS 20/4P | |
| 8 | RULES 1-4 IN FIGS. | SFS 8/1P | |
| | | SFS 8/2P | |
| | | SFS 8/3P | |
| | | SFS 8/4P | |
| 11 | RULES 1-4 IN FIGS. | SFS 11/1P | |
| | | SFS 11/2P | |
| | | SFS 11/3P | |
| | | SFS 11/4P | |
| ... | ... | | |
| 17 | RULES 1-4 IN FIGS. | SFS 17/1P | |
| | | SFS 17/2P | |
| | | SFS 17/3P | |
| | | SFS 17/4P | |
| 5 | RULES 1-4 IN FIGS. | SFS 5/1P | |
| | | SFS 5/2P | |
| | | SFS 5/3P | |
| | | SFS 5/4P | |

FIG. 11D

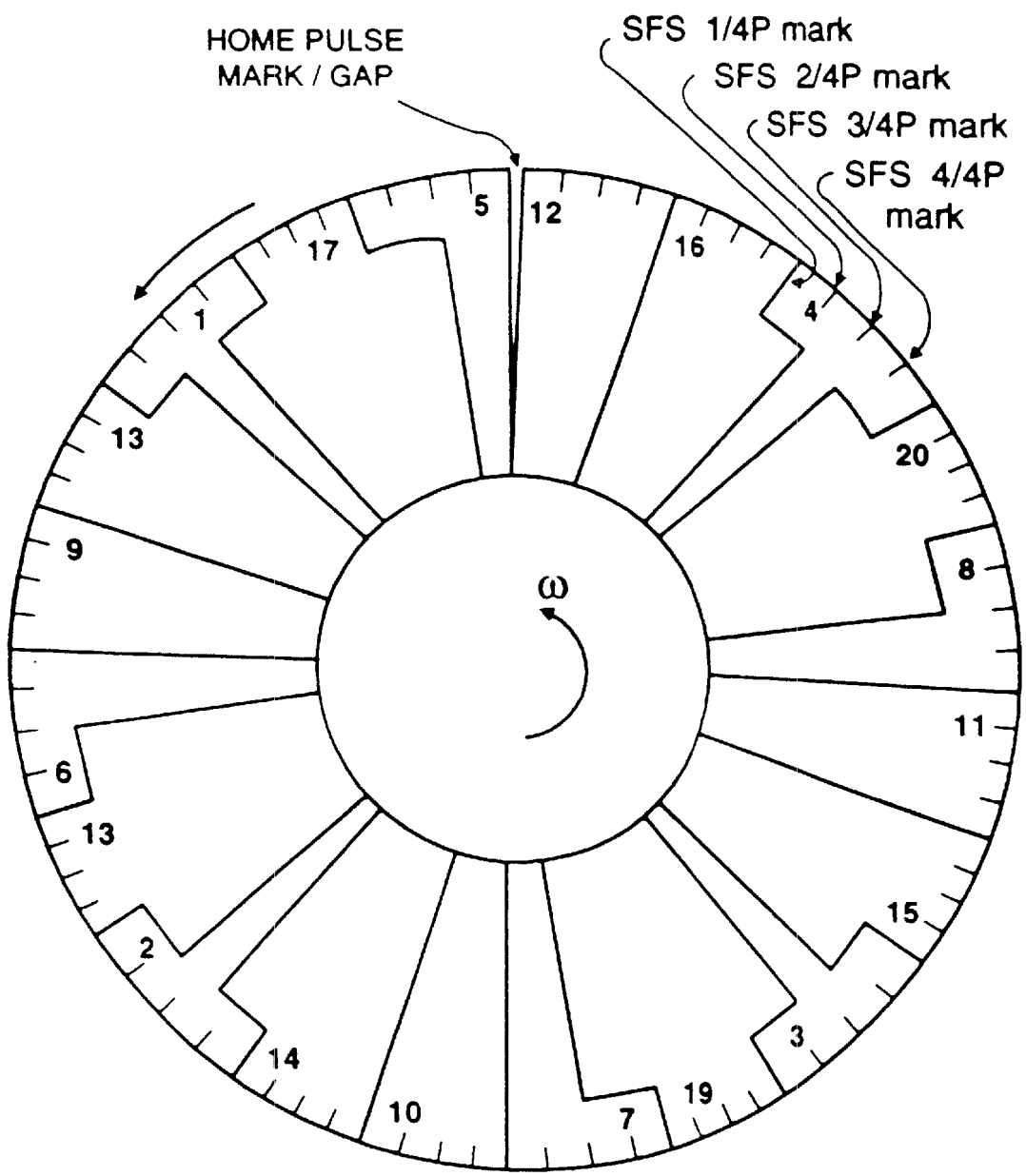
F I G. 12A

TABLE EMBODIED IN SFSP GENERATOR MODULE

| SCANNING FACET NO. | SFSP TRIGGERING EVENTS | PULSE EVENT FROM SFSP MODULE |
|---|---|---|
| 12 | DETECTION OF 1$^{ST}$, 2$^{ND}$, 3$^{RD}$ AND 4$^{TH}$ SFS PULSE AFTER DETECTION OF HOME PULSE (HOP) | SFS 12/1P<br>SFS 12/2P<br>SFS 12/3P<br>SFS 12/4P |
| 16 | DETECTION OF 5$^{TH}$, 6$^{TH}$, 7$^{TH}$ AND 8$^{TH}$ SFS PULSE AFTER DETECTION OF HOP | SFS 16/1P<br>SFS 16/2P<br>SFS 16/3P<br>SFS 16/4P |
| 4 | DETECTION OF 9$^{TH}$, 10$^{TH}$, 11$^{TH}$ AND 12$^{TH}$ SFSP AFTER DETECTION OF HOP | SFS 4/1P<br>SFS 4/2P<br>SFS 4/3P<br>SFS 4/4P |
| 20 | DETECTION OF 13$^{TH}$, 14$^{TH}$, 15$^{TH}$ AND 16$^{TH}$ SFSP AFTER DETECTION OF HOP | SFS 20/1P<br>SFS 20/2P<br>SFS 20/3P<br>SFS 20/4P |
| 8 | DETECTION OF 17$^{TH}$, 18$^{TH}$, 19$^{TH}$ AND 20$^{TH}$ SFSP AFTER DETECTION OF HOP | SFS 8/1P<br>SFS 8/2P<br>SFS 8/3P<br>SFS 8/4P |
| 11 | DETECTION OF 21$^{ST}$, 22$^{ND}$, 23$^{RD}$ AND 24$^{TH}$ SFSP AFTER DETECTION OF HOP | SFS 11/1P<br>SFS 11/2P<br>SFS 11/3P<br>SFS 11/4P |
| ⋮ | ⋮ | |
| 17 | DETECTION OF 73$^{RD}$, 74$^{TH}$, 75$^{TH}$ AND 76$^{TH}$ SFSP AFTER DETECTION OF HOP | SFS 17/1P<br>SFS 17/2P<br>SFS 17/3P<br>SFS 17/4P |
| 5 | DETECTION OF 77$^{TH}$, 78$^{TH}$, 79$^{TH}$ AND 80$^{TH}$ SFSP AFTER DETECTION OF HOP | SFS 5/1P<br>SFS 5/2P<br>SFS 5/3P<br>SFS 5/4P |

FIG. 12D

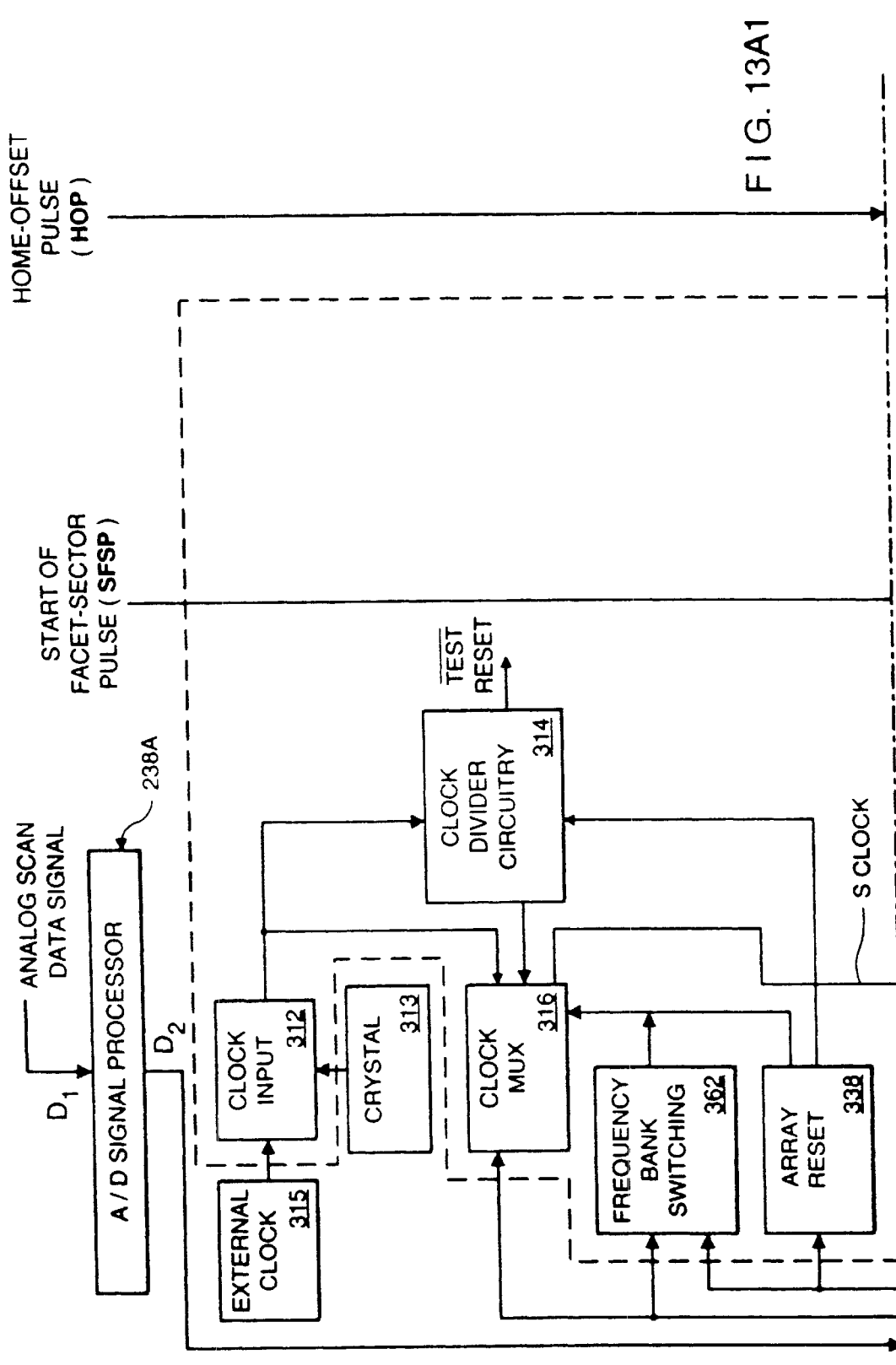
FIG. 13A1

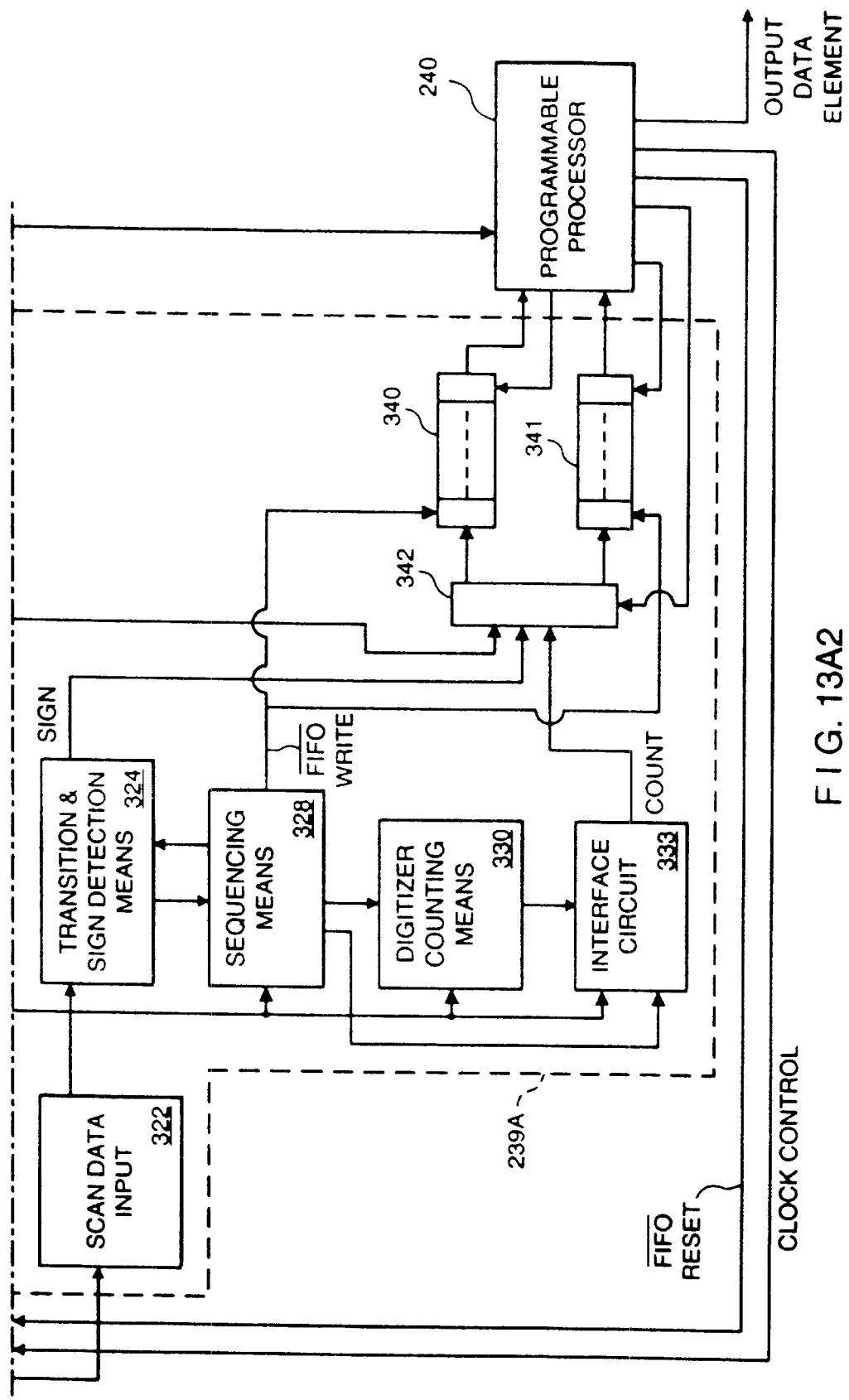
FIG. 13A2

| SCANNER NO. | SCANNING STATION NO. |
|---|---|
| TOTAL NO. OF FACETS ON DISC | NO. OF SECTORS PER FACET |

FIG. 13C1

TABLE EMBODIED IN DECODE PROCESSOR

| SCANNING FACET NO. | SFSP TRIGGERING EVENTS | PULSE EVENT FROM SFSP MODULE | MIN. AND MAX. FACET ANGLES CORRESPONDING TO FACET SECTOR IDENTIFIED BY SFSP EVENT |
|---|---|---|---|
| 12 | DETECTION OF 1$^{ST}$, 2$^{ND}$, 3$^{RD}$ AND 4$^{TH}$ SFS PULSE AFTER DETECTION OF HOME PULSE (HOP) | SFS 12/1P | $\theta$ ROT MIN , $\theta$ ROT MAX |
| | | SFS 12/2P | |
| | | SFS 12/3P | |
| | | SFS 12/4P | |
| 16 | DETECTION OF 5$^{TH}$, 6$^{TH}$, 7$^{TH}$ AND 8$^{TH}$ SFS PULSE AFTER DETECTION OF HOP | SFS 16/1P | |
| | | SFS 16/2P | |
| | | SFS 16/3P | |
| | | SFS 16/4P | |
| 4 | DETECTION OF 9$^{TH}$, 10$^{TH}$, 11$^{TH}$ AND 12$^{TH}$ SFSP AFTER DETECTION OF HOP | SFS 4/1P | |
| | | SFS 4/2P | |
| | | SFS 4/3P | |
| | | SFS 4/4P | |
| 20 | DETECTION OF 13$^{TH}$, 14$^{TH}$, 15$^{TH}$ AND 16$^{TH}$ SFSP AFTER DETECTION OF HOP | SFS 20/1P | |
| | | SFS 20/2P | |
| | | SFS 20/3P | |
| | | SFS 20/4P | |
| 8 | DETECTION OF 17$^{TH}$, 18$^{TH}$, 19$^{TH}$ AND 20$^{TH}$ SFSP AFTER DETECTION OF HOP | SFS 8/1P | |
| | | SFS 8/2P | |
| | | SFS 8/3P | |
| | | SFS 8/4P | |
| 11 | DETECTION OF 21$^{ST}$, 22$^{ND}$, 23$^{RD}$ AND 24$^{TH}$ SFSP AFTER DETECTION OF HOP | SFS 11/1P | |
| | | SFS 11/2P | |
| | | SFS 11/3P | |
| | | SFS 11/4P | |
| ⋮ | | | |
| 17 | DETECTION OF 73$^{RD}$, 74$^{TH}$, 75$^{TH}$ AND 76$^{TH}$ SFSP AFTER DETECTION OF HOP | SFS 17/1P | |
| | | SFS 17/2P | |
| | | SFS 17/3P | |
| | | SFS 17/4P | |
| 5 | DETECTION OF 77$^{TH}$, 78$^{TH}$, 79$^{TH}$ AND 80$^{TH}$ SFSP AFTER DETECTION OF HOP | SFS 5/1P | |
| | | SFS 5/2P | |
| | | SFS 5/3P | |
| | | SFS 5/4P | |

FIG. 13C2

PACKAGE VELOCITY AND PACKAGE LENGTH MEASUREMENT SUBSYSTEM

PACKAGE-OUT-OF THE TUNNEL (POOT) INDICATION SUBSYSTEM 700

PACKAGE VELOCITY AND PACKAGE LENGTH MEASUREMENT SUBSYSTEM
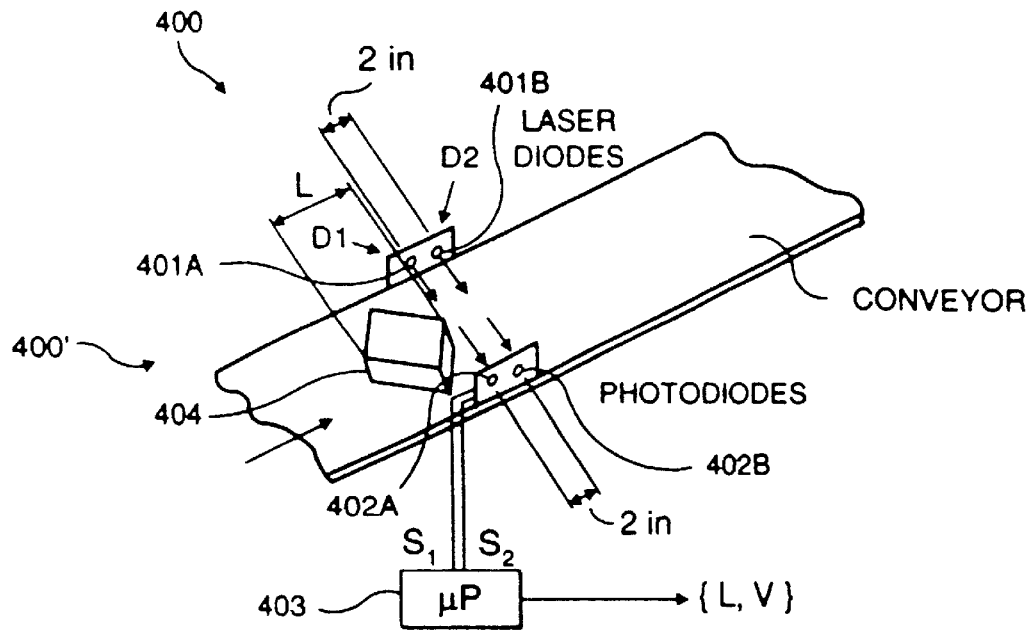
FIG. 15B1
PHOTODIODE OUTPUTS
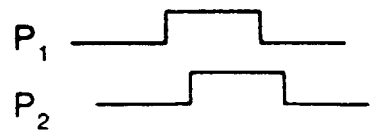
FIG. 15B2
INPUT TO MICROPROCESSOR
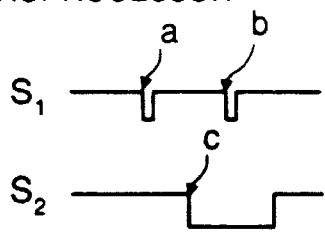
FIG. 15B3

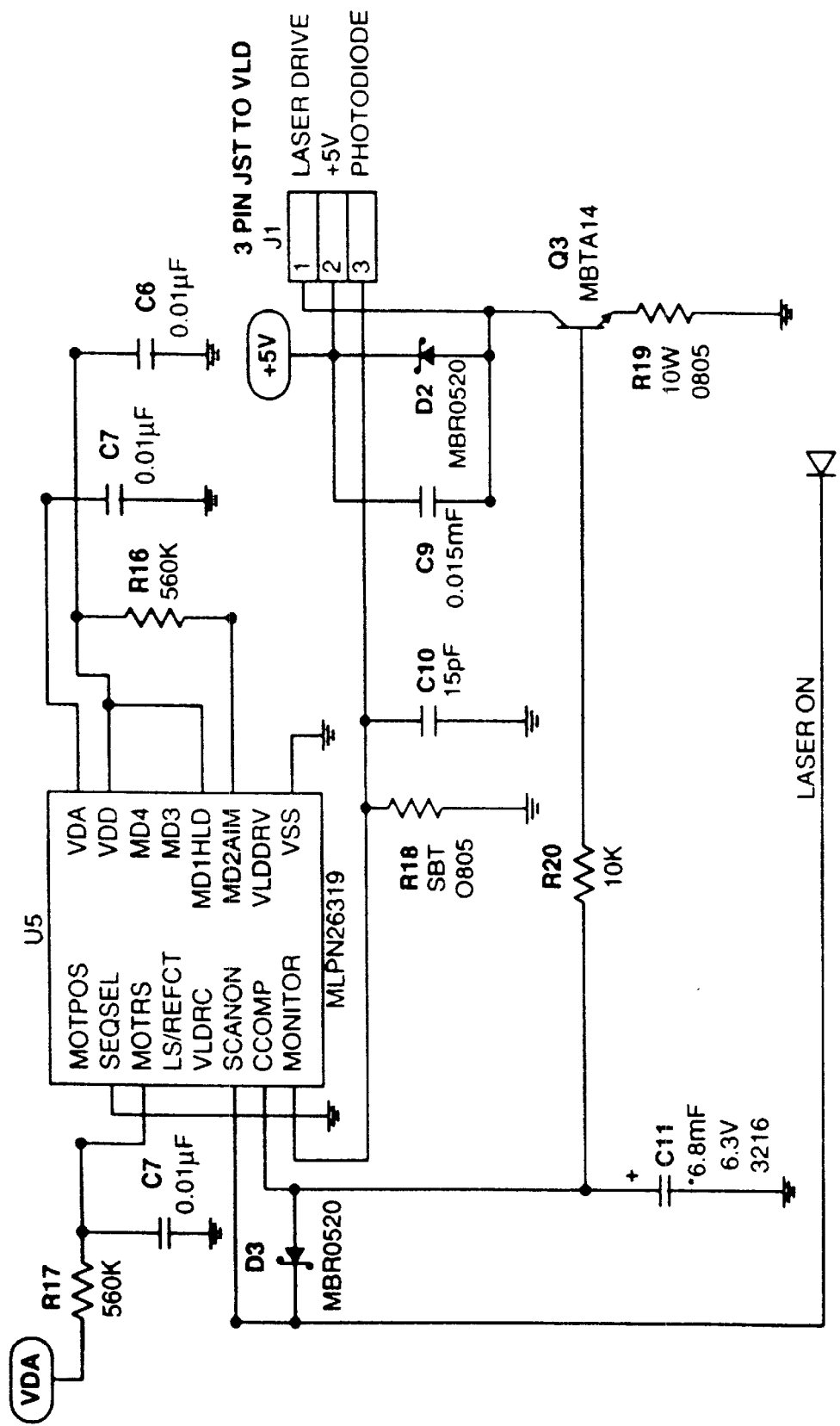
FIG. 15B4

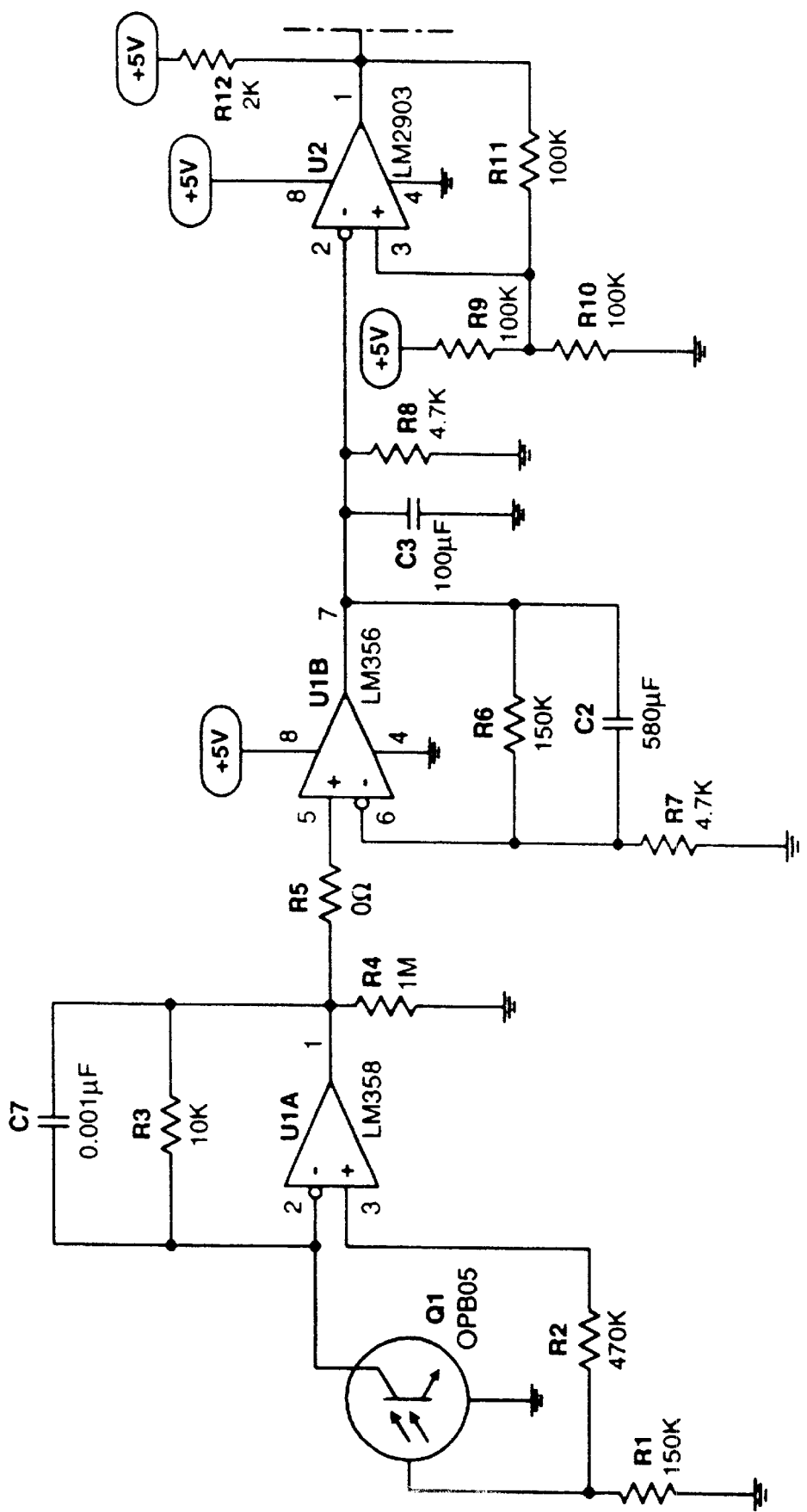
FIG. 15B5A

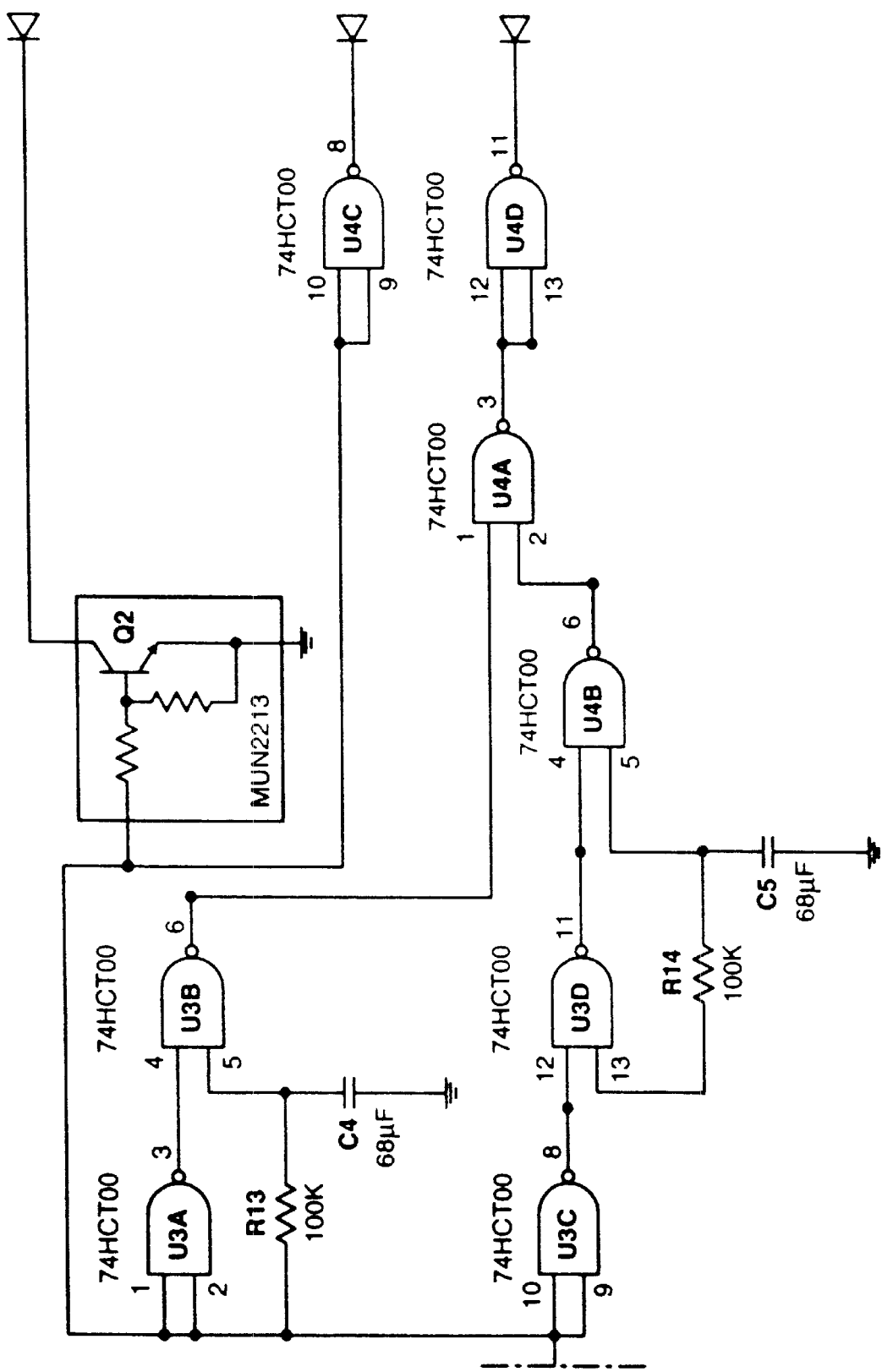
FIG. 15B5B

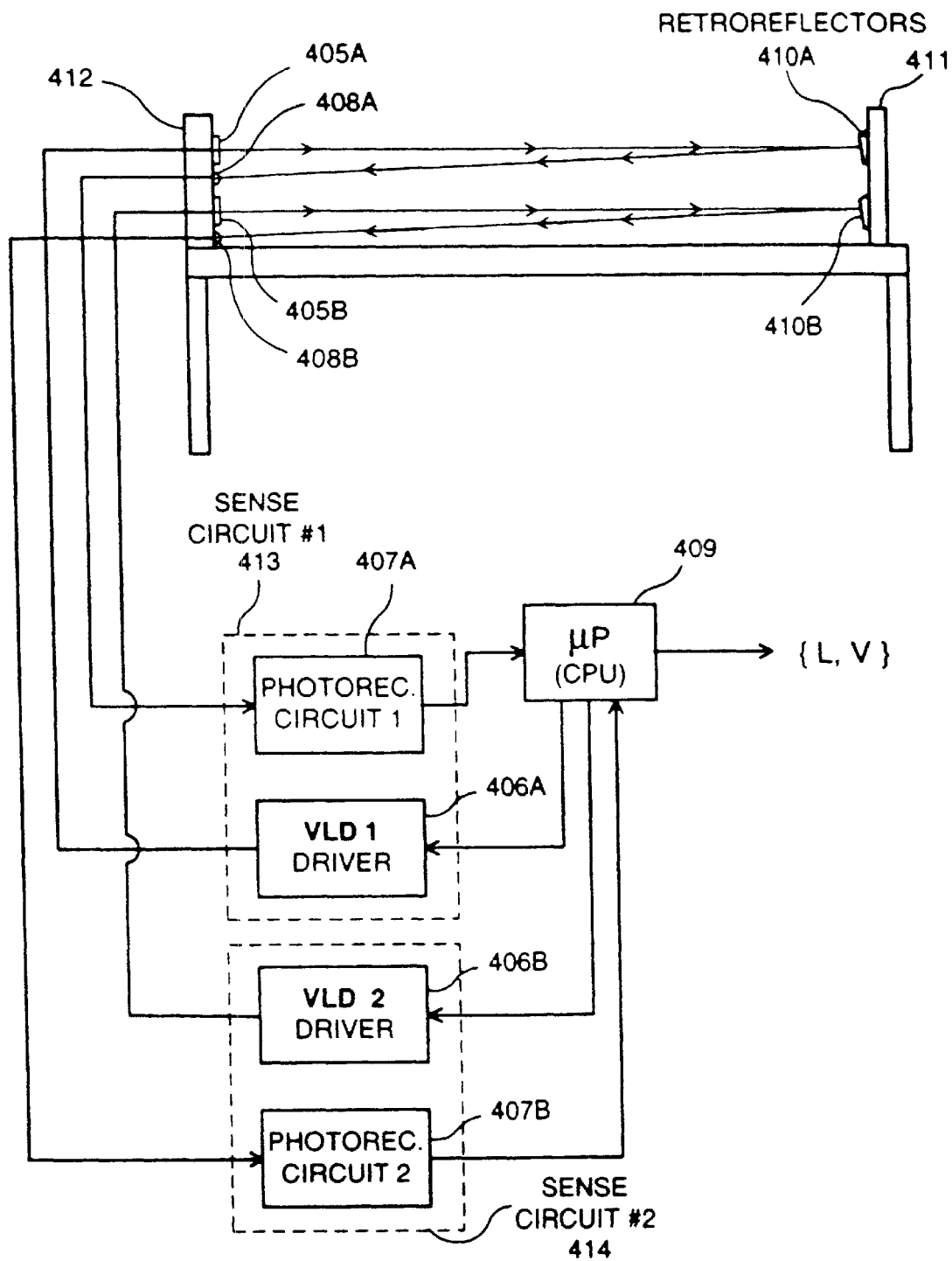
FIG. 15C1

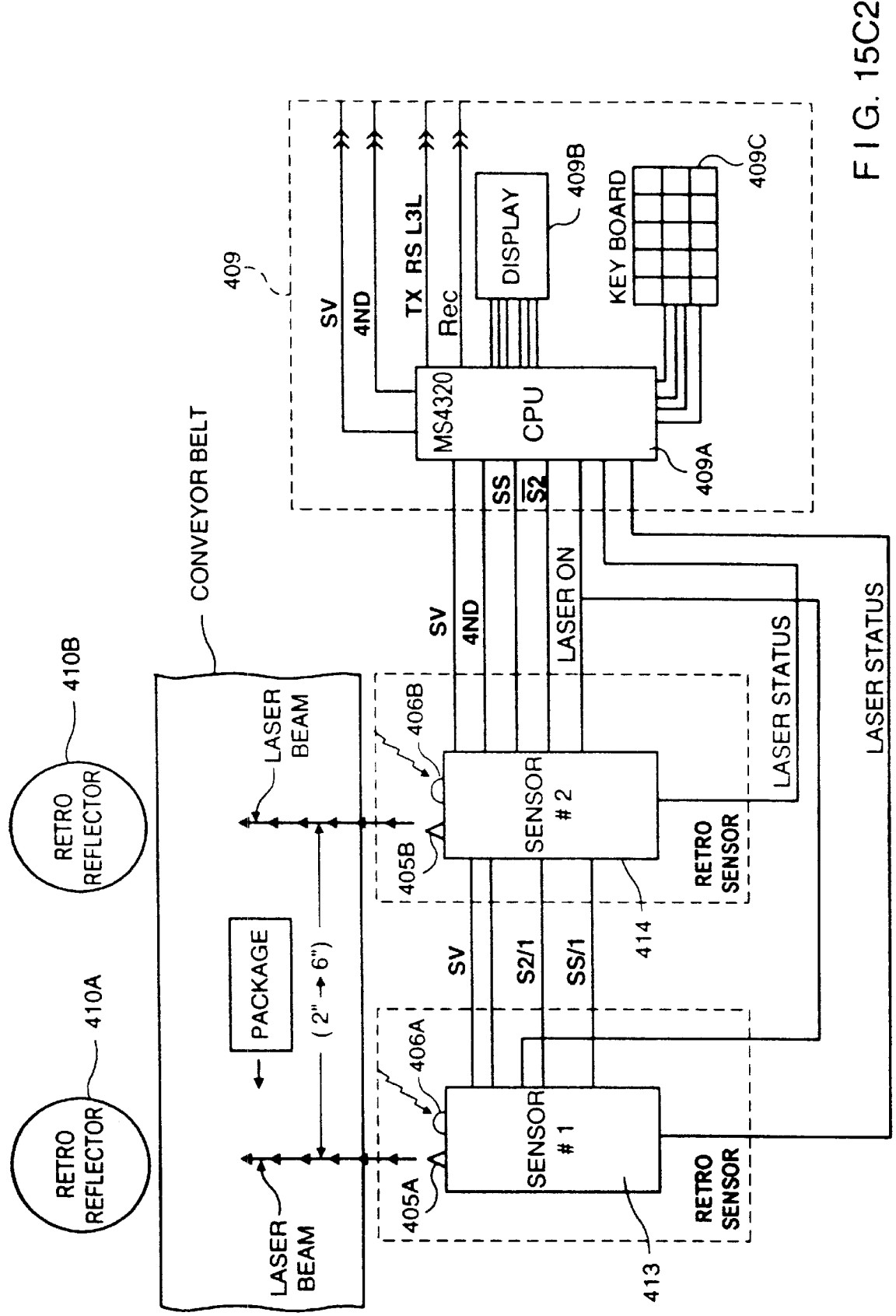
FIG. 15C2

(FOR RETRO - REFLECTIVE CONFIGURATION)
FLOW CHARTS FOR THE VELOCITY AND LENGTH MEASUREMENT SUBSYSTEM
D = DISTANCE BETWEEN 2 SENSORS (TYPICAL VALUE: 3 INCHES)
VC = VELOCITY COUNTS (32 BITS)
LC = LENGTH COUNTS (32 BITS)
T = 0.651 MICROSECONDS (LENGTH ON ONE MACHINE CYCLE)
VS = VELOCITY COUNT RECEIVED FLAG
LS = LENGTH COUNT RECEIVED FLAG
CC = ALL COUNTS AND FLAGS CLEARED FLAG
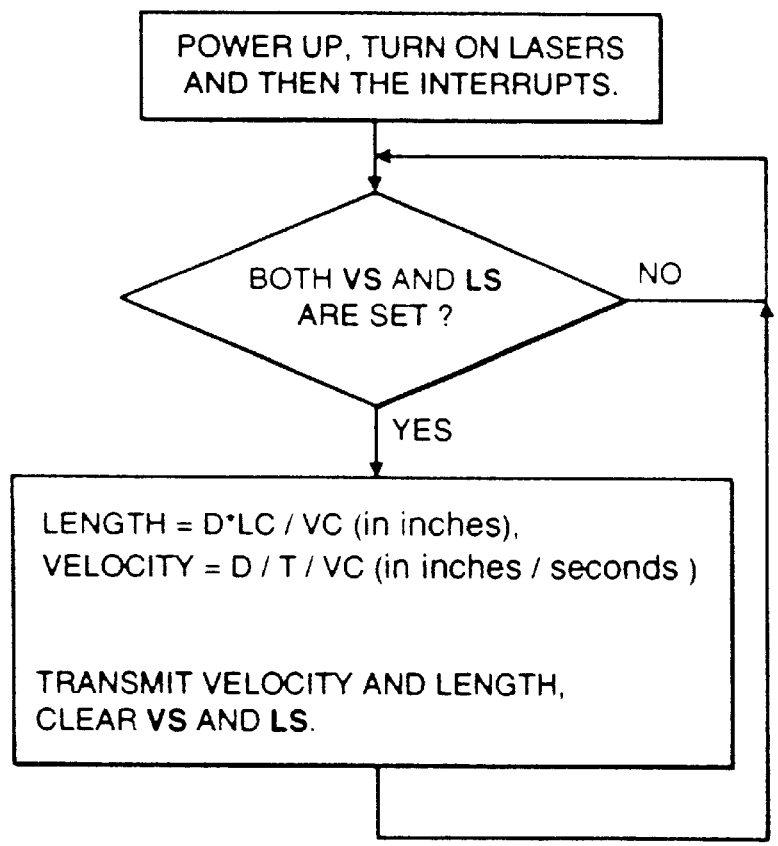
FIG. 15D1

EXTERNAL INTERRUPT 0 ( SENSOR 1 )
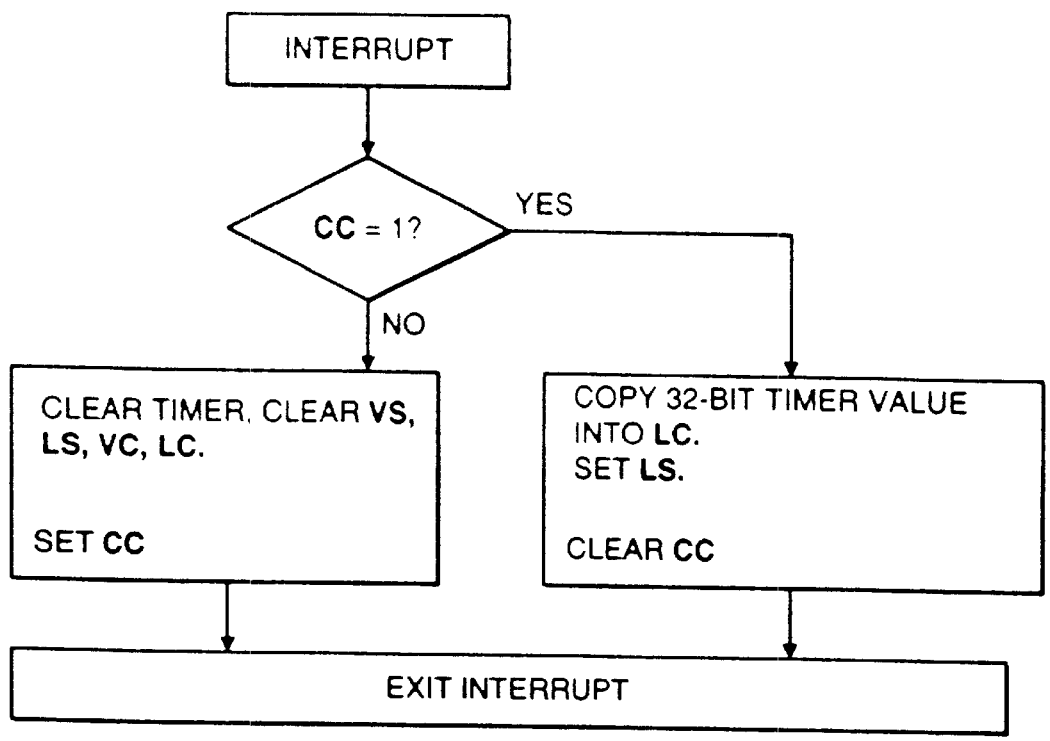
FIG. 15D2
EXTERNAL INTERRUPT 1 ( SENSOR 2 )
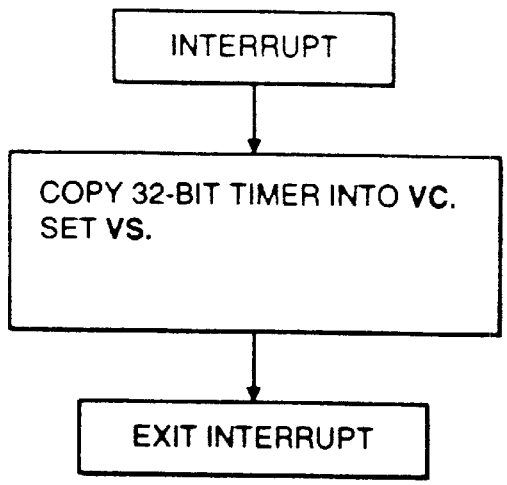
FIG. 15D3

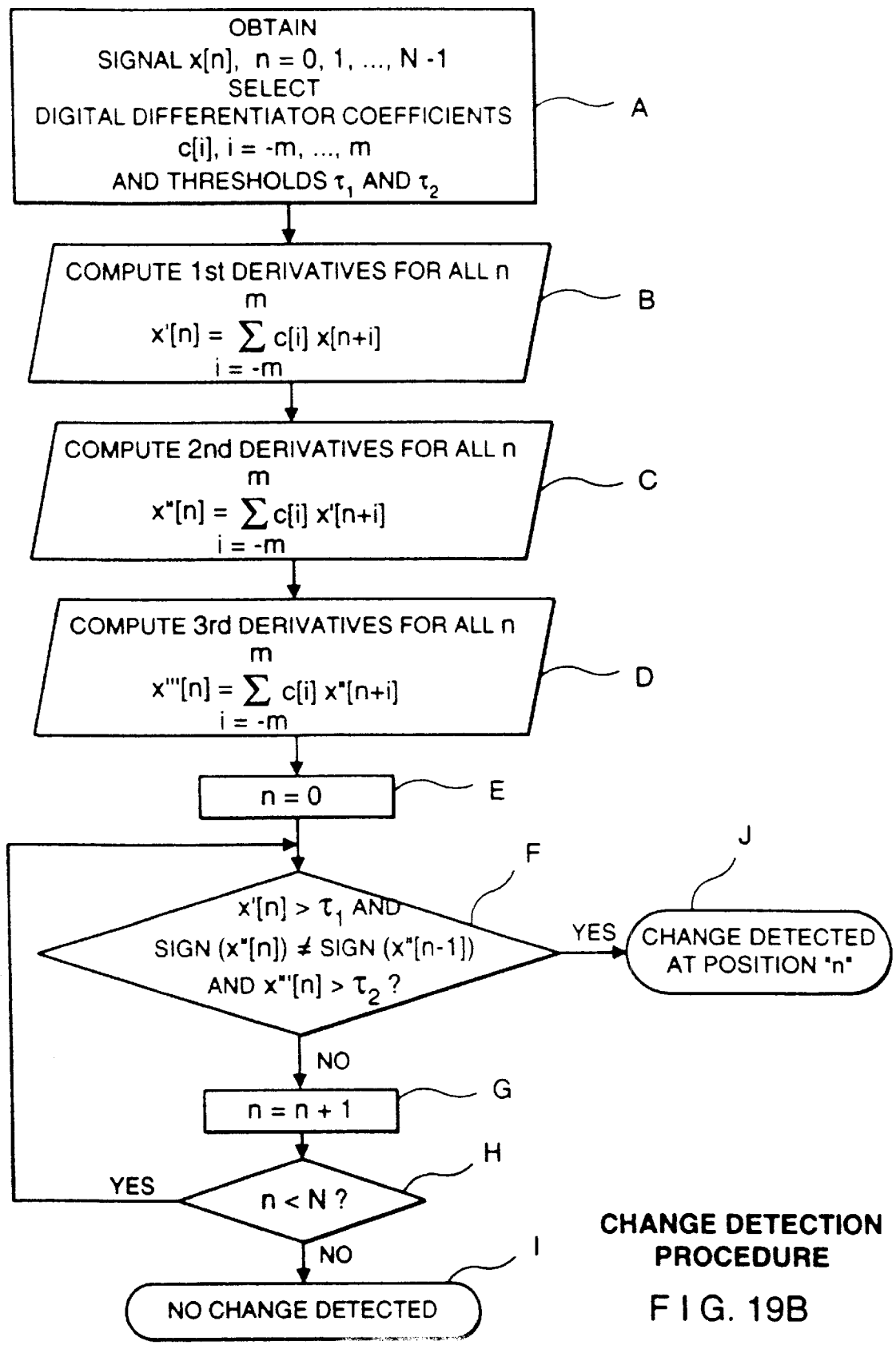

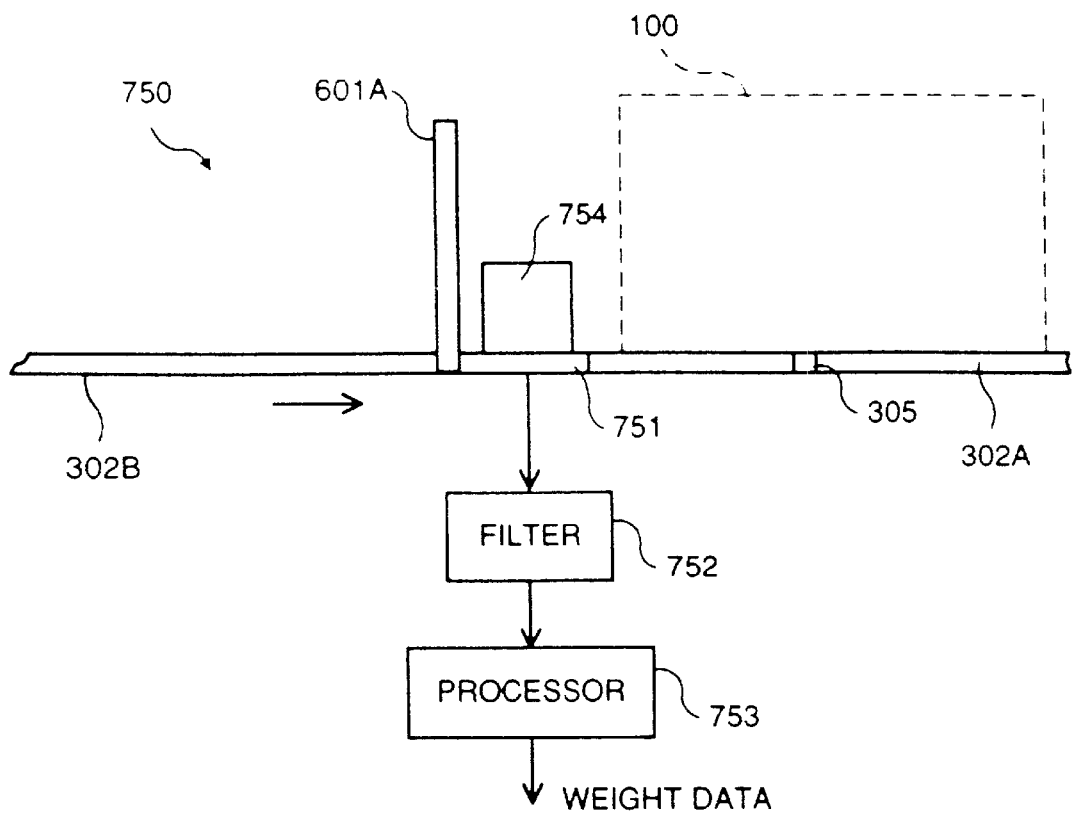
F I G. 20A
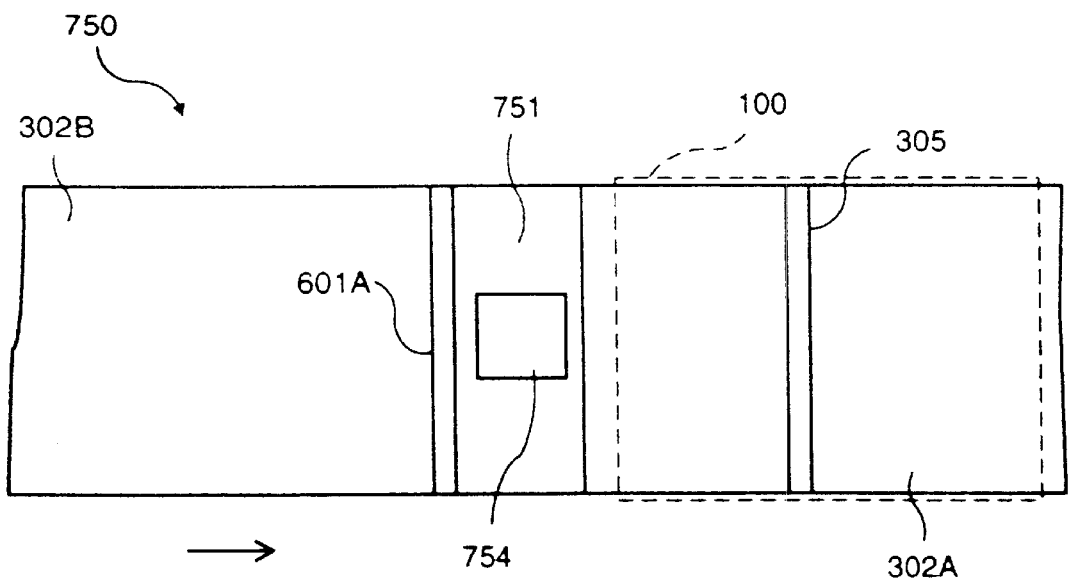
F I G. 20B

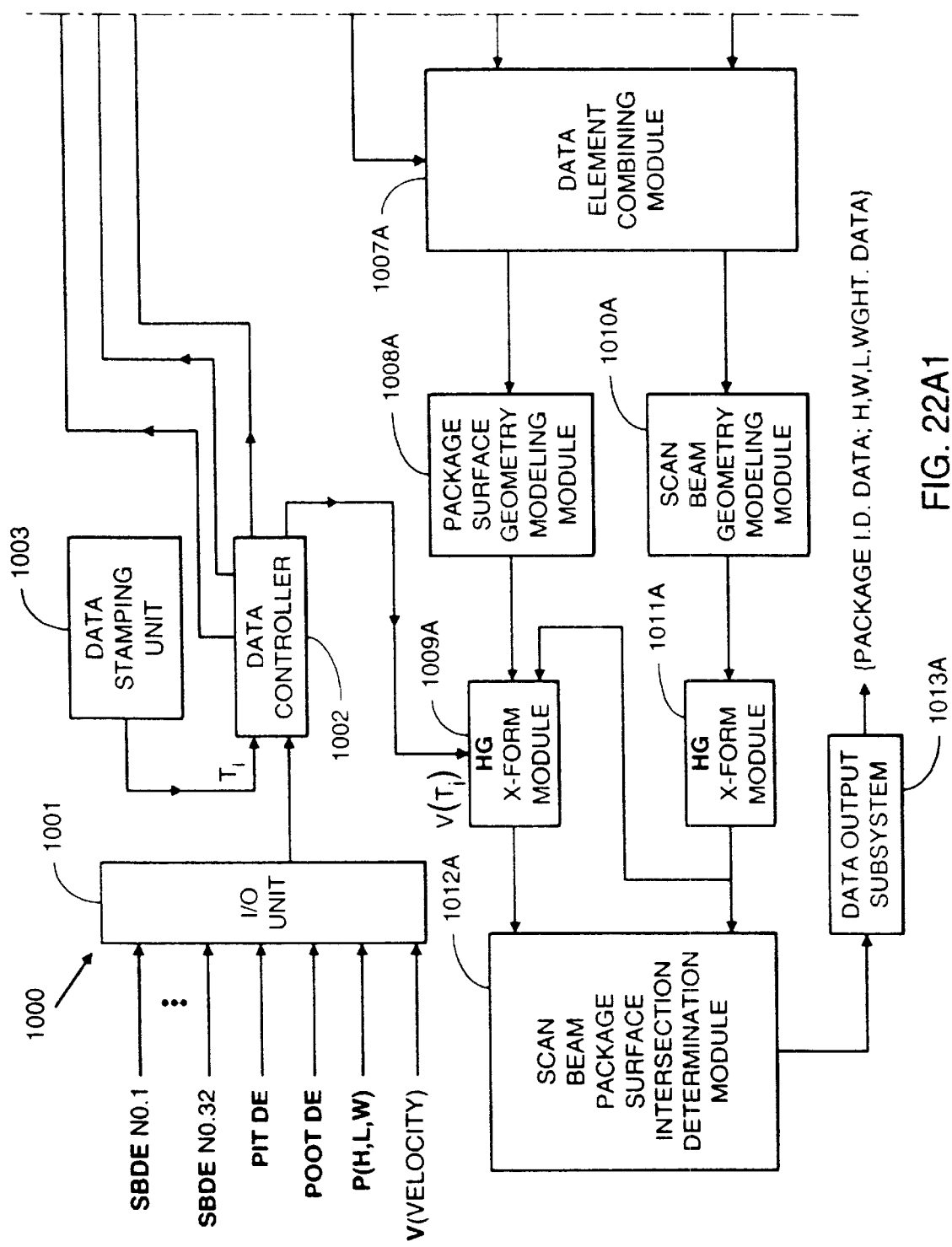
FIG. 22A1

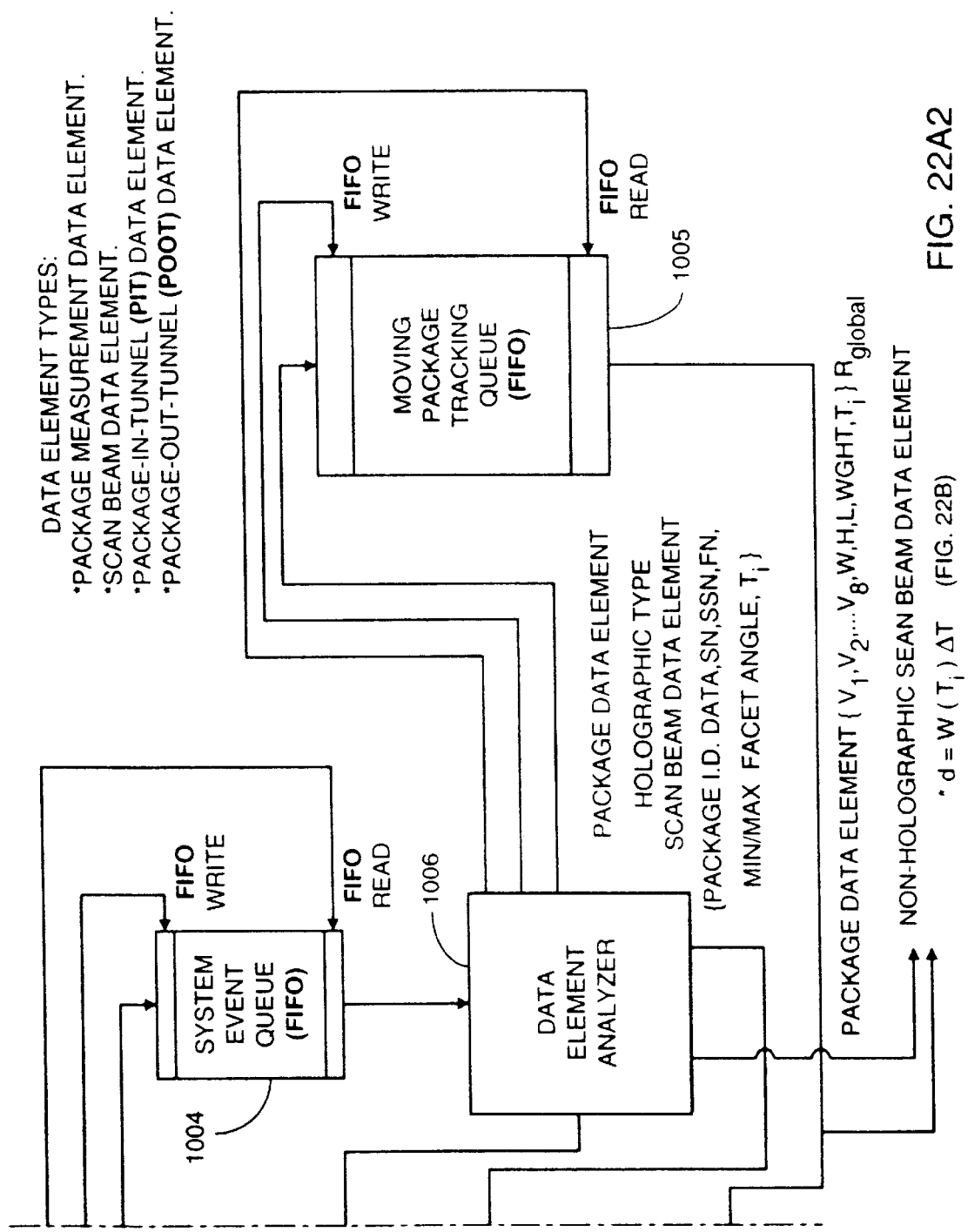
FIG. 22A2

DATA ELEMENT HANDLING RULES

1. WHEN A PACKAGE DATA ELEMENT (PDE) OF ANY TYPE IS REMOVED FROM THE SYSTEM EVENT QUEUE, THEN IT IS PLACED IN THE MOVING PACKAGE TRACKING QUEUE

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN THE MOVING PACKAGE TRACKING QUEUE AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIGS. 22A1 AND 22A2

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE IS REMOVED THERE FROM

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT

FIG. 23A1

(a) IF THE TIME STAMP $T_i$ ON THE REMOVED POOT DATA ELEMENT INDICATES THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE (b) IF THE TIME STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM THE MOVING PACKAGE TRACKING QUEUE.

FIG. 23A2

VECTOR-BASED SURFACE MODELLING OF PACKAGES MOVING IN SCANNING TUNNEL

MATHEMATICAL FORM OF EACH SURFACE ON THE PACKAGE: VECTOR-BASED MODEL CONSISTING OF (1) AT LEAST THREE VERTICE POINTS WITHIN THE PLANE OF THE PACKAGE SURFACE, AND (2) NORMAL VECTOR FOR THE PLANE.

PROCEDURE:

(1) USE POSITION VECTOR ( REFERENCED TO X=0, Y=0, Z=0 IN $R_{global}$), FOR SPECIFYING THE POSITION OF EACH VERTEX IN THE PACKAGE SURFACE PLANE; AND (2) USE NORMAL VECTOR FOR SPECIFYING THE SURFACE DIRECTION OF THE PACKAGE SURFACE (AT WHICH LIGHT REFLECTS)

(3) THESE FOUR VECTORS SPECIFY THE SURFACE OF THE PACKAGE IN COORDINATE REFERENCE FROM $R_{global}$

FIG. 24B

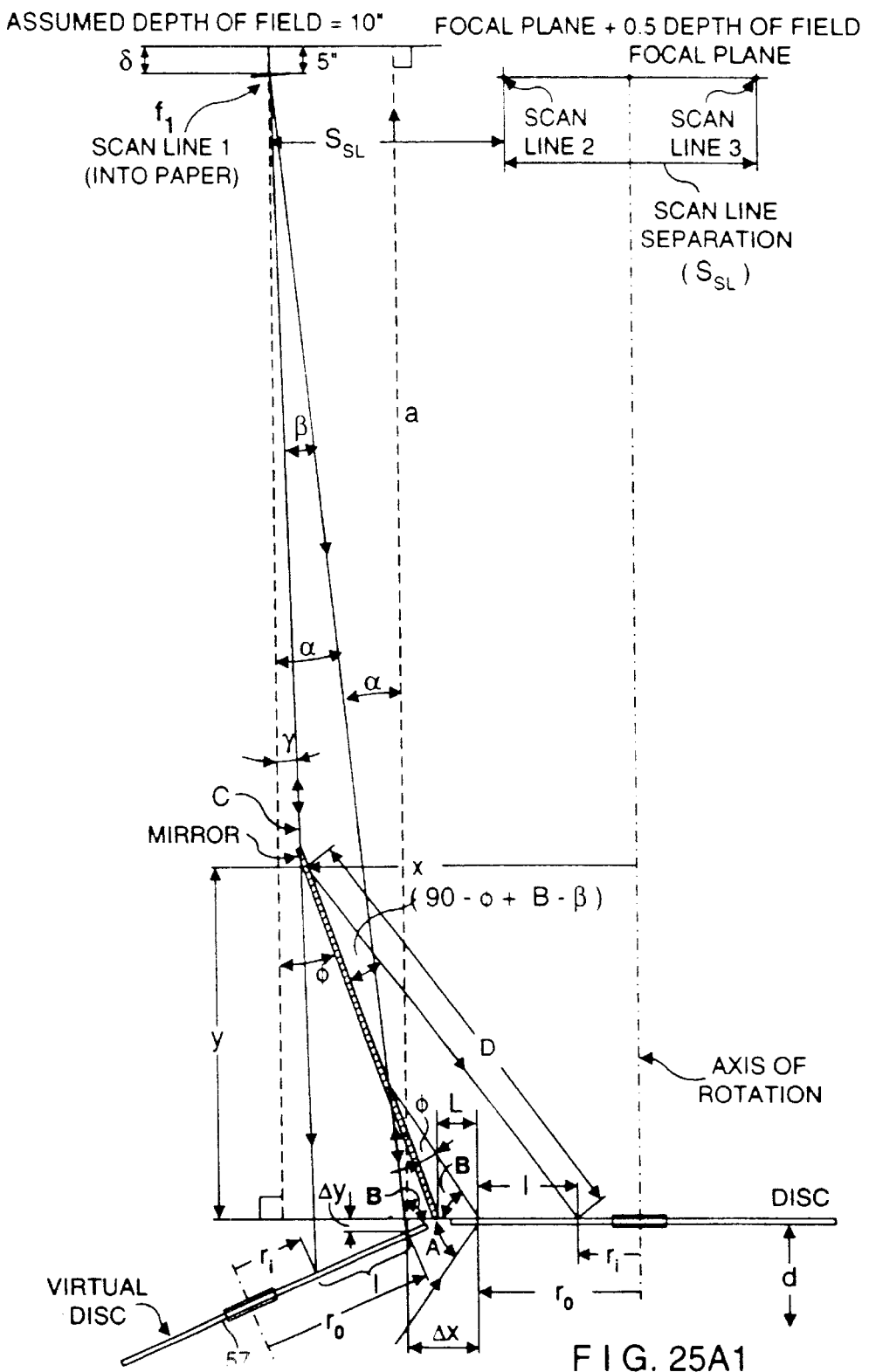
FIG. 25A1

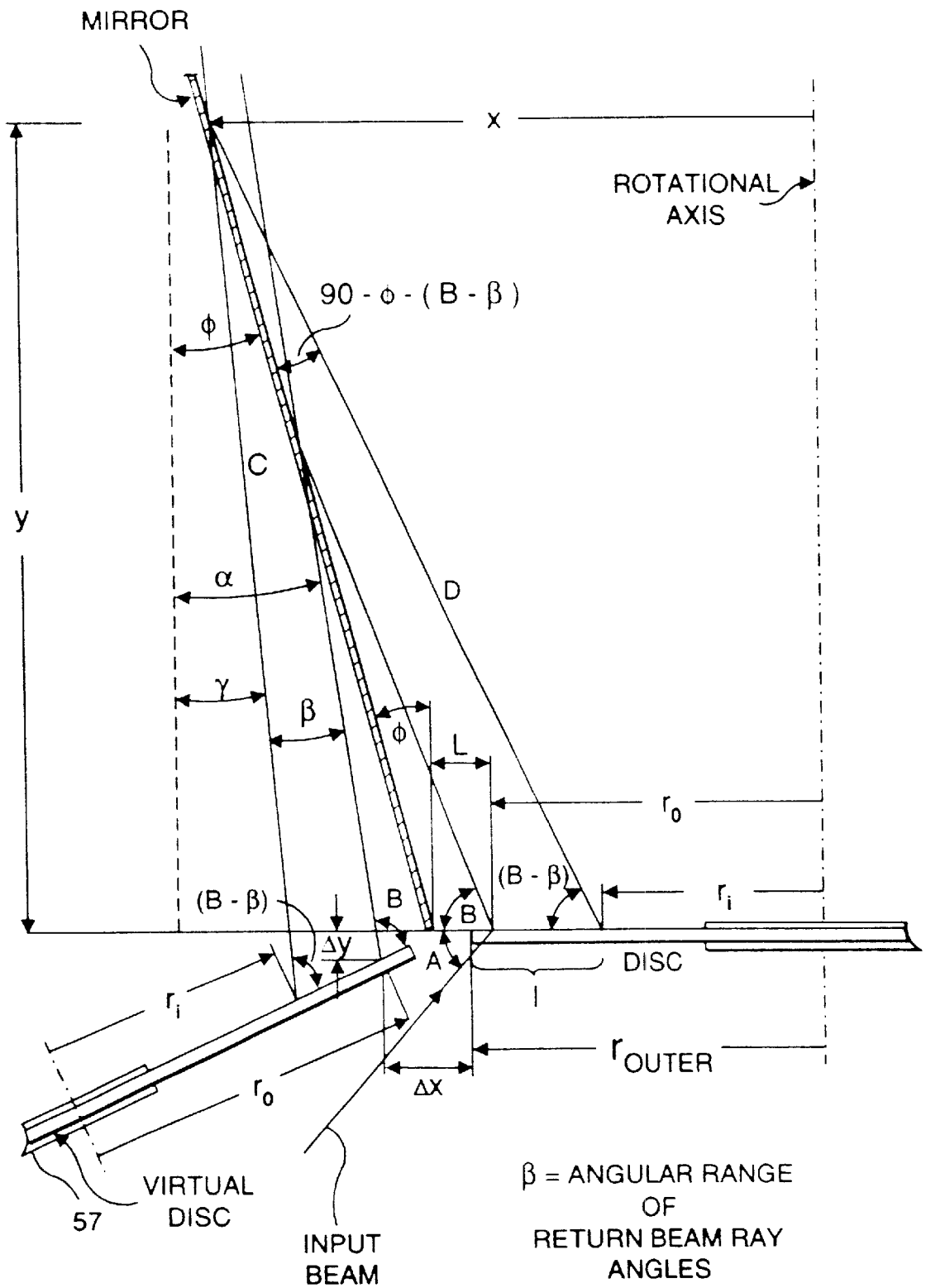
FIG. 25A2

(1) THE RADIUS TO BEAM-INCIDENT-POINT ON THE HOLOGRAPHIC SCANNING DISC, ASSIGNED THE SYMBOLIC NOTATION "$r_0$"

(2) SCANLINE SEPARATION BETWEEN ADJACENT SCANLINES AT THE FOCAL PLANE OF THE (i, J)-TH SCANLINE, ASSIGNED THE SYMBOLIC NOTATION "$S_{SL}$"

(3) THE SCANLINE LENGTH (MEASURED INTO THE PAPER) FOR THE (i, J)-TH SCANLINE, ASSIGNED THE SYMBOLIC NOTATION "$L_{SL}$"

(4) THE DISTANCE MEASURED FROM THE SCANNING DISC TO THE FOCAL PLANE OF THE (i, J)-TH SCANLINE, ASSIGNED THE SYMBOLIC NOTATION "$a_i$"

(5) THE DISTANCE FROM RADIUS TO BEAM-INCIDENT-POINT $r_0$ TO BEAM FOLDING MIRROR, ASSIGNED THE SYMBOLIC NOTATION "$L$"

(6) THE TILT ANGLE OF THE J-TH BEAM FOLDING MIRROR ASSOCIATED WITH GENERATION OF THE (i, J)-TH SCANLINE, ASSIGNED THE SYMBOLIC NOTATION "$\phi_j$"

(7) THE TILT ANGLE OF THE VIRTUAL SCANNING DISC, ASSIGNED THE SYMBOLIC NOTATION "$2\phi$"

(8) THE LATERAL SHIFT OF THE BEAM INCIDENT POINT ON THE VIRTUAL SCANNING DISC, ASSIGNED THE SYMBOLIC NOTATION "$\Delta X$"

(9) THE VERTICAL SHIFT OF THE BEAM INCIDENT POINT ON THE VIRTUAL SCANNING DISC, ASSIGNED THE SYMBOLIC NOTATION "$\Delta Y$"

(10) THE DISTANCE FROM THE ROTATION AXIS TO THE BEAM INCIDENT POINT ON THE VIRTUAL SCANNING DISC, ASSIGNED THE SYMBOLIC NOTATION "$r_0 + \Delta X$"

(11) THE DISTANCE FROM THE BEAM INCIDENT POINT ON THE VIRTUAL SCANNING DISC TO THE FOCAL PLANE WITHIN WHICH THE (i, j)-TH SCANLINE RESIDES, ASSIGNED THE SYMBOLIC NOTATION "$f_i$"

(12) THE DIAMETER OF THE CROSS-SECTION OF THE LASER BEAM SCANNING STATION, ASSIGNED THE SYMBOLIC NOTATION "$d_{BEAM}$"

(13) THE ANGULAR GAP BETWEEN ADJACENT HOLOGRAPHIC SCANNING FACETS, ASSIGNED THE SYMBOLIC NOTATION "$d_{GAP}$"

(14) THE OUTER RADIUS OF THE AVAILABLE LIGHT COLLECTION REGION ON THE HOLOGRAPHIC SCANNING DISC, ASSIGNED THE SYMBOLIC NOTATION "$r_{OUTER}$"

FIG. 25B1

(15) THE INNER RADIUS OF THE AVAILABLE LIGHT COLLECTION REGION ON THE HOLOGRAPHIC SCANNING FACET, ASSIGNED THE SYMBOLIC NOTATION "$r_{INNER}$"

(16) ONE-HALF OF THE DEPTH OF FIELD OF THE (i, j)-TH SCANLINE, ASSIGNED THE SYMBOLIC NOTATION "$\delta$"

(17) THE DISTANCE FROM THE MAXIMUM READ DISTANCE ($f_i$ + 5") TO THE INNER RADIUS $r_i$ OF THE SCANNING FACET, ASSIGNED THE SYMBOLIC NOTATION "C"

(18) THE OUTER RAY ANGLE MEASURED RELATIVE TO THE NORMAL TO THE i-TH HOLOGRAPHIC FACET, ASSIGNED THE SYMBOLIC NOTATION "$\alpha$"

(19) THE INNER RAY ANGLE MEASURED RELATIVE TO THE NORMAL TO THE i-TH HOLOGRAPHIC FACET, ASSIGNED THE SYMBOLIC NOTATION "$\gamma$"

(20) THE LIGHT COLLECTION ANGLE MEASURED FROM THE FOCAL POINT OF THE i-TH FACET TO THE LIGHT COLLECTION AREA OF THE SCANNING FACET, ASSIGNED THE SYMBOLIC NOTATION "$\beta$"

(21) THE INTERSECTION OF THE BEAM FOLDING MIRROR AND LINE C, ASSIGNED THE SYMBOLIC NOTATION "X"

(21A) THE INTERSECTION OF THE BEAM FOLDING MIRROR AND LINE C, ASSIGNED THE SYMBOLIC NOTATION "Y"

(22) THE DISTANCE MEASURED FROM THE INNER RADIUS TO THE POINT OF MIRROR INTERSECTION, ASSIGNED THE SYMBOLIC NOTATION "D"

(23) THE DISTANCE MEASURED FROM THE BASE OF THE SCANNER HOUSING TO THE TOP OF THE j-TH BEAM FOLDING MIRROR, ASSIGNED THE SYMBOLIC NOTATION "h"

(24) THE DISTANCE MEASURED FROM THE SCANNING DISC TO THE BASE OF THE HOLOGRAPHIC SCANNER, ASSIGNED THE SYMBOLIC NOTATION "d"

(25) THE FOCAL LENGTH OF THE i-TH HOLOGRAPHIC SCANNING FACET FROM THE SCANNING FACET TO THE CORRESPONDING FOCAL PLANE WITHIN THE SCANNING VOLUME, ASSIGNED THE SYMBOLIC NOTATION "$f_i$"

(26) INCIDENT BEAM ANGLE, ASSIGNED THE SYMBOLIC NOTATION "$A_i$"

FIG. 25B2

(27) DIFFRACTED BEAM ANGLE, ASSIGNED THE SYMBOLIC NOTATION "$B_i$"

(28) THE ANGLE OF THE J-TH LASER BEAM MEASURED FROM THE VERTICAL, ASSIGNED THE SYMBOLIC NOTATION "$-\alpha$"

(29) THE SCAN ANGLE OF THE LASER BEAM, ASSIGNED THE SYMBOLIC NOTATION "$\theta_{si}$"

(30) THE SCAN MULTIPLICATION FACTOR FOR THE i-TH HOLOGRAPHIC FACET, ASSIGNED THE SYMBOLIC NOTATION "$M_i$"

(31) THE FACET ROTATION ANGLE FOR THE i-TH HOLOGRAPHIC FACET, ASSIGNED THE SYMBOLIC NOTATION "$\theta_{ROTi}$"

(32) ADJUSTED FACET ROTATION ANGLE ACCOUNTING FOR DEADTIME, ASSIGNED THE SYMBOLIC NOTATION "$\theta'_{ROTi}$"

(33) THE LIGHT COLLECTION EFFICIENCY FACTOR FOR THE i-TH HOLOGRAPHIC FACET, NORMALIZED RELATIVE TO THE 16TH FACET, ASSIGNED THE SYMBOLIC NOTATION "$\xi_i$"

(34) THE MAXIMUM LIGHT COLLECTION AREA FOR THE i-TH HOLOGRAPHIC FACET, ASSIGNED THE SYMBOLIC NOTATION "$Area_i$"

(35) THE BEAM SPEED AT THE CENTER OF THE (i, j)-TH SCANLINE, ASSIGNED THE SYMBOLIC NOTATION "$V_{CENTER}$"

(36) THE ANGLE OF SKEW OF THE DIFFRACTED LASER BEAM AT THE CENTER OF THE i-TH HOLOGRAPHIC FACET, ASSIGNED THE SYMBOLIC NOTATION "$\phi_{SKEW}$"

(37) THE MAXIMUM BEAM SPEED OF ALL LASER BEAMS PRODUCED BY THE HOLOGRAPHIC SCANNING DISC, ASSIGNED THE SYMBOLIC NOTATION "$V_{MAX}$"

(38) THE MINIMUM BEAM SPEED OF ALL LASER BEAMS PRODUCED BY THE HOLOGRAPHIC SCANNING DISC, ASSIGNED THE SYMBOLIC NOTATION "$V_{MIN}$"

(39) THE RATIO OF THE MAXIMUM BEAM SPEED TO THE MINIMUM BEAM SPEED, ASSIGNED THE SYMBOLIC NOTATION "$V_{MAX}/V_{MIN}$"

(40) THE DEVIATION OF THE LIGHT RAYS REFLECTED OFF THE PARABOLIC LIGHT REFLECTING MIRROR BENEATH THE SCANNING DISC, FROM THE BRAGG ANGLE FOR THE FACET, ASSIGNED THE SYMBOLIC NOTATION "$\delta_e$"

FIG. 25B3

PARAMETER EQUATION USED IN THE SPREADSHEET DESIGN OF THE SCANNER (1) $\Delta x := L(1 + \cos(2\phi))$ (2) $\Delta y := L \sin(2\phi)$ (3) $\Delta y := r_0 + \Delta x$ (4) $C := \sqrt{(f+\delta)^2 + l^2 + 2(f+\delta)\, l \cos(B)}$ LAW OF COSINES, WHERE: $l = r_{outer} - r_{inner}$ $\beta = \alpha - \gamma = B + 2\phi - 90 - \gamma$ (5) $\alpha := B - 90 + 2\phi$ (6) $r := \alpha - \cos\left[\dfrac{(f+\delta)^2 + C^2 - l^2}{2(f+\delta)C}\right]$ (7) $\beta := \alpha - \gamma$ (8) $X := D \cos(B - \beta) + r_i$ (9) $Y := D \sin(B - \beta)$

(10) $D := \dfrac{[r_0 + L - r_i] \sin(90 + \phi)}{\sin(90 - B + \beta - \phi)}$  (LAW OF SINES)

$$(12) \quad f_i := \sqrt{a_i^2 + \left[m S_{SL} - \left[r_0 + \Delta x\right]\right]^2}$$

m IS A FACTOR THAT VARIES FROM SCAN LINE TO SCAN LINE AND DETERMINED BY SCAN LINE SEPARATION AND DISTANCE FROM THE ROTATIONAL AXIS OF THE DISC.

$$(13) \quad B_i := \text{atan}\left[\left[\frac{m S_{SL} - \left[r_0 + \Delta x\right]}{a_i}\right]\right] + 90 - 2\phi$$

$$(14) \quad \theta_{Si} := 2 \, \text{atan}\left[\left[\frac{\frac{1}{2} \text{ScanLineLength}}{f_i}\right]\right]$$

$$(15) \quad M_i := \frac{r_0}{f_i} + \cos(\lambda_i) + \cos(B_i)$$

$$(16) \quad \theta_{roti} := \frac{\theta_{Si}}{M_i}$$

$$(17) \quad \theta'_{roti} := \theta_{roti} + \underbrace{\frac{d_{beam}}{r_0} + \frac{d_{gap}}{r_0}}_{\Theta_{dead}}$$

$$(18) \quad \xi_i := \left[\frac{f_i}{f_{16}}\right]^2 \frac{\sin[B_{16}]}{\sin(B_i)} H_i$$

$$(19) \quad \text{Area}_i := \pi \left[r_{outer}^2 + r_{inner}^2\right] \frac{\xi_i}{\sum_{i=1}^{16}[\xi_i]} \qquad i = 1, 2, \ldots 16$$

FIG. 25C2

VECTOR MODELING OF LASER SCAN BEAMS IN HOLOGRAPHIC SCANNING SUBSYSTEMS

MATHEMATICAL FORM FOR EACH LASER SCAN BEAM:
VECTOR-BASED MODEL OF OPTICAL PATH OF BEAM
FROM DISC TO MIRROR TO FOCAL PLANE ($\infty$)

PROCEDURE:

(1) USE POSITION VECTOR REFERENCED FROM X=0, Y=0, Z=0 IN $R_{local\ scanner}$, FOR SPECIFYING THE STARTING POINT OF LASER SCAN BEAM ON DISC, AND DIRECTION VECTOR FOR SPECIFYING THE DIRECTION OF LASER BEAM THE BEAM FOLDING MIRROR; AND (2) USE POSITION VECTOR FOR SPECIFYING POINT ON MIRROR WHERE BEAM IS REFLECTED FROM BEAM FOLDING MIRROR TOWARDS FOCAL PLANE OF FACET, EXTENDING TO INFINITY, AND DIRECTION VECTOR FOR SPECIFYING THE DIRECTION OF LASER BEAM TOWARDS DESIGNATED FOCAL PLANE (3) THESE FOUR VECTORS SPECIFY THE LASER BEAM RAY IN LOCAL COORDINATE REFERENCE $R_{local\ scanner}$

FIG. 27

VECTOR-BASED MODEL OF SCANNING-SURFACE PRODUCED BY NON-HOLOGRAPHIC BOTTOM SCANNERS

NOTE:

EACH SCANNING SURFACE IS SPECIFIED BY FOUR BOUNDARY POINTS IN $y = 0$, X - Z PLANE OF $R_{global}$ REFERENCED TO $x = 0, y = 0, z = 0$;

EACH POINT IS REPRESENTED BY A POSITION VECTOR AND A DIRECTION VECTOR ASSUMED NORMAL TO X-Y PLANE.

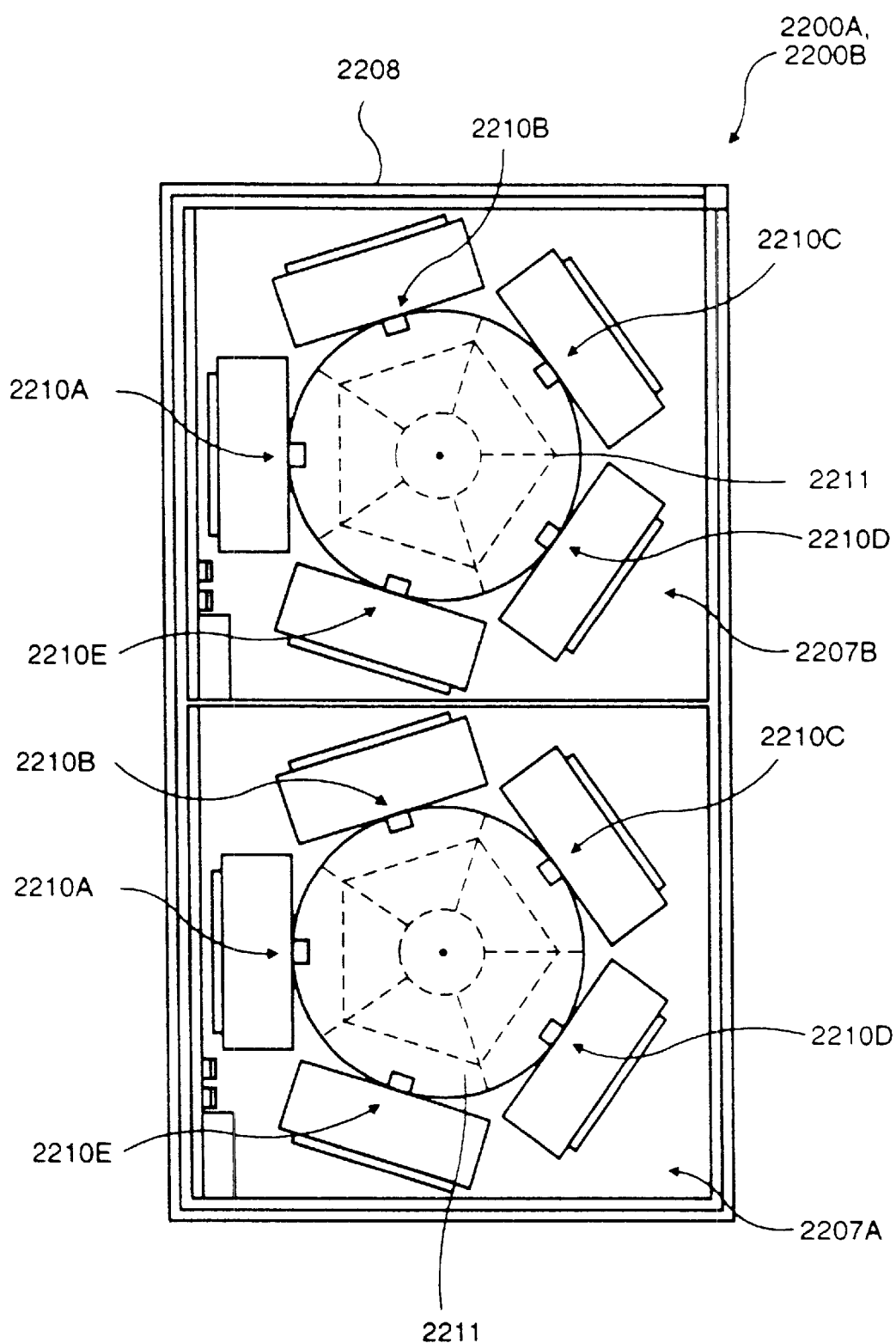
F I G. 36

| FACET | DIFFRACTION FOCAL LENGTH (INCHES) | GEOMETRICAL FOCAL LENGTH (INCHES) | ANGLE A (DEGREE) | ANGLE B (DEGREES) | ANGLE OF DIFFRACTION (DEGREES) | ANGLE OF BEAM FROM VERTICAL (DEREES) | SCAN ANGLE (DEGREES) | SCAN MULT. FACTOR (m) | ROTATION ANGLE (DEGREES) |
|---|---|---|---|---|---|---|---|---|---|
| 1 | 49.57 | 49.76 | 45.9 | 61.06 | 28.94 | -3.06 | 29.61 | 1.26 | 23.51 |
| 2 | 49.54 | 49.73 | 45.9 | 55.62 | 34.38 | 2.38 | 29.62 | 1.34 | 22.10 |
| 3 | 49.96 | 50.16 | 45.9 | 50.23 | 39.77 | 7.77 | 29.39 | 1.41 | 20.77 |
| 4 | 50.81 | 51.01 | 45.9 | 44.97 | 45.03 | 13.03 | 28.92 | 1.48 | 19.52 |
| 5 | 49.57 | 49.76 | 45.9 | 61.06 | 28.94 | -3.06 | 29.61 | 1.26 | 23.51 |
| 6 | 49.54 | 49.73 | 45.9 | 55.62 | 34.38 | 2.38 | 29.62 | 1.34 | 22.10 |
| 7 | 49.96 | 50.16 | 45.9 | 50.23 | 39.77 | 7.77 | 29.39 | 1.41 | 20.77 |
| 8 | 50.81 | 51.01 | 45.9 | 44.97 | 45.03 | 13.03 | 28.92 | 1.48 | 19.52 |
| 9 | 59.06 | 59.38 | 45.9 | 60.56 | 29.44 | -2.56 | 25.01 | 1.25 | 19.94 |
| 10 | 59.04 | 59.36 | 45.9 | 56.00 | 34.00 | 2.00 | 25.02 | 1.32 | 18.93 |
| 11 | 59.39 | 59.72 | 45.9 | 51.47 | 38.53 | 6.53 | 24.88 | 1.39 | 17.96 |
| 12 | 60.10 | 60.44 | 45.9 | 47.01 | 42.99 | 10.99 | 24.59 | 1.44 | 17.04 |
| 13 | 59.06 | 59.38 | 45.9 | 60.56 | 29.44 | -2.56 | 25.01 | 1.25 | 19.94 |
| 14 | 59.04 | 59.36 | 45.9 | 56.00 | 34.00 | 2.00 | 25.02 | 1.32 | 18.93 |
| 15 | 59.39 | 59.72 | 45.9 | 51.47 | 38.53 | 6.53 | 24.88 | 1.39 | 17.96 |
| 16 | 60.10 | 60.44 | 45.9 | 47.01 | 42.99 | 10.99 | 24.59 | 1.44 | 17.04 |

FIG. 38

DATA ELEMENT HANDLING RULES

1. WHEN A PACKAGE DATA ELEMENT (PDE) IS REMOVED FROM THE SYSTEM EVENT QUEUE, THEN IT IS PLACED IN THE MOVING PACKAGE TRACKING QUEUE

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN THE MOVING PACKAGE TRACKING QUEUE AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIGS. 41A AND 41B

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE IS REMOVED THEREFROM

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT

FIG. 42A (A) IF THE TIME-STAMP $T_i$ ON THE REMOVED POOT DATA ELEMENT INDICATE THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE.

(B) IF THE TIME-STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM THE MOVING PACKAGE TRACKING QUEUE

FIG. 42B

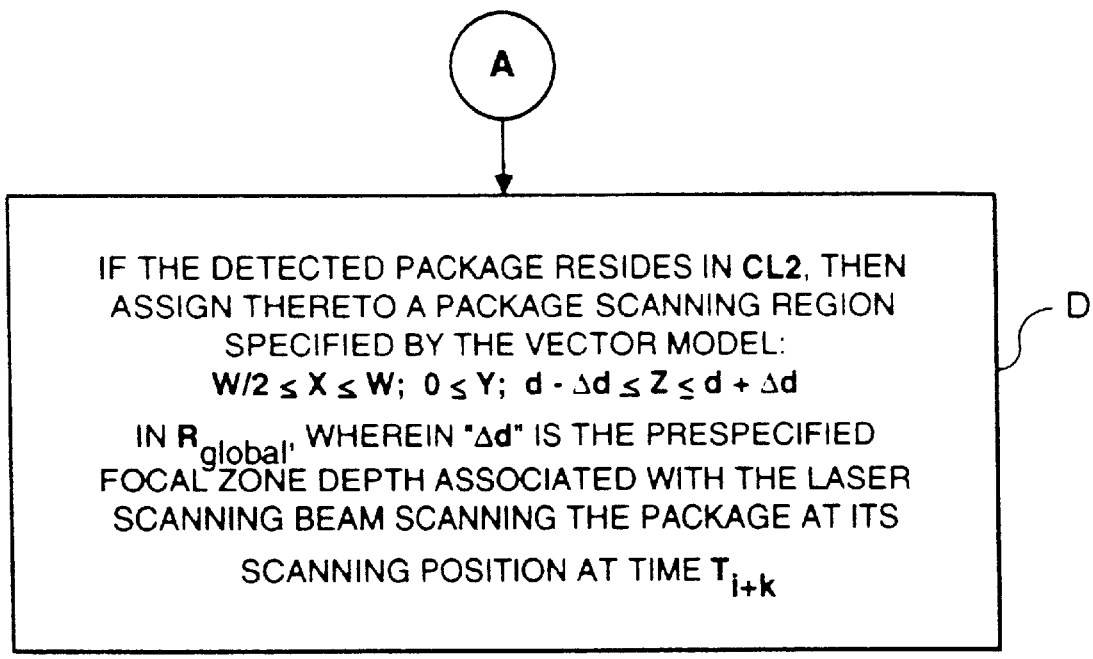
F I G. 44B

COORDINATE CONVERSION OF VECTOR-BASED SCAN BEAM MODELS FROM LOCAL TO GLOBAL COORDINATE REFERENCE SYSTEM
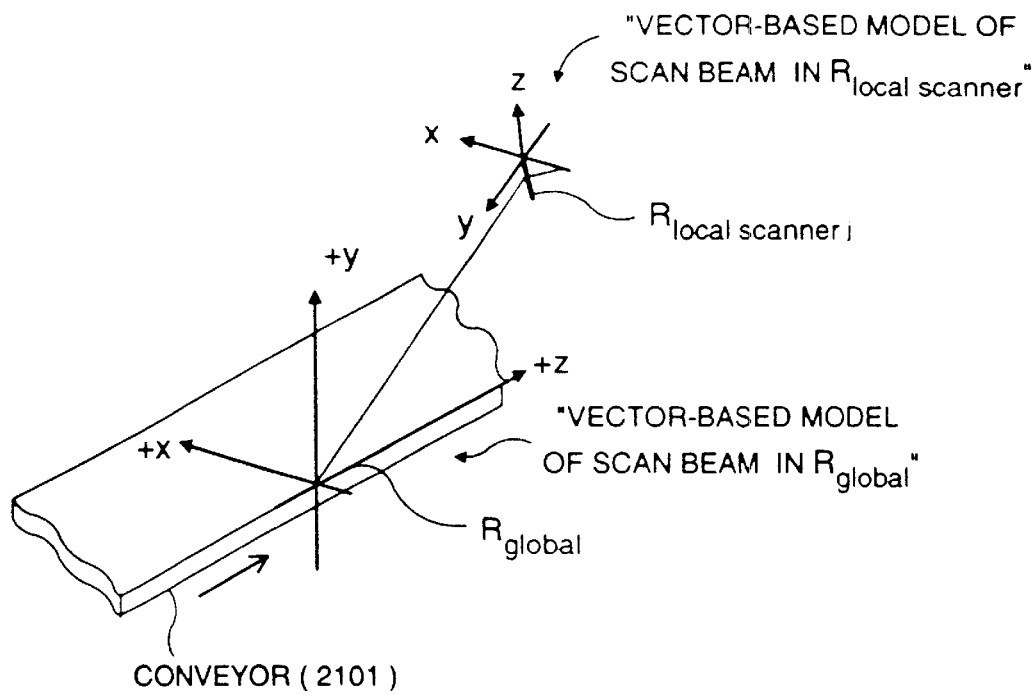
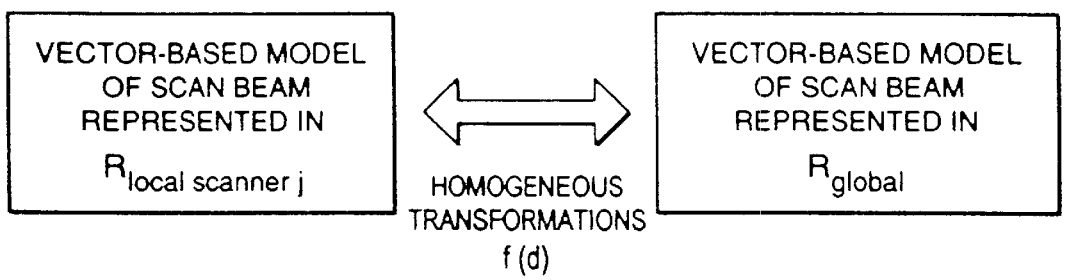
FIG. 45

SCAN BEAM/PACKAGE-SCANNING REGION INTERSECTION DETERMINATION METHOD FOR SCAN DATA ELEMENTS PRODUCED FROM HOLOGRAPHIC SCANNING SUBSYSTEMS

A: USING THE MINIMUM AND MAXIMUM SCAN RAY MODELS OF THE LASER SCAN BEAM, DETERMINE THE ZONE OF COORDINATES ABOUT AND WITHIN THE FOCAL PLANES OF SUCH SCAN RAY MODELS, EXPRESSED AS:

$$X_{min} \pm \Delta X; \quad Y_{min} \pm \Delta Y; \quad Z_{min} \pm \Delta Z$$

$$Xmax \pm \Delta X; \quad Ymax \pm \Delta Y; \quad Zmax \pm \Delta Z$$

B: DETERMINE WHETHER OR NOT THE ZONE OF COORDINATES ABOUT AND WITHIN THE FOCAL PLANES OF THE MINIMUM AND MAXIMUM SCAN RAYS FALL WITHIN THE SPATIAL BOUNDARIES OF THE COMPUTED PACKAGE SCANNING REGIONS WITH EITHER THE FIRST OR SECOND CONVEYOR LANE OR SYSTEM

C: IF THE ZONE OF COORDINATES ABOUT AND WITHIN THE FOCAL PLANES OF THE MIN. AND MAX. SCAN RAYS FALL WITHIN THE SPATIAL BOUNDARIES OF THE COMPUTED PACKAGE SCANNING REGIONS ALONG EITHER THE FIRST OR SECOND CONVEYOR LANE, THEN OUTPUT A DATA ELEMENT IN THE OUTPUT QUEUE COMPUTING THE PACKAGE I.D. DATA FOR USE BY OTHER SUBSYSTEMS

FIG. 46

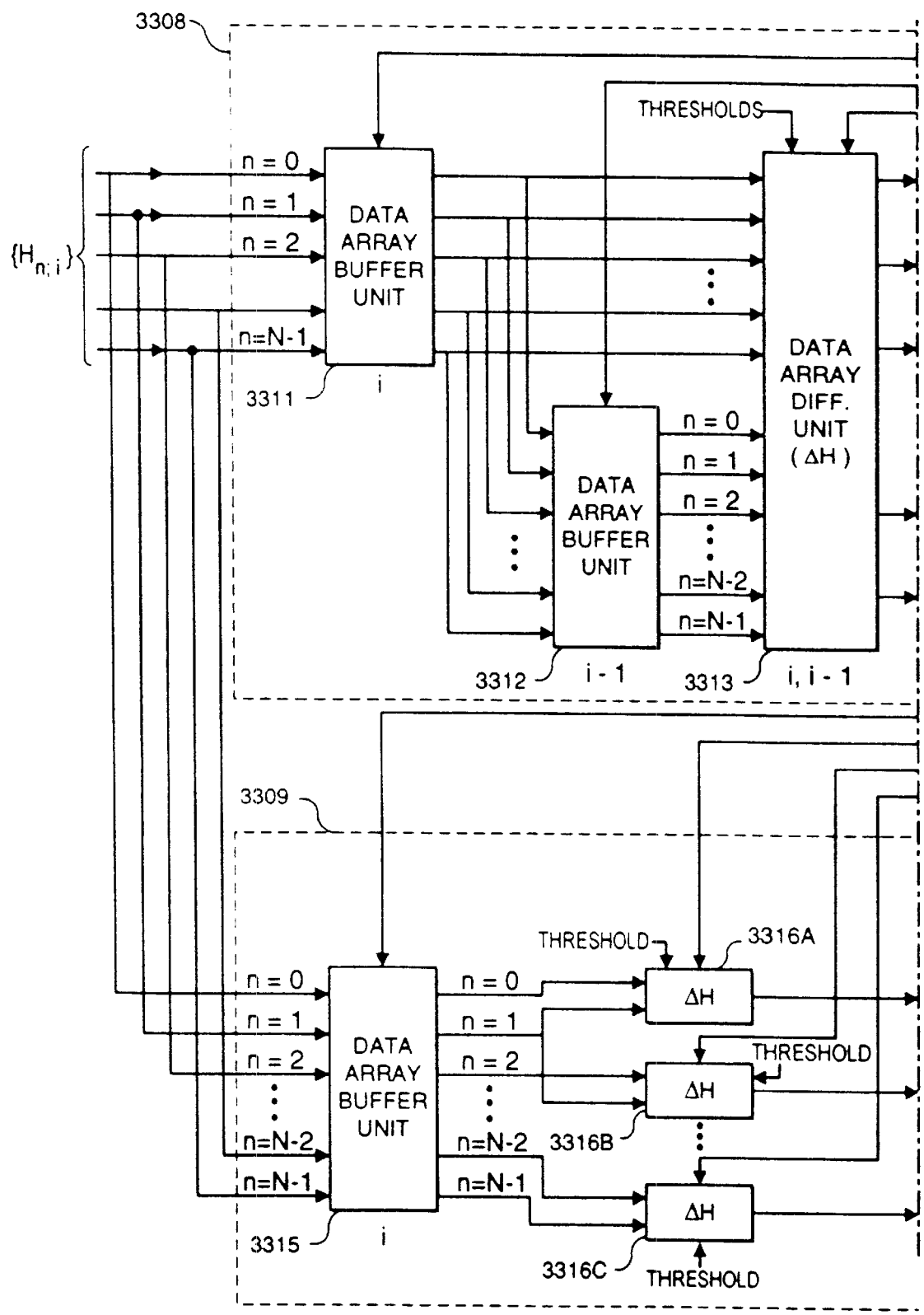
F I G. 49B1

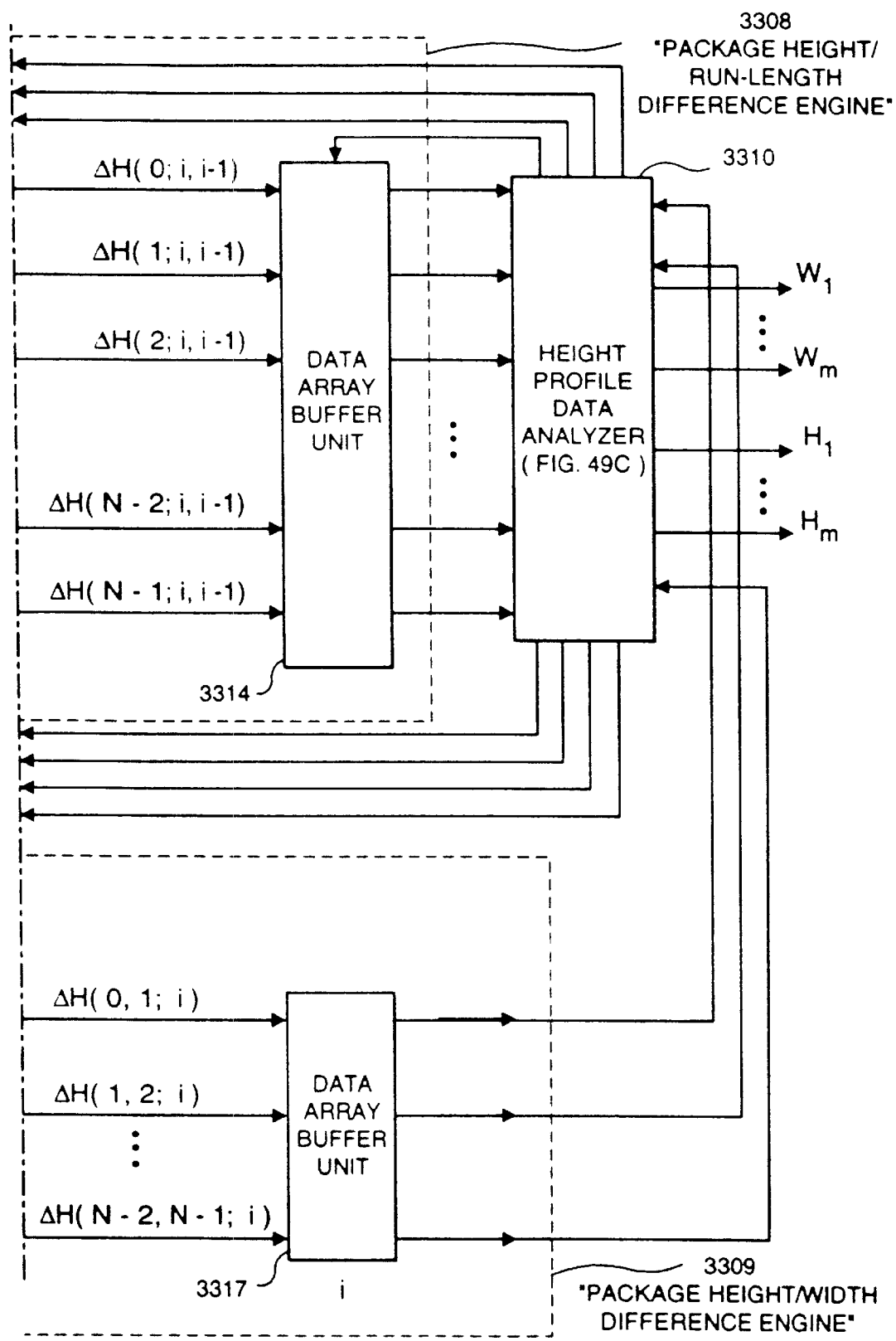
FIG. 49B2

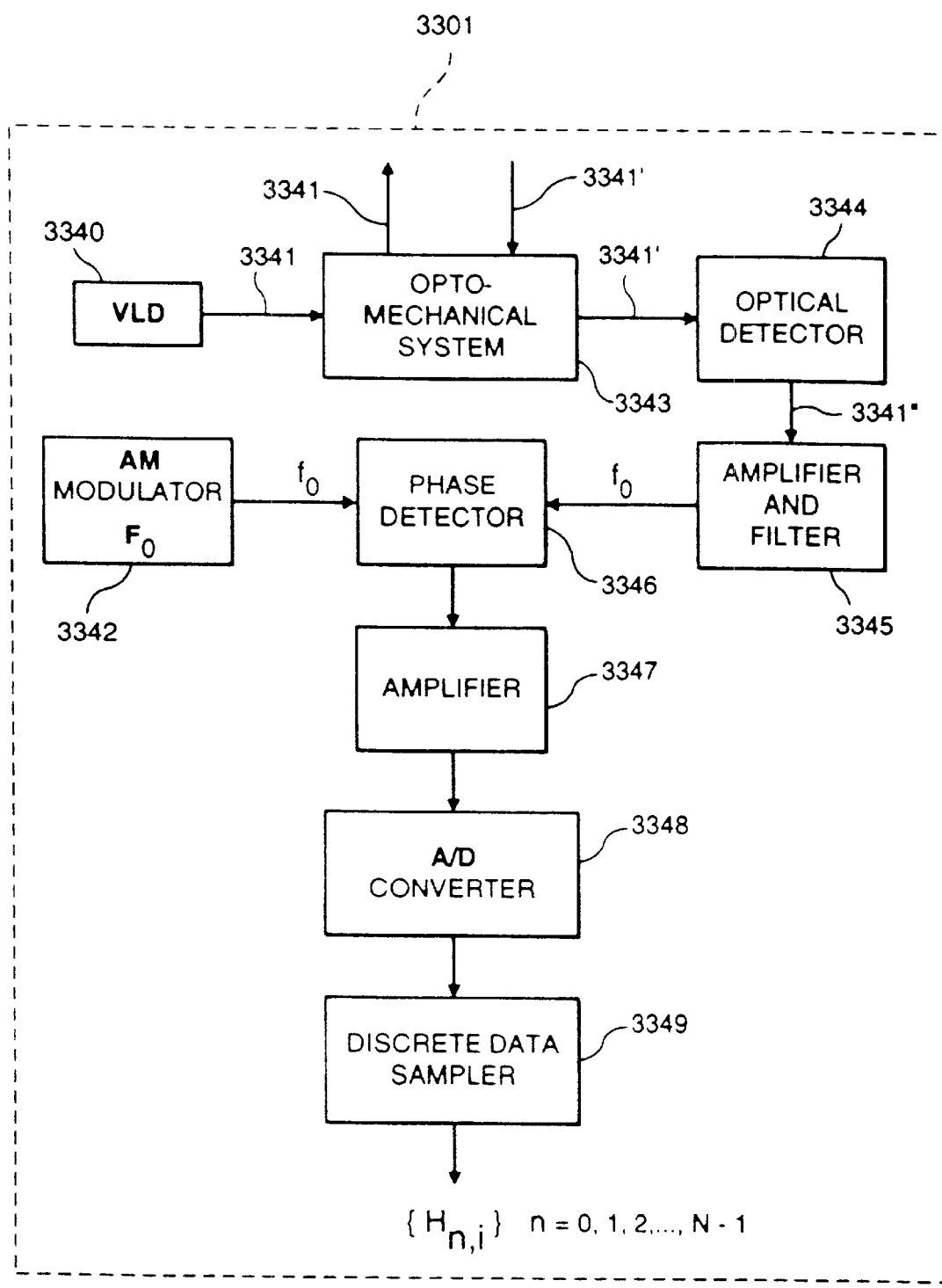
F I G. 49C

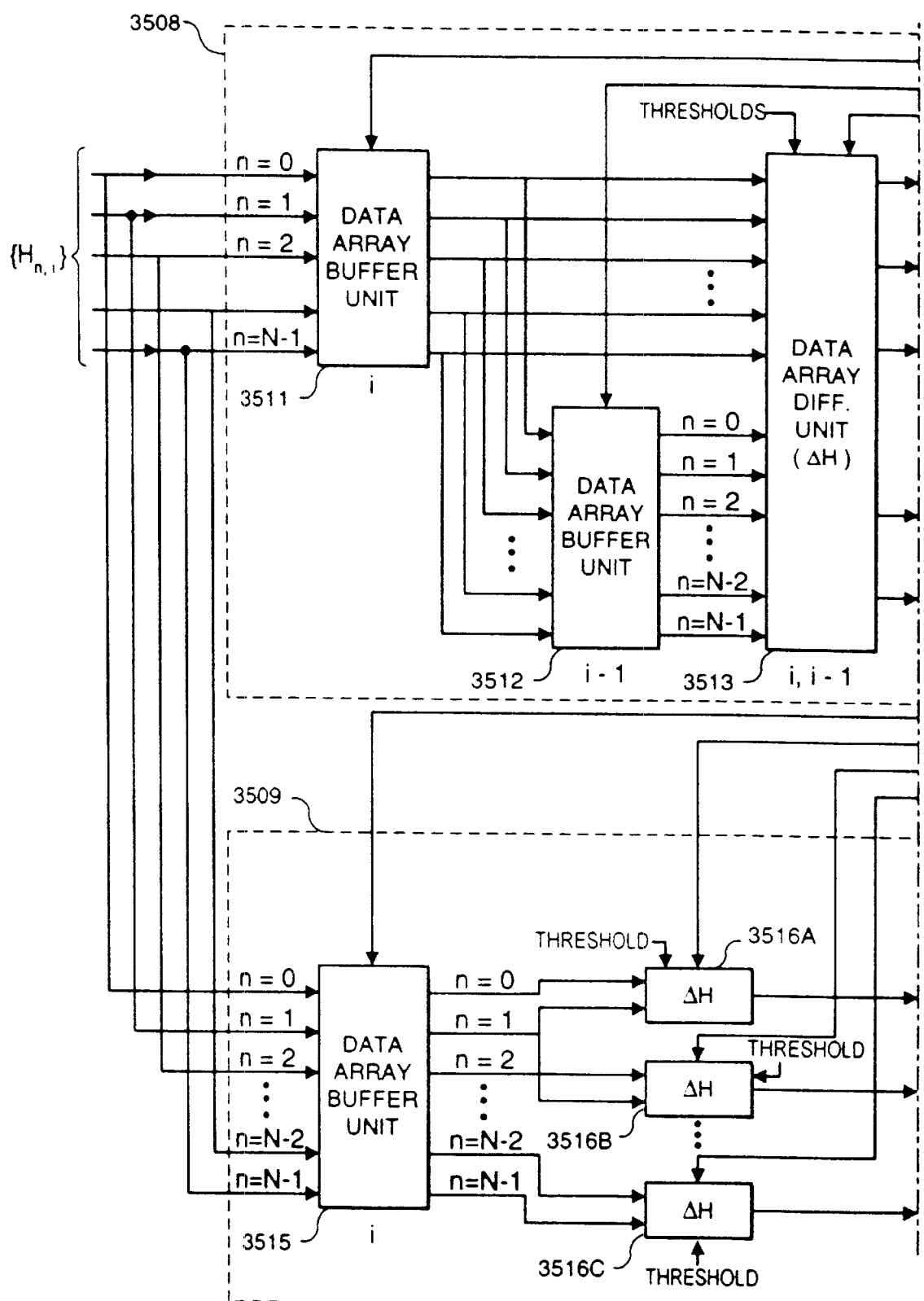
FIG. 50B1

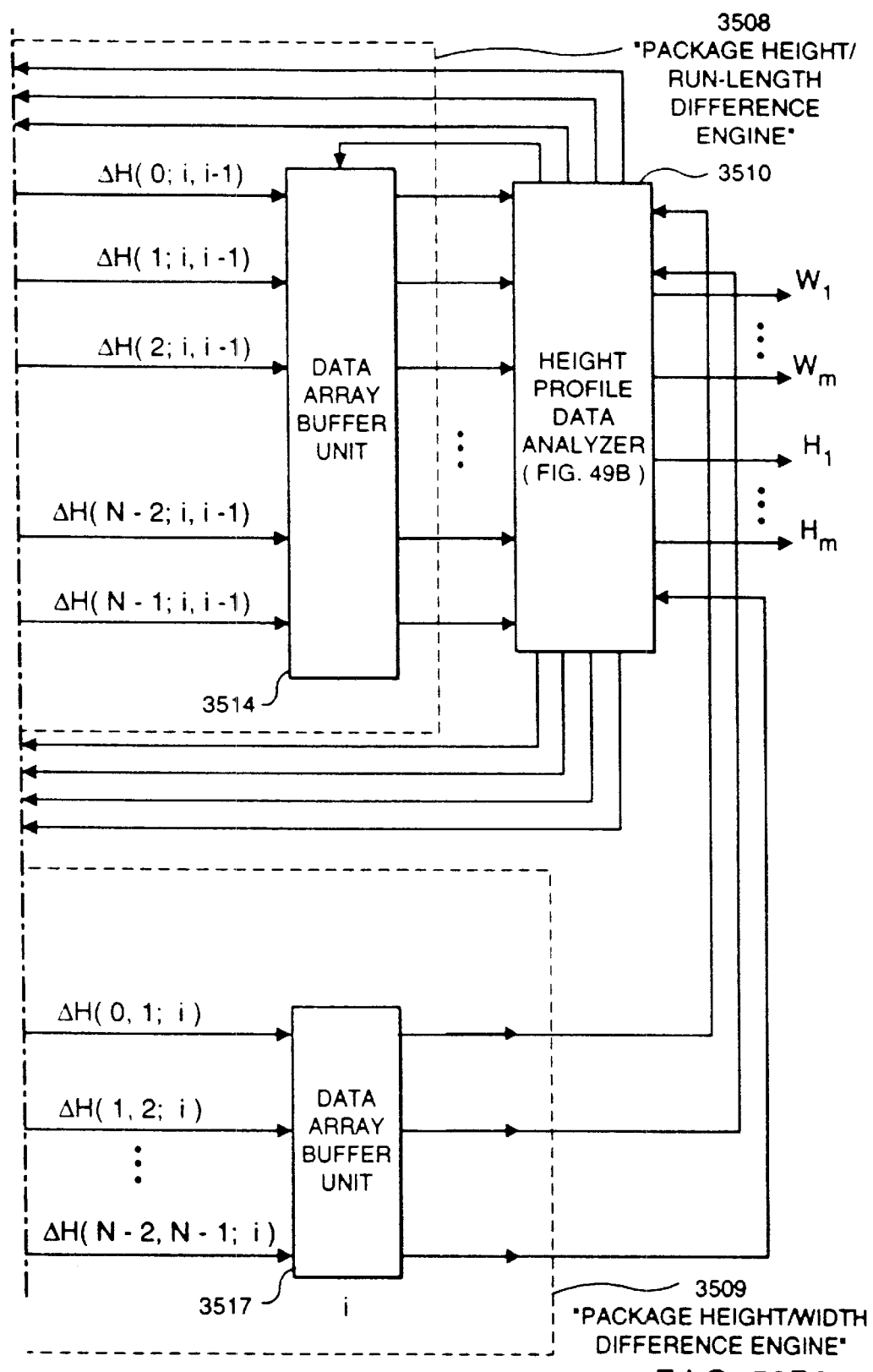
FIG. 50B2

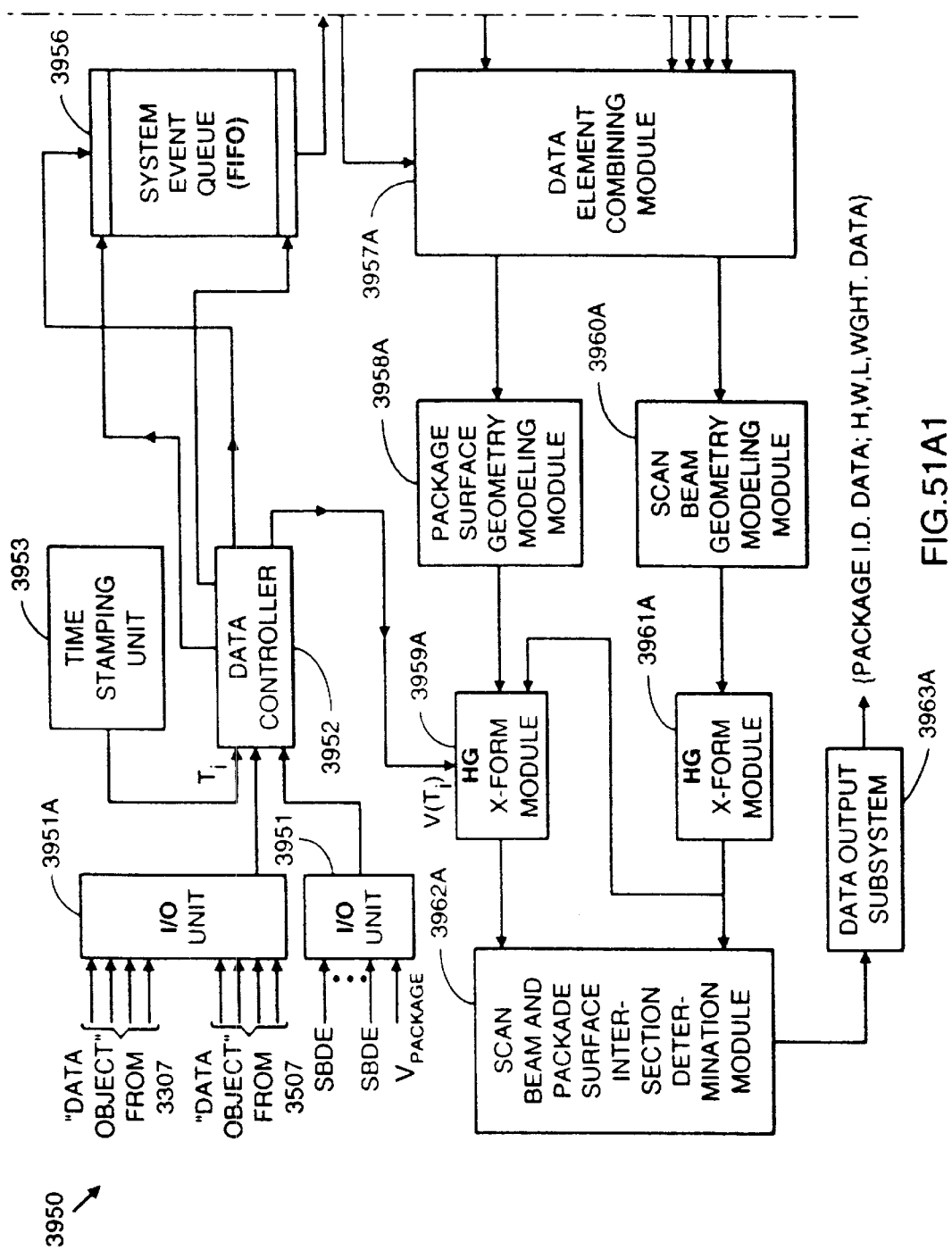
FIG.51A1

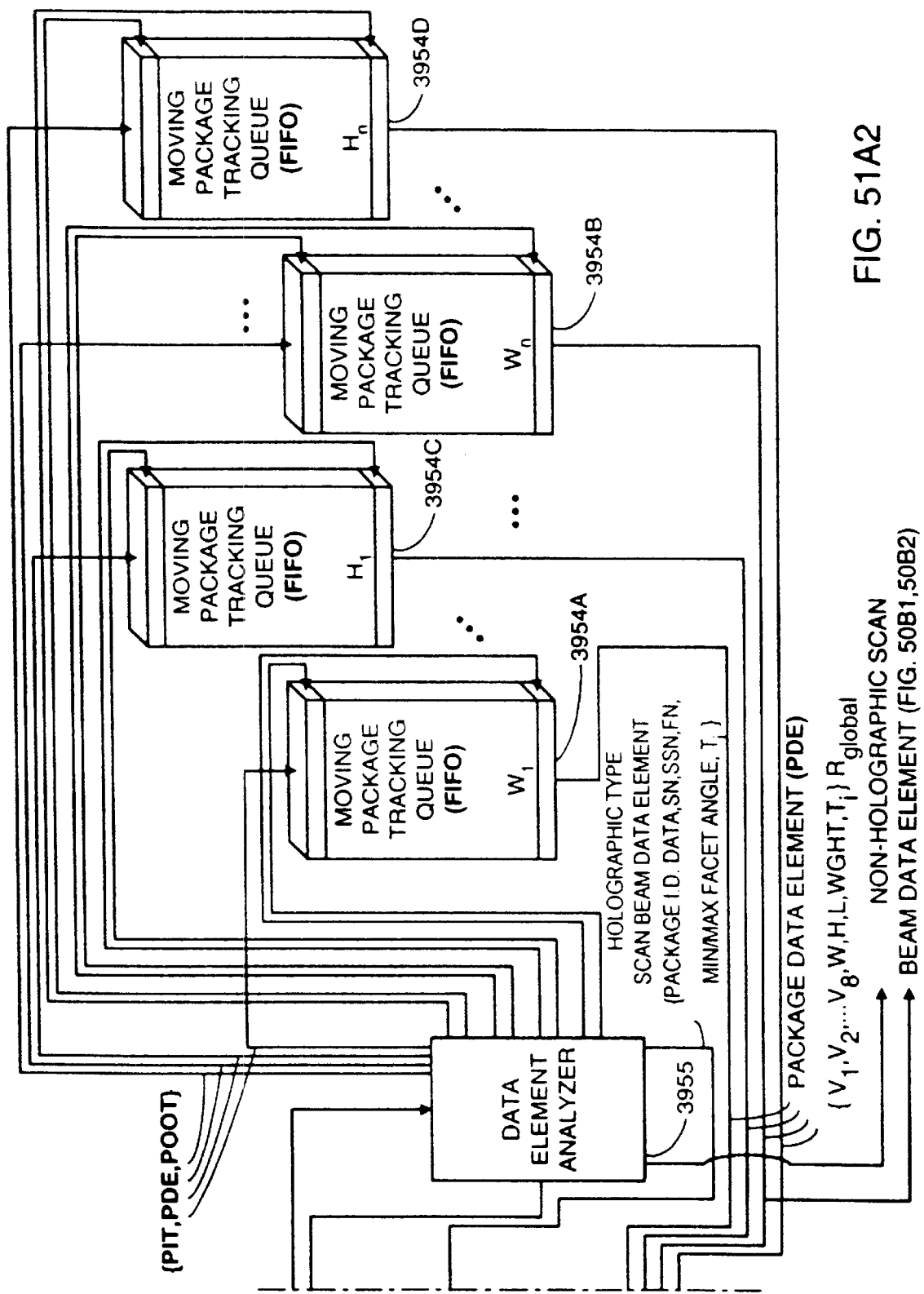
FIG. 51A2

DATA ELEMENT HANDLING RULES

1. WHEN A PACKAGE DIMENSION ELEMENT (PDE) OF ANY TYPE IS REMOVED FROM THE SYSTEM EVENT QUEUE, THEN IT IS PLACED IN THE MOVING PACKAGE TRACKING QUEUE INDICATED BY THE PACKAGE DIMENSION DATA ASSOCIATED WITH THE PACKAGE DIMENSION DATA ELEMENT

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN EACH MOVING PACKAGE TRACKING QUEUE, AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIGS. 51A1 AND 51A2

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE (INDICATED BY THE PACKAGE DIMENSION DATA ASSOCIATED WITH THE PIT DATA ELEMENT) IS REMOVED THEREFROM.

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT:

FIG. 52A (A) IF THE TIME STAMP $T_i$ ON THE REMOVED POOT DATA ELEMENT INDICATES THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE INDICATED BY THE PACKAGE DIMENSION DATA ELEMENT ASSOCIATED WITH THE POOT DATA ELEMENT (B) IF THE TIME-STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM ANY MOVING PACKAGE TRACKING QUEUE

FIG. 52B

VECTOR-BASED SURFACE MODELLING OF PACKAGES MOVING IN SCANNING TUNNEL

MATHEMATICAL FORM OF EACH SURFACE ON THE PACKAGE: VECTOR-BASED MODEL CONSISTING OF (1) AT LEAST THREE VERTICE POINTS WITHIN THE PLANE OF THE PACKAGE SURFACE, AND (2) NORMAL VECTOR FOR THE PLANE.

PROCEDURE:
(1) USE POSITION VECTOR (REFERENCED TO X=0, Y=0, Z=0 IN $R_{global}$) FOR SPECIFYING THE POSITION OF EACH VECTOR IN THE PACKAGE SURFACE PLANE; AND A
(2) USE NORMAL VECTOR FOR SPECIFYING THE SURFACE DIRECTION OF THE PACKAGE SURFACE (AT WHICH LIGHT REFLECTS)

(3) THESE FOUR VECTORS SPECIFY THE SURFACE OF THE PACKAGE IN COORDINATE REFERENCE FRAME $R_{global}$

FIG. 53B

VECTOR MODELING OF LASER SCAN BEAMS IN HOLOGRAPHIC SCANNING SUBSYSTEMS

MATHEMATICAL FORM FOR EACH LASER SCAN BEAM:
VECTOR-BASED MODEL OF OPTICAL PATH OF BEAM FROM DISC TO MIRROR TO FOCAL PLANE ($\infty$)

PROCEDURE:
(1) USE POSITION VECTOR REFERENCED FROM $X=0$, $Y=0$, $Z=0$ IN $R_{local\ scanner}$, FOR SPECIFYING THE STARTING POINT OF LASER SCAN BEAM ON DISC, AND DIRECTION VECTOR FOR SPECIFYING THE DIRECTION OF LASER BEAM TO THE BEAM FOLDING MIRROR, AND (2) USE POSITION VECTOR FOR SPECIFYING POINT ON MIRROR WHERE LASER BEAM IS REFLECTED FROM BEAM FOLDING MIRROR TOWARD FOCAL PLANE OF FACET EXTENDING TO INFINITY AND DIRECTION VECTOR FOR SPECIFYING THE DIRECTION OF LASER BEAM TOWARD DESIGNATED FOCAL PLANE (3) THESE FOUR VECTORS SPECIFY THE LASER BEAM RAY IN LOCAL COORDINATE REFERENCE $R_{local\ scanner}$

FIG. 54

VECTOR-BASED MODEL OF SCANNING-SURFACE PRODUCED BY NON-HOLOGRAPHIC BOTTOM SCANNERS

NOTE:

EACH SCANNING SURFACE IS SPECIFIED BY FOUR BOUNDARY POINTS IN $y = 0$, $X - Z$ PLANE OF $R_{global}$, REFERENCED TO $x = 0$, $y = 0$, $z = 0$;

EACH POINT IS REPRESENTED BY A POSITION VECTOR AND A DIRECTION VECTOR ASSUMED NORMAL TO X-Y PLANE.

COORDINATE CONVERSION OF VECTOR-BASED MODELS OF SCAN BEAMS PRODUCED BY HOLOGRAPHIC SCANNERs IN SYSTEM
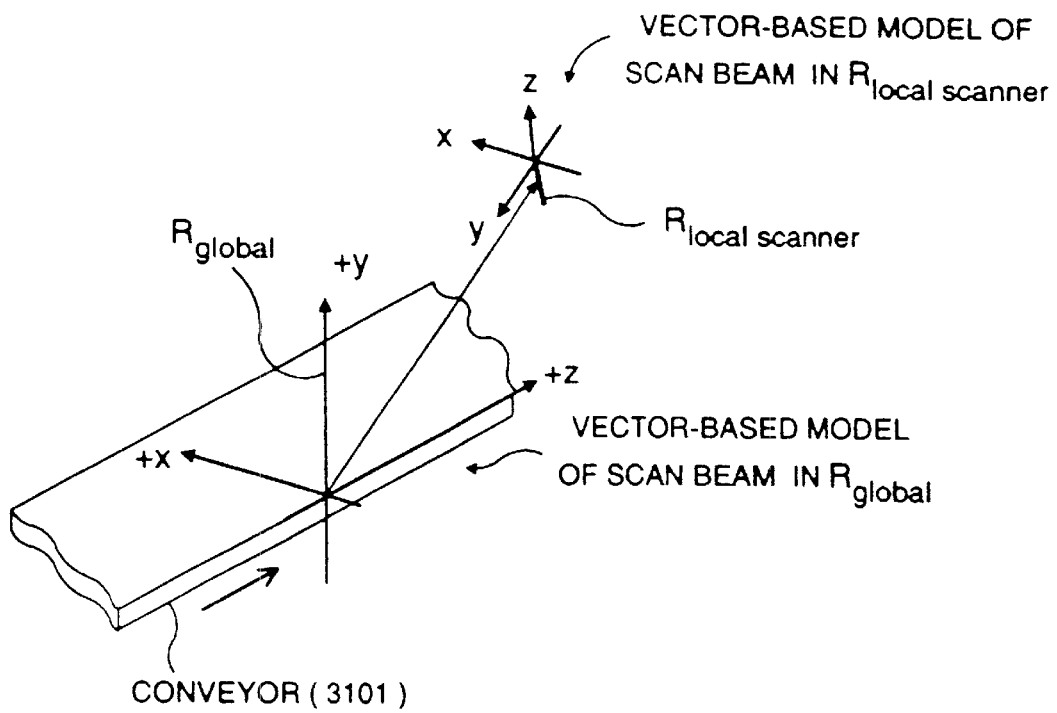
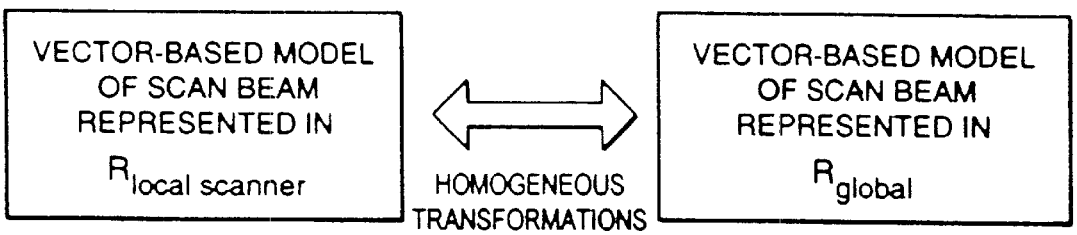
FIG. 56

AUTOMATED SYSTEM AND METHOD FOR IDENTIFYING AND MEASURING PACKAGES TRANSPORTED THROUGH A LASER SCANNING TUNNEL

CROSS-REFERENCE TO RELATED US APPLICATIONS

This is a Continuation-in-Part of application Ser. Nos.: 09/274,265 filed Mar. 22, 1999; Ser. No. 09/243,078 filed Feb. 2, 1999; Ser. No. 09/241,930 filed Feb. 2, 1999; Ser. No. 09/157,778 filed Sep. 21, 1998; Ser. No. 09/047,146 filed Mar. 24, 1998, Ser. No. 08/949,915 filed Oct. 14, 1997, now U.S. Pat. No. 6,158,659; Ser. No. 08/854,832 filed May 12, 1997, now U.S. Pat. No. 6,085,978; Ser. No. 08/886,806 filed Apr. 22, 1997, now U.S. Pat. No. 5,984,185; Ser. No. 08/726,522 filed Oct. 7, 1996, now U.S. Pat. No. 6,073,846; and 08/573,949 filed Dec. 18, 1995, now abandoned, each said application being commonly owned by Assignee, Metrologic Instruments, Inc., of Blackwood, N.J., and incorporated herein by reference as if fully set forth herein.

BACKGROUND OF THE INVENTION

1. Field of Invention

The present invention relates generally to an automated tunnel-type laser scanning package identification and measuring system arranged about a high-speed conveyor structure used in diverse package routing and transport applications, and also a method of identifying and measuring packages having bar code symbols on surfaces facing any direction with a 3-D scanning volume.

2. Brief Description of the Prior Art

In many environments, there is a great need to automatically identify and measure objects (e.g. packages, parcels, products, luggage, etc.) as they are transported along a conveyor structure. While over-the-head laser scanning systems are effective in scanning upwardly-facing bar codes on conveyed objects, there are many applications where it is not practical or otherwise feasible to ensure that bar code labels are upwardly-facing during transportation under the scanning station.

Various types of "tunnel" scanning systems have been proposed so that bar codes can be scanned independently of their orientation within the scanning volume of the system. One such prior art tunnel scanning system is disclosed in U.S. Pat. No. 5,019,714 to Knowles. In this prior art scanning system, a plurality of single scanline scanners are orientated about a conveyor structure in order to provide a limited degree of omni-directional scanning within the "tunnel-like" scanning environment. Notably, however, prior art tunnel scanning systems, including the system disclosed in U.S. Pat. No. 5,019,714, are incapable of scanning bar code systems in a true omni-directional sense, i.e. independent of the direction that the bar code faces as it is transported along the conveyor structure. At best, prior art scanning systems provide omni-directional scanning in the plane of the conveyor belt or in portions of planes orthogonal thereto. However, true omnidirectional scanning along the principal planes of a large 3-D scanning volume has not been hitherto possible.

Also, while numerous systems have been proposed for automatically identifying and measuring the dimensions and weight of packages along a high-speed conveyor, prior art systems have been very difficult to manufacture, maintain, and operate in a reliable manner without the use of human supervision.

Thus, there is a great need in the art for an improved tunnel-type automated laser scanning package identification/measuring system and a method of identifying and measuring packages transported along a high-speed conveyor system, while avoiding the shortcomings and drawbacks of prior art scanning systems and methodologies.

OBJECTS AND SUMMARY OF THE PRESENT INVENTION

Accordingly, a primary object of the present invention is to provide a novel tunnel-type automated package identification and measuring system that is free of the shortcomings and drawbacks of prior art tunnel-type laser scanning systems and methodologies.

Another object of the present invention is to provide a fully automated package identification and measuring system, wherein an omni-directional holographic scanning tunnel is used to read bar codes on packages entering the tunnel, while a package dimensioning subsystem is used to capture information about the package prior to entry into the tunnel.

Another object of the present invention is to provide a fully automated package identification and measuring system, wherein mathematical models are created on a real-time basis for both the geometry of the package and the position of the laser scanning beam used to read the bar code symbol thereon. Another object of the present invention is to provide a fully automated package identification and measuring system, wherein the mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

Another object of the present invention is to provide such a system, in which a plurality of holographic laser scanning subsystems are mounted on a scanner support framework, arranged about a high-speed conveyor belt, and arranged so that each scanning subsystem projects a highly-defined 3-D omni-directional scanning volume with a large depth-of-field, above the conveyor structure so as to collectively provide omni-directional scanning within each of the three principal scanning planes of the tunnel-type scanning system.

Another object of the present invention is to provide such a system, in which each holographic laser scanning subsystem projects a highly-defined 3-D omni-directional scanning volume that has a large depth-of-field and is substantially free of spatially and temporally coincident scanning planes, to ensure substantially zero crosstalk among the numerous laser scanning channels provided within each holographic laser scanning subsystem employed in the system.

Another object of the present invention is to provide such a system, in which a split-type conveyor is used with a gap disposed between its first and second conveyor platforms, for mounting of an omni-directional projection-type laser scanning subsystem that is below the conveyor platforms and ends substantially the entire width of the conveyor platform.

Another object of the present invention is to provide such a system, wherein a plurality of holographic laser scanners are arranged about the conveyor system so as to produce a bidirectional scanning pattern along the principal axes of a three-dimensional laser scanning volume.

A further object of the present invention is to provide a system, in which each holographic laser scanner employed in the system projects a three-dimensional laser scanning volume having multiple focal planes and a highly confined geometry extending about a projection axis extending from the scanning window of the holographic scanner and above the conveyor belt of the system.

Another object of the present invention is to provide an automated package identification and measuring system, wherein singulated packages can be detected, dimensioned, weighed, and identified in a fully automated manner without human intervention, while being transported through a laser scanning tunnel subsystem using a package conveyor subsystem.

Another object of the present invention is to provide such a system, wherein a package detection and dimensioning subsystem is provided on the input side of its scanning tunnel subsystem, for detecting and dimensioning singulated packages passing through the package detection and dimensioning subsystem.

Another object of the present invention is to provide such a system, wherein a data element queuing, handling and processing subsystem is provided for queuing, handling and processing data elements representative of package identification, dimensions and/or weight, and wherein a moving package tracking queue is maintained so that data elements comprising objects, representative of detected packages entering the scanning tunnel, can be tracked along with dimensional and measurement data collected on such detected packages.

Another object of the present invention is to provide such a system, wherein a package detection subsystem is provided on the output side of its scanning tunnel subsystem.

Another object of the present invention is to provide such a system, wherein the tunnel scanning subsystem provided therein comprises a plurality of laser scanning subsystems, and each such laser scanning subsystem is capable of automatically generating, for each bar code symbol read by the subsystem, accurate information indicative of the precise point of origin of the laser scanning beam and its optical path to the read bar code symbol, as well as produce symbol character data representative of the read bar code symbol.

Another object of the present invention is to provide such a system, wherein the plurality of laser scanning subsystems generates an omnidirectional laser scanning pattern within a 3-D scanning volume, wherein a bar code symbol applied to any one side of a six-sided package (e.g. box) will be automatically scanned and decoded when passed through the 3-D scanning volume using the conveyor subsystem.

Another object of the present invention is to provide such a system, wherein the laser scanning subsystems comprise holographic laser scanning subsystems, and also polygonal-type laser scanning subsystems for reading bar code symbols facing the conveyor surface.

Another object of the present invention is to provide such a system, wherein each holographic laser scanning subsystem employed in the tunnel scanning subsystem comprises a device for generating information specifying which holographic scanning facet or holographic facet sector (or segment) produced the laser scan data used to read any bar code symbol by the subsystem.

Another object of the present invention is to provide such a system, wherein each non-holographic (e.g. polygonal-type) laser scanning subsystem employed in the tunnel scanning subsystem comprises a device for generating information specifying which mirror facet or mirror sector produced the laser scan data used to read any bar code symbol by the subsystem.

Another object of the present invention is to provide such a system, wherein the data element queuing, handling and processing subsystem provided therein further comprises a scan beam geometry modeling subsystem for producing, relative to a local coordinate reference system symbolically embedded within the laser scanning subsystem, coordinate information comprising a geometric model of each laser scanning beam used to read a particular bar code symbol for which symbol character data has been produced by the laser scanning subsystem.

Another object of the present invention is to provide such a system, wherein the data element queuing, handling and processing subsystem provided therein further comprises a first homogeneous transformation module for converting the coordinate information comprising the geometric model of each laser scanning beam used to read a particular bar code symbol on a detected package, from the local coordinate reference system symbolically embedded within the laser scanning subsystem, to a global coordinate reference system symbolically embedded within the tunnel-type scanning system.

Another object of the present invention is to provide such a system, wherein the data element queuing, handling and processing subsystem provided therein further comprises a package surface modeling subsystem for producing, relative to a local coordinate reference system symbolically embedded within the laser scanning subsystem, coordinate information comprising a geometric model of each surface on each package detected by the package detection and dimensioning subsystem.

Another object of the present invention is to provide such a system, wherein the data element queuing, handling and processing subsystem provided therein further comprises a second homogeneous transformation module for converting the coordinate information comprising the geometric model of each surface on a detected package, from the local coordinate reference system symbolically embedded within the laser scanning subsystem, to a global coordinate reference system symbolically embedded within the tunnel-type scanning system.

Another object of the present invention is to provide such a system, wherein a laser scan beam and package surface intersection determination subsystem is provided for determining which detected package was scanned by the laser scanning beam that read a particular bar code symbol, and for linking (i.e. correlating) package measurement data associated with the detected package with package identification data associated with the laser scanning beam that read a bar code symbol on a detected package.

Another object of the present invention is to provide such a system with a package velocity measurement subsystem for measuring the velocity of the package as it moves from the package detection and dimensioning subsystem through the laser scanning tunnel subsystem of the system.

Another object of the present invention is to provide such a system, wherein the package velocity measurement subsystem is realized using a pair of spaced-apart laser beams projected over the conveyor so that when a package interrupts these laser beams, electrical pulses are automatically generated and processed using a clock in order to compute the instantaneous velocity of each and every package transported along the conveyor belt subsystem.

Another object of the present invention is to provide such a system, wherein the package detection and dimensioning subsystem provided on the input side of the laser scanning tunnel subsystem comprises a first pair of light transmitting and receiving structures arranged to transmit a plurality of light beams along a direction parallel to the conveyor belt in order to collect data and measure the height of each singulated package passing through the package detection and dimensioning subsystem, and a second pair of light transmitting and receiving structures arranged to transmit a plurality of light beams along a direction perpendicular to the conveyor belt in order to collect data and measure the width of each singulated package passing through the package detection and dimensioning subsystem.

Another object of the present invention is to provide such a system, wherein the package detection and dimensioning subsystem provided on the input side of the laser scanning tunnel subsystem further comprises a height data processor for processing arrays of height profile data collected from the first pair of light transmitting and receiving structures in order to detect stacked arrangements of packages transported through the package detection and dimensioning subsystem, and width data processor for processing arrays of width profile data collected from the second pair of light transmitting and receiving structures in order to detect side-by-side arrangements of packages transported through the package detection and dimensioning subsystem, and upon detecting either a stacked configuration of packages or a side-by-side configuration of packages, automatically generating an unique data element indicative of such multiple package arrangements along the conveyor belt, and placing this unique data element in the moving package tracking queue in the data element queuing, handling and processing subsystem so that this subsystem can cause an auxiliary subsystem to reroute such multiple packages through a singulation unit and then return to pass once again through the system of the present invention.

Another object of the present invention is to provide such a system, wherein a package weighing-in-motion subsystem is provided for weighing singulated packages moving through the package detection and dimensioning subsystem, and producing weight measurement information for assignment to each detected package.

Another object of the present invention is to provide an automated package identification and measuring system, wherein multiple packages can be detected, dimensioned, weighed, and identified in a fully automated manner without human intervention, while being transported through a laser scanning tunnel subsystem using a package conveyor subsystem.

Another object of the present invention is to provide such a system, wherein a package detection and dimensioning subsystem is provided on the input side of its scanning tunnel subsystem, for detecting and dimensioning multiple packages passing through the package detection and dimensioning subsystem.

Another object of the present invention is to provide such a system, wherein a data element queuing, handling and processing subsystem is provided for queuing, handling and processing data elements representative of package identification, dimensions and/or weight, and wherein a moving package tracking queue is maintained so that data elements comprising objects, representative of detected packages entering the scanning tunnel, can be tracked along with dimensional and measurement data collected on such detected packages.

Another object of the present invention is to provide such a system, wherein a package detection subsystem is provided on the output side of its scanning tunnel subsystem.

Another object of the present invention is to provide such a system, wherein the tunnel scanning subsystem provided therein comprises a plurality of laser scanning subsystems, and each such laser scanning subsystem is capable of automatically generating, for each bar code symbol read by the subsystem, accurate information indicative of the precise point of origin of the laser scanning beam and its optical path to the read bar code symbol, as well as produce symbol character data representative of the read bar code symbol.

Another object of the present invention is to provide such a system, wherein the plurality of laser scanning subsystems generates an omnidirectional laser scanning pattern within a 3-D scanning volume, wherein a bar code symbol applied to any one side of a six-sided package (e.g. box) will be automatically scanned and decoded when passed through the 3-D scanning volume using the conveyor subsystem.

Another object of the present invention is to provide such a system, wherein the laser scanning subsystems comprise holographic laser scanning subsystems, and also polygonal-type laser scanning subsystems for reading bar code symbols facing the conveyor surface.

Another object of the present invention is to provide such a system, wherein each holographic laser scanning subsystem employed in the tunnel scanning subsystem comprises a device for generating information specifying which holographic scanning facet or holographic facet sector (or segment) produced the laser scan data used to read any bar code symbol by the subsystem.

Another object of the present invention is to provide such a system, wherein each non-holographic (e.g. polygonal-type) laser scanning subsystem employed in the tunnel scanning subsystem comprises a device for generating information specifying which mirror facet or mirror sector produced the laser scan data used to read any bar code symbol by the subsystem.

Another object of the present invention is to provide such a system, wherein the data element queuing, handling and processing subsystem provided therein further comprises a scan beam geometry modeling subsystem for producing, relative to a local coordinate reference system symbolically embedded within the laser scanning subsystem, coordinate information comprising a geometric model of each laser scanning beam used to read a particular bar code symbol for which symbol character data has been produced by the laser scanning subsystem.

Another object of the present invention is to provide such a system, wherein the data element queuing, handling and processing subsystem provided therein further comprises a first homogeneous transformation module for converting the coordinate information comprising the geometric model of each laser scanning beam used to read a particular bar code symbol on a detected package, from the local coordinate reference system symbolically embedded within the laser scanning subsystem, to a global coordinate reference system symbolically embedded within the tunnel-type scanning system.

Another object of the present invention is to provide such a system, wherein the data element queuing, handling and processing subsystem provided therein further comprises a package surface modeling subsystem for producing, relative to a local coordinate reference system symbolically embedded within the laser scanning subsystem, coordinate information comprising a geometric model of each surface on each package detected by the package detection and dimensioning subsystem.

Another object of the present invention is to provide such a system, wherein the data element queuing, handling and processing subsystem provided therein further comprises a second homogeneous transformation module for converting the coordinate information comprising the geometric model of each surface on a detected package, from the local coordinate reference system symbolically embedded within the laser scanning subsystem, to a global coordinate reference system symbolically embedded within the tunnel-type scanning system.

Another object of the present invention is to provide such a system, wherein a laser scan beam and package surface intersection determination subsystem is provided for determining which detected package was scanned by the laser scanning beam that read a particular bar code symbol, and for linking (i.e. correlating) package measurement data associated with the detected package with package identification data associated with the laser scanning beam that read a bar code symbol on a detected package.

Another object of the present invention is to provide such a system with a package velocity measurement subsystem for measuring the velocity of the package as it moves from the package detection and dimensioning subsystem through the laser scanning tunnel subsystem of the system.

Another object of the present invention is to provide such a system, wherein the package velocity measurement subsystem is realized using an roller wheel engaged in direct contact with the conveyor belt as it moves, generating electrical pulses as an optical encoder attached to the shaft of the roller wheel is caused to complete one revolution, during which the conveyor belt traveled one linear foot, and counting these generated electrical pulses with reference to a clock in order to compute the instantaneous velocity of the conveyor belt, and thus each and every package transported therealong without slippage.

Another object of the present invention is to provide such a system, wherein the package detection and dimensioning subsystem provided on the input side of the laser scanning tunnel subsystem comprises a laser scanning mechanism that generates an amplitude modulated laser scanning beam that is scanned across the width of the conveyor structure in the package conveyor subsystem while the scanning beam is disposed substantially perpendicular to the surface of the conveyor structure, and light reflected from scanned packages is collected, detected and processed to produce information representative of the package height profile across the width of the conveyor structure for each timing sampling instant carried out by the package detection and dimension subsystem.

Another object of the present invention is to provide such a system, wherein the package detection and dimensioning subsystem provided on the input side of the laser scanning tunnel subsystem further comprises a height data processor for processing arrays of height profile data collected from the first pair of light transmitting and receiving structures in order to detect stacked arrangements of packages transported through the package detection and dimensioning subsystem, and width data processor for processing arrays of width profile data collected from the second pair of light transmitting and receiving structures in order to detect side-by-side arrangements of packages transported through the package detection and dimensioning subsystem, an d upon detecting either a stacked configuration of packages or a side-by-side configuration of packages, automatically generating a unique data element indicative of such multiple package arrangements along the conveyor belt, and placing this unique data element in the moving package tracking queue in the data element queuing, handling and processing subsystem so that this subsystem can cause an auxiliary subsystem to reroute such multiple packages through a singulation unit and then returned to pass once again through the system of the present invention.

Another object of the present invention is to provide such a system, wherein a package weighing-in-motion subsystem is provided for weighing multiple packages moving through the package detection and dimensioning subsystem, and producing weight measurement information for assignment to each detected package.

Another object of the present invention is to provide an automated package identification and measuring system, wherein multiple packages, arranged in a side-by-side, stacked and/or singulated configuration, can be simultaneously detected, dimensioned, weighed, and identified in a fully automated manner without human intervention, while being transported through a laser scanning tunnel subsystem using a package conveyor subsystem.

Another object of the present invention is to provide such a system, wherein a package detection and dimensioning subsystem is provided on the input side of its scanning tunnel subsystem, for simultaneously detecting and dimensioning multiple packages passing through the package detection and dimensioning subsystem, and wherein the package detection and dimensioning subsystem employs multiple moving package tracking queues simultaneously maintained therein for spatially different regions above the conveyor belt so order that data objects, representative of packages detected in such spatially different regions, can be produced and tracked along with dimensional and measurement data collected on such detected packages.

Another object of the present invention is to provide such a system, wherein a data element queuing, handling and processing subsystem is provided for queuing, handling and processing data elements representative of package identification, dimensions and/or weight, and wherein multiple moving package tracking queues are simultaneously maintained for spatially different regions above the conveyor belt so that data elements comprising objects, representative of detected packages entering the scanning tunnel, can be tracked along with dimensional and measurement data collected on such detected packages.

Another object of the present invention is to provide such a system, wherein a multiple package detection and dimensioning subsystem is provided on the output side of its scanning tunnel subsystem, and multiple moving package tracking queues are simultaneously maintained therein for spatially different regions above the conveyor belt in order that data elements comprising objects, representative of detected packages exiting the scanning tunnel, can be tracked along with dimensional and measurement data collected on such detected packages.

Another object of the present invention is to provide such a system, wherein the tunnel scanning subsystem provided therein comprises a plurality of laser scanning subsystems, and each such laser scanning subsystem is capable of automatically generating, for each bar code symbol read by the subsystem, accurate information indicative of the precise point of origin of the laser scanning beam and its optical path to the read the bar code symbol, as well as symbol character data representative of the read bar code symbol.

Another object of the present invention is to provide such a system, wherein the data element queuing, handling and processing subsystem provided therein further comprises a scan beam geometry modeling subsystem for producing, relative to a local coordinate reference system symbolically embedded within the laser scanning subsystem, coordinate information comprising a geometric model of each laser scanning beam used to read a particular bar code symbol for which symbol character data has been produced by the laser scanning subsystem.

Another object of the present invention is to provide such a system, wherein the data element queuing, handling and processing subsystem provided therein further comprises a first homogeneous transformation module for converting the coordinate information comprising the geometric model of each laser scanning beam used to read a particular bar code symbol on a detected package, from the local coordinate reference system symbolically embedded within the laser scanning subsystem, to a global coordinate reference system symbolically embedded within the tunnel-type scanning system.

Another object of the present invention is to provide such a system, wherein the data element queuing, handling and processing subsystem provided therein further comprises a package surface modeling subsystem for producing, relative to a local coordinate reference system symbolically embedded within the laser scanning subsystem, coordinate information comprising a geometric model of each surface on each package detected by the package detection and dimensioning subsystem.

Another object of the present invention is to provide such a system, wherein the data element queuing, handling and processing subsystem provided therein further comprises a second homogeneous transformation module for converting the coordinate information comprising the geometric model of each surface on a detected package, from the local coordinate reference system symbolically embedded within the laser scanning subsystem, to a global coordinate reference system symbolically embedded within the tunnel-type scanning system.

Another object of the present invention is to provide such a system, wherein a laser scan beam and package surface intersection determination subsystem is provided for determining which detected package was scanned by the laser scanning beam that read a particular bar code symbol, and for linking (i.e. correlating) package measurement data associated with the detected package with package identification data associated with the laser scanning beam that read a bar code symbol on a detected package.

Another object of the present invention is to provide such a system with a package velocity measurement subsystem for measuring the velocity of the package as it moves from the package detection and dimensioning subsystem through the laser scanning tunnel subsystem of the system.

Another object of the present invention is to provide such a system, wherein the package velocity measurement subsystem is realized using an roller wheel engaged in direct contact with the conveyor belt as it moves, generating electrical pulses as an optical encoder attached to the shaft of the roller wheel is caused to complete one revolution, during which the conveyor belt traveled one linear foot, and counting these generated electrical pulses with reference to a clock in order to compute the instantaneous velocity of the conveyor belt, and this each and every package transported therealong without slippage.

Another object of the present invention is to provide such a system, wherein the package detection and dimensioning subsystem provided on the input side of the laser scanning tunnel subsystem comprises a laser scanning mechanism that generates an amplitude modulated laser scanning beam that is scanned across the width of the conveyor structure in the package conveyor subsystem while the scanning beam is disposed substantially perpendicular to the surface of the conveyor structure, and light reflected from scanned packages is collected, detected and processed to produce information representative of the package height profile across the width of the conveyor structure for each timing sampling instant carried out by the package detection and dimension subsystem.

Another object of the present invention is to provide such a system, wherein the package detection and dimensioning subsystem provided on the input side of the laser scanning tunnel subsystem comprises a stereoscopic camera subsystem which captures stereoscopic image pairs of packages being transported through the package detection and dimensioning subsystem, and also a real-time stereoscopic image processor which is programmed to detect multiple images present in the field of view of stereoscopic imaging subsystem, and compute the vertices and dimensions of each such detected package.

Another object of the present invention is to provide such a system, wherein a package weighing-in-motion subsystem is provided for weighing simultaneously weighing each package, or arrangement of side-by-side and/or stacked packages moving through the package detection and dimensioning subsystem, and producing weight measurement information for assignment to each detected package, or apportioned to each arrangement of side-by-side and/or stacked packages, based on relative volumetric measurements.

Another object of the present invention is to provide an improved tunnel-type scanning system, wherein bar code symbols downwardly facing the conveyor belt can be automatically scanned as they are transported through the system in a high-speed manner.

Another object of the present invention is to provide an improved method of identifying and measuring packages within a tunnel-scanning environment through which objects of various types can be conveyed at high transport speeds.

Another object of the present invention is to provide an automated package identification and measuring system characterized by: lower labor costs; higher load efficiency; perfect destination accuracy; extremely fast ID throughput; more accurate shipping charges; fast, accurate tracking and sorting; and precision package weights, shapes, and measurements.

Another object of the present invention is to provide an automated package identification and measuring system which can read bar codes anywhere on a parcel moving down a fast conveyor line: top; sides; front; rear; and bottom.

Another object of the present invention is to provide an automated package identification and measuring system which enables fully automated package handling on real world-sized bar codes.

Another object of the present invention is to provide an automated package identification and measuring system which does not require any human intervention during handling.

Another object of the present invention is to provide an automated package identification and measuring system which can sort the package after bar code data on the package has been read and captured by the system software.

Another object of the present invention is to provide an automated package identification and measuring system which can measure and weigh the package, eliminating the "guesstimating" often required by human operators.

Another object of the present invention is to provide an automated package identification and measuring system which enables exact weighing and measuring of packages, and thus minimizes wasted cargo space and more carrying capacity on every shipment, thereby allowing shippers to bill customers with greater precision, with fees keyed to package volume, shape, weight, and destination.

Another object of the present invention is to provide an automated method of automated identifying and measuring packages arranged in either a singulated, side-by-side or stacked configuration on a conveyor structure.

A further object of the present invention is to provide a novel way of and means for digitizing digital scan data while correlating laser scanning information.

A further object of the present invention is to provide a novel way of and means for decoding digital scan count data while correlating laser scanning information for use in various types of object tracking operations.

These and other objects of the present invention will become apparent hereinafter and in the Claims to Invention.

BRIEF DESCRIPTION OF THE DRAWINGS

For a more complete understanding of the present invention, the following Detailed Description of the Illustrative Embodiment should be read in conjunction with the accompanying Drawings, wherein:

FIG. 2C is a table setting forth data specifying the position and orientation of the sixteen omni-directional holographic laser scanners mounted within the tunnel scanning subsystem of the first illustrative embodiment of the present invention, wherein the position of each single-disc holographic scanner is specified with respect to the center of the holographic scanning disc contained within each such scanning unit, and the position of each triple-disc holographic scanner is specified with respect to the center of the middle holographic scanning disc contained within each such scanning unit;

FIG. 3A1 is a perspective, partially cut-away view of the single-disc holographic laser scanning subsystem (e.g. indicated as L/F Corner #1, L/F Corner #2, L/B Corner #1, L/B Corner #2, R/F Corner #1, R/F Corner #2, R/B Corner #1 and R/B Corner #2 in FIG. 1C and the Scanner Positioning Table shown in FIG. 2C), mounted within the corners of the tunnel-type scanning system of the first illustrative embodiment, showing the holographic scanning disc surrounded by one of its six beam folding mirrors, parabolic light collection mirrors, laser beam production modules, photodetectors, and analog and digital signal processing boards mounted on the optical bench of the subsystem;

FIG. 3A2 is a plan view of the single-disc holographic laser scanning subsystem employed in the tunnel scanning subsystem of the first illustrative embodiment, showing the holographic scanning disc surrounded by six laser scanning stations comprising a beam folding mirror, parabolic light collection mirror, laser beam production module (employing a VLD), each of which is enclosed in a compact housing adapted for adjustable support by the scanner support framework employed in the tunnel scanning subsystem of the illustrative embodiment;

FIG. 3A3 is a cross-sectional view of the single-disc holographic laser scanning subsystem shown in FIG. 3A2, showing its holographic scanning disc rotatably supported by its scanning motor mounted on the optical bench of the subsystem;

FIG. 3A4 is a schematic representation of the layout of the volume-transmission type holographic optical element (HOEs) mounted between the glass support plates of the holographic scanning disc employed within the single-disc holographic scanning subsystem installed in the tunnel scanning system of the first illustrative embodiment;

FIGS. 3A5A through 3A5C, taken together, show a table setting forth the design parameters used to construct each holographic disc within the single-disc holographic scanning subsystem employed in the tunnel scanning system of the first illustrative embodiment;

FIG. 3A6 is a schematic representation of the laser scanning pattern projected from the single-disc holographic laser scanning subsystem employed in the tunnel-type scanning system of the first illustrative embodiment of the present invention;

FIGS. 3A7A through 3A7C, taken together, is a schmatic representation of the subcomponents of the single-disk holographic laser scanning subsystems of the first illustrative embodiment configured together on the analog signal processing boards, decode signal processing boards and within the housing;

FIG. 3A8A is an elevated view of the home-pulse mark sensing module of the present invention deployed about each holographic scanning disc in the system of the first illustrative embodiment of the present invention;

FIG. 3A8B is a plan view of the home pulse mark sensing module shown in FIG. 3A8A;

FIGS. 3A8C1 and 3A8C2, taken together, show a schematic diagram of an analog signal processing circuit which can be used to implement the home-pulse detector employed in the holographic laser scanning subsystems of the first illustrative embodiment of the present invention;

FIG. 3B1 is a plan view of the triple-disc holographic scanning subsystem (e.g. indicated as Top/Front, Top/Back, Left Side/Front, Left Side/Back, Right Side/Front and Right Side/Back in FIG. 1C and the Scanner Positioning Table shown in FIG. 2C), mounted on the top and sides of the tunnel-type scanning system of the first illustrative embodiment, showing three holographic scanning discs mounted on an optical bench with 13.3 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3B2 is a schematic representation of the layout of the volume-transmission type holographic optical elements (HOEs) mounted between the glass support plates of each holographic scanning disc employed within the triple-disc holographic scanning subsystem shown in FIG. 3B1;

FIGS. 3B3A and 3B3B, taken together, provide a table setting forth the design parameters used to construct within each holographic scanning disc each holographic scanning subsystem employed in the triple-disc holographic laser scanner shown in FIG. 3B1;

FIG. 3B4 is a schematic representation of the laser scanning pattern projected from the single-disc holographic laser scanning subsystem employed in the triple-disc holographic laser scanner shown in FIG. 3B1, when no beam folding mirrors associated therewith are angularly located or rotated;

FIG. 3B5 is a table setting forth the angular location and rotation of each beam folding mirror in the center and end-located holographic scanning subsystems employed in the triple-disc holographic laser scanner shown in FIG. 3B1;

FIG. 3B6 is a schematic representation of the laser scanning pattern projected from the center holographic laser scanning subsystem employed in the triple-disc holographic laser scanner shown in FIG. 3B1, wherein each beam folding mirror associated therewith is angularly located and rotated as shown in the table of FIG. 3B5, to achieve the desired scanning pattern;

FIG. 3B7 is a schematic representation of the laser scanning pattern projected from end-located holographic laser scanning subsystems employed in the triple-disc holographic laser scanner shown in FIG. 3B1, wherein each of beam folding mirrors associated therewith is angularly located and rotated to achieve the desired scanning pattern;

FIG. 3B8 is a schematic representation of the laser scanning pattern projected from the triple-disc holographic laser scanner shown in FIG. 3B1;

FIG. 3C1 is a plan view of the triple-disc holographic scanning subsystem (e.g. indicated as Front and Back in FIG. 1C and the Scanner Positioning Table shown in FIG. 2C), mounted on the top of the tunnel-type scanning system of the illustrative embodiment, showing three holographic scanning discs mounted on an optical bench with 14.0 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3C2 is a schematic representation of the laser scanning pattern projected from the triple-disc holographic laser scanner shown in FIG. 3C1;

FIG. 3D1 is an exploded diagram of the fixed laser projection scanner mounted beneath the conveyor belt surface of the system and between the first and second conveyor belt platforms of the conveyor subsystem employed in the tunnel scanning system of the first illustrative embodiment of the present invention, showing the optical bench upon which eight fixed projection-type laser scanning subsystems are mounted and enclosed within a scanner housing having a rugged glass scanning window bridging the gap provided between the first and second conveyor belt platforms;

FIG. 3D2 is a perspective diagram of the projection-type laser scanning subsystem mounted within the bottom-mounted fixed projection scanner shown in FIG. 3D1, showing an eight-sided polygon scanning element rotatably mounted closely adjacent to a stationary mirror array comprised of four planar mirrors, and a light collecting mirror centrally mounted for focusing light onto a photodetector disposed slightly beyond the polygon scanning element;

FIG. 3D3A is a plan view of the eight fixed-projection laser scanning subsystems mounted on the optical bench of the bottom-mounted laser scanner shown in FIG. 3D1;

FIG. 3D3B is an elevated end view of the eight fixed-projection laser scanning subsystems mounted on the optical bench of the bottom-mounted laser scanner shown in FIG. 3D1, so that the scanning window(s) of the fixed projection laser scanning subsystems (i.e. platforms or benches) are disposed at about a 28° angle with respect to the optically transparent extending across the width extent of the plane of the conveyor belt structure of the system;

FIG. 3D4 is a schematic representation of the partial scanning pattern produced by the eight-sided polygon scanning element and two stationary mirrors mounted adjacent to the central plane of each fixed-projection laser scanning subsystem mounted on the optical bench of the bottom-mounted laser scanner shown in FIG. 3D1;

FIG. 3D5 is a schematic representation of the partial scanning pattern produced by the eight-sided polygon scanning element and two outer stationary mirrors mounted adjacent to the two inner-located stationary mirrors in each fixed-projection laser scanning subsystem mounted on the optical bench of the bottom-mounted laser scanner shown in FIG. 3D1;

FIG. 3D6 is a schematic representation of the complete scanning pattern produced by the eight-sided polygon scanning element and four stationary mirrors mounted about the central plane of each fixed-projection laser scanning subsystem mounted on the optical bench of the bottom-mounted laser scanner shown in FIG. 3D1;

FIG. 3D7 is a schematic representation of the resultant (collective) omni-directional scanning pattern produced through the conveyor-mounted scanning window, by the eight fixed-projection laser scanning subsystems mounted on the optical bench of the bottom-mounted laser scanner shown in FIG. 3D1;

FIG. 4 is a schematic block diagram illustrating that the holographic and fixed-projection laser scanning subsystems, the package dimensioning/measurement subsystem, package velocity and length measurement subsystem, the package-in-tunnel indication subsystem, the package-out-of-tunnel subsystem, the package weighing-in-motion subsystem, the data-element queuing, handling and processing subsystem, the input/output port multiplexing subsystem, and the conveyor belt subsystem integrated together within the automated tunnel-type package identification and measurement system of the first illustrative embodiment of the present invention;

FIG. 5A is a schematic diagram showing the directions of omni-directional scanning provided in the X-Y plane of the 3-D scanning volume of the tunnel scanning system of the first illustrative embodiment Top Front and Top Back holographic laser scanning subsystems, and bottom-mounted fixed projection scanning subsystem employed therein;

FIG. 6 is a schematic diagram showing the direction of omni-directional scanning provided in the X-Y plane of the 3-D scanning volume of the tunnel scanning system of the first illustrative embodiment, by the Left Side Front, Left Side Back, Right Side Front and Right Side Back holographic laser scanning subsystems employed therein;

FIG. 7 is a schematic diagram showing the direction of omni-directional scanning provided in the Y-Z plane of the 3-D scanning volume of the tunnel scanning system of the first illustrative embodiment, by the Top Front and Top Back holographic laser scanning subsystems employed therein;

FIG. 8A is a schematic diagram showing the direction of omni-directional scanning provided in the Y-Z plane of the 3-D scanning volume of the tunnel scanning system of the first illustrative embodiment of the present invention, by the holographic laser scanning subsystems (indicated by R/B Corner #1, R/B Corner #2, R/F Corner #1 and R/B Corner #2) employed therein;

FIG. 8B is a schematic diagram showing the direction of omni-directional scanning provided in the X-Y plane of the 3-D scanning volume of the tunnel scanning system of the first illustrative embodiment of the present invention, by the holographic laser scanning subsystems (indicated by R/B Corner #1, R/B Corner #2, R/F Corner #1 and R/B Corner #2) employed therein;

FIG. 10A is a schematic representation of the components on the control board and decode processing boards associated with holographic scanning disc employed within the tunnel scanning subsystem of the first illustrative embodiment of the present invention, showing the home-pulse detector and home-offset pulse (HOP) generator on the control board, and the start-of-facet-sector pulse (SFSP) generator, digitizer circuitry, decode signal processor and ROM containing relative timing information about each SFSP in relation to the HOP sent to the decode processing board from the control board of the present invention;

FIG. 10B is a schematic representation of the start-of-facet-sector pulse (SFSP) generator employed on each decode board associated with a holographic laser scanning subsystem in the system of the first illustrative embodiment of the present invention;

FIG. 10C is a first table containing parameters and information that are used within the SFP generation module of the SFSP generator shown in FIG. 10B;

Is FIG. 10E is a second table containing parameters and information that are used within the SFSP generation module of the SFSP generator shown in FIG. 10B;

FIGS. 10F1 and 10F2 set forth a table containing a set of production rules used within the SFSP generation module of the SFSP generator shown in FIG. 10B, to generate start-of-facet-sector pulses therewithin;

FIGS. 11A1 and 11A2, taken together, provide a schematic diagram of the digitizing circuit shown in FIG. 10A, using a pair of dual FIFO memory storage buffers to synchronously track digital scan data and information about the facet-sectors on the optically-encoded holographic scanning disc of FIG. 12A used to generate the laser scanning beam that was used to collect such digital scan data from a bar code symbol on a package transported through the tunnel scanning subsystem of the first illustrative embodiment of the present invention;

FIGS. 11C1, 11C2 and 11D set forth tables containing parameters and information that are used within the decode processor of the present invention shown in FIG. 11B in order to recover digital count data from time-based facet-sector related information, and generate decoded symbol character data and the minimum and maximum facet sector angles that specify the facet sector on a particular holographic scanning disc used to generate the laser scanning beam/plane that collects the scan data associated with the decoded bar code symbol;

FIG. 12A is a schematic diagram of the holographic scanning disc that contains an optically-encoded home-pulse mark as well as a series of start-of-facet-sector marks about the outer edge thereof for indicating where each facet sector along the disc begins, relative to the home pulse mark;

FIG. 12D is a table containing parameters and information that are used within the SFSP generation module of the SFSP generator shown in FIG. 12C;

FIGS. 13A1 and 13A2, taken together, set forth a schematic diagram of the digitizing circuit shown in FIG. 12B using a pair of dual FIFO memory storage buffers to synchronously track digital scan data and information about the facet-sectors on a holographic scanning disc used to generate the laser scanning beam that was used to collect such digital scan data from a bar code symbol on a package transported through the tunnel scanning subsystem hereof;

FIGS. 13C1 and 13C2 are tables containing parameters and information that are used within the decode processor of the present invention shown in FIG. 13A1 and 13A2 in order to recover digital count data from time-based facet-sector related information, and generate decoded symbol character data and the minimum and maximum facet sector angles that specify the facet sector on a particular holographic scanning disc used to generate the laser scanning beam/ plane that collects the scan data associated with the decoded bar code symbol;

FIG. 15B1 is a schematic representation showing the dual-laser based package velocity and measurement subsystem installed in a "direct transmit/receive" configuration at the location of the vertical and horizontal light curtains employed in the package height/width profiling subsystem of the present invention;

FIG. 15B2 is a schematic representation of the signals received by the photoreceivers of the dual-laser based package velocity and measurement subsystem shown in FIG. 15A;

FIG. 15B3 is a schematic representation of the signals generated by the photoreceiving circuitry and provided as input to the signal processor of the dual-laser based package velocity and measurement subsystem shown in FIG. 15A;

FIG. 15B4 is a schematic diagram of circuitry for driving the dual laser diodes used in the dual-laser based package velocity and measurement subsystem of FIG. 15B1;

FIGS. 15B5A and 15B5B, taken together, provide a schematic diagram of circuitry for conditioning the signals received by the photoreceivers employed in the dual-laser based package velocity and measurement subsystem of FIG. 15B1;

FIG. 15C1 is a schematic representation showing the dual-laser based package velocity and measurement subsystem installed in a "retro-reflection" configuration at the location of the vertical and horizontal light transmitting/ receiving structures employed in the package height/width profiling subsystem of the present invention;

FIG. 15C2 is a schematic diagram of electronic circuitry adapted for automatically generating a pair of laser beams at a known space-part distance, towards a retroflective device positioned on the opposite side of the conveyor belt of the system of the first illustrative embodiment of the present invention, and automatically detecting the retroflected beams and processing the same so as to produce signals suitable for computing the length and velocity of a package passing through the transmitted laser beams within the dual-laser based package velocity and measurement subsystem of FIG. 15C1;

FIGS. 15D1 through 15D3, taken together, set forth a flow chart describing the steps carried out by the signal processor used in the dual-laser based package velocity and measurement subsystems of FIGS. 15A and FIG. 15C1, so as to compute the velocity (v) and length (L) of the package transported through the laser beams of the dual-laser based package velocity and measurement subsystem hereof;

FIG. 19B is a flow chart describing the operation of the FIR digital filter system of FIG. 19A and how it detects sudden changes in the width and height data streams produced by the package height/width profiling subsystem of FIG. 16B;

FIG. 20A is an elevated side schematic view of the in-motion weighing subsystem employed in the system of the first illustrative embodiment of the present invention, wherein the scale and data processing subcomponents thereof are shown arranged about the package height/width profiling subsystem of FIG. 16A;

FIG. 20B is a plan view of the in-motion weighing subsystem shown in FIG. 20A, wherein a moving package is shown being weighed on the scale component as it is transported along the conveyor belt of the system of the first illustrative embodiment;

FIGS. 22A1, 22A2 and 22B taken together provide a schematic representation of the data element queuing, handling and processing subsystem of the present invention shown in FIG. 4;

FIGS. 23A1 and 23A2 set forth a table of rules used to handle the data elements stored in the system event queue in the data element queuing, handling and processing subsystem of FIGS. 22A1 through 22B;

FIG. 24B is a table setting forth a preferred procedure for creating a vector-based surface model for each surface of each package transported through the package dimensioning/measuring subsystem and package velocity/length measurement subsystem of the system hereof;

FIGS. 25A1 and 25A2 set forth a schematic representation of a diffraction-based geometric optics model, created by the scan beam geometry modeling subsystem (i.e. module) of FIGS. 22A1 through 22B, for the propagation of the laser scanning beam (ray) emanating from a particular point on the facet, towards its point of reflection on the corresponding beam folding mirror, towards to the focal plane determined by the focal length of the facet, created within the scan beam geometry modeling module of the system thereof;

FIGS. 25B1 through 25B3 set forth a table of parameters used to construct the diffraction-based geometric optics model of the scanning facet and laser scanning beam shown in FIGS. 25A1 and 25A2;

FIGS. 25C1 and 25C2, taken together, set forth a table of parameters used in the spreadsheet design of the holographic laser scanning subsystems of the present invention, as well as in real-time generation of geometrical models for laser scanning beams using 3-D ray-tracing techniques;

FIG. 27 is a table setting forth a preferred procedure for creating a vector-based ray model for laser scanning beams which have been produced by a holographic laser scanning subsystem of the system hereof, that may have collected the scan data associated with a decoded bar code symbol read thereby within the tunnel scanning subsystem;

FIG. 36 is a plan view of a dual-disc holographic laser scanning subsystem mounted over the conveyor belt of the system shown in FIG. 33;

FIG. 38 is a table setting forth the design parameters used to construct each holographic disc within the dual-disc holographic scanning subsystem employed in the tunnel scanning system of the second illustrative embodiment;

Figure 1A:
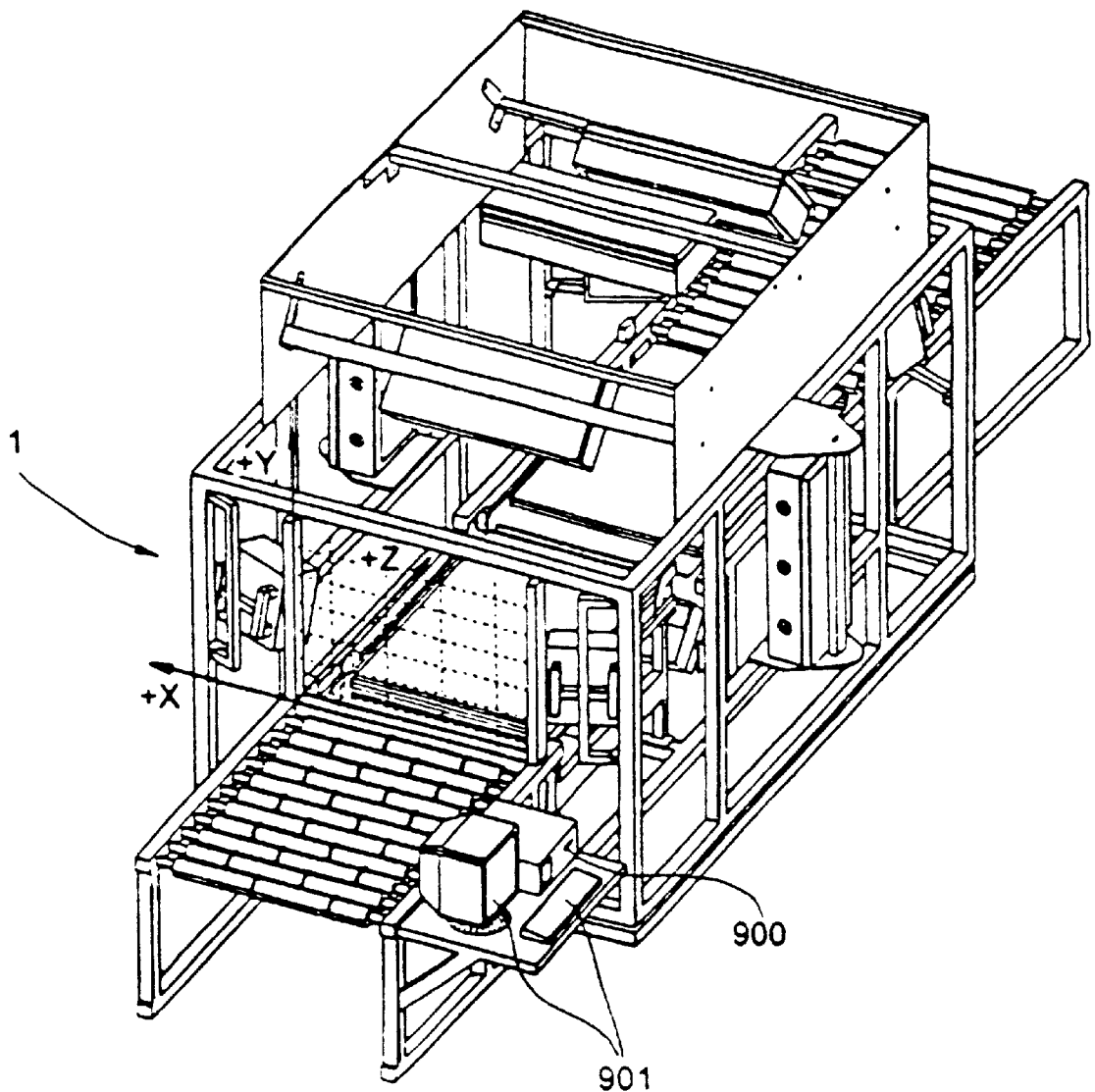
FIG. 1A is a perspective view of an automated tunnel-type laser scanning package identification and measurement (e.g. dimensioning and weighing) system constructed in accordance with the first illustrated embodiment of the present invention.
Figure 1B:
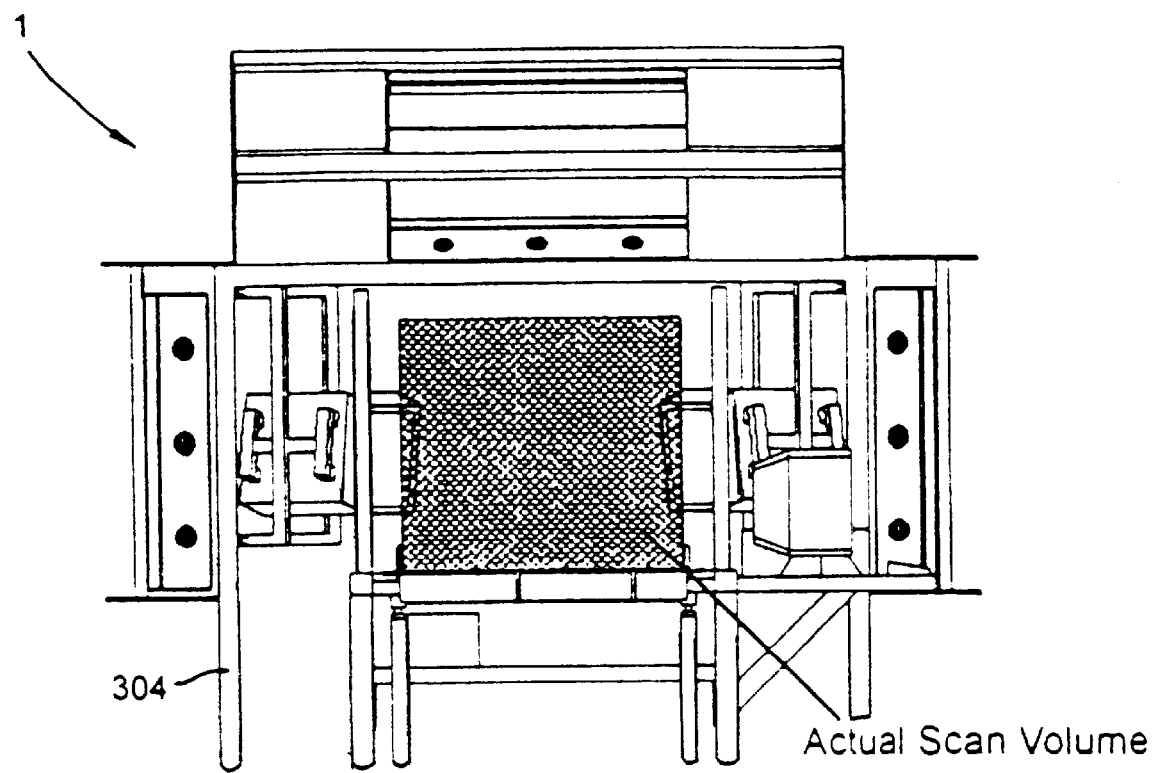
FIG. 1B is an end elevated view of the system shown in FIG. 1A.
Figure 1C:
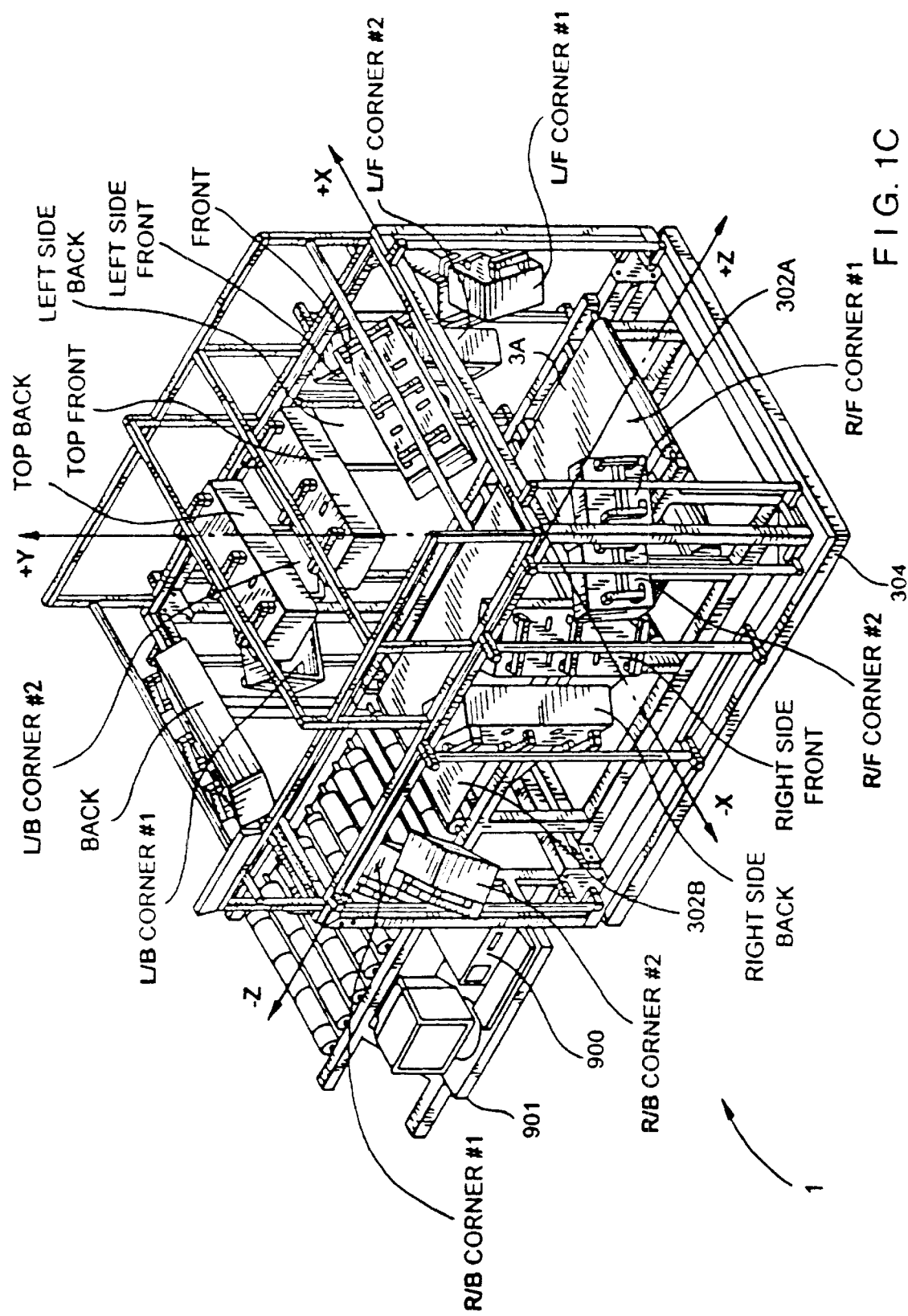
FIG. 1C is a first perspective view of the tunnel-type package identification and measurement system of the first illustrative embodiment of the present invention.
Figure 1D:
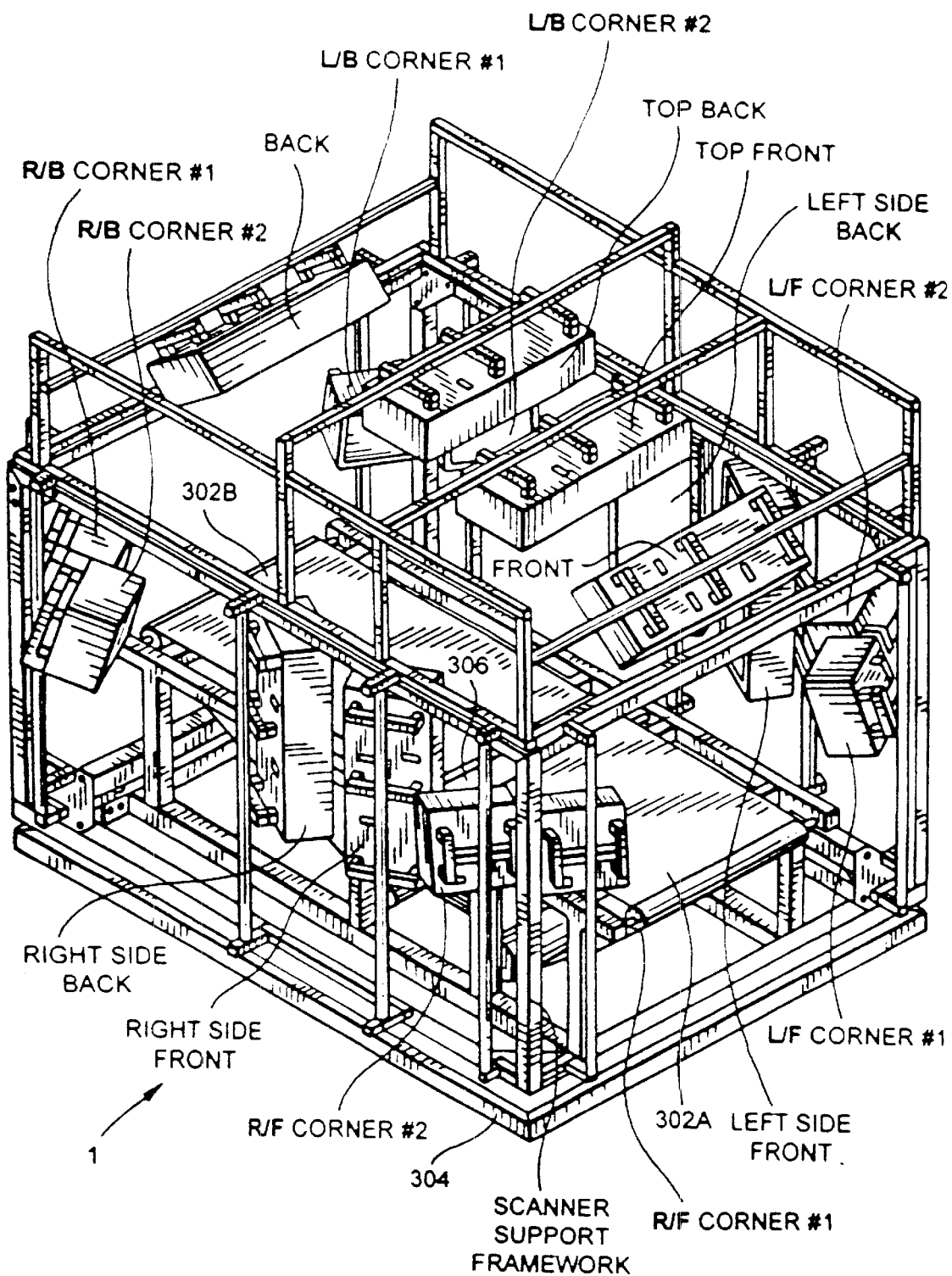
FIG. 1D is a second perspective view of the tunnel-type package identification and measurement system of FIG. 1A, shown in larger scale and with a portion of its conveyor structure removed from about the tunnel laser scanning subsystem.
Figure 1E:
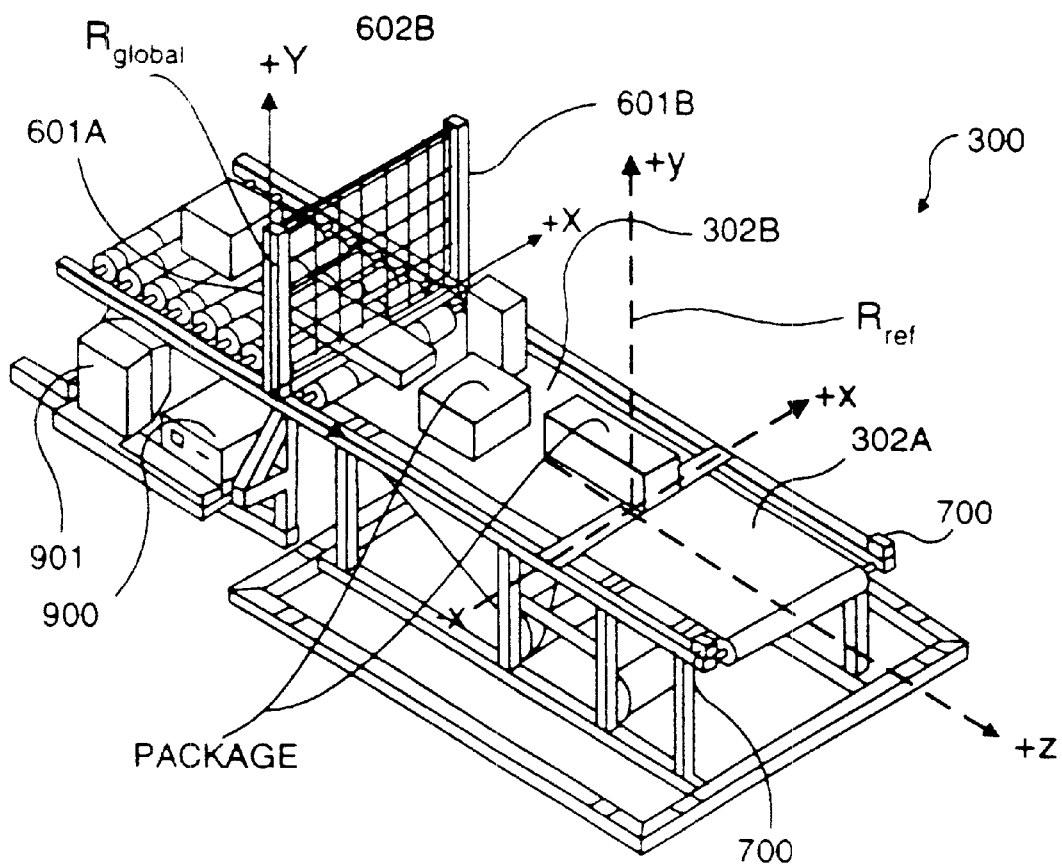
FIG. 1E is a third perspective view of the tunnel-type package identification and measurement system of the first illustrative embodiment, removed from the scanner support framework, in order to clearly show the O-ring conveyor platform for staggering packages prior to entering the 3-D scanning volume, the light curtain associated with the packaging dimensioning subsystem for determining the total volume of the package, and whether there are multiple packages entering the 3-D scanning volume, a scanner management computer system (i.e. Station) with a graphical user interface (GUI) for easily configuring the scanning subsystems within the system and monitoring the flow of packages into the scanning tunnel, and an exit sensor for detecting the exit of each scanned package within the scanning tunnel.
Figure 1F:
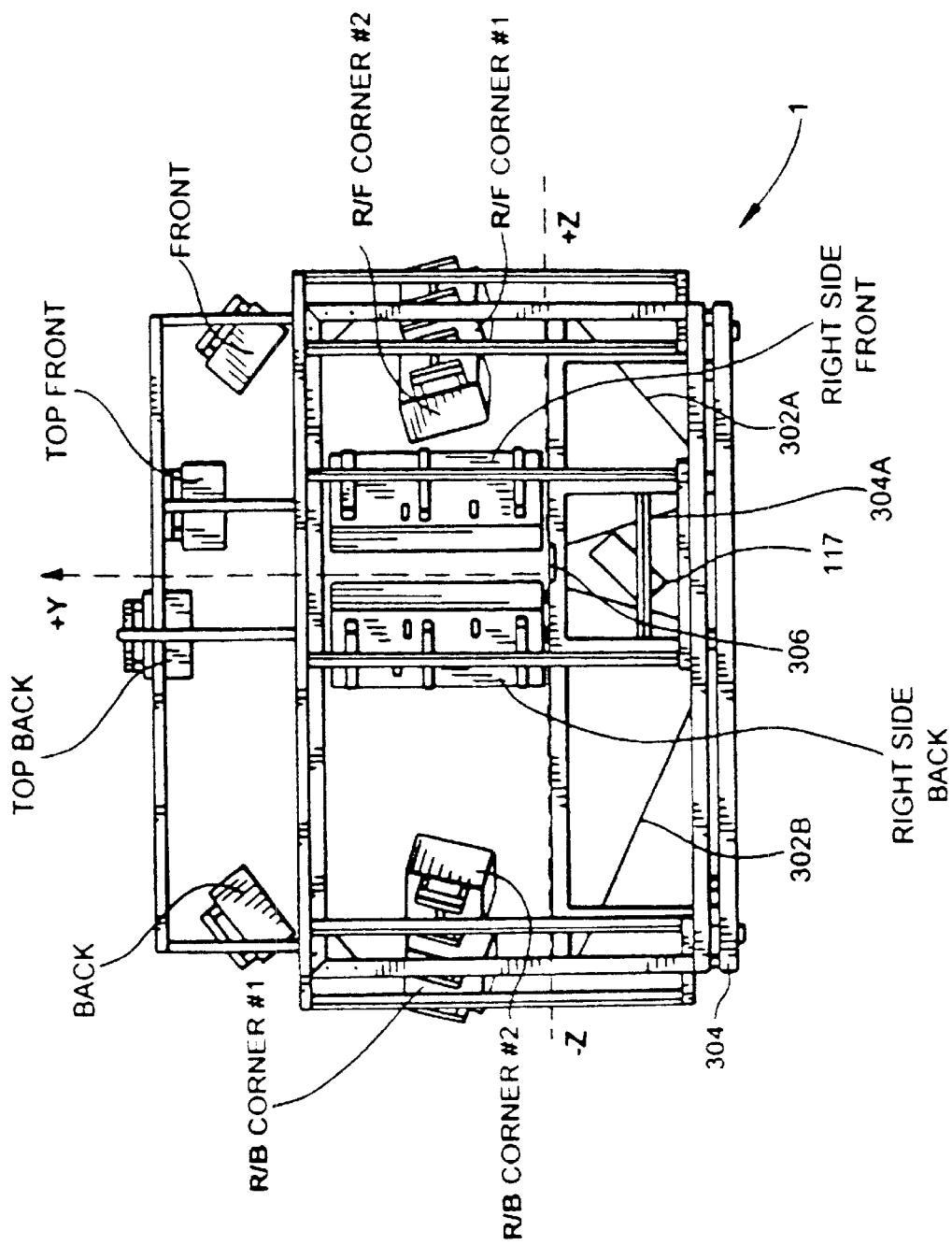
FIG. 1F is an elevated end view of the tunnel-type laser scanning system of the first illustrative embodiment of the present invention, shown in greater detail, detached from a portion of its roller-based conveyor subsystem and scanner management subsystem.
Figure 1G:
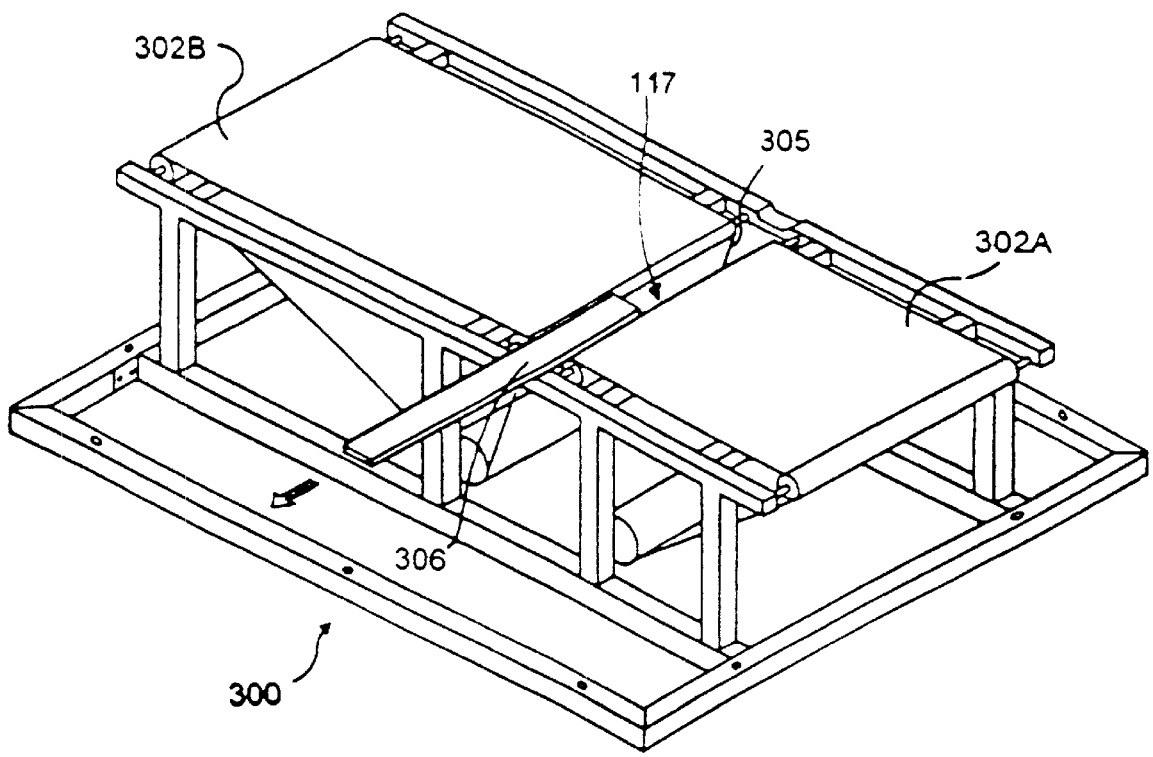
FIG. 1G is a perspective view of the split-section conveyor subsystem and its bottom-mounted laser scanning projection subsystem, and user-interface/workstation, shown detached from the scanner support framework shown in FIGS. 1A, 1B and 1C.
Figure 2A:
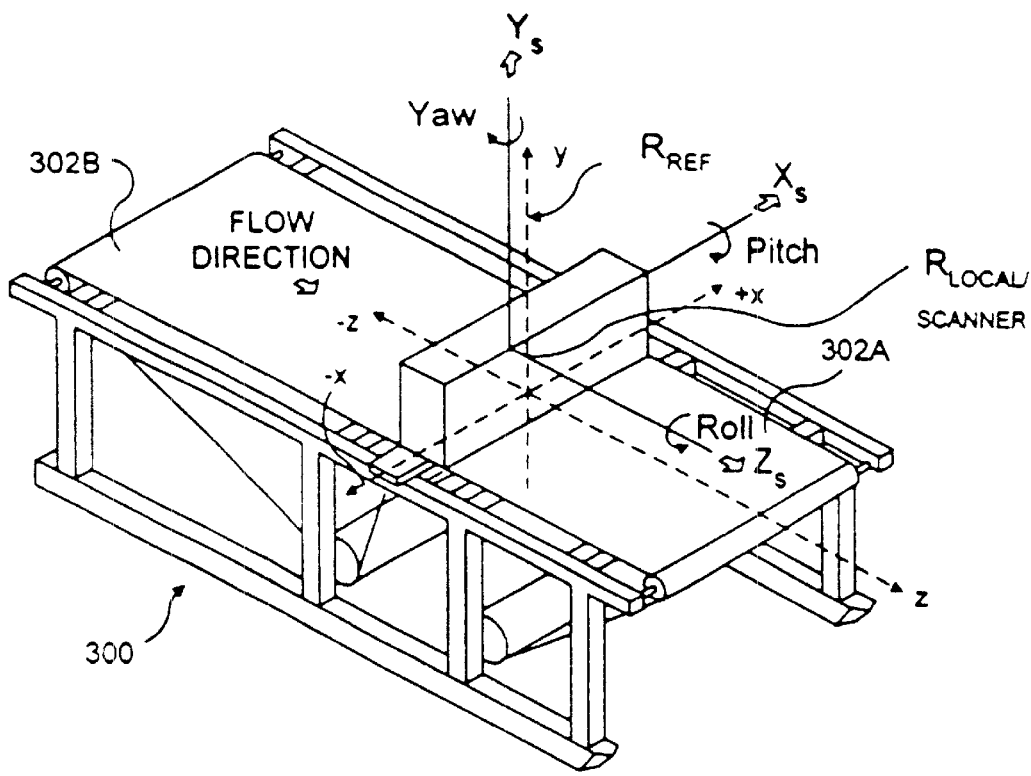
FIG. 2A is a perspective view of the split-conveyor subsystem removed from scanner support framework of the system of the first illustrative embodiment, showing a coordinate reference framework symbolically embedded within the conveyor subsystem and shown with graphical indications describing the directions of yaw, pitch and roll of each triple-scanning disc holographic scanner supported from the scanner support framework of the tunnel scanning system shown in FIGS. 1A and 1B.
Figure 2B:
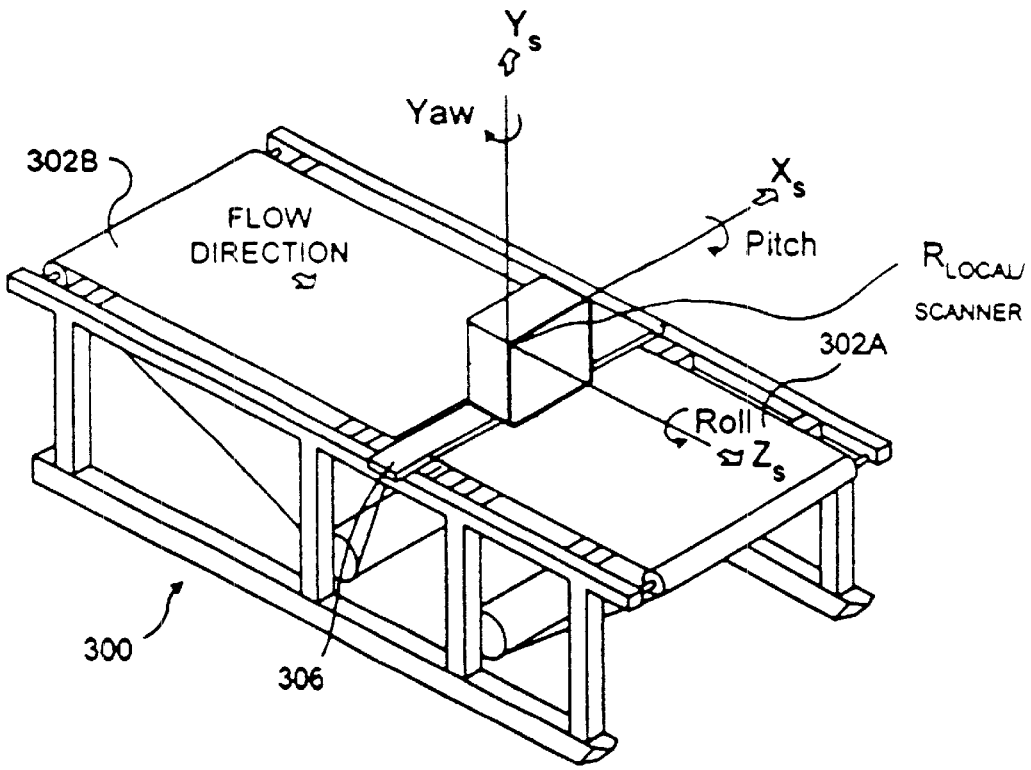
FIG. 2B is a perspective view of the split-conveyor subsystem removed from scanner support framework of the package identification and measurement system of the first illustrative embodiment, showing a coordinate reference framework symbolically embedded within the conveyor system and schematically depicted with graphical indications describing the directions of yaw, pitch and roll of each single-scanning disc holographic scanner supported from the scanner support framework of the tunnel scanning subsystem shown in FIGS. 1A and 1B.
Figure 33:
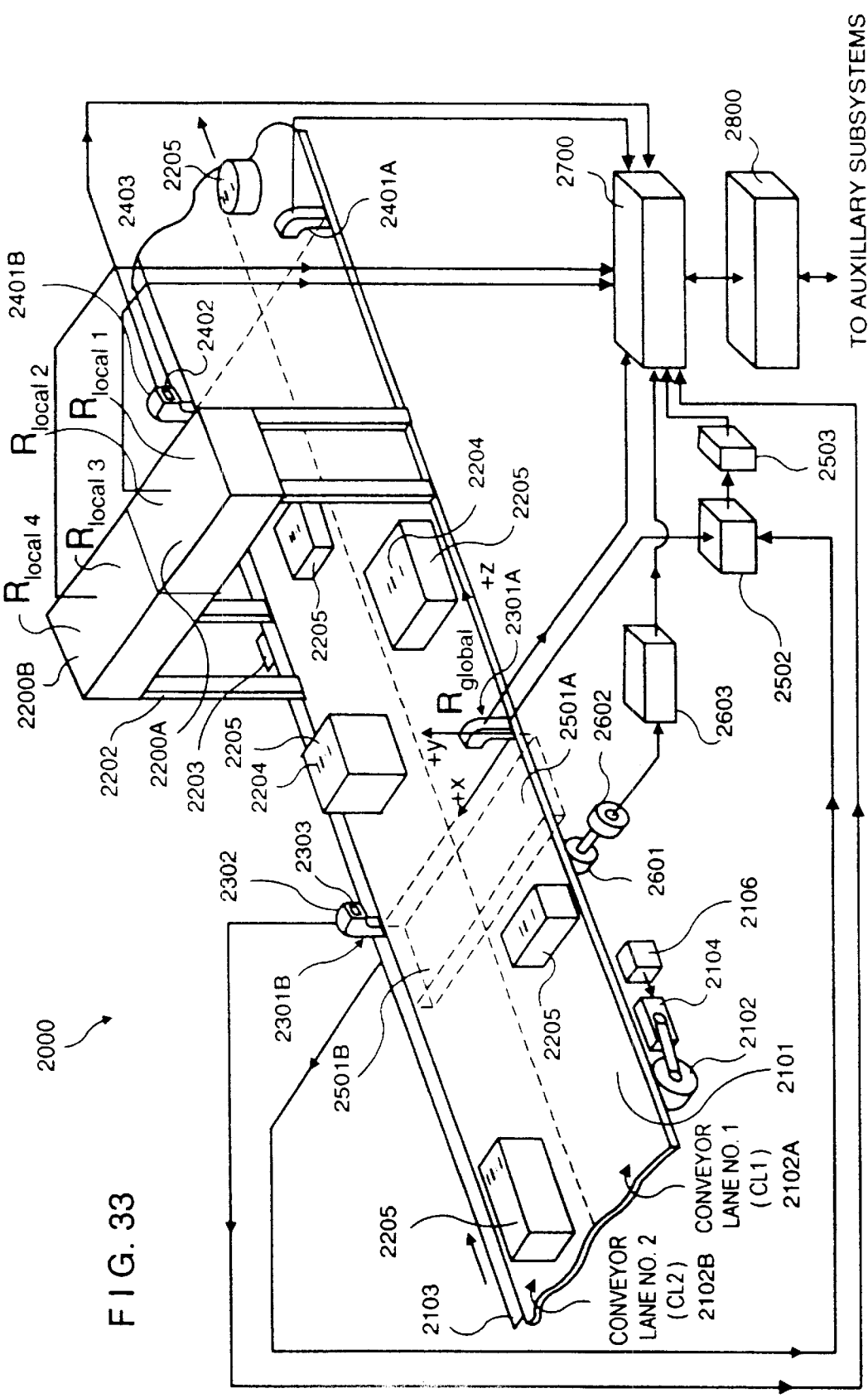
FIG. 33 is a perspective view of a "dual-lane" automated tunnel-type laser scanning package identification and weighing system constructed in accordance with the second illustrative embodiment of the present invention.
Figure 41A:
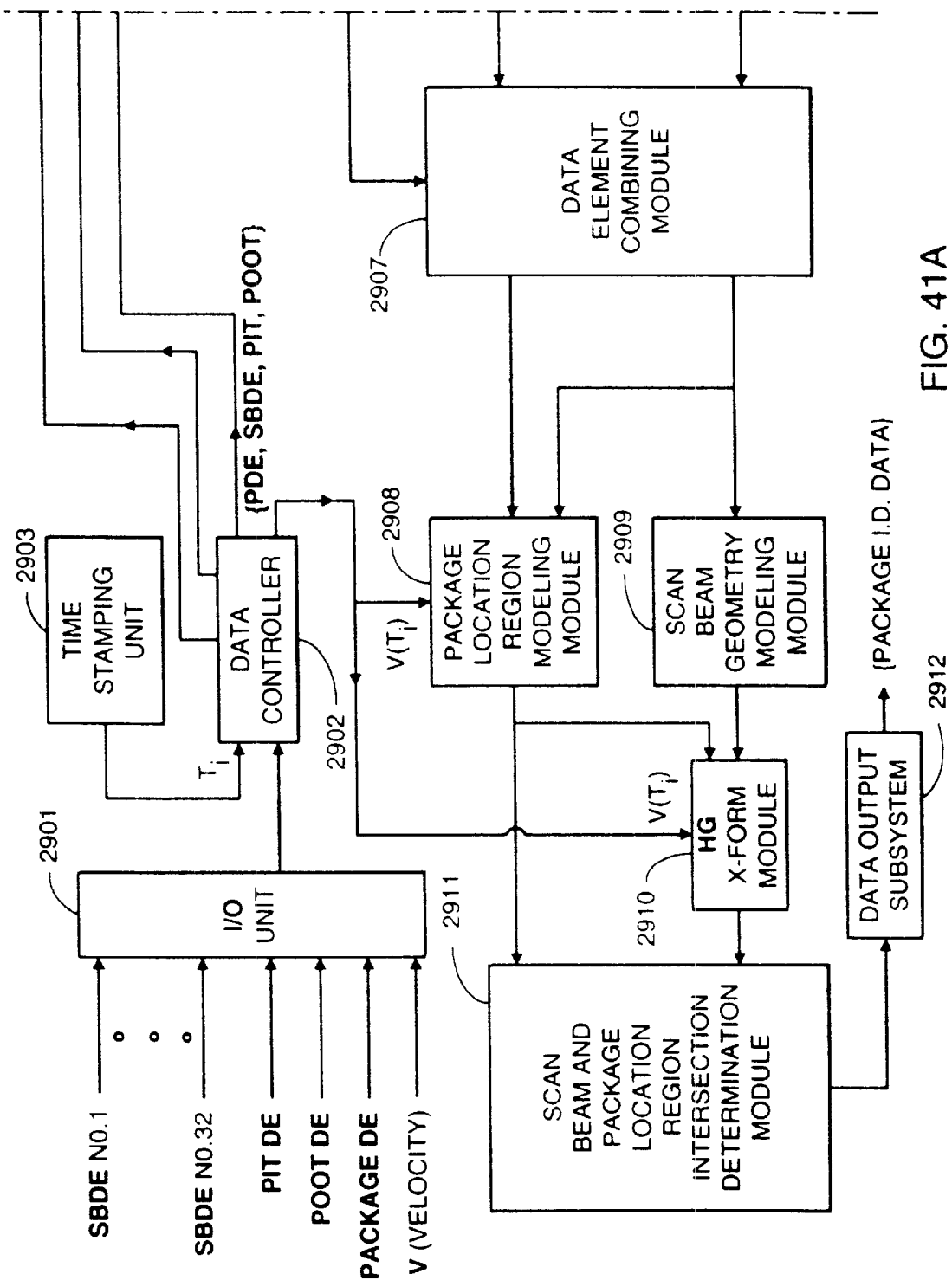
FIGS. 41A and 41B, taken together, provide a schematic representation of the data element queuing, handling and processing subsystem employed in the system of the second illustrative embodiment of the present invention, illustrated in FIG. 33.
Figure 41B:
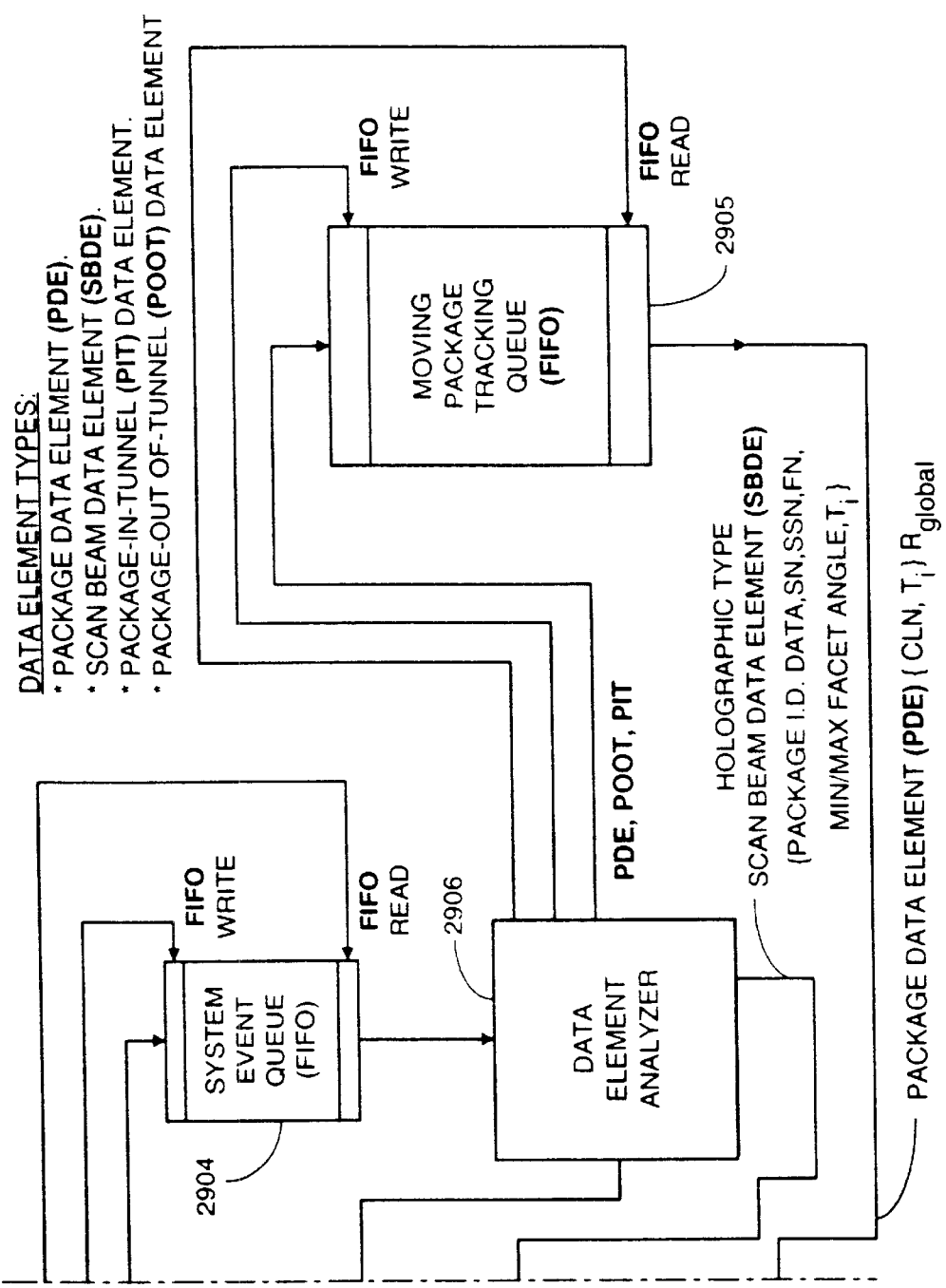
Figure 43:
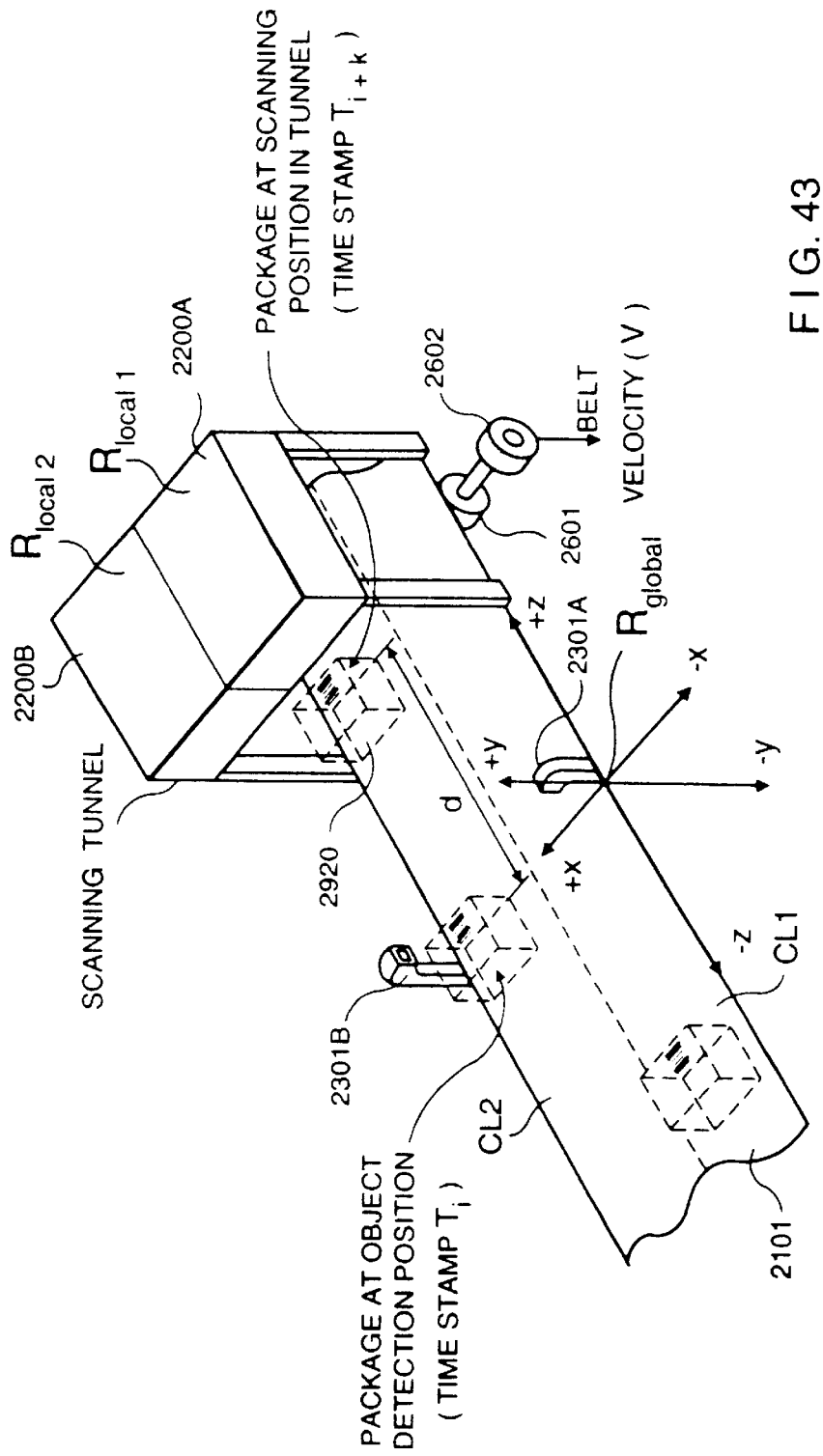
Figure 44A:
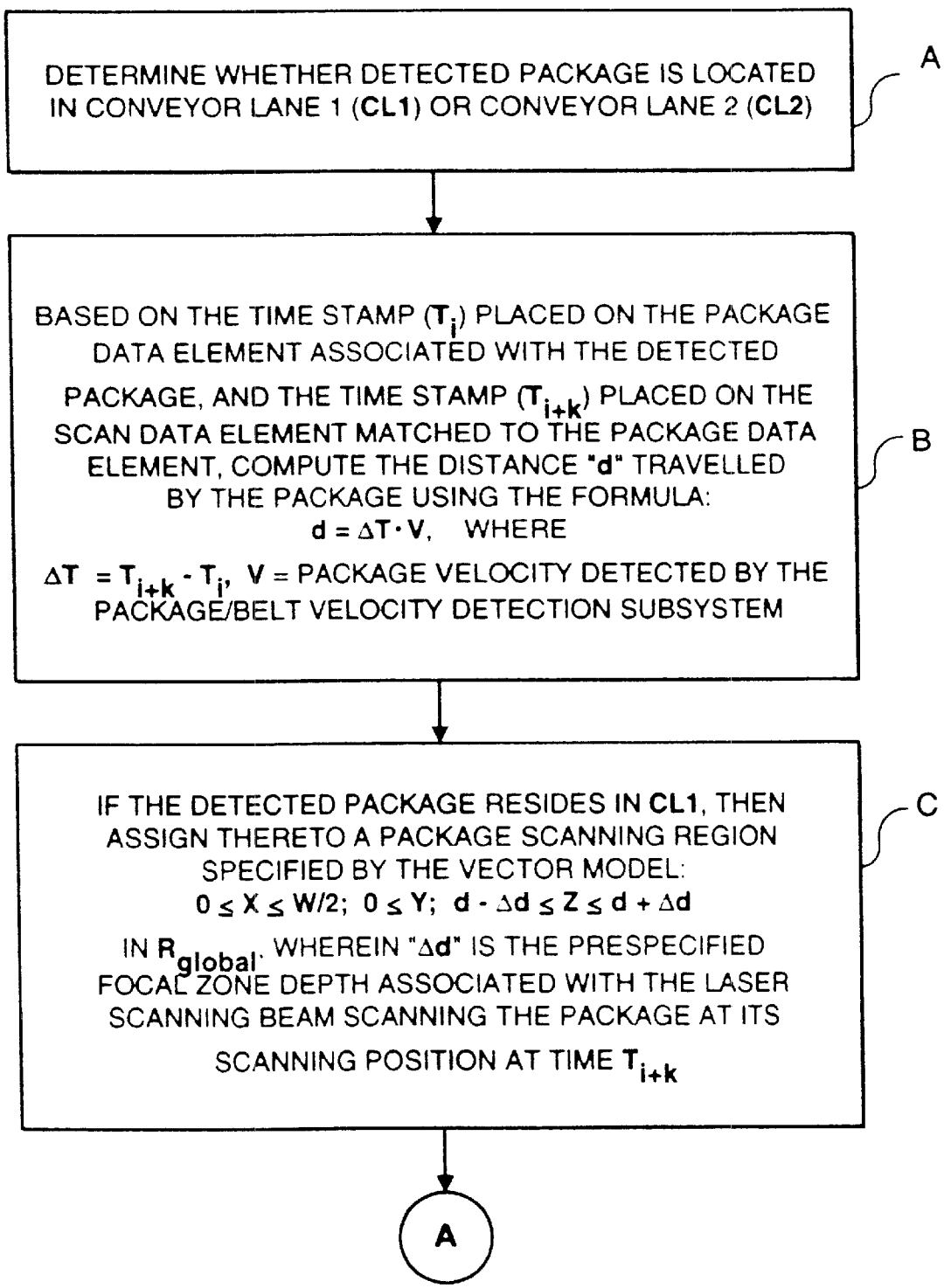
Figure 47:
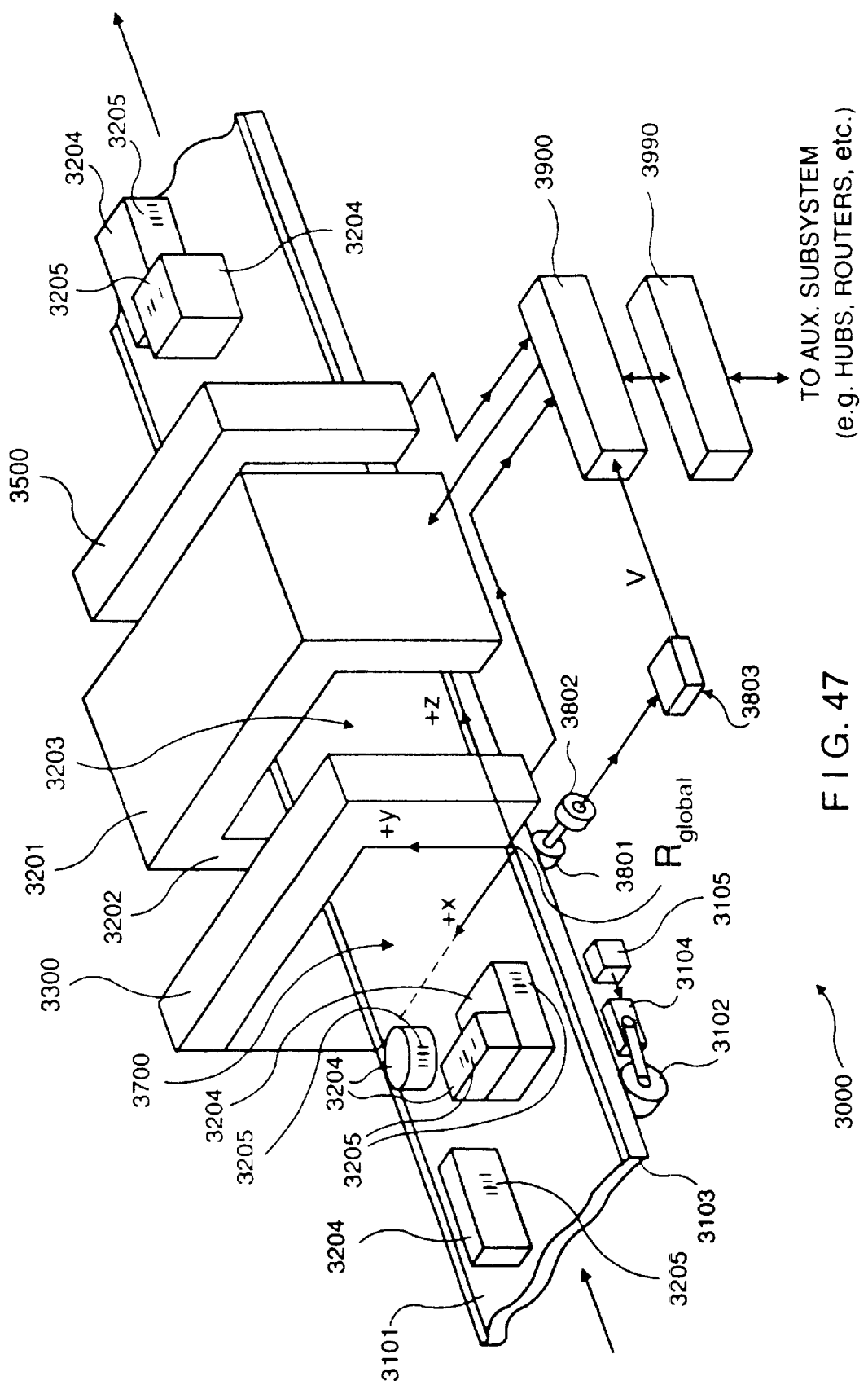
Figure 48:
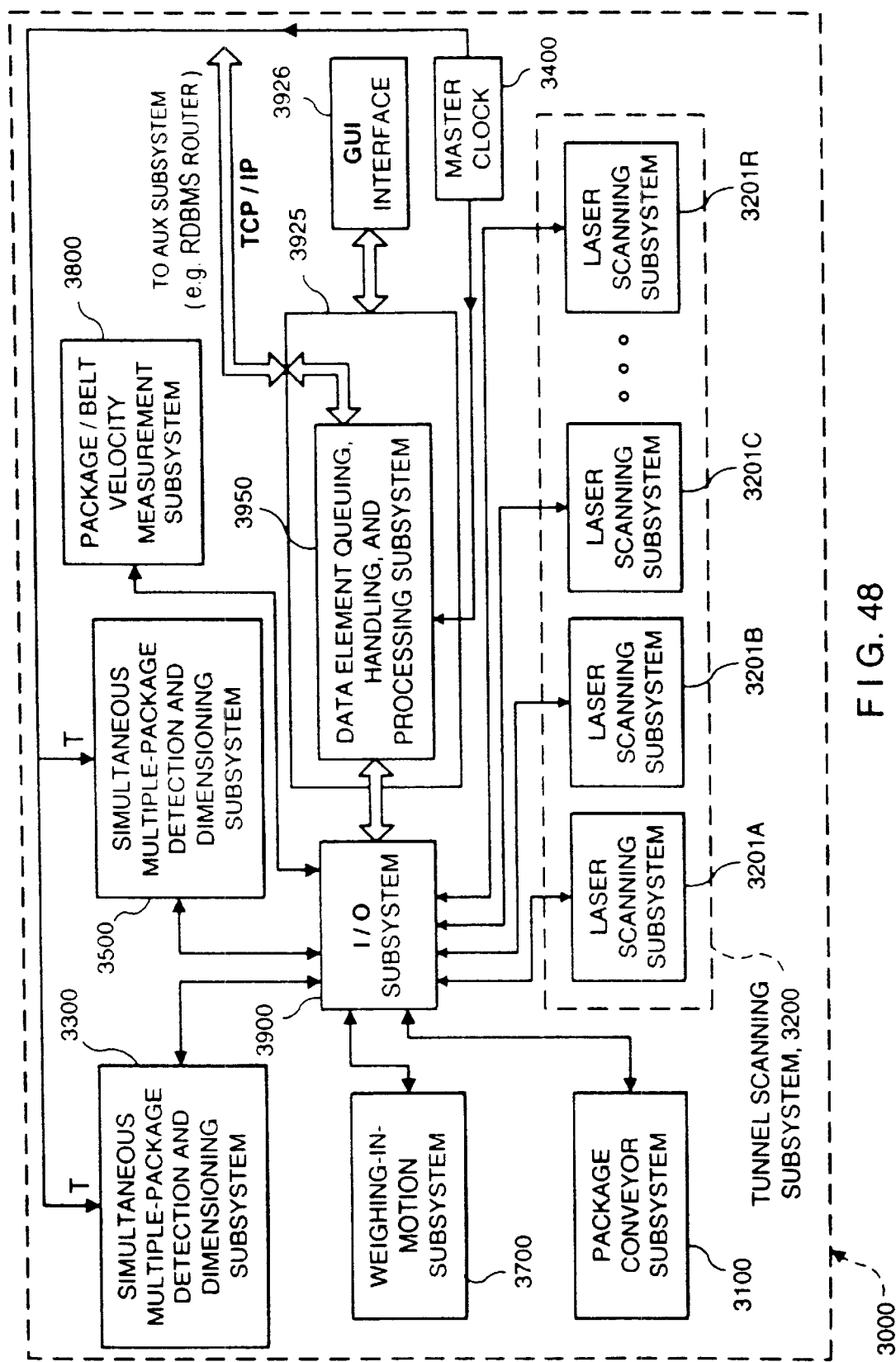
Figure 49A:
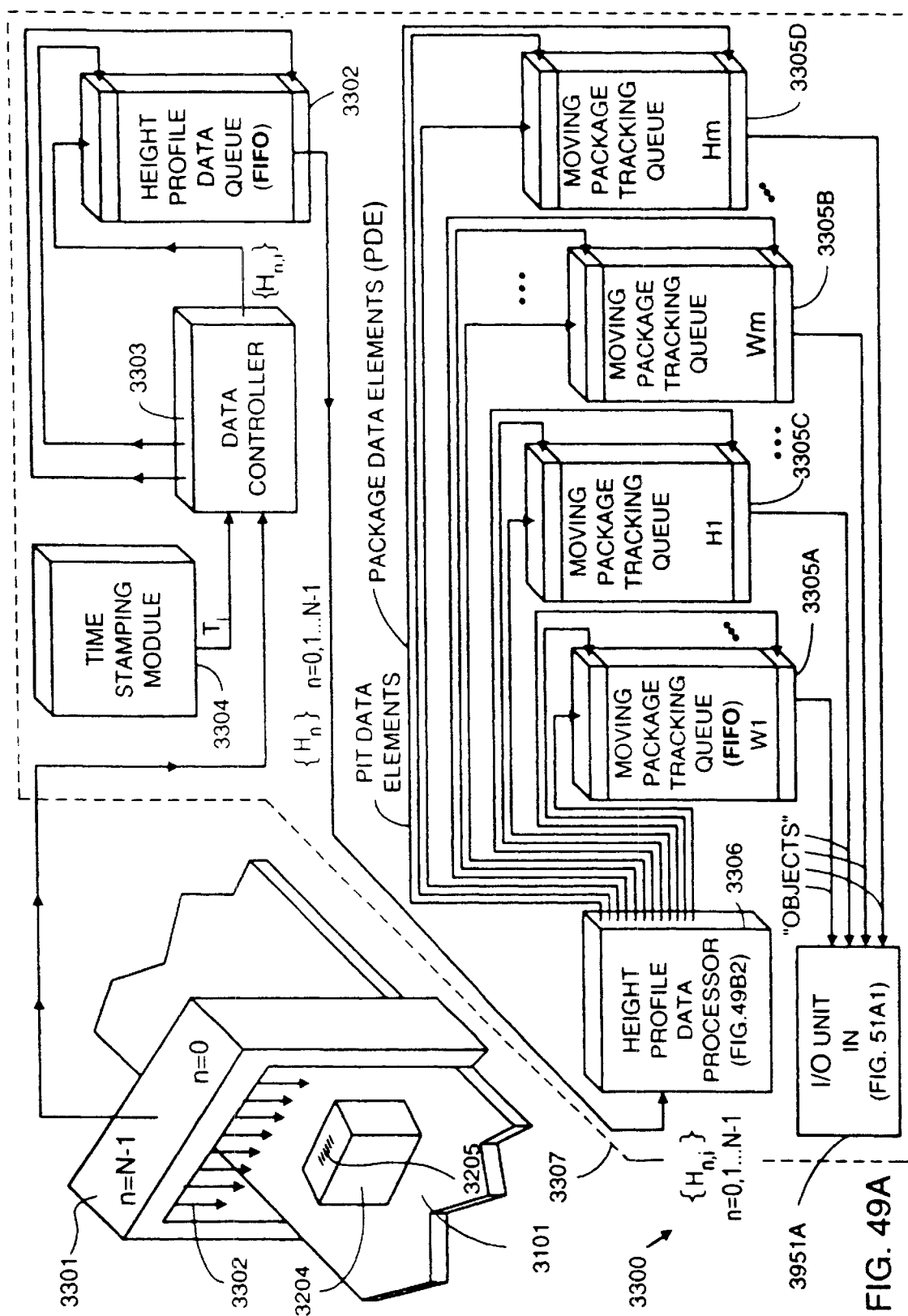
Figure 50A:
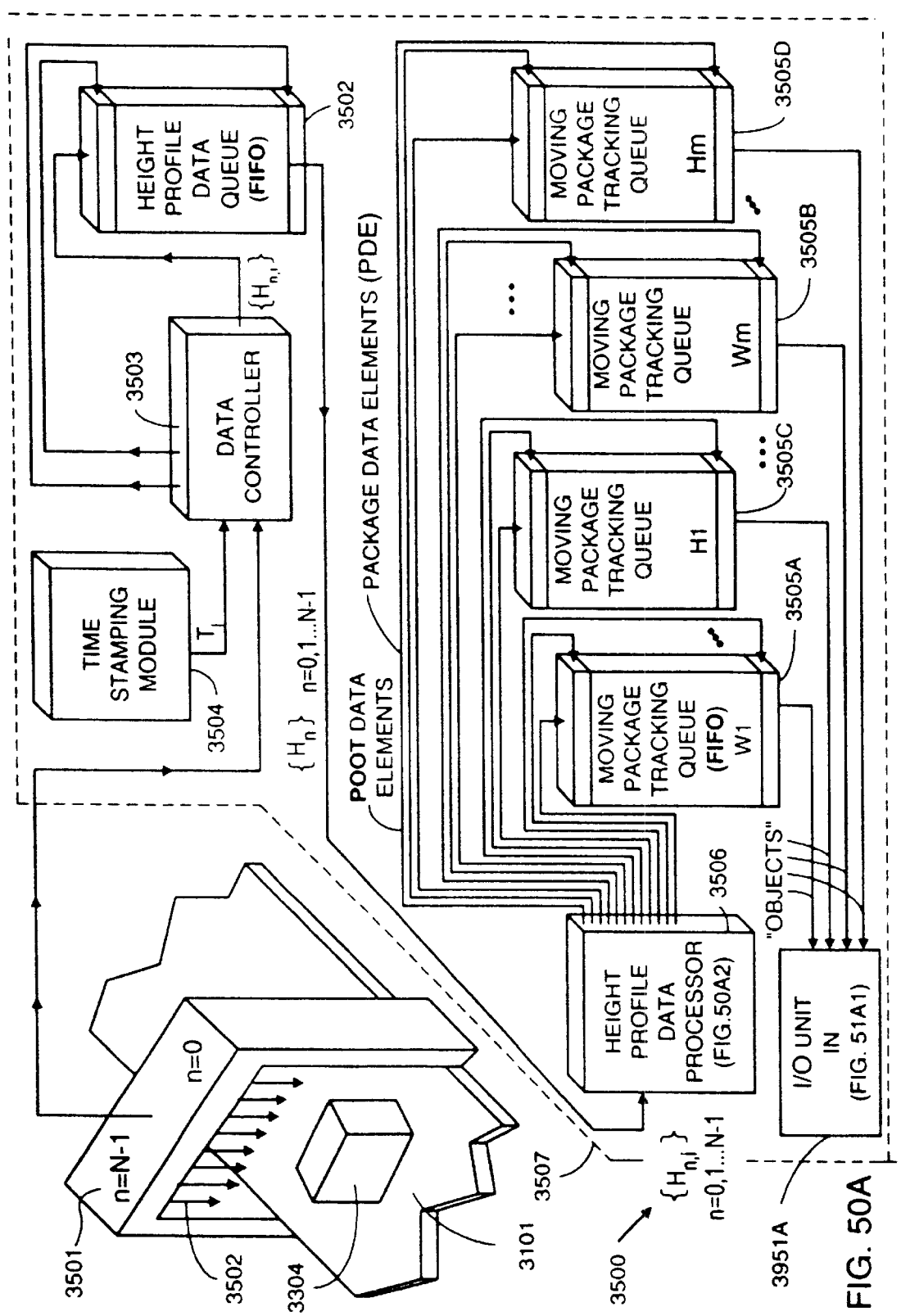
Figure 50C:
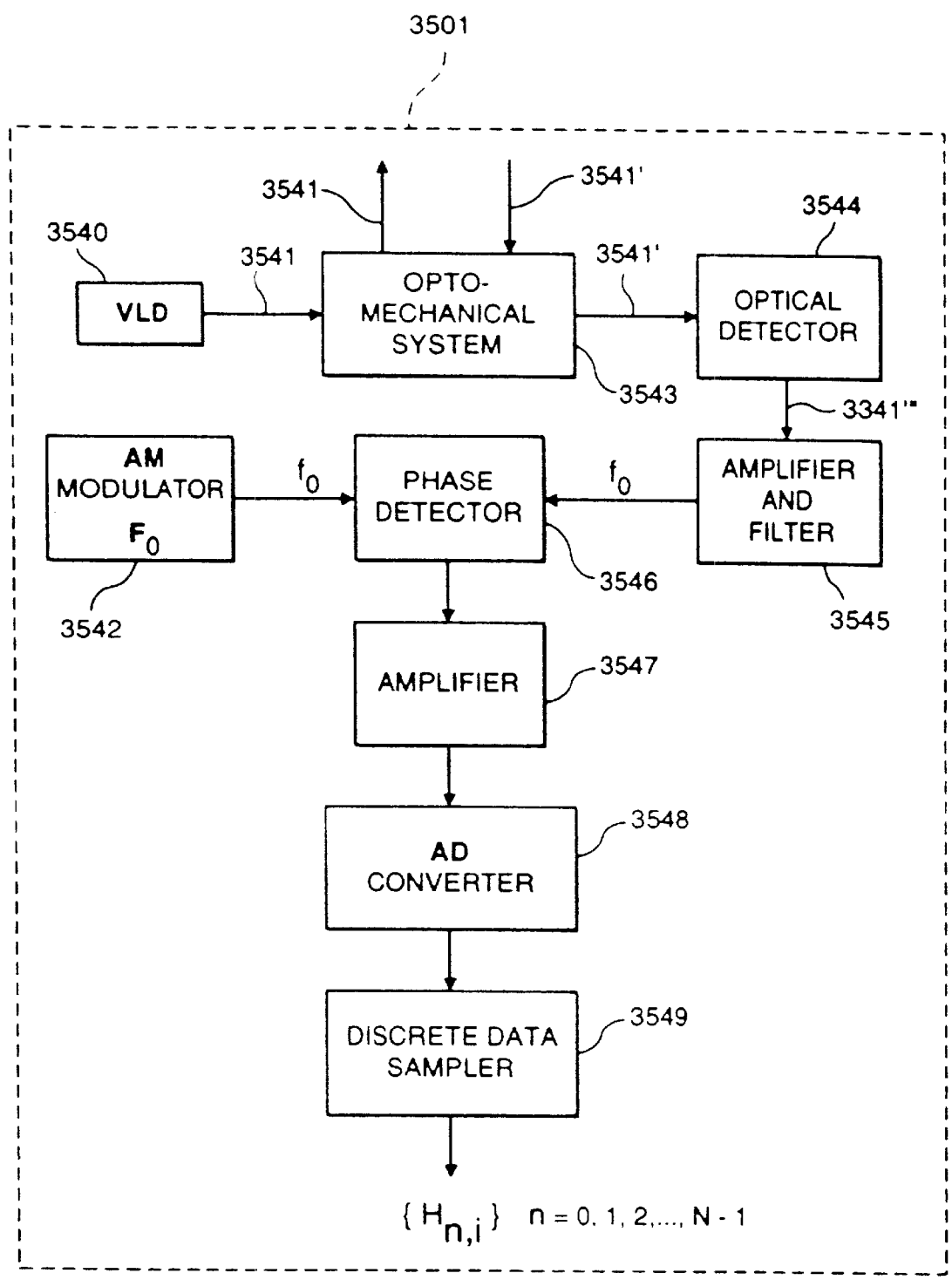
Figure 53A:
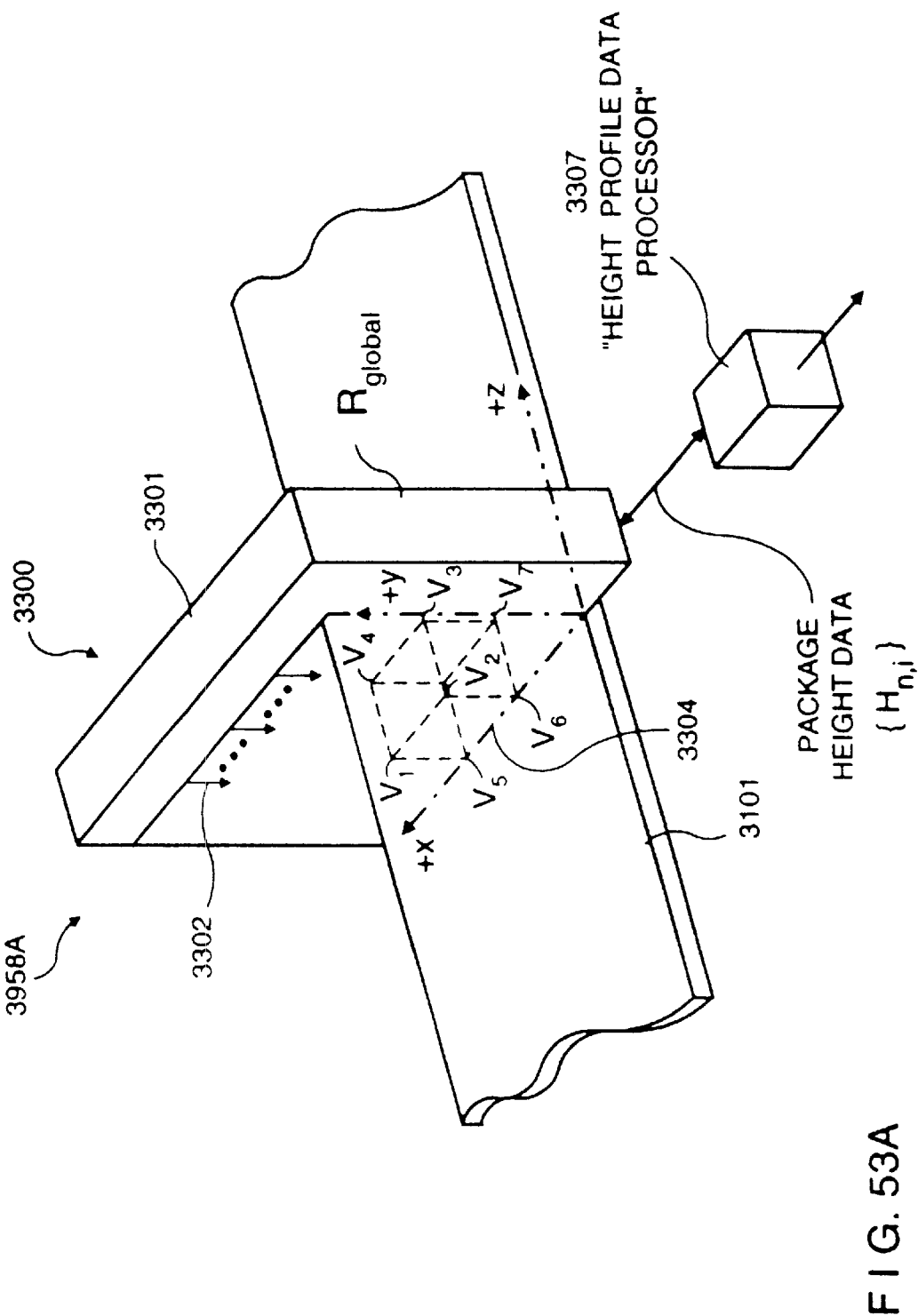
Figure 55:
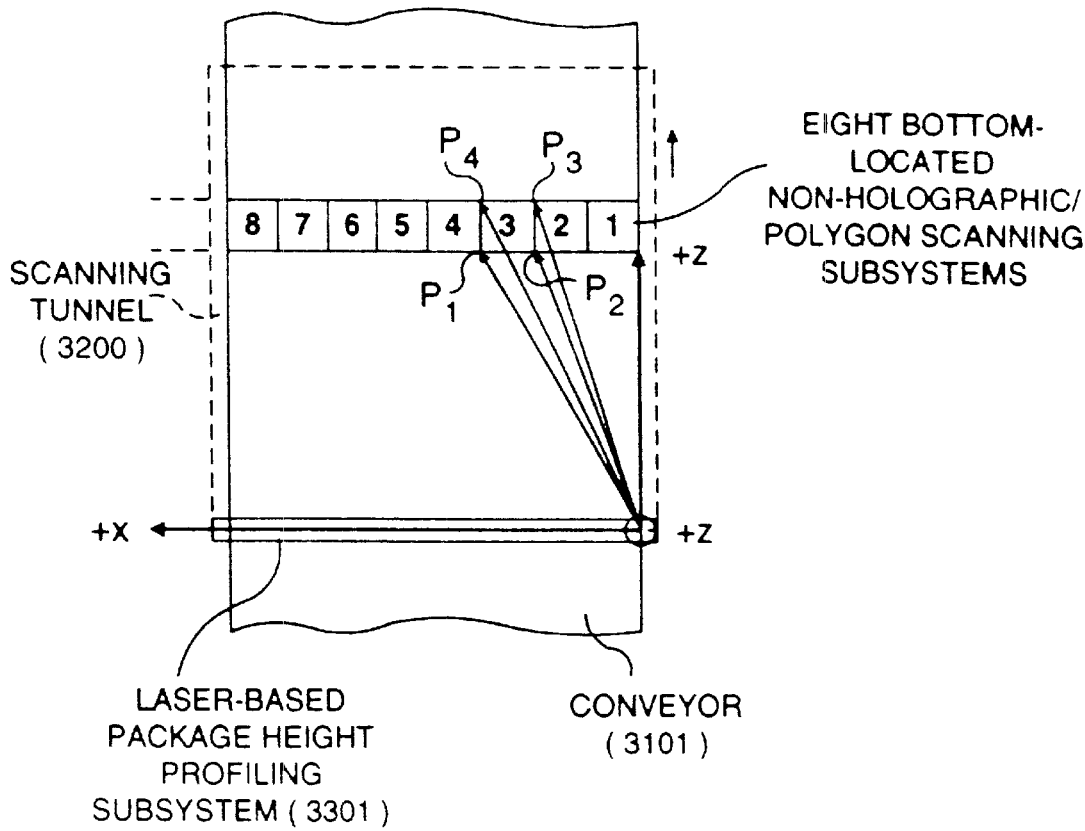
Figure 57:
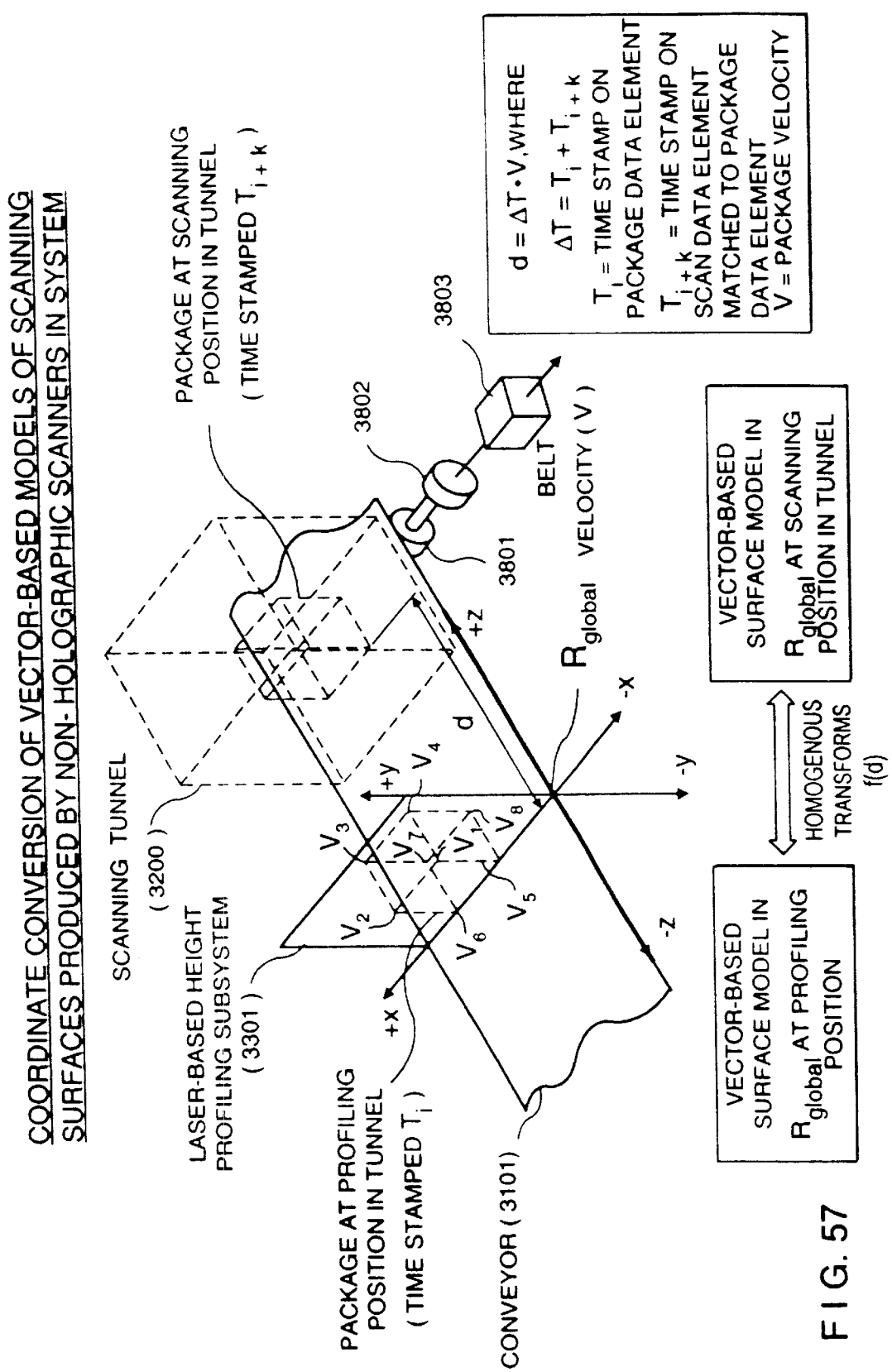
Figure 58A:
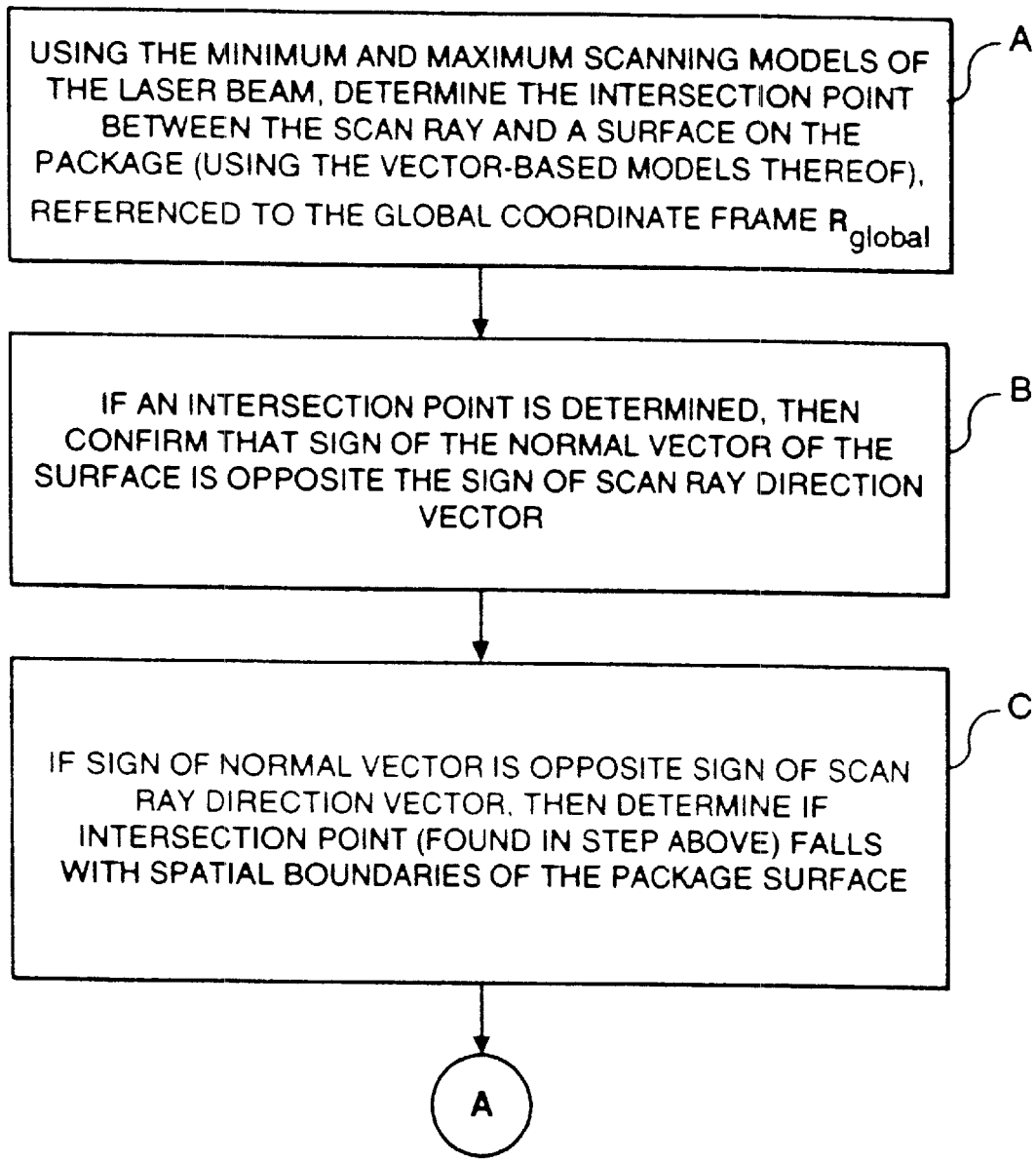
Figure 58B:
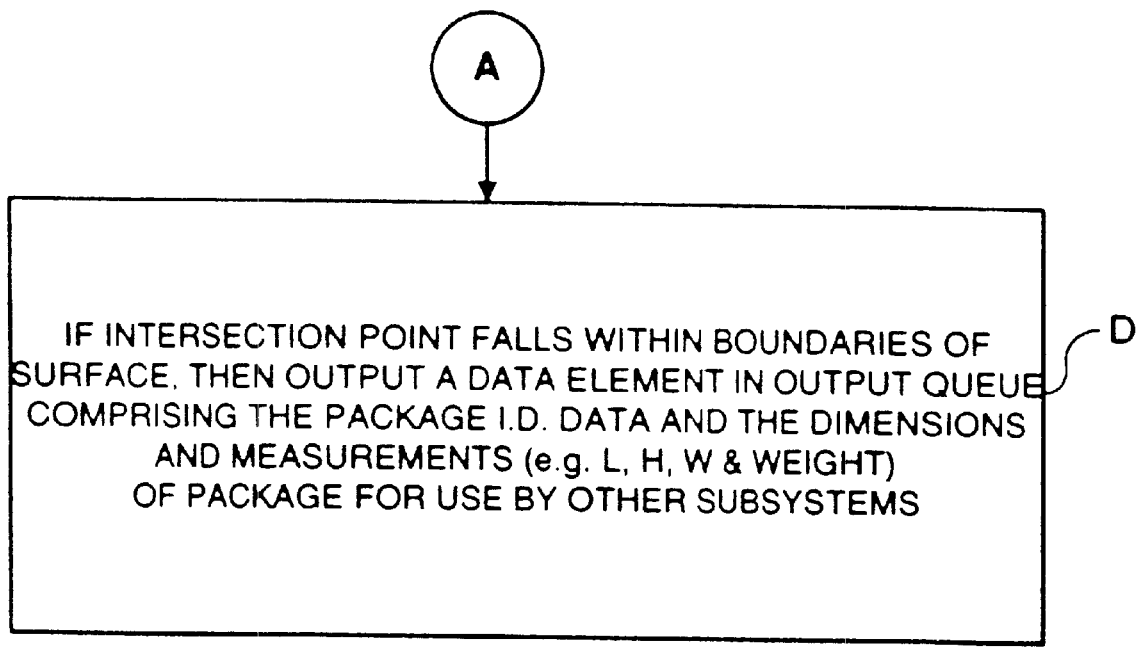
Figure 59A:
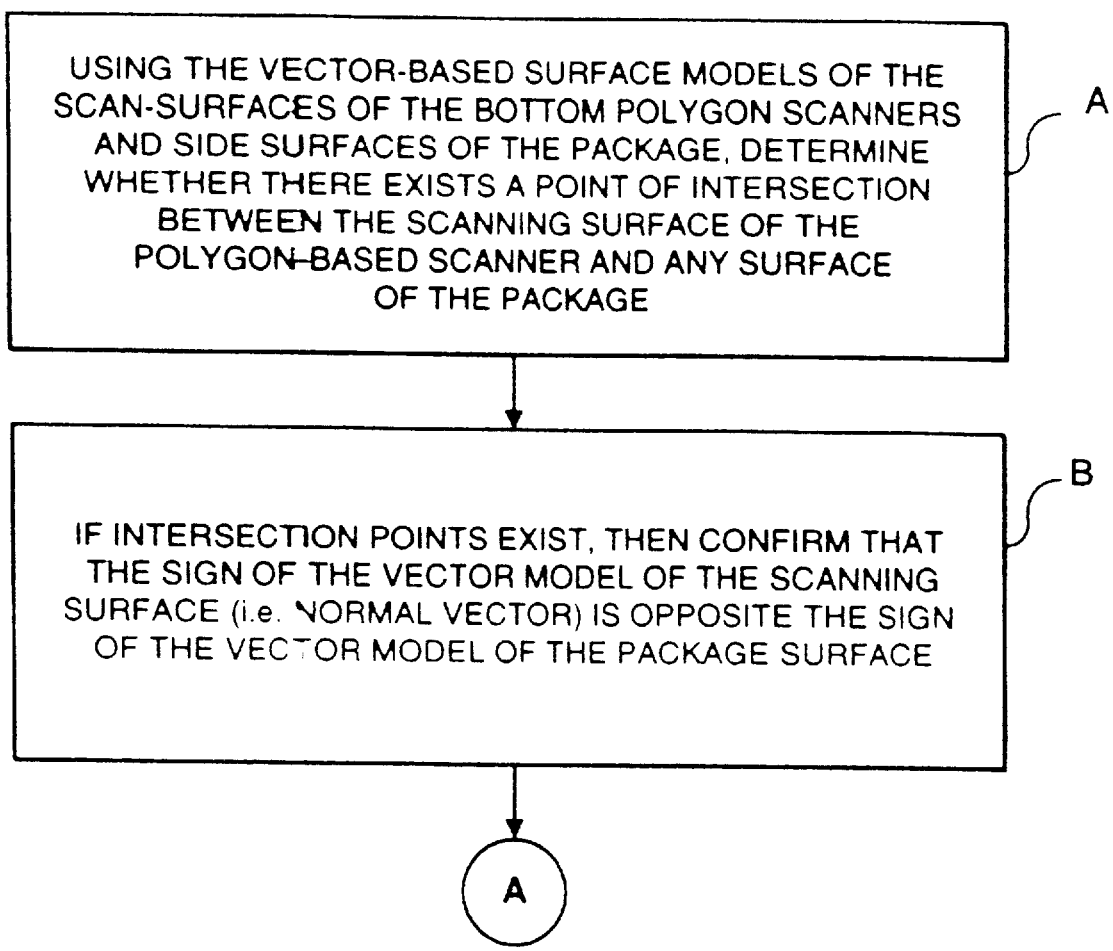
Figure 59B:
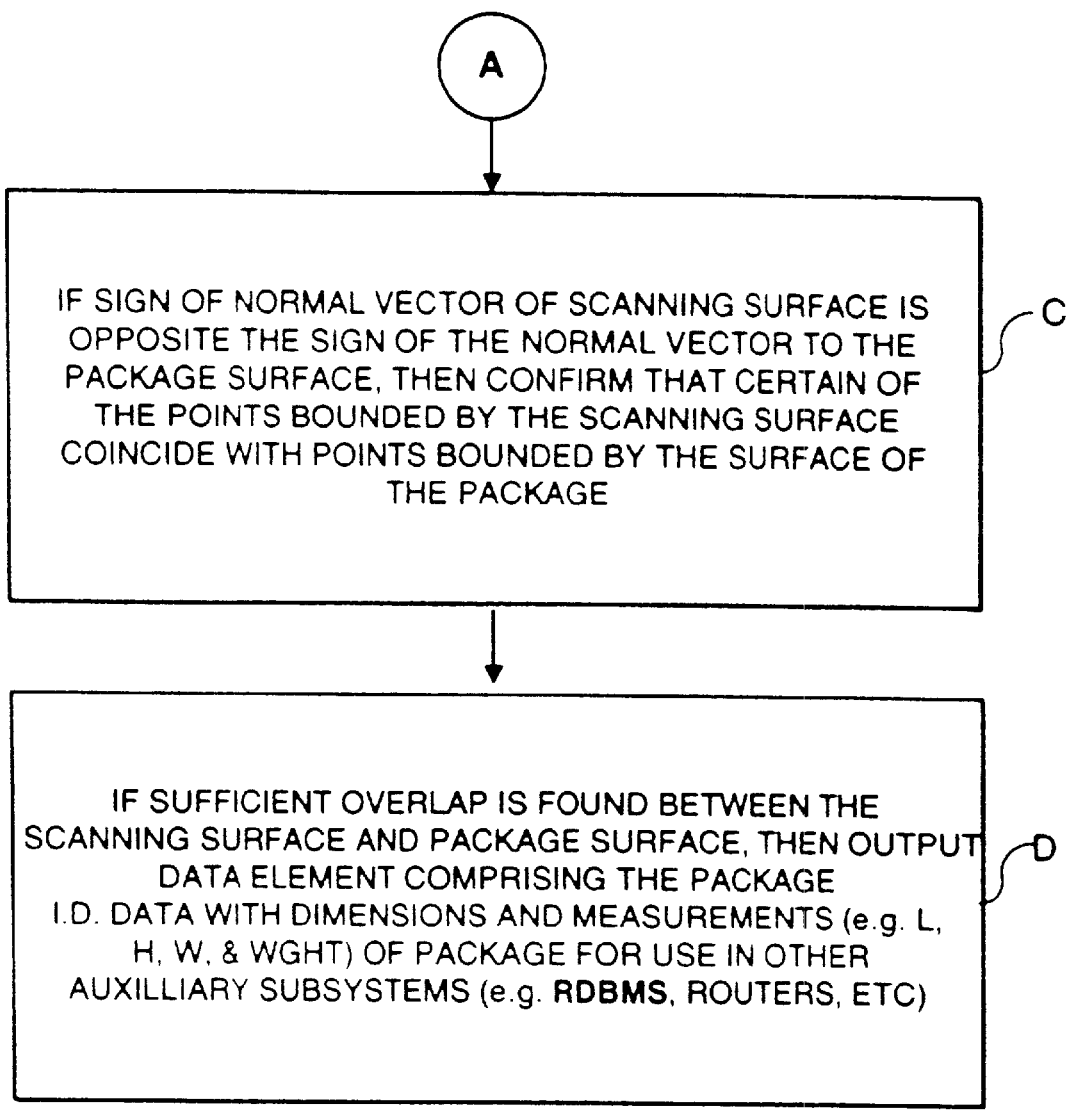
Figure 60:
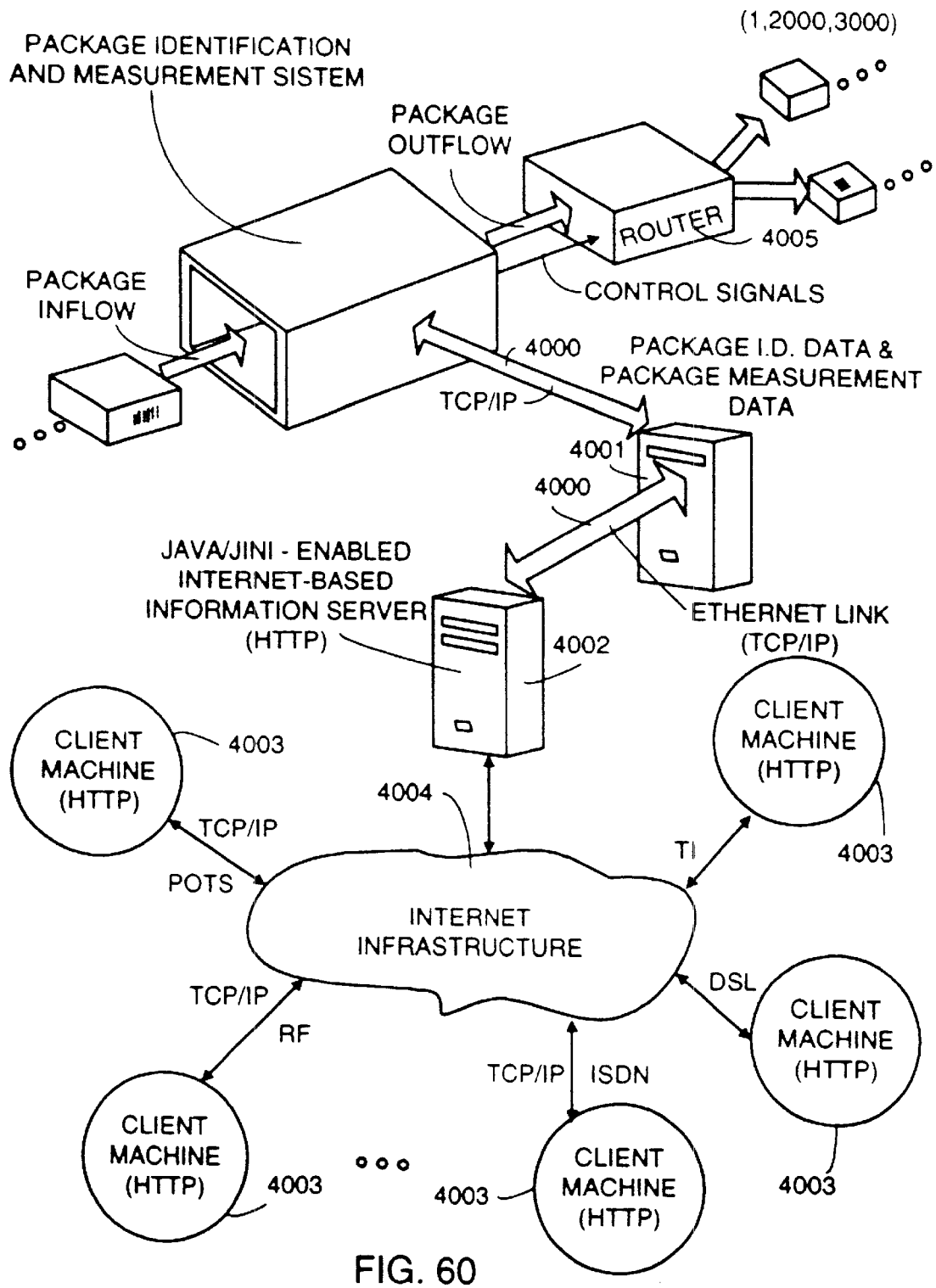

FIGS. 42A and 42B set forth a table of rules used to handle the data elements stored in the system event queue in the data element queuing, handling and processing subsystem of FIGS. 41A and 41B;

FIG. 43 is a schematic representation of the system and method used herein to create vector-based models of each package location region within the tunnel scanning system of the second illustrative embodiment;

FIGS. 44A and 44B provide a flow chart setting forth a preferred procedure for creating a vector-based model for each package location region within the tunnel scanning system of the second illustrative embodiment;

FIG. 45 is a schematic representation graphically illustrating how a vector-based scanning beam model created within a local scanner coordinate reference frame $R_{localscannerj}$ can be converted into a corresponding vector-based model created within the global scanner coordinate reference frame $R_{global}$ using homogeneous transformations of the second illustrative embodiment;

FIG. 46 is a flow chart setting forth a preferred procedure for determining whether the scan beam (rays) associated with a particular scan beam data element produced by a holographic scanning subsystem within the system of FIG. 33 intersects with the package location region associated with package scanned at the scanning position associated with the scan beam data element, and thus whether to correlate a particular package identification data element with a particular package measurement data element or like token acquired by the system;

FIG. 47 is a perspective view of an automated tunnel-type laser scanning package identification and weighing system constructed in accordance with the third illustrative embodiment of the present invention, wherein multiple packages, arranged in stacked and/or side-by-side configurations, are transported along a high speed conveyor belt, dimensioned, weighed and identified in a fully automated manner without human intervention;

FIG. 48 is schematic block diagram of the system of FIG. 47, showing the subsystem structure thereof as comprising a scanning tunnel including holographic and non-holographic laser scanning subsystems, a first simultaneous multiple-package detection and dimensioning subsystem installed on the input side of the tunnel scanning subsystem, a second simultaneous multiple-package detection and dimensioning subsystem installed on the output side of the tunnel scanning subsystem, a package/belt velocity measurement subsystem, a package weighing-in-motion subsystem, a data-element queuing, handling and processing subsystem, an input/output (I/O) subsystem, a conveyor belt subsystem, and a master clock for establishing a global time reference when time-stamping data elements generated throughout the system;

FIG. 49A is a schematic representation of the first simultaneous multiple-package detection and dimensioning subsystem installed on the input side of the tunnel scanning subsystem, showing its various constituent subcomponents;

FIGS. 49B1 and 49B2, taken together, set forth a schematic representation of the height profile data analyzer employed in the subsystem of FIG. 49A, comprising a data controller, time-stamping module, a height profile data element queue, a height profile data analyzer, and a plurality of moving package tracking queues assigned to different spatial regions above the conveyor belt of the system located on the input side of the tunnel scanning subsystem;

FIG. 49C is a schematic block diagram of the laser scanning mechanism employed in the simultaneous multiple-package detection and dimensioning subsystem shown in FIG. 49A;

FIG. 50A is a schematic representation of the second simultaneous multiple-package detection and dimensioning subsystem installed on the output side of the tunnel scanning subsystem, showing its various constituent subcomponents;

FIGS. 50B1 and 50B2, taken together, set fortgh a schematic representation of the height profile data analyzer employed in the subsystem of FIG. 50A, comprising a data controller, time-stamping module, a height profile data element queue, a height profile data analyzer, and a plurality of moving package tracking queues assigned to different spatial regions above the conveyor belt of the system located on the output side of the tunnel scanning subsystem;

FIG. 50C is a schematic block diagram of the laser scanning mechanism employed in the second simultaneous multiple-package detection and dimensioning subsystem shown in FIG. 50A;

FIGS. 51A1, 51A2 and 51B, taken together, provide a schematic representation of the data element queuing, handling and processing subsystem of the present invention shown in FIGS. 47 and 48;

FIGS. 52A and 52B set forth a table of rules used to handle the data elements stored in the scan beam data element (SBDE) queue in the data element queuing, handling and processing subsystem of FIGS. 51A1, 51A2 and 51B;

FIG. 53A is a schematic representation of the surface geometry model created for each package surface by the package surface geometry modeling subsystem (i.e. module) deployed within the data element queuing, handling and processing subsystem of FIGS. 51A1 through 51B, illustrating and showing how each surface of each package transported through package dimensioning/measuring subsystem is mathematically represented (i.e. modeled) using at least three position vectors (referenced to x=0, y=0, z=0) in the global reference frame $R_{global}$, and a normal vector drawn to the package surface indicating the direction of incident light reflection therefrom;

FIG. 53B is a table setting forth a preferred procedure for creating a vector-based surface model for each surface of each package transported through the package detection and dimensioning subsystem of the system hereof;

FIG. 54 is a table setting forth a preferred procedure for creating a vector-based ray model for laser scanning beams which have been produced by a holographic laser scanning subsystem of the system hereof, that may have collected the scan data associated with a decoded bar code symbol read thereby within the tunnel scanning subsystem;

FIG. 55 is a schematic representation of the vector-based 2-D surface geometry model created for each candidate scan beam by the scan surface modeling subsystem (i.e. module) shown in FIGS. 51A1 through 51B, and showing how each omnidirectional scan pattern produced from a particular polygon-based bottom scanning unit is mathematically represented (i.e. modeled) using four position vectors (referenced to x=0, y=0, z=0) in the global reference frame $R_{global}$ and a normal vector drawn to the scanning surface indicating the direction of laser scanning rays projected therefrom during scanning operations;

FIG. 56 is a schematic representation graphically illustrating how a vector-based model created within a local scanner coordinate reference frame $R_{localscannerj}$ can be converted into a corresponding vector-based model created within the global scanner coordinate reference frame $R_{global}$ using homogeneous transformations;

FIG. 57 is a schematic representation graphically illustrating how a vector-based package surface model created within the global coordinate reference frame $R_{global}$ at the "package height/width profiling position" can be converted into a corresponding vector-based package surface model created within the global scanner coordinate reference frame $R_{global}$ at the "scanning position" within the tunnel using homogeneous transformations, and how the package travel distance (d) between the package height/width profiling and scanning positions is computed using the package velocity (v) and the difference in time indicated by the time stamps placed on the package data element and scan beam data element matched thereto during each scan beam/package surface intersection determination carried out within the data element queuing, handling and processing subsystem of FIGS. 51A1 through 51B;

FIGS. 58A and 58B, taken together, provide a procedure for determining whether the scan beam (rays) associated with a particular scan beam data element produced by a holographic scanning subsystem intersects with any surface on the package that has been scanned at a particular scanning position, and thus whether to correlate a particular package identification data element with particular package measurement data element acquired by the system;

FIGS. 59A and 59B, taken together, provide a procedure for determining whether the scanning surface associated with a particular scan beam data element produced by a non-holographic (e.g. polygon-based) bottom-located scanning subsystem intersects with any surface on the package that has been scanned at a particular scanning position, and thus whether to correlate a particular package identification data element with particular package measurement data element acquired by the system;

FIG. 60 is a schematic representation of an automatic package identification and measurement system of the present invention shown interfaced to a relational database management system (RDBMS) and an Internet information server which are connected to a local information network that is interconnected to the Internet, for the purpose of enabling customers and other authorized personnel to use a WWW-enabled browser program to (1)remotely access (from an Internet server) information about any packages transported through the system, as well as diagnostics regarding the system, and (2) remotely control the various subcomponents of the system in order to reprogram its subsystems, perform service routines, performance checks and the like, as well as carry out other forms of maintenance required to keep the system running optimally, while minimizing downtime or disruption in system operations.

DETAILED DESCRIPTION OF THE ILLUSTRATIVE EMBODIMENTS OF THE PRESENT INVENTION

Referring to the figures in the accompanying Drawings, the preferred embodiments of the automated package identification and measurement system of the present invention will be described in great detail, wherein like elements will be indicated using like reference numerals.

Automated Tunnel-type Laser Scanning Package Identification and Measurement System of the First Illustrative Embodiment of the Present Invention In FIG. 1A, there is shown an automated tunnel-type laser scanning package identification and measuring (e.g. dimensioning and weighing) system designed to meet the needs of demanding customers, such as the United States Postal Service (USPS), which requires "hands-free" bar code (or code symbol) scanning of at least six-sided packages, wherein the label containing the code symbol to be read could be positioned in any orientation on any one of the six or more sides of the box or container structure. As used hereinafter, the term "hands-free" shall mean scanning of bar codes on boxes or parcels that are travelling past the scanners in only one direction on some sort of conveyor system. In this illustrative embodiment, the package should be singulated in a conventional manner.

Figure 4:
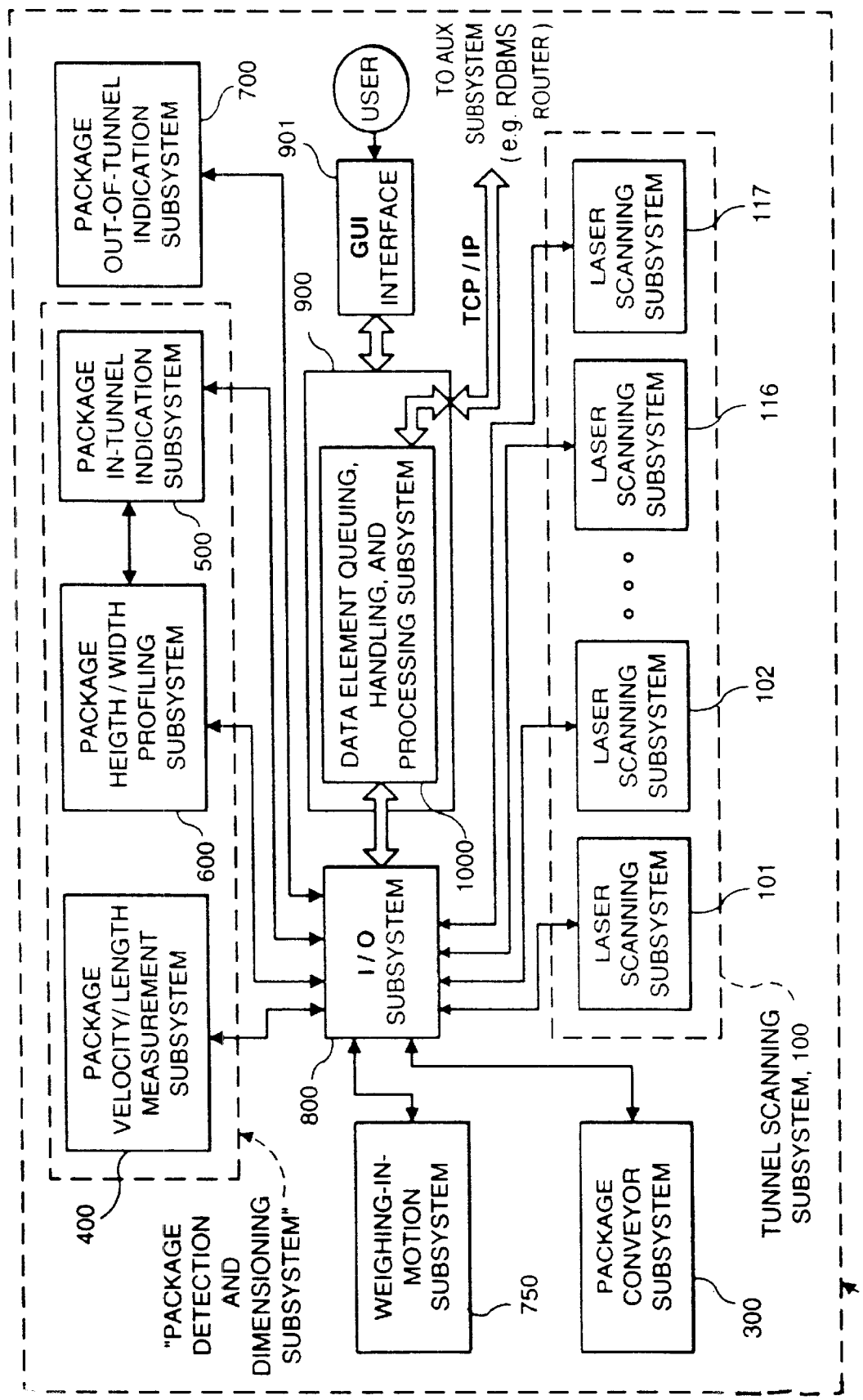

As shown in FIG. 4, the automated tunnel scanning system of the first illustrative embodiment indicated by reference numeral 1 comprises an integration of subsystems, namely: a high-speed package conveyor system 300 having a conveyor belt 302 comprising at least two separated sections 302A and 302B (as illustrated in FIGS. 1C through 1G), with each section having a width of at least 30 inches to support one or more package transport lanes along the conveyor belt; a tunnel scanning subsystem 100 including an arrangement of holographic and non-holographic laser scanning bar code symbol reading subsystems 101 through 117 supported overhead and below the conveyor belt by a support frame 304 (as illustrated in FIGS. 1C through 1e) so as to produce a truly 3-D omnidirectional scanning volume above the conveyor belt, for scanning bar codes on packages transported therethrough independent of the package or bar code orientation; a package velocity and length measurement subsystem 400; a package-in-the-tunnel indication subsystem 500 realized as a 2-D light sensing structure mounted along the conveyor belt, on the input side of the tunnel, for automatically detecting the presence of each package moving into the scanning tunnel; a package (x-y) dimensioning subsystem 600, employing the 2-D light sensing structure of subsystem 500, for producing x-y profile data of detected packages; a package-out-of-the-tunnel indication subsystem 700 realized as an infrared (IR) light sensing object-detecting device mounted along the conveyor belt, on the output side of the tunnel, for automatically detecting the presence of packages moving out of the scanning tunnel; a weighing-in-motion subsystem 750 for weighing packages as they are transported along the conveyor belt; an input/output subsystem 800 for managing the inputs to and output from the system of FIG. 1A; and a data management computer 900 with a graphical user interface (GUI) 901, for realizing a data element queuing, handling and processing subsystem 1000, as well as other data and system management functions.

Laser Scanning Tunnel Subsystem of First Illustrative Embodiment of the Present Invention As shown in FIGS. 1A through 1G, the tunnel scanning system of the first illustrative embodiment 1 comprises an arrangement of laser scanning subsystems (i.e. scanners) which, by virtue of their placement, relative to the conveyor belt subsystem 300, essentially form a "tunnel" scanning subsystem over and about the conveyor belt of the conveyor subsystem 300. In the field of package sortation of any sort, whether it be mail, luggage (as in an airport terminal) or other items or boxes, this type of code symbol scanning system is known as a "tunnel scanning system" by those skilled in the art.

The tunnel scanning system of the first illustrative embodiment, shown in great detail in FIGS. 1A through 9B, has been designed and constructed to meet a specific set of customer-defined scanning parameters. For example, the bar code label could be on any one side of a box having six sides. The bar code label could be in any orientation. Furthermore, the object bearing the bar code label to be read would be moving past the scanners of the conveyor belt travelling at speeds in excess of 400 feet per second. In the illustrative embodiment, the conveyor belts 302A and 302B are moving at 520 feet per second but may move faster in other embodiments. The types of codes to be read to include such codes as Code 39, Code 128 and others. The aspect ratio of the bar codes to be read is on the order of 10 mils and greater.

The tunnel scanning system of the present invention can be used in various types of applications, such as for example, where the bar codes are read to determine (a) identification of incoming packages, (b) identification of outgoing packages, and (c) sortation of outgoing packages. For sortation types of applications, the information derived from the bar code will be used not only to identify the package, but also to direct the package along a particular path using deflectors, routers and other instruments well known in the package and parcel handling art.

In the illustrative embodiment, the volume to be scanned within the tunneling subsystem (e.g. its 3-D scanning volume) is approximately: 1 meter wide (i.e. the width of the conveyor belt); ten feet long; and 1 meter tall (i.e. the height of the tallest possible box going through). The laser scanning pattern produced by the concerted operation of the holographic laser scanning subsystems identified in the drawings, and described above, fills this entire 3-D scanning volume with over 400,000 scan lines per second. The 3-D scanning volume of the tunnel scanning system, measured with respect to the surface of the conveyor belt, begins at the surface of the conveyor belt in order to scan flat items (such as envelopes), and extends up approximately 1 meter ("h") above the surface of the conveyor belt subsystem.

As shown in FIGS. 1A through 1D, sixteen holographic laser scanning subsystems 101 through 116 are mounted on a lightweight scanner support framework 304, at positions specified in Tunnel Scanner Positioning Data Table shown in FIG. 2C. The terms (e.g. "Top/Front", Top/Back", etc.) used in this Table to identify the individual holographic scanning subsystems of the tunnel scanning system hereof are used throughout the drawings, rather than reference numerals. The one fixed-projection scanner subsystem, identified by the label "Bottom" or 117, is mounted between the gap 305 provided between the first and second conveyor platforms 302A and 302B comprising the conveyor subsystem 300 of the tunnel scanning subsystem 100.

Figure 5A:
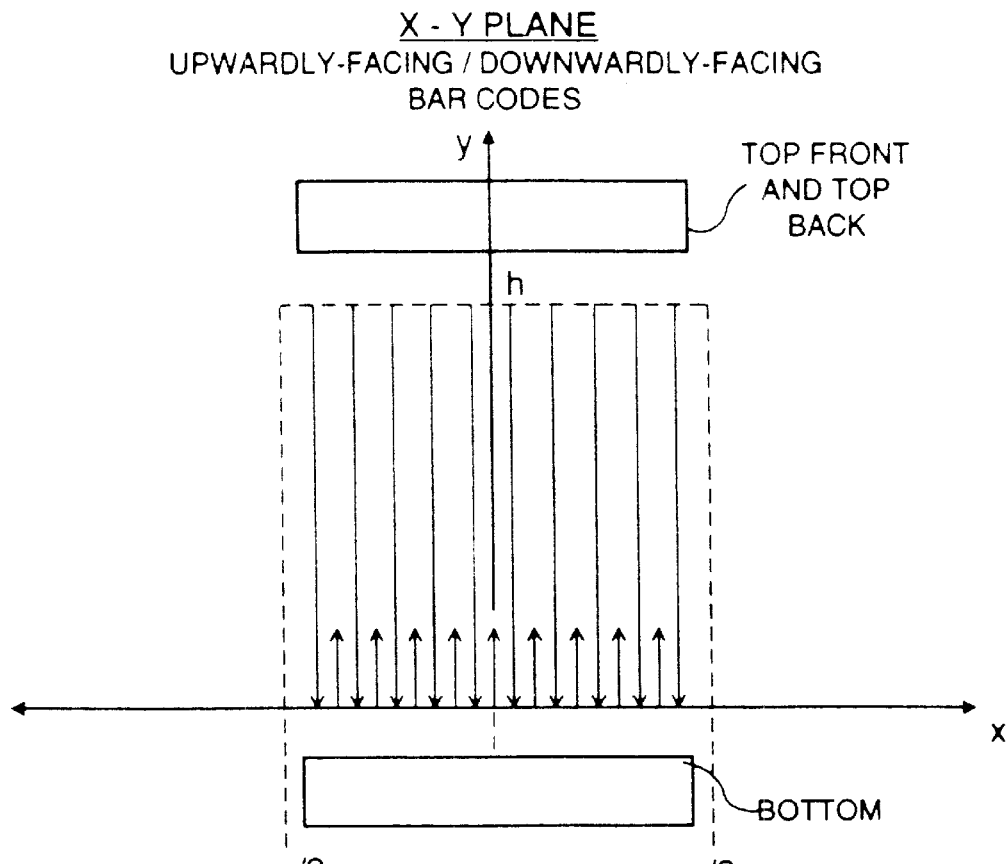
Figure 6:
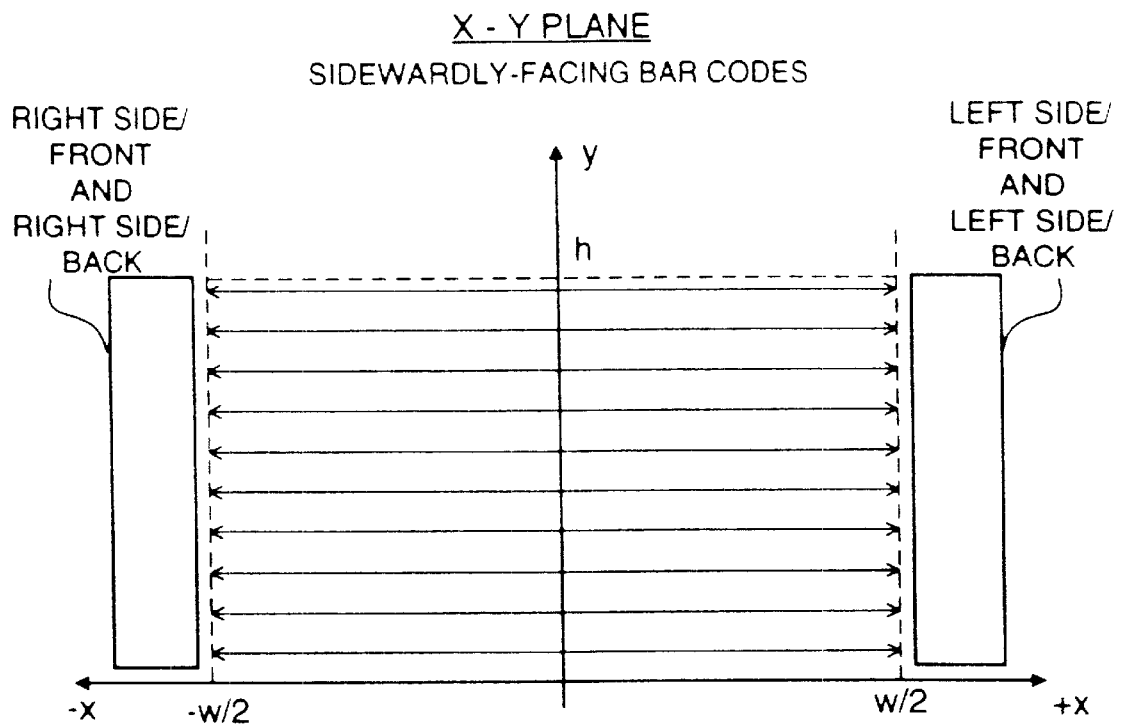

Each of the holographic scanners (denoted in R/F Corner #1, R/F Corner #2, R/B Corner #1, R/B Corner #2, L/F Corner #1, L/F Corner #2, L/B Corner #1, L/B Corner #2) mounted within the corners of the scanner support framework are single-disc holographic scanning subsystems, having five focal planes, formed using six laser scanning stations, each of which includes a VLD, a beam folding mirror, parabolic light collection mirror, signal processing circuit boards and the like, are designed and constructed using the methods detailed in Applicant's copending application Ser. No. 08/949,915 filed Oct. 14, 1997, now U.S. Pat. No. 6,158,659; Ser. No. 08/854,832 filed May 12, 1997, now U.S. Pat. No. 6,085,978; Ser. No. 08/886,806 filed Apr. 22, 1997, now U.S. Pat. No. 5,984,185; Ser. No. 08/726,522 filed Oct. 7, 1996, now U.S. Pat. No. 6,073,846; and Ser. No. 08/573,949 filed Dec. 18, 1995, now abandoned, each incorporated herein by reference. The design parameters for the twenty facet holographic scanning disc shown 130 in FIG. 3A4, and the supporting subsystem used therewith, are set forth in the Table of FIGS. 3A5A through 3A5C. Notably, the design parameters set forth in the table of FIGS. 3A5A through 3A5C are defined in detail in the above-referenced US Patent Applications. The scanning pattern projected on the middle (third) focal/scanning plane of each such single-disc holographic scanning subsystem is shown in FIG. 3A6.

The various omnidirectional scanning directions provided for within the 3-D scanning volume of the tunnel-scanning system of the present invention are schematically illustrated in FIGS. 5A through 9B. These illustrations indicate how each of the laser scanning subsystems within the tunnel scanning system contribute to produce the truly omnidirectional scanning performance attained by the tunnel scanner hereof.

Figure 8A:
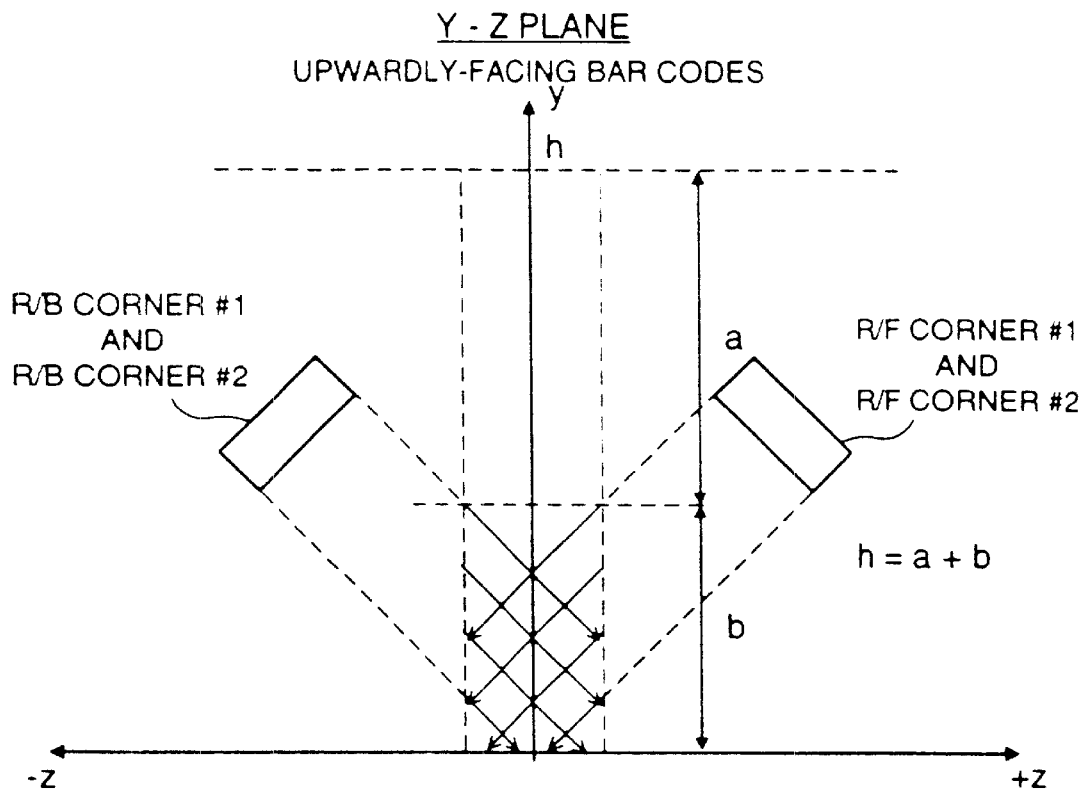
Figure 8B:
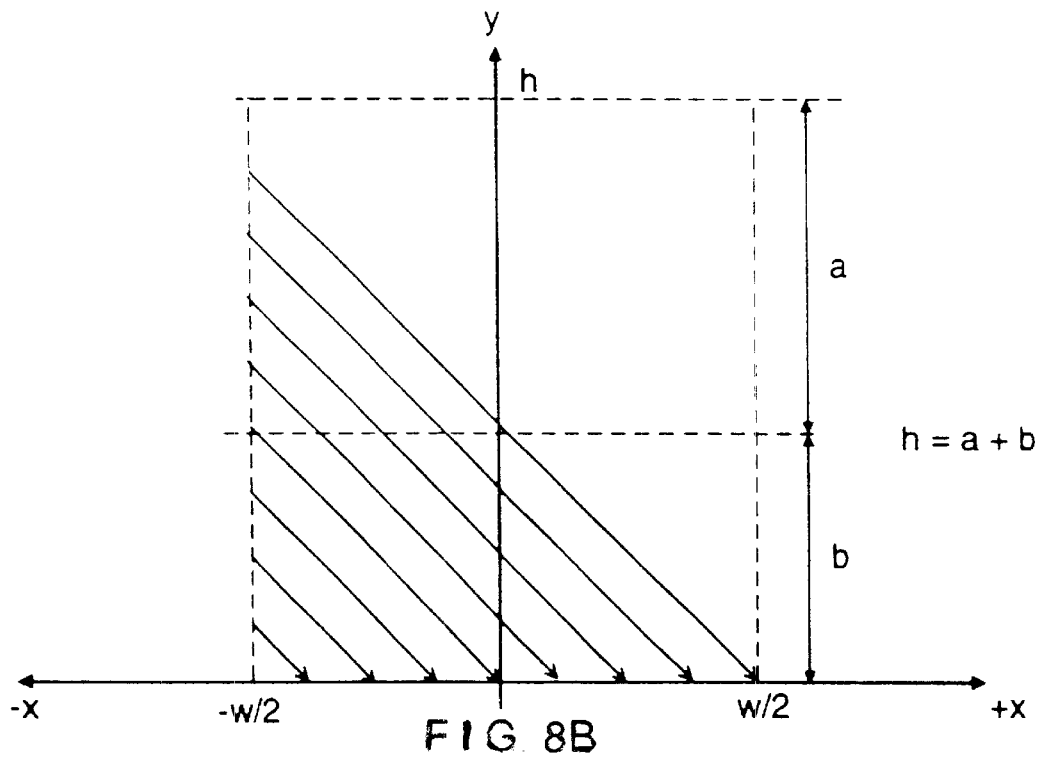
Figure 9A:
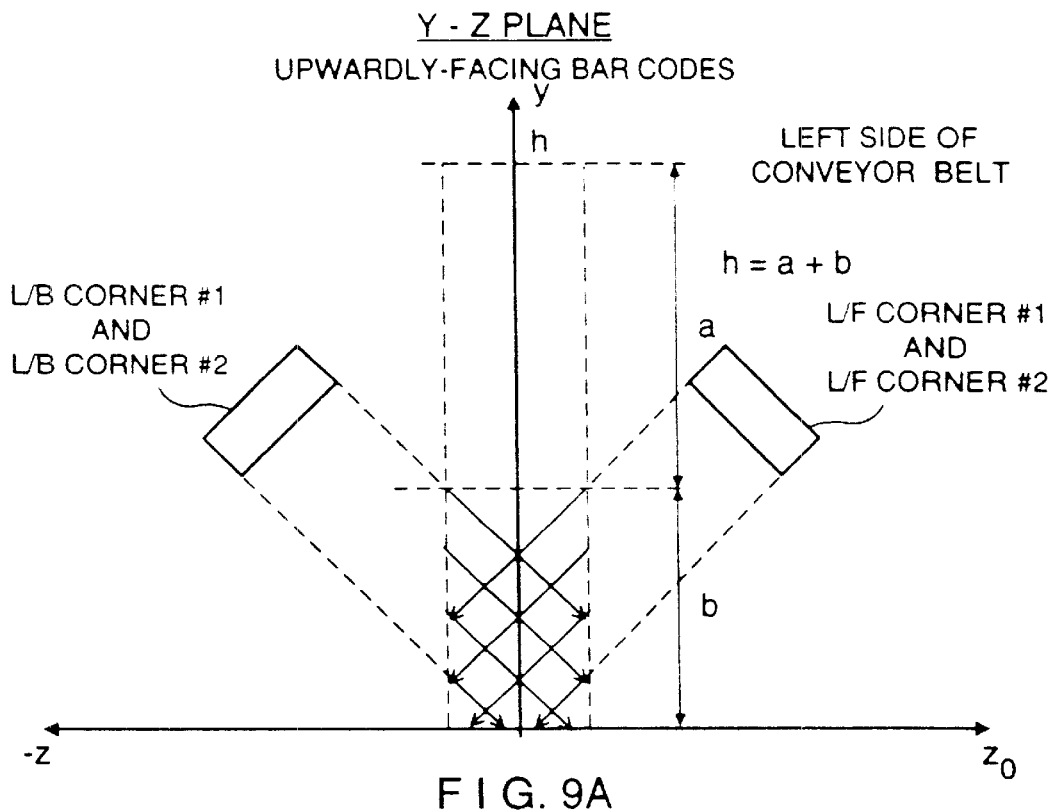
FIG. 9A is a schematic diagram showing the direction of omni-directional scanning provided in the Y-Z plane of the 3-D scanning volume of tunnel scanning system of the first illustrative embodiment of the present invention, by the holographic laser scanning subsystems (indicated by L/B Corner #1, L/B Corner #2, L/F Corner #1 and L/F Corner #2) employed therein.
Figure 9B:
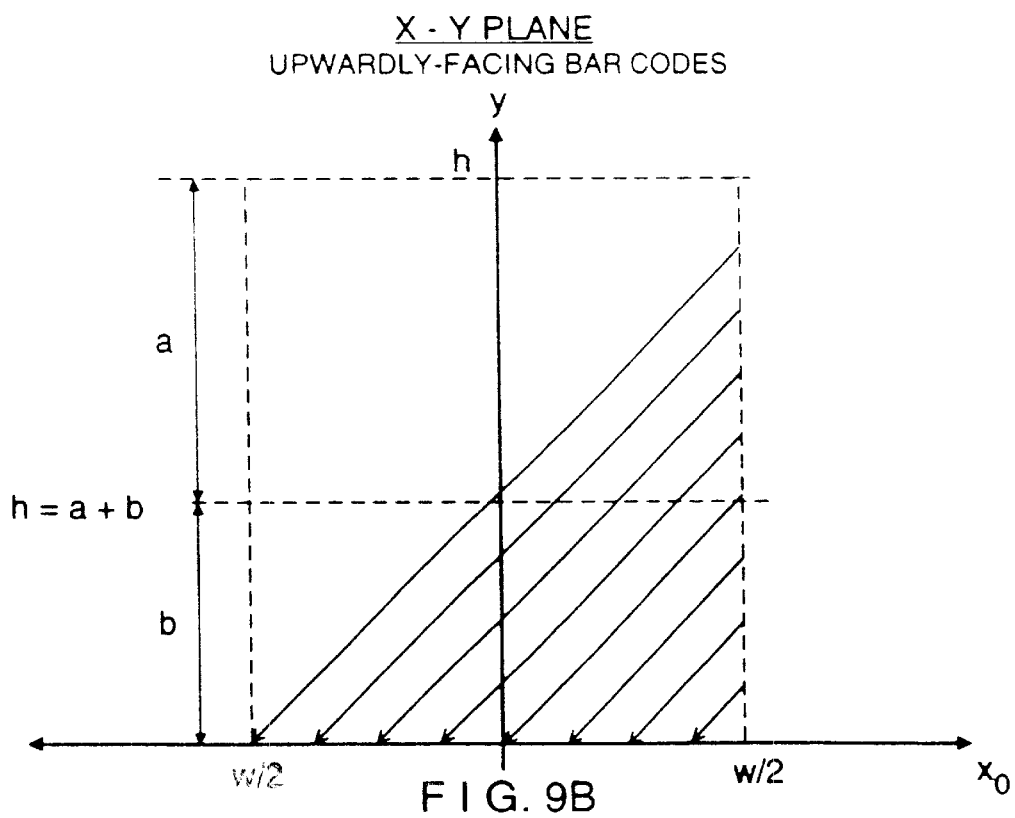
FIG. 9B is a schematic diagram showing the direction of omni-directional scanning provided in the X-Y plane of the 3-D scanning volume of tunnel scanning system of the first illustrative embodiment of the present invention, by the holographic laser scanning subsystems (indicated by L/B Corner #1, L/B Corner #2, L/F Corner #1 and L/F Corner #2) employed therein.

The four triple-disc holographic scanners (denoted as Left Side Front, Left Side Back, Right Side Front and Right Side Back) are mounted on the left and right sides of the scanner support framework 304. Each of these triple-disc holographic scanning subsystems is shown in greater detail in FIGS. 3B1 through 3B8. Each of these holographic scanning subsystems has five focal planes, formed using three sets (groups) of six laser scanning stations, arranged about a twenty-facet scanning disc. Each laser scanning station about the scanning disc includes a VLD, a beam folding mirror, parabolic light collection mirror, signal processing circuit boards and the like. Each holographic laser scanning subsystem within these triple-disc scanners are designed and constructed using the methods detailed in Applicant's copending application Ser. No. 08/949,915 filed Oct. 14, 1997, now U.S. Pat. No. 6,158,659; Ser. No. 08/854,832 filed May 12, 1997, now U.S. Pat. No. 6,085,978; Ser. No. 08/886,806 filed Apr. 22, 1997, now U.S. Pat. No. 5,984,185; Ser. No. 08/726,522 filed Oct. 7, 1996, now U.S. Pat. No. 6,073,846; and Ser. No. 08/573,949 filed Dec. 18, 1995, now abandoned, each incorporated herein by reference. The design parameters for each twenty facet holographic scanning disc 130 shown in FIG. 3B2, and the supporting subsystem used therewith, are set forth in the Table of FIGS. 3B3A and 3B3B. Notably, the design parameters set forth in the table of FIGS. 3B3A and 3B3B are defined in detail in the above-referenced US Patent Applications. The scanning pattern projected on the middle (third) focal/scanning plane of each such triple-disc holographic scanning subsystem is shown in FIG. 3B8.

As shown, the two triple-disc holographic scanners (denoted as Front and Back) are mounted above the conveyor belt by way of the scanner support framework 304. Each of these triple-disc holographic scanning subsystems is shown in greater detail in FIGS. 3C1 and 3C2. Each of these holographic scanning subsystems has five focal planes, formed using three sets (groups) of six laser scanning stations, arranged about a twenty-facet scanning disc. Each laser scanning station about the scanning disc has a VLD, a beam folding mirror, parabolic light collection mirror, signal processing circuit boards and the like. Each holographic laser scanning subsystem within these triple-disc scanners are designed and constructed using the methods detailed in Applicant's copending application Ser. No. 08/949,915 filed Oct. 14, 1997, now U.S. Pat. No. 6,158,659; Ser. No. 08/854,832 filed May 12, 1997, now U.S. Pat. No. 6,085,978; Ser. No. 08/886,806 filed Apr. 22, 1997, now U.S. Pat. No. 5,984,185; Ser. No. 08/726,522 filed Oct. 7, 1996, now U.S. Pat. No. 6,073,846; and Ser. No. 08/573,949 filed Dec. 18, 1995, now abandoned, each incorporated herein by reference. The design parameters for each twenty facet holographic scanning disc shown in the table of FIG. 3A4, and the supporting subsystem used therewith, are set forth in the Table of FIGS. 3B3A and 3B3B. Notably, the design parameters set forth in the table of FIGS. 3B3A and 3B3B are defined in detail in the above-referenced US Patent Applications. The scanning pattern projected on the middle (third) focal/scanning plane of each such triple-disc holographic scanning subsystem is shown in FIG. 3C2.

Figure 7:
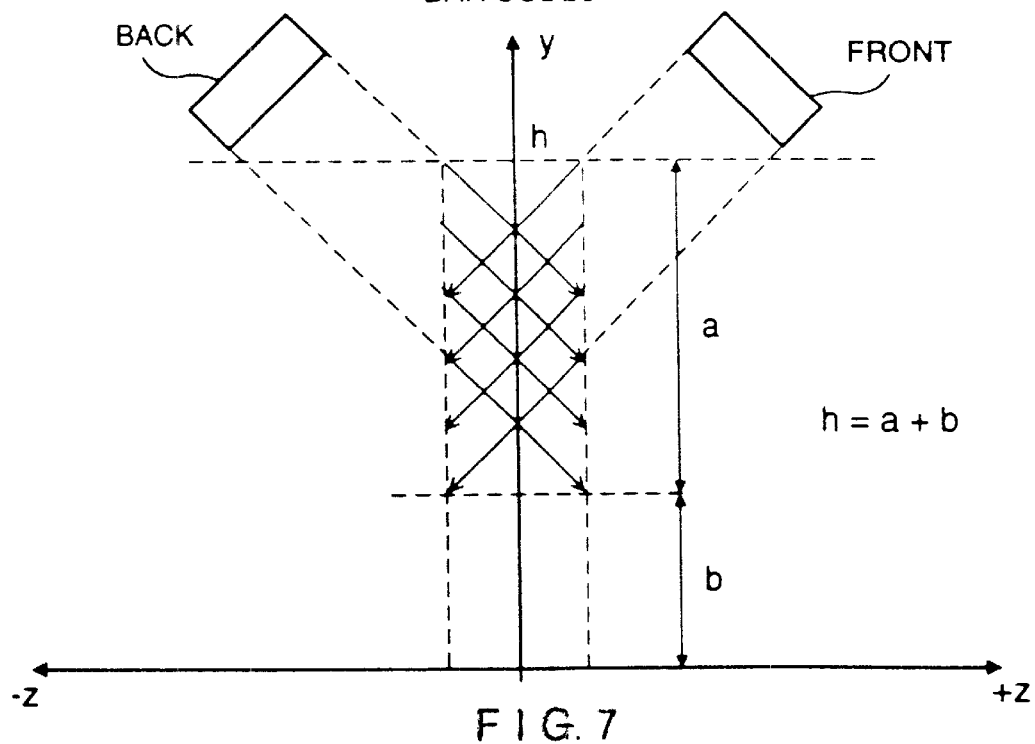

The bottom-mounted fixed projection scanner (denoted as Bottom) employed in the tunnel scanning system hereof is shown in greater detail in FIGS. 3D1 through 3D7. As shown in FIG. 3D1, the bottom-mounted scanner comprises eight fixed-projection laser scanning subsystems 118, that are mounted along optical bench 119. As illustrated in FIG. 3D2, each fixed projection scanning subsystem 118 comprises: four stationary mirrors 120A through 120D arranged about a central reference plane passing along the longitudinal extent of the optical bench 121 of the subsystem; and eight-sided motor driven polygon scanning element 122 mounted closely to the nested array of mirrors 120A through 120D; a light collecting mirror 123 mounted above the nested array along the central reference plane; a laser diode 124 for producing a laser beam which is passed through collecting mirror 123 and strikes the polygon scanning element 122; and a photodetector 125, mounted above the polygon scanning element 122, for detecting reflected laser light and produce scan data signals indicative of the detected laser light intensity for subsequent signal processing in a manner known in the bar code reading art.

As shown in FIG. 3D1, each subsystem 118 is mounted on optical bench 119, and a housing 126 with light transmission aperture 127, is mounted to the optical bench 119 in a conventional manner. As shown, a protective, scratch-resistant scanning window pane 128 is mounted over the light transmission aperture 127 to close off the interior of the housing from dust, dirt and other forms of debris. As illustrated in FIG. 3D3B, the bottom scanning unit 117 is mounted to a pair of support brackets 129 which in turn are mounted to a base support bracket 132 connected to the scanning tunnel framework 304A (shown in FIG. 1F). The scanning unit 117 is mounted relative to the conveyor belt sections 302A and 302B so that the scanning window 128 on the bottom scanning unit 117 is disposed at about 28° to the protective conveyor window 306, disposed over the gap region 305 (e.g. about 5.0 inches wide) formed between the conveyor belt sections 302A and 302B. As shown in FIG. 3D3A, the bottom scanning unit 117 is mounted about 12.5 inches below the conveyor scanning window 306. Also, the symbol character data outputs from subsystems 118 are supplied to a digital data multiplexer 130 which transmits the symbol character data to the I/O subsystem 800, shown in FIG. 4.

The partial scan patterns produced by individual stationary mirrors 120B, 102C and 120A, 120D, respectively, in each laser scanning subsystem 118 are shown in FIGS. 3D4 and 3D5, respectively. The complete pattern generated by each subsystem 118 is shown in FIG. 3D6. The composite omnidirectional scanning pattern generated by the eight laser scanning subsystems 118 working together in the bottom scanner unit 117 is shown in FIG. 3D7.

As shown in the system diagram of FIGS. 3A7A through 3A7C, each holographic laser scanning unit of the present invention 101 through 116 comprises a number of system components, many of which are realized on a control board 200, a plurality (e.g. six) analog signal processing boards 201A–201-F, and six digital signal processing boards 202A–202F.

As described in WIPO Patent Application Publication No. WO 98/22945, each holographic laser scanning unit 101 through 116 employed herein cyclically generates from its ultra compact scanner housing 140 shown in FIG. 3A2 (and 140' in FIG. 3b1 and 3C1), a complex three-dimensional laser scanning pattern within a well defined 3-D scanning volume which will be described in greater detail hereinbelow. In the system of the first illustrative embodiment, each such laser scanning pattern is generated by a rotating holographic scanning disc 130, about which are mounted six (6) independent laser scanning stations 142A through 142F, sometime referred to as laser scanning modules by coapplicants.

In FIG. 3A1, one of the laser scanning stations in the holographic scanner is shown in greater detail. Notably, all subcomponents associated therewith shall be referenced with the character "A", whereas the subcomponents associated with the other five laser scanning stations shall be referenced using the characters B through F. As illustrated in FIG. 3A1, the beam folding mirror 142A through 142F associated with each laser scanning station, has a substantially planar reflective surface and is tangentially mounted adjacent to the holographic scanning disc 130. In the illustrative embodiment, beam folding mirror 142A through 142F is supported in this position relative to the housing base (i.e. the optical bench) 143 using support legs 144A (through 142F) and 145A (through 145F) and rear support bracket 146A (through 146F).

As shown in FIG. 3A1, the laser beam production module 147A (through 147F) associated with each laser scanning station is mounted on the optical bench (i.e. housing base plate 143), immediately beneath its associated beam folding mirror 142A through 142F. Depending on which embodiment of the laser beam production module is employed in the construction of the holographic laser scanner, the position of the laser beam production module may be different.

As shown in FIGS. 3A1 and 3A2, six laser production modules 142A through 142F are mounted on base plate 143, substantially but not exactly symmetrically about the axis of rotation of the shaft of electric motor 150. During laser scanning operations, these laser beam production modules produce six independent laser beams which are directed through the edge of the holographic disc 130 at an angle of incidence $A_i$, which, owing to the symmetry of the laser scanning pattern of the illustrative embodiment, is the same for each laser scanning station (i.e. $A_i$=43.0 degrees for all values of i). The incident laser beams produced from the six laser beam production modules 142A through 142F extend along the six central reference planes, each extending normal to the plane of base plate 143 and arranged about 60 degrees apart from its adjacent neighboring central planes, as best illustrated in FIG. 3A2. While these central reference planes are not real (i.e. are merely virtual), they are useful in describing the geometrical structure of each laser scanning station in the holographic laser scanner of the present invention.

As shown in FIG. 3A1, the photodetector 152A (through 152F) of each laser scanning station is mounted along its central reference plane, above the holographic disc 130 and opposite its associated beam folding mirror 142A (through 142F) so that it does not block or otherwise interfere with the returning (i.e. incoming) laser light rays reflecting off light reflective surfaces (e.g. product surfaces, bar code symbols, etc) during laser scanning and light collecting operations. In the illustrative embodiment, the six photodetectors 152A through 152F are supported in their respective positions by a photodetector support frame 153 which is stationarily mounted to the optical bench by way of vertically extending support elements 154A through 154F. The electrical analog scan data signal produced from each photodetector is processed in a conventional manner by its analog scan data signal processing board 201A (through 201F) which is also supported upon the photodetector support frame 153, as shown. Notably, the height of the photodetector support board, referenced to the base plate (i.e. optical bench), is chosen to be less than the minimum height so that the beam folding mirrors 142A through 142F must extend above the holographic disc 130 in order to realize the prespecified laser scanning pattern of the illustrative embodiment. In practice, this height parameter is not selected (i.e. specified) until after the holographic disc has been completely designed according to the design process of the present invention, while satisfying the design constraints imposed on the disc design process. As explained in detail in WIPO Patent Application Publication No. WO 98/22945, the use of a spreadsheet-type computer program to analytically model the geometrical structure of both the laser scanning apparatus and the ray optics of the laser beam scanning process, allows the designer to determine the geometrical parameters associated with the holographic scanning facets on the disc which, given the specified maximum height of the beam folding mirrors (Y is defined in FIG. 25A2), will produce the prespecified laser scanning pattern (including focal plane resolution) while maximizing the use of the available light collecting area on the holographic scanning disc.

As best shown in FIG. 3A3, the parabolic light collecting mirror 149A (through 149F) associated with each laser scanning station is disposed beneath the holographic scanning disc 130, along the central reference plane associated with the laser scanning station. While certainly not apparent from this figure, precise placement of the parabolic light collecting element (e.g. mirror) 149A (through 149F) relative to the holographic facets on the scanning disc 130 is a critical requirement for effective light detection by the photodetector 152A (through 152F) associated with each laser scanning station. Placement of the photodetector at the focal point of the parabolic light focusing mirror alone is not sufficient for optimal light detection in the light detection subsystem of the present invention. As taught in WIPO Patent Application Publication No. WO 98/22945, careful analysis must be accorded to the light diffraction efficiency of the holographic facets on the scanning disc and to the polarization state(s) of collected and focused light rays being transmitted therethrough for detection. As will become more apparent hereinafter, the purpose of such light diffraction efficiency analysis ensures the realization of two important conditions, namely: (i) that substantially all of the incoming light rays reflected off an object (e.g. bar code symbol) and passing through the holographic facet (producing the corresponding instant scanning beam) are collected by the parabolic light collecting mirror; and (ii) that all of the light rays collected by the parabolic light collecting mirror are focused through the same holographic facet onto the photodetector associated with the station, with minimal loss associated with light diffraction and refractive scattering within the holographic facet. A detailed procedure is described in WIPO Patent Application Publication No. WO 98/22945 for designing and installing the parabolic light collecting mirror in order to satisfy the critical operating conditions above.

As shown in FIGS. 3A2 and 3A3, the six digital scan data signal processing boards 202A through 202F, are arranged in such a manner to receive and provide for processing the analog scan data signals produced from analog scan data signal processing boards 201A through 201F, respectively. As best shown in FIGS. 3A2 and 3A3, each digital scan data signal processing board 202A through 202F is mounted vertically behind its respective beam folding mirror 142A through 142F. A control board (i.e. motherboard) 200 is also mounted upon the base plate 143 for processing signals produced from the digital scan data signal processing boards 202A through 202F. A conventional power supply board 155 is also mounted upon the base plate 143, within one of its extreme corners. The function of the digital scan data signal processing boards, the central processing board 200, and the power supply board 155 will be described in greater detail in connection with the functional system diagram shown in FIGS. 3A7A through 3A7C. As shown in FIGS. 3A7A through 3A7C, electrical cables are used to conduct electrical signals from each analog scan data signal processing board 202A (through 202F) to its associated digital scan data signal processing board 202A (through 202F), and from each digital scan data signal processing board to the central processing board 200. Regulated power supply voltages are provided to the central signal processing board 200 by way of an electrical harness (not shown), for distribution to the various electrical and electro-optical devices requiring electrical power within the holographic laser scanner as shown in FIGS. 3A7B and 3A7C. In a conventional manner, electrical power from a standard 120 Volt, 60 HZ, power supply is provided to the power supply board by way of flexible electrical wiring (not shown). Symbol character data produced from the central processing board 200 is transmitted to the I/O subsystem 800, over a serial data transmission cable connected to a serial output (i.e. standard RS232) communications jack installed through a wall in the scanner housing 140 (140').

Many of the system components comprising each of the holographic laser scanning units 101 through 116 are realized on control board 200, the plurality (e.g. six) analog signal processing boards 201A through 201F, and the six digital signal processing boards 202A through 202F.

In the illustrative embodiment shown in FIG. 3A7A, each analog scan data signal processing board 201A through 201F has the following components mounted thereon: a photodetector 152A (through 152F) (e.g. a silicon photocell) for detection of analog scan data signals as described hereinabove; and analog signal processing circuit 235A (through 235F) for processing detected analog scan data signals.

In the illustrative embodiment, each photodetector 152A through 152F is realized as an opto-electronic device and each analog signal processing circuit 235A (through 235F) aboard the analog signal processing board (201A through 201F) is realized as an Application Specific Integrated Circuit (ASIC) chip. These chips are suitably mounted onto a small printed circuit (PC) board, along with electrical connectors which allow for interfacing with other boards within the scanner housing. With all of its components mounted thereon, each PC board is suitably fastened to the photodetector support frame 153, along its respective central reference frame, as shown in FIG. 3A1.

In a conventional manner, the optical scan data signal $D_0$ focused onto the photodetector 152A during laser scanning operations is produced by light rays of a particular polarization state (e.g. S polarization state) associated with a diffracted laser beam being scanned across a light reflective surface (e.g. the bars and spaces of a bar code symbol) and scattering thereof. Typically, the polarization state distribution of the scattered light rays is altered when the scanned surface exhibits diffuse reflection characteristics. Thereafter, a portion of the scattered light rays are reflected along the same outgoing light ray paths toward the holographic facet which produced the scanned laser beam. These reflected light rays are collected by the scanning facet and ultimately focused onto the photodetector of the associated light detection subsystem by its parabolic light reflecting mirror 149A (through 149F) disposed beneath the scanning disc 130. The function of each photodetector 152A (through 152F) is to detect variations in the amplitude (i.e. intensity) of optical scan data signal $D_0$, and to produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to the light reflection characteristics of the scanned surface (e.g. the scanned bar code symbol). The function of the analog signal processing circuitry is to band-pass filter and preamplify the electrical analog scan data signal $D_1$, in order to improve the SNR of the output signal.

In the illustrative embodiment, each digital scan data signal processing board 202A through 202F is constructed in substantially the same manner. On each of these signal processing boards, the following devices are provided: an analog-to-digital (A/D) conversion circuit 238A through 238F, as taught in copending U.S. application Ser. No. 09/243,078 filed Feb. 2, 1999 and Ser. No. 09/241,930 filed Feb. 2, 1999, realizable as a first application specific integrated circuit (ASIC) chip; a programmable digitizing circuit 239A through 239F realized as a second ASIC chip; a start-of-facet-sector pulse (SFSP) generator 236A through 236F realizable as a programmable IC chip, for generating SFSPs relative to home-offset pulses (HOP) generated by a HOP generation circuit 244 on the control board 200, shown in FIG. 3A7B, and received by the SFSP generator; an EPROM 237A through 237F for storing parameters and information represented in the tables of FIGS. 10C, 10E, 10F1 and 10F2; and a programmed decode computer 240A through 240F realizable as a microprocessor and associated program and data storage memory and system buses, for carrying out symbol decoding operations and recovery of SFSPs from the digitizer circuit 239A (through 239F) in a synchronous, real-time manner as will be described in greater detail hereinafter. In the illustrative embodiment, the ASIC chips, the microprocessor, its associated memory and systems buses are all mounted on a single printed circuit (PC) board, using suitable electrical connectors, in a manner well known in the art.

The function of the A/D conversion circuit 238A (through 238F) is to perform a thresholding function on the second-derivative zero-crossing signal in order to convert the electrical analog scan data signal $D_1$ into a corresponding digital scan data signal $D_2$ having first and second (i.e. binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit (through 238F) of the present invention is two-fold: (1) to convert the digital scan data signal D2, associated with each scanned bar code symbol, into a corresponding sequence of digital words (i.e. a sequence of digital count values) $D_3$ representative of package identification (I.D.) data; and (2) to correlate time-based (or position-based) information about the facet sector on the scanning disc that generated the sequence digital count data (corresponding to a scanline or portion thereof) that was used to read the decoded bar code symbol on the package scanned in the scanning tunnel subsystem 100. Notably, in the digital word sequence D3, each digital word represents the time length duration of first or second signal level in the corresponding digital scan data signal $D_2$. Preferably, the digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in each holographic laser scanning subsystem 101 through 116 in the system of the present invention.

In bar code symbol scanning applications, each programmed decode computer 240A through 240F has two primary functions: (1) to receive each digital word sequence $D_3$ produced from its respective digitizing circuit 239A through 239F, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated with the decode computer; and (2A) to generate a specification for the laser scanning beam (or plane-sector) that was used to collect the scan data underlying the decode bar code symbol, or alternatively, (2B) to generate a specification of the holographic scanning facet sector or segment that produced the collected scan data $D_1$ from which each laser-scanned bar code symbol is read.

In accordance with general convention, the first function of the programmed decode computer 240A (through 240F) hereof is to receive each digital word sequence $D_3$ produced from the digitizing circuit 239A (through 238F) , and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

The second function of the programmed decode processor 240A through 240F is best described with reference to FIGS. 11D and 11E. In the illustrative embodiment hereof, each programmed decode computer 240A through 240F generates a specification for the laser scanning beam (or plane-sector) in terms of the minimum and maximum facet angles delimited by the facet sector involved in the scanning the decoded bar code symbol. Such minimum and maximum facet angles are indicated in the last column of the table shown in FIG. 11D. Alternatively, each programmed decode computer 240A through 240F could generate a specification of the holographic scanning facet sector or segment that produced the collected scan data from which each laser-scanned bar code symbol is read. In such a case, each programmed decode processor would generate for each decoded bar code symbol, the following items of information: the identification number of the laser scanning subsystem that produced the underlying scan data from which the bar code symbol was read; the identification number of the laser scanning station that produced the underlying scan data from which the bar code symbol was read; the facet number of the scanning facet on the scanning disc that produced the underlying scan data from which the bar code symbol was read; and the facet sector number of the scanning facet on the scanning disc that produced the underlying scan data from which the bar code symbol was read. Such information items could be generated using tables similar to those set forth in FIG. 11D, except that instead of reading out minimum and maximum facet angles (as provided in the rightmost column thereof), the facet sector (or segment) number could be read out, and assembled with the other items of information providing the specification of how the laser scanning beam in issue was generated from the holographic laser scanning subsystem. In either case, such information will enable the data management computer system 900 of FIG. 4 to compute a vector-based geometrical model of the laser scanning beam used to scan the read bar code symbol represented by the coordinated symbol character data. As will be described in greater detail hereinafter, the geometrical model of the laser beam is produced in real-time aboard the data management computer system 900 using "3-D ray-tracing techniques" which trace the laser scanning beam from (1) its point of original on the holographic scanning disc, (2) to its point of reflection off the corresponding beam folding mirror, and (3) towards the focal point of the laser scanning beam determined by the focal length of the scanning facet involved in the production of the laser scanning beam. From the computed vector-based geometrical model of the laser scanning beam, the location of the decoded bar code symbol (i.e. when it was scanned by the laser scanning beam being geometrically modeled) can be specified (i.e. computed) in real-time relative to a local coordinate reference system symbolically embedded within the laser scanning subsystem.

As shown in FIGS. 3A7B and 3A7C, the control board 200 comprises a number of components mounted on a small PC board, namely: a programmed microprocessor 242 with a system bus and associated program and data storage memory, for controlling the system operation of the holographic laser scanner and performing other auxiliary functions; first, second, third, forth, fifth and sixth serial data channels 243A through 243F, for receiving serial data input from the programmable decode computers 240A through 240F; an input/output (I/O) interface circuit 248 for interfacing with and transmitting symbol character data and other information to the I/O subsystem 800, and ultimately to the data management computer system 900 of FIG. 4; home pulse detector 245 realizable as the electronic circuit shown in FIGS. 3A8C1 and 3A8C2, for detecting the home pulse generated when the laser beam 250 from VLD 253 (in home pulse marking sensing module 251 shown in FIG. 3A8A) is directed through home-pulse gap 131 (between Facets Nos. 5 and 12) and sensed by photodetector 152 through 152F; and a home-offset-pulse (HOP) generator 244 realized as an ASIC chip, for generating a set of six home-offset pulses (HOPs) in response to the detection of each home pulse by circuit 245. In the illustrative embodiment, each serial data channel 243A through 243F is realized as an RS232 port, although it is understood that other structures may be used to realize the function performed thereby. The programmed control computer 242 also produces motor control signals, and laser control signals during system operation. These control signals are received as input by a power supply circuit 252 realized on the power supply PC board. Other input signals to the power supply circuit 252 include a 900 Volt, 60 Hz line voltage signal from a standard power distribution circuit. On the basis of the received input signals, the power supply circuit produces as output, (1) laser source enable signals to drive VLDs 253A, 253B and 253C, respectively, and (2) a motor enable signal in order to drive the scanning disc motor 150 coupled to holographic scanning disc 130.

First Method of Determining Laser Beam Position in Holographic Laser Scanners Under Constant Scanning Motor Speed Conditions In FIGS. 10A through 11E, a first method is shown for determining the position of the laser scanning beam produced by holographic laser scanning subsystems under constant scanning motor speed conditions and synchronously encoding facet section information with digital count data in the digitizer circuit of each decode board. In general, this method involves optically encoding the "home pulse mark/gap" 131 along the edge of the holographic scanning disc, and upon detecting the same, generating home offset pulses (HOPs) which are used to automatically generate the start of each facet pulse (SFPs), and the SFPs in turn are used to automatically generate the start-of-facet-sector pulses (SFSPs) aboard each decode board 202A through 202F. The details of this process will be described hereinbelow.

Figure 10D:
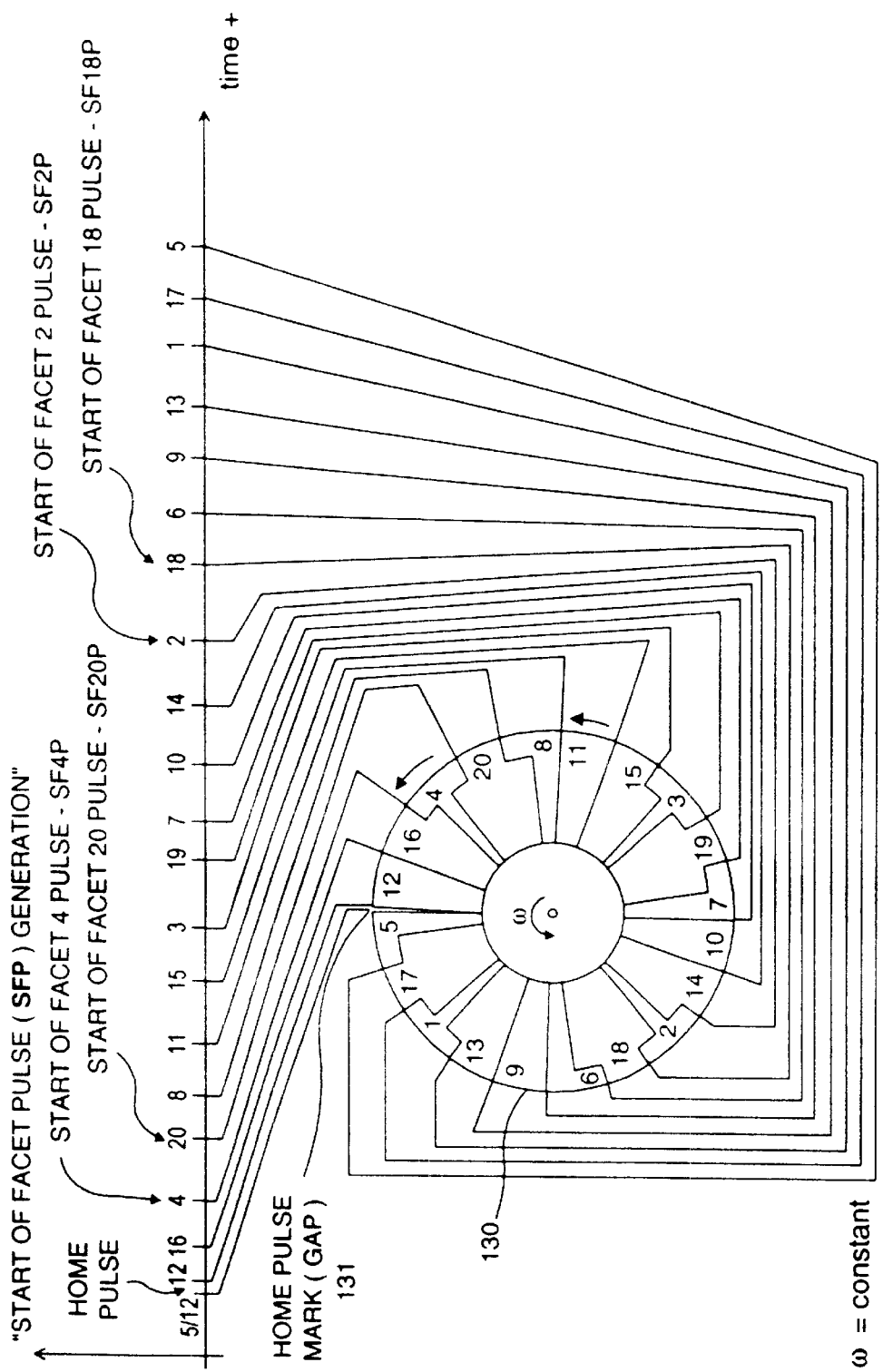
FIG. 10D is a schematic representation of the operation of the start-of-facet pulse SFP generation module employed within each SFSP generator of the present invention, wherein start of facet pulses are generated within the SFP generation module relative to the home-offset pulse (HOP) received from the HOP generator on the control board associated with each holographic scanning disc.
Figure 10G:
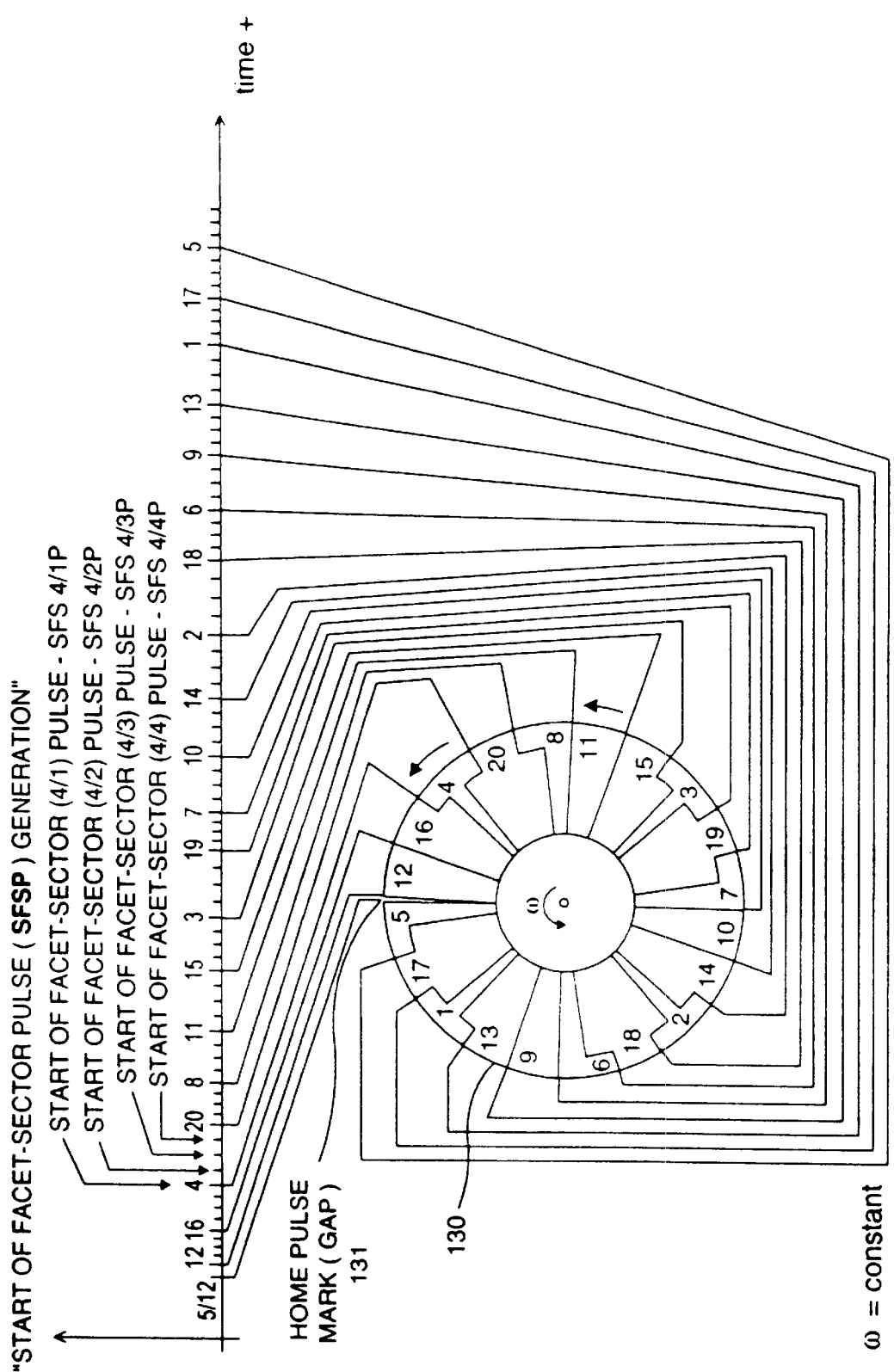
FIG. 10G is a schematic representation of the operation of the start-of-facet-sector pulse (SFSP) generator of the present invention, wherein start of facet sector pulses (SFSPs) are generated within the SFSP generator relative to the home-offset pulse (HOP) received from the HOP generator on the control board associated with each holographic scanning disc.
Figure 11B:
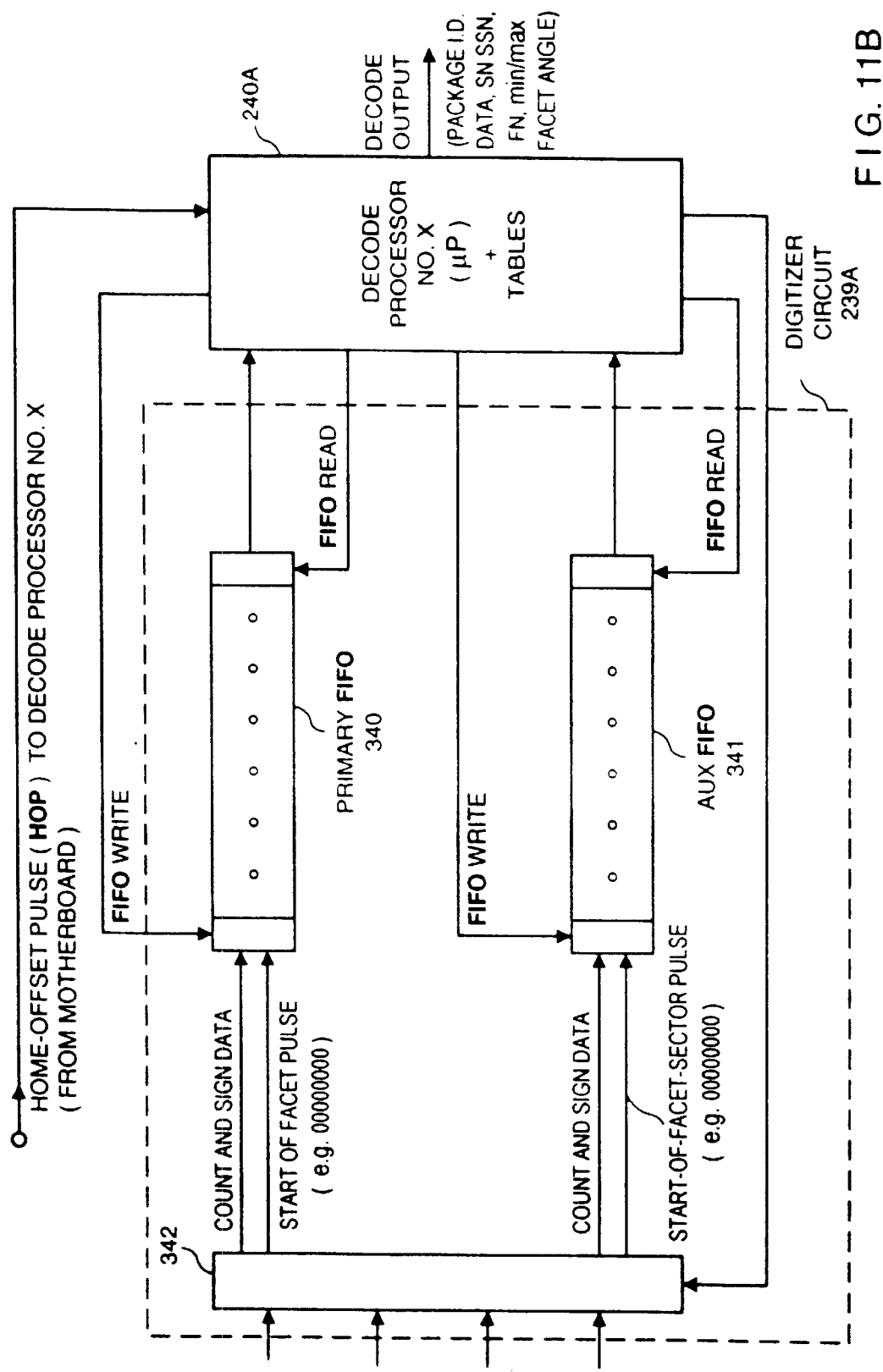
FIG. 11B is a schematic diagram showing in greater detail the digitizing circuit shown in FIG. 10A.
Figure 11E:
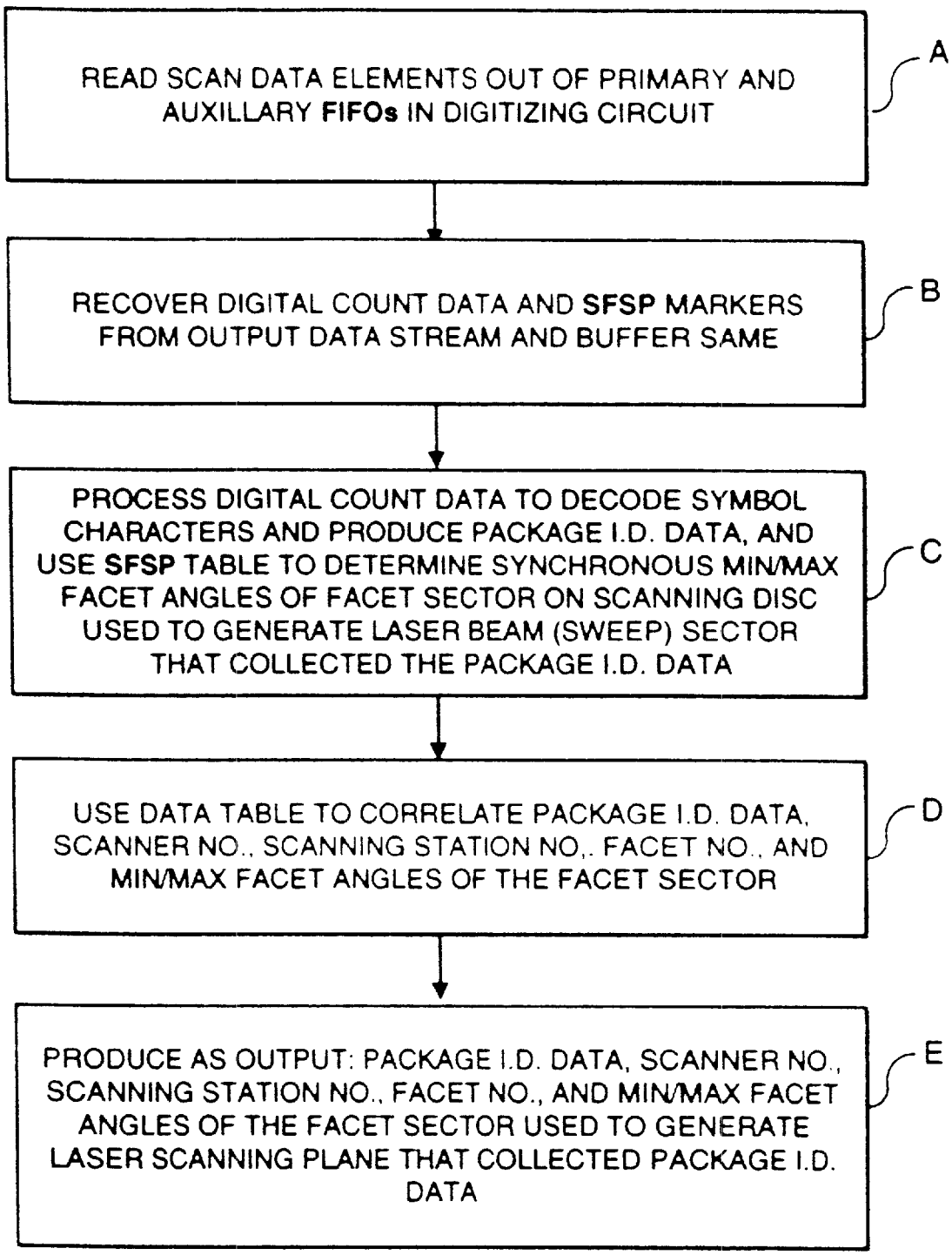
FIG. 11E is a high level flow chart describing the steps of the process carried out by the decode processor of the present invention shown in FIG. 11B.

Referring now to FIGS. 10 through 11D, it is noted that each home offset pulse produced from HOP generating circuit 244 is provided to the SFSP generator 236A through 236F on the decode processing board. When the HOP pulse is received at the SFSP generator 236A through 236F on a particular decode processing board, the home pulse gap 131 on the scanning disc 130 is starting to pass through the laser beam directed therethrough at the scanning station associated with the decode signal processing board. As shown in FIGS. 10A through 11E, timing information stored in the tables shown in these figures is used by the SFSP generator 236A (through 236F) to generate a set of SFSPs in response to the received HOP pulse during each revolution of the scanning disc. This enables a digital number count (referenced from the HOP) to be generated and correlated along with the digital data counts produced within the digitizer circuit 239A (through 239F) in a synchronous manner. As shown in FIG. 10B, each SFSP generator 236B through 236B comprises: a clock 260 for producing clock pulses (e.g. having a pulse duration of about 4 microseconds); a SFP generation module 261 for generating SFPs using the table of FIG. 10C in accordance with the process depicted in FIG. 10C; a SFSP generation module 262 for generating SFSPs using the table of FIG. 10E and production rules set forth in FIGS. 10F1 and 10F2, in accordance with the process depicted in FIG. 10G; and a control module 263 for controlling the SFP generation module 261 and the SFSP generation module 262, and resetting the clock 260 upon each detection of a new HOP from the HOP generator 244 on the control board 200 associated with the holographic scanning unit.

As shown in FIGS. 11A1 and 11A2, the digitizer circuit 239A (through 239F) of the present invention comprises a number of subcomponents. In particular, a scan data input circuit 322 is provided for receiving digital scan data signal $D_2$. A clock input 312 is provided from an external fixed frequency source 313, e.g. a 40 MHz crystal, or another external clock 315 to produce a pulse train. The output of the clock input circuit 312 is provided to the clock divider circuitry 314. That circuit 314 includes dividers for successively dividing the frequency of the clock pulses by a factor of two to produce a plurality of clock frequencies, as will be described in detail later. This plurality of clock signals is provided to a clock multiplexer 316. As shown in FIGS. 11A1 and 11A2, the 40 MHz clock input signal is also provided directly to the clock multiplexer 316. The clock multiplexer 316 selects the desired output frequencies for the device based upon control signals received from clock control circuitry in the programmable decode processor (through 240F) and in associated circuitry. The output of the clock multiplexer 316 comprises an S clock signal which provides the basic timing for the digitizer circuit 239A (through 239F), as well as the input to digital counters. The processing of the input (bar code) scan data $D_2$ is provided from signal processor 238A (throug 238F). The input circuit 322 provides output signals which represent the detected bar code signal to be processed and are provided to the transition and sign detecting circuit 324. That circuit detects the transition from a bar to a space or from a space to a bar from the input signals provided thereto, and also determines whether the symbol occurring before the transition is a bar or a space. Thus, the transition and sign detector 324 provides a signal bearing the "sign: information (referred to as the "SIGN" signal) which is provided to multiplexer 342, and thus a primary first-in, first-out (FIFO) memory which serves as the input of programmable processor 240A (240F). The transition and sign circuit 324 also provides a signal to the sequencing means 328 to commence operation of the sequencing circuit 328. The sequencing circuit 328 sequences the digitizer circuit through a predetermined number of steps which begin at the occurrence of each symbol transition and which will be described in detail later. Sequencing circuit 328 provides a FIFO write signal to the FIFO input of primary FIFO 340 and the auxiliary FIFO 341, at the proper time to enable it to accept data thereinto. The sequencing circuit 328 provides input signals to digitizing counting circuit 330 so that the starting and stopping of the counters, occurring with the detection of each transition, is properly sequenced. The counting circuit 330 also receives an input signal from the clock multiplexer 316 (S Clock). This signal runs the counters at the selected rate when they are enabled by the sequencing means 328. The clock multiplexer 316, the sequencer circuit 328 and the counting circuit 330 each supply signals to the interface circuit 333 which enables it to properly pass the digitized count data to the primary and auxiliary FIFOs 340 and 341, via multiplexer 342, as shown in FIGS. 11A1 and 11B. The clock multiplexer 316 is arranged to provide two banks of available frequencies for the device to use, namely, an upper and a lower bank. The selection of frequencies from the upper bank or the lower bank is determined by a frequency bank switching circuit 362. The frequency bank switching circuit 362 also provides an input to an array reset 338 which provides a signal to reset the clock divider 314 on command. The clock divider circuitry 314 also generates a TEST reset signal by inverting the array reset signal. The TEST reset signal resets the remainder of the circuit 239A (through 239F). The command which initiates this reset condition is normally generated by a testing device (not shown) connected to device 239A (through 239F) and used to test it upon its fabrication.

As shown in FIGS. 11A1 through 11C, digital count data or a string of zeros (representative of correlated SFP data or count values from the HOP) are written into the primary FIFO using multiplexer 342 and write enable signals generated by the sequencing circuit 328. The SFP marker (i.e. string of zeros) is written over the data in the primary FIFO 340 whenever the SFP count data is presented to the digitizer circuit. Also, digital count data or a string of zeros (representative of correlated SFSP data or SFS count values from the HOP) are written into the auxiliary FIFO 341 using multiplexer 342 and write enable signals generated by the sequencing circuit 328. The SFSP marker (i.e. string of zeros) is written over the data in the auxiliary FIFO 341 whenever the SFP count data is presented to the digitizer circuit. With such a data encoding scheme, the decoder 240A (through 240F) is allowed to decode process the scan count data in the FIFOs, as well as determine which facet sector produced the laser scanning beam. The later function is carried out using the tables set forth in FIGS. 11C1 through 11D and the method described in the flow chart of FIG. 11E. As shown in FIG. 11E, the output of the decode processor 240A (through 240F) is a scan beam data element comprising the package ID data, the scanner number (SN), the laser scanning station number (SSN), facet number (FN) and minimum and maximum facet angles subtending the facet sector involved in generating the laser beam used to read the decoded bar code symbol representative of the package ID data. Additional details concerning the design and construction of digitizer circuit (239A through 239F) can be found in Co-Applicant's U.S. Pat. No. 5,343,027 incorporated herein by reference in its entirety.

Figure 12B:
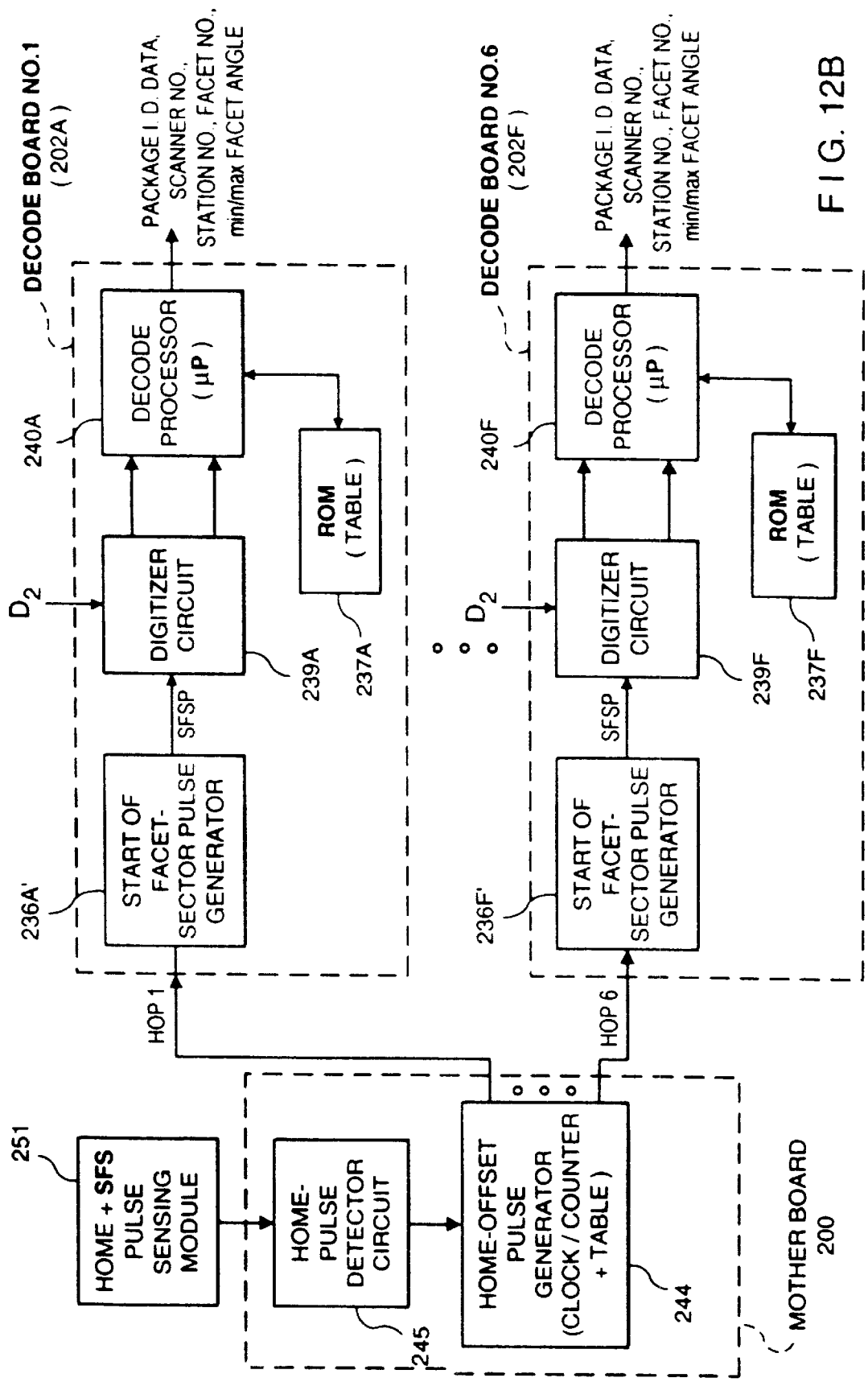
FIG. 12B is a schematic representation of the components on the control board and decode processing boards associated with an optically-encoded holographic scanning disc which can be employed within the tunnel scanning subsystem of the present invention, showing the home-pulse detector and home-offset pulse (HOP) generator on the control board, and the start-of-facet-sector pulse (SFSP) generator, digitizer circuitry, decode signal processor and ROM containing relative timing information about each SFSP in relation to the HOP sent to the decode processing board from the control board of the present invention.
Figure 12C:
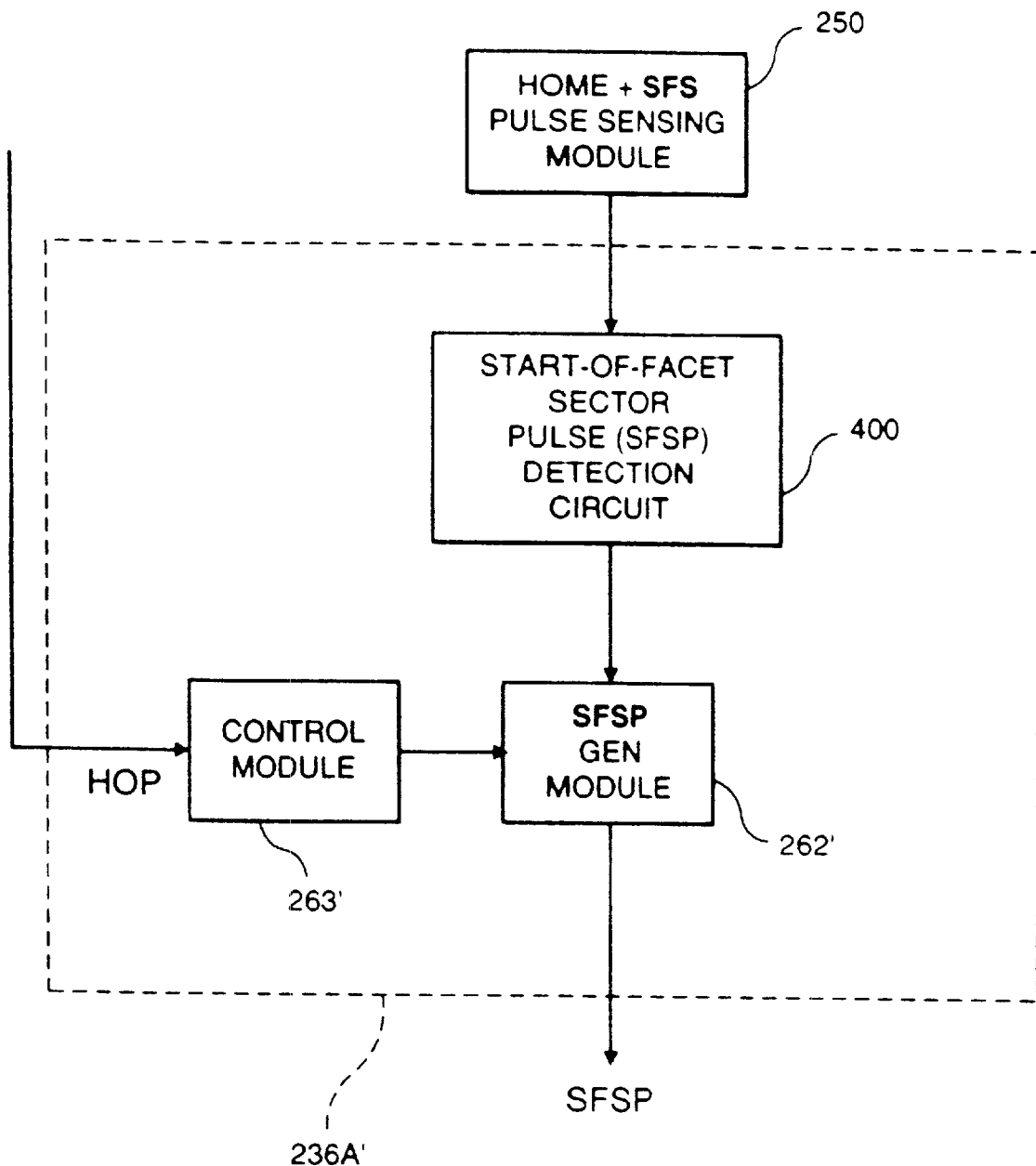
FIG. 12C is a schematic representation of the start-of-facet-sector pulse (SFSP) generator employed on each decode board shown in FIG. 12B.
Figure 12E:
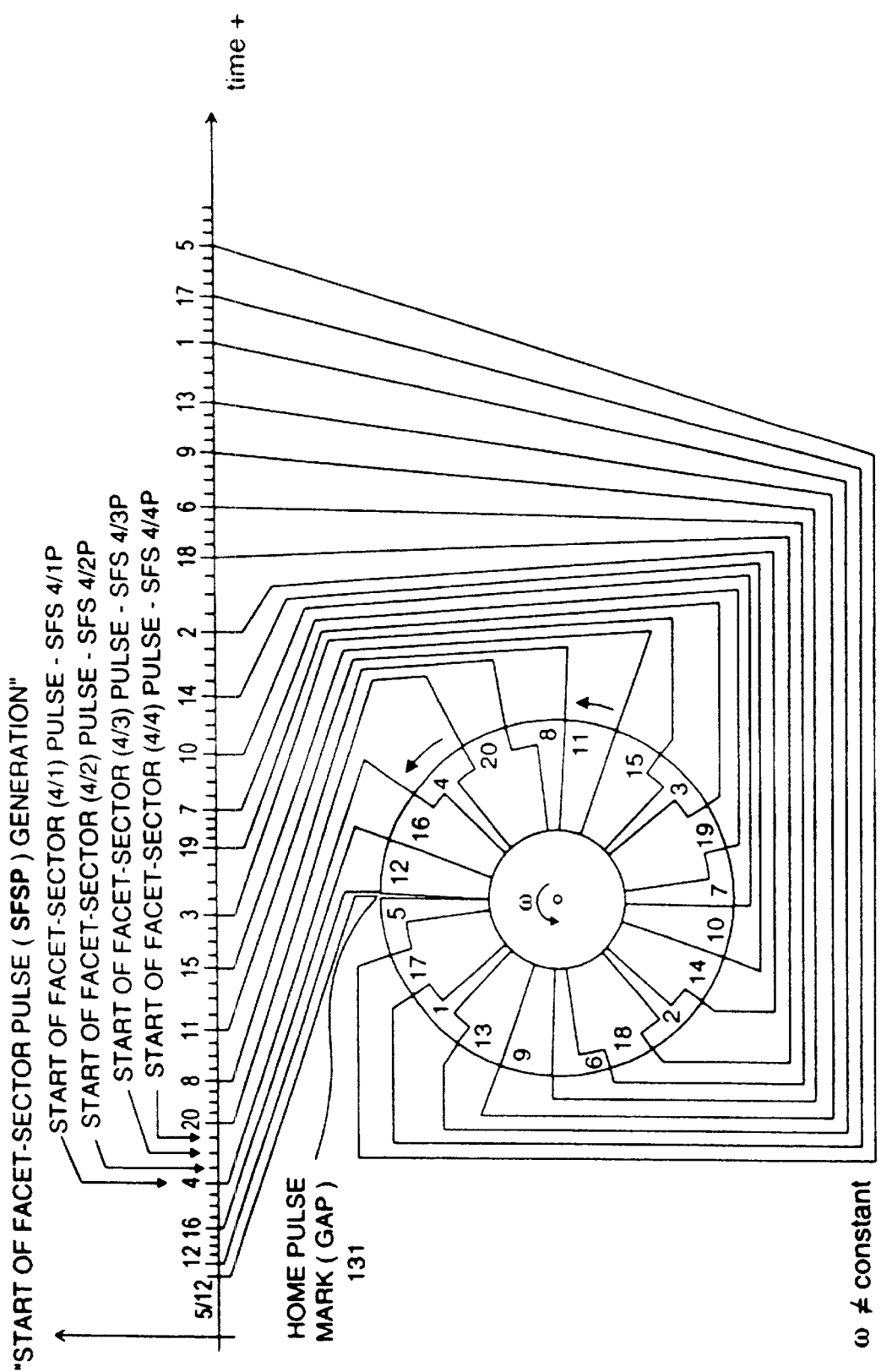
FIG. 12E is a schematic representation of the operation of the start-of-facet sector pulse (SFSP) generator shown FIG. 12C, wherein start of facet sector pulses are generated therewithin relative to the home-offset pulse (HOP) received from the HOP generator on the control board associated with each holographic scanning disc.
Figure 13B:
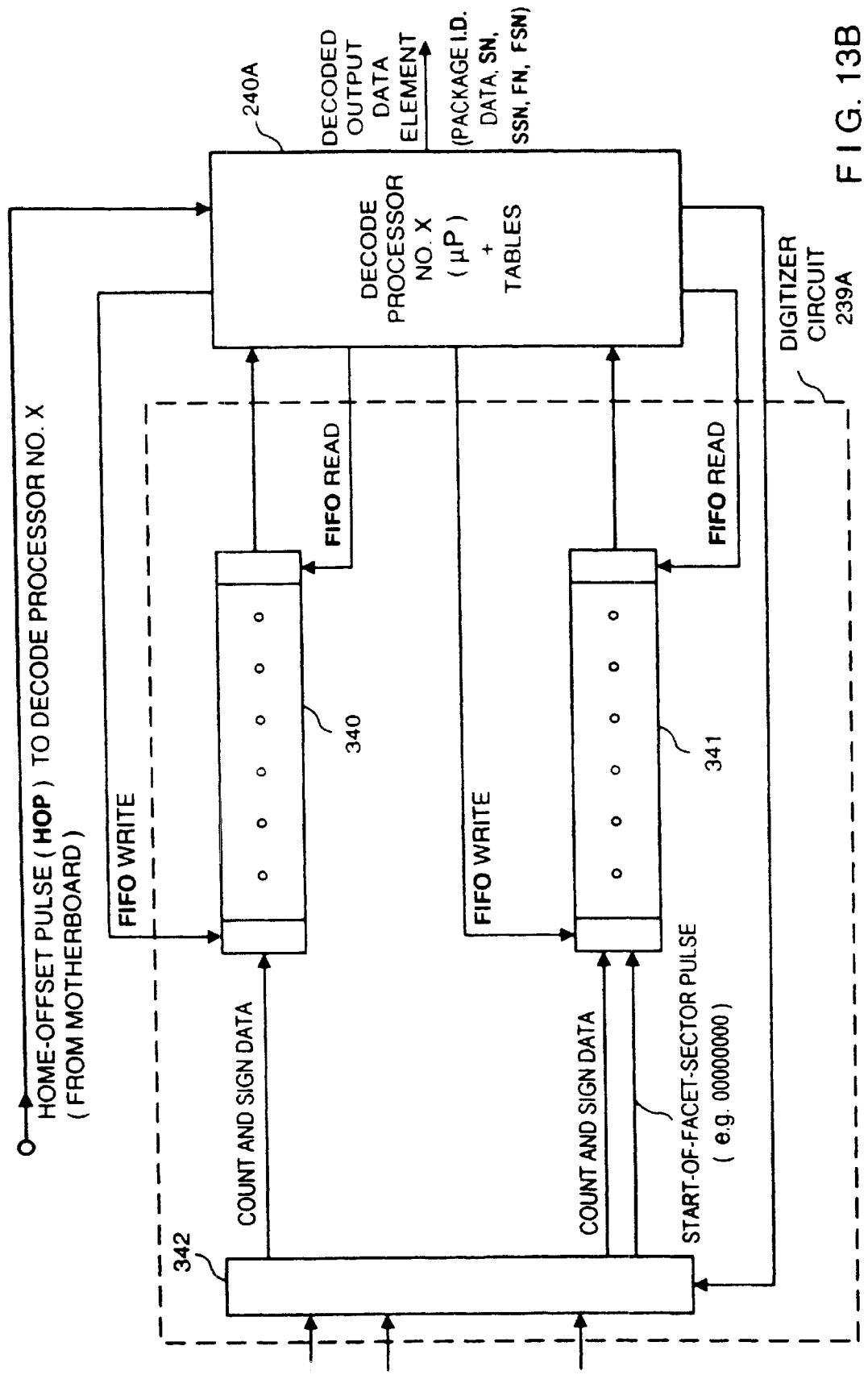
FIG. 13B is a schematic diagram showing the digitizing circuit of FIG. 13A2 in greater detail.
Figure 13D:
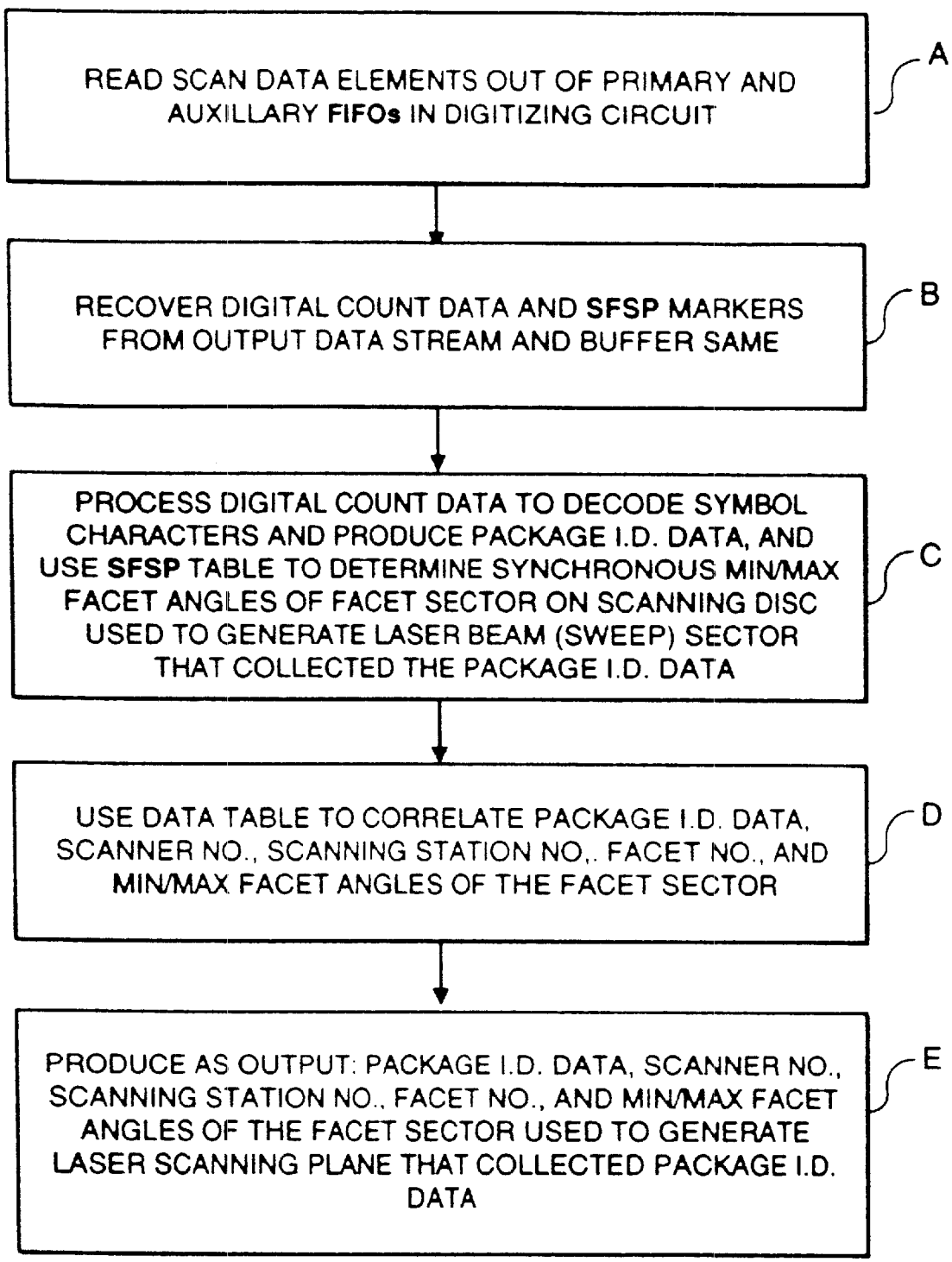
FIG. 13D is a high level flow chart describing the steps of the process carried out by the decode processor of the present invention shown in FIG. 12B.

Second Method of Determining Laser Beam Position in Holographic Laser Scanners Under Constant Scanning Motor Speed Conditions In FIGS. 12A through 13D, an alternative method is shown for determining the position of the laser scanning beam holographic laser scanning subsystems under constant scanning motor speed and synchronously encoding facet section information with digital count data in the digitizer circuit of each decode board. This method involves optically encoding the start of each facet sector (SFS) mark along the outer edge of the holographic scanning disc 130', as shown in FIG. 12A. This optical encoding process can be carried out when mastering the scanning disc using a masking pattern during laser exposure. The home pulse gap sensing module described above can be used to detect the home pulse gap as well as the SFS marks along the edge of the scanning disc. As shown, the home gap 131 or functionally equivalent mark of a predetermined opacity generates a home pulse, whereas the SFS marks generate a series of SFSPs during each revolution of the scanning disc. The home pulse is detected on the home pulse detection circuit on the control board and is used to generate HOPs as in the case described above. The HOPs are transmitted to each decode board where they are used reference (i.e. count) how many SFSPs have been counted since the received HOP, and thus determine which facet sector the laser beam is passing through as the scanning disc rotates. Digital counts representative of each SFSP are synchronously generated by the SFSP generator aboard each decode board and are loaded into the auxiliary FIFO 341, while correlated digital count scan data is loaded into both the primary and auxiliary FIFOs, 340 and 341 respectively, in a manner similar to that described above. The decode processor can use the information in tables 13C1 and 13C2 to determine which SFSP counts correspond to which minimum and maximum facet angles in accordance with the decode processing method of the present invention described in FIG. 13D. The advantage of this method is that it is expected to be less sensitive to variations in angular velocity of the scanning disc.

Referring now to FIG. 4, the individual scanning subsystems within the system of the first illustrative embodiment are shown interfaced with the data management computer system 900 by way of I/O port subsystem 800 well known in the art. As shown, the data management computer system 900 has a graphical user interface (GUI) 901 supported by a display terminal, an icon-pointing device (i.e. a mouse device), keyboard, printer, and the like. The GUI enables programming of the system, as well as the carrying out of other management and maintenance functions associated with proper operation with the system. Preferably, the data management computer system 900 also includes a network interface card for interfacing with a high-speed Ethernet information network that supports a network protocol such as TCP/IP well known in the art.

The above-described methods for determining the position of laser scanning beams in holographic laser scanning systems involve recovering laser position information using a "home-pulse" mark on the holographic disc rotated a constant angular velocity. However, it has been discovered that such techniques work satisfactorily only when the angular velocity of the scanning disc is maintained very close to the designed nominal angular velocity during start-up and steady-state operation. In many applications, it is difficult or otherwise unfeasible to maintain the angular velocity of the scanning disc constant such modes of operation, even when using speed locking/control techniques known in the electrical motor arts. Thus in many applications there will be a need for a laser beam position determination system and method that works for any scanning disc motor speed as well as under small accelerations (and decelerations) of the scanning disc motor, hereinafter referred to as varying scanning motor speed conditions.

Laser Position Determination in Holographic Laser Scanners Under Varying Scanning Motor Speed Conditions In FIGS. 14A through 14D, a novel system and method is illustrated for accurately determining the position of laser scanning beams in holographic laser scanning subsystems under varying scanning disc motor speed conditions. In this embodiment of the present invention, a holographic scanning disc having a home pulse mark or gap 131 as shown in FIG. 3B2 can be used to generate the required laser scanning pattern. Also, as shown in FIG. 3B1, each holographic scanning disc is provided with a home pulse sensing module 251 and home pulse detection circuit 245 as shown in FIGS. 3A8A through 3A8C2 and described in detail hereinabove.

Figure 14A:
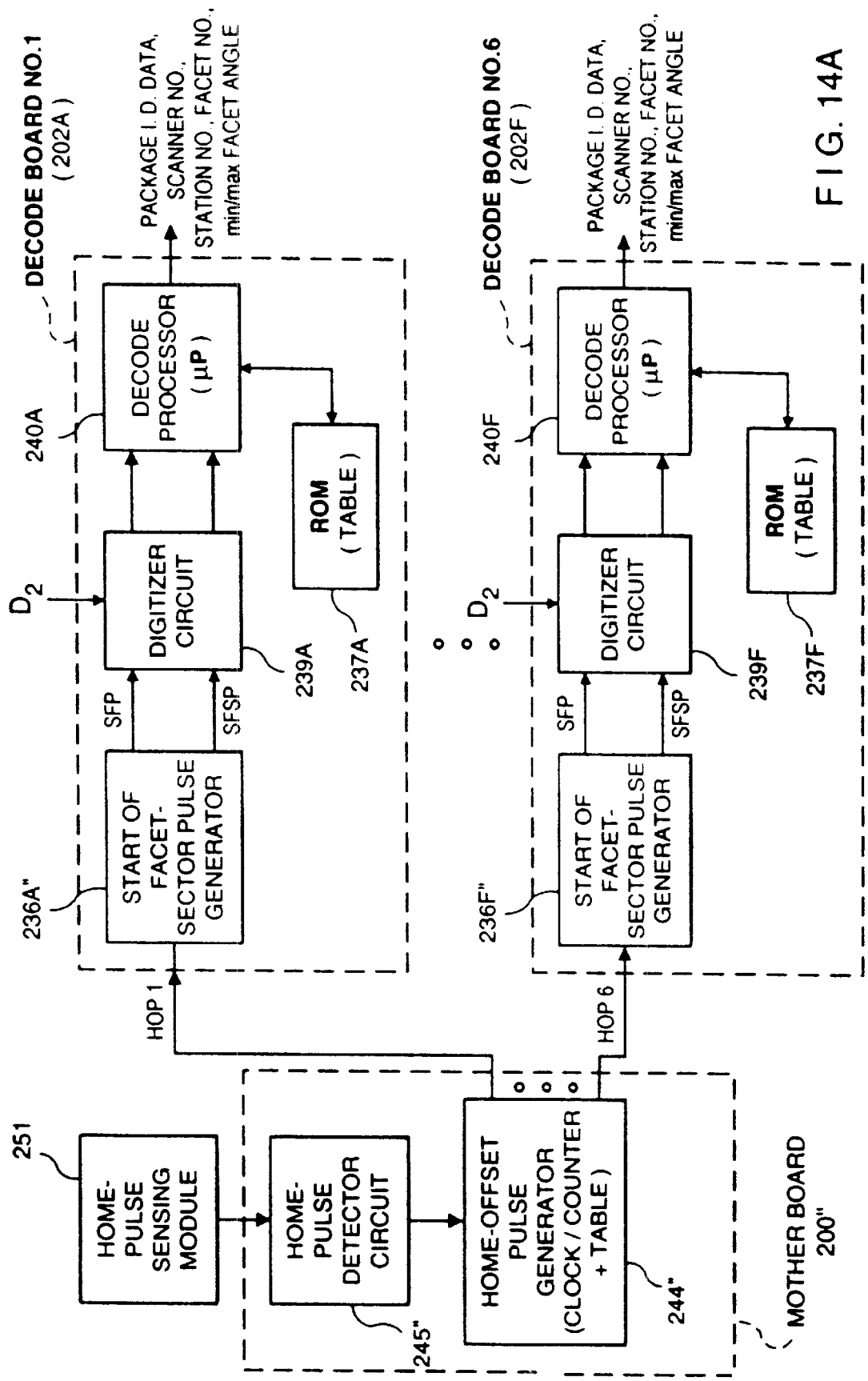
FIG. 14A is a schematic representation of the components on the control board and decode processing boards associated with a holographic scanning disc employed within an alternative embodiment of the holographic scanning subsystems in the tunnel scanning subsystem of the first illustrative embodiment of the present invention, showing the home-pulse detector and home-offset pulse (HOP) generator on the control board, and the start-of-facet-sector pulse (SFSP) generator, digitizer circuitry, and decode signal processor.

As illustrated in FIG. 14A, each time the home pulse mark or gap on the scanning disc 130 passes the home pulse sensing module 251, a home pulse (HP) is automatically generated from the home pulse detection circuit 245". Each time a home pulse is generated from the home pulse detection circuit 245", a set of home offset pulses (HOPs) is sequentially produced from HOP generation circuit 244" in accordance with the process depicted in FIG. 14C. The number of HOPs produced in response to each detected HP is equal to the number of laser scanning stations (i.e. scanning modules), N, arranged about the laser scanning disc. Each generated HOP is provided to the SFSP generator (236A' through 236F') on the decode processing board (240A through 240F) associated with the HOP. When the HOP pulse is received at the SFSP generator on its respective decode signal processing board, the home pulse mark or gap on the scanning disc 130 is then starting to pass through the laser beam directed therethrough at the laser scanning station associated with the decode signal processing board. During each revolution of the scanning disc, the SFSP generation module 261" within each SFSP generation circuit 236A" through 236F" generates a set of start of facet pulses (SFPs) relative to the HOP, and also a set of start of facet sector pulses (SFSPS) relative to each SFSP. This enables a SFP and a SFSP (referenced from the HOP) to be generated by each SFSP generation circuit 236A" through 236F" and provided to the digitizer circuit 239A through 239F so that the SFP and SFSP data can be correlated with the digital data counts produced within the digitizer circuits in a synchronous manner. Within the decode processor, SFP and SFSP data can be translated into laser beam position data expressed in terms of the minimum and maximum angles that delimit the facet sector producing the scan data from which the bar code symbol was decoded.

In the illustrative embodiment, the HOP generation circuit 244" is implemented using an 87C51 microcontroller. The microcontroller uses two inputs: the home-pulse detected signal from the home pulse detection circuit 245" connected to an interrupt pin of the 87C51; and a "motor-stable" (i.e. motor-ready) signal from the scanning motor controller. The microcontroller has as many outputs as there are laser scanning stations (i.e. scanning modules) in each laser scanning subsystem. Each output pin is dedicated to sending HOPs to a particular laser scanning station within the subsystem.

Figure 14B:
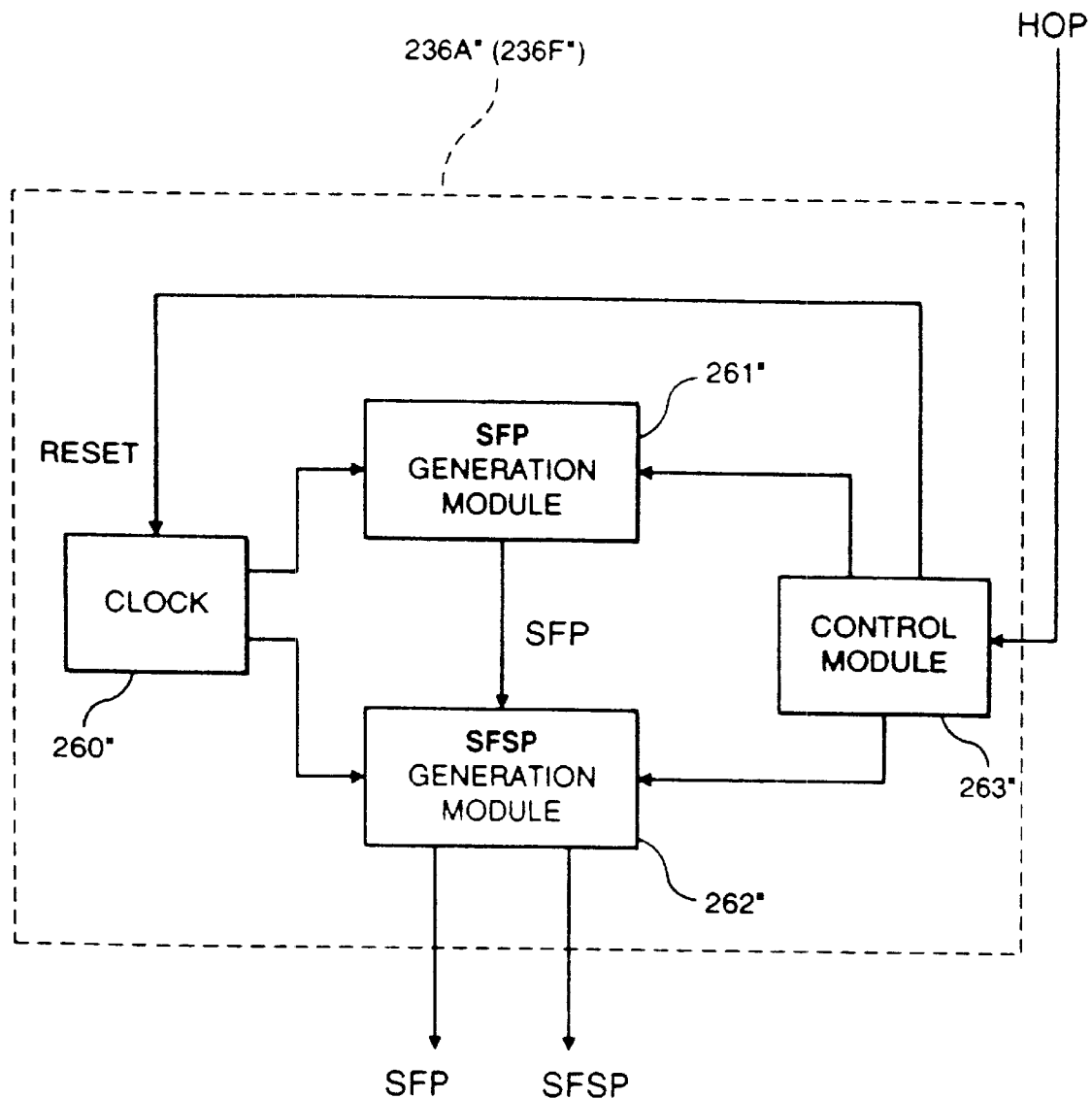
FIG. 14B is a schematic representation of the start-of-facet-sector pulse (SFSP) generator employed on each decode board associated with a holographic laser scanning subsystem depicted in FIG. 14A.

In general, each SFSP generation circuit is realized as a programmed microprocessor. However, for purposes of understanding the SFSP generation circuitm 236A" (through 236F), it will be helpful to schematically represent it as comprising a number of subcomponents, as shown in FIG. 14B. As shown therein, each SFSP generator 236A" through 236F" comprises: a clock 260" for producing clock pulses (e.g. having a pulse duration of about 4 microseconds); a SFP generation module 261" for generating SFPs in accordance with the process depicted in FIG. 14D; a SFSP generation module 262" for generating SFSPs in accordance with the process depicted in FIG. 14D; and a control module 263" for controlling the SFP generation module 261" and the SFSP generation module 262", and resetting the clock 260" upon each detection of a new HOP from the HOP generator 244" on the control board 200" associated with the holographic scanning unit.

In the illustrative embodiment, the SFP/SFSP generation circuit 236A" (through 236F" ) has been implemented using an programmed 87C52 microcontroller mounted on each decoding board associated with a particular scanning station. The HOP for the corresponding scanning station is received on an interrupt pin of the microcontroller. The microcontroller outputs three signals to the decode processor 240A (through 240F): (i) SFPs; (ii) SFSPs; and (iii) a signal processor adjustment signal which constitutes a level high (or low ) when the facet that passes the scanning station's laser is a facet on a near (or far) focal plane.

The operation of the HOP generation circuit 244" and the SFSP generation circuit 236A" (through 236F" ) will now be described with reference to the flow charts set forth in FIGS. 14C and 14D. In these flow charts described below, the following list of symbols are used:

$t_i$=timer value at start of home-pulse for the $i^{th}$ rotation of the disc;

$T_i$=time-period of the $(i-1)^{th}$ rotation of the disc;

$x_{Hj}$=angular value of the position of the laser of the $j^{th}$ scanning station (i.e. scanning module) of the system, relative to the previous scanning station (home-pulse laser for scanning station 1);

$x^{Fj}$=angular width of the $j^{th}$ facet of the disc;

$x^{Fjm}$=angular width of the $m^{th}$ sector (i.e. segment) of the $j^{th}$ facet of the disc;

$t_i^{Hj}$=time elapsed between the $j^{th}$ HOP and the $(j-1)^{th}$ HOP of the $i^{th}$ rotation of the disc;

$t_i^{Fj}$=time elapsed between the Start of Facet Pulse (SFP) of facet j and facet j−1 of the $i^{th}$ rotation of the disc;

$t_i^{Fjm}$=time elapsed between the Start of Facet Segment Pulse (SFSP) of sector m and sector m−1 of facet j of the $i^{th}$ rotation of the disc;

$t_i^n$=time at which the $n^{th}$ HOP/SFP of the $i^{th}$ rotation of the disc is outputted; and $t_i^{pn}$=time at which the $p^{th}$ SFSP of the $n^{th}$ facet of the $i^{th}$ rotation of the disc is outputted.

Each time the "start of home-pulse mark" is detected, the home-pulse sensing module 251 described hereinabove automatically produces a negative going output pulse which is provided to the HOP generation circuit 244', as shown in FIG. 14A. The HOP generation circuit 244' uses this negative going output pulse to calculate the times at which the home-pulse mark reaches the different modules (i.e. laser scanning stations) and, in response to such calculated times, to automatically generate and provided HOPs to the SFSP generation circuit 236A" (through 236F"). The calculation is based on the important assumption that the motor speed for the $i^{th}$ rotation is very close to the motor speed for the $(i-1)^{th}$ rotation.

Figure 14C:
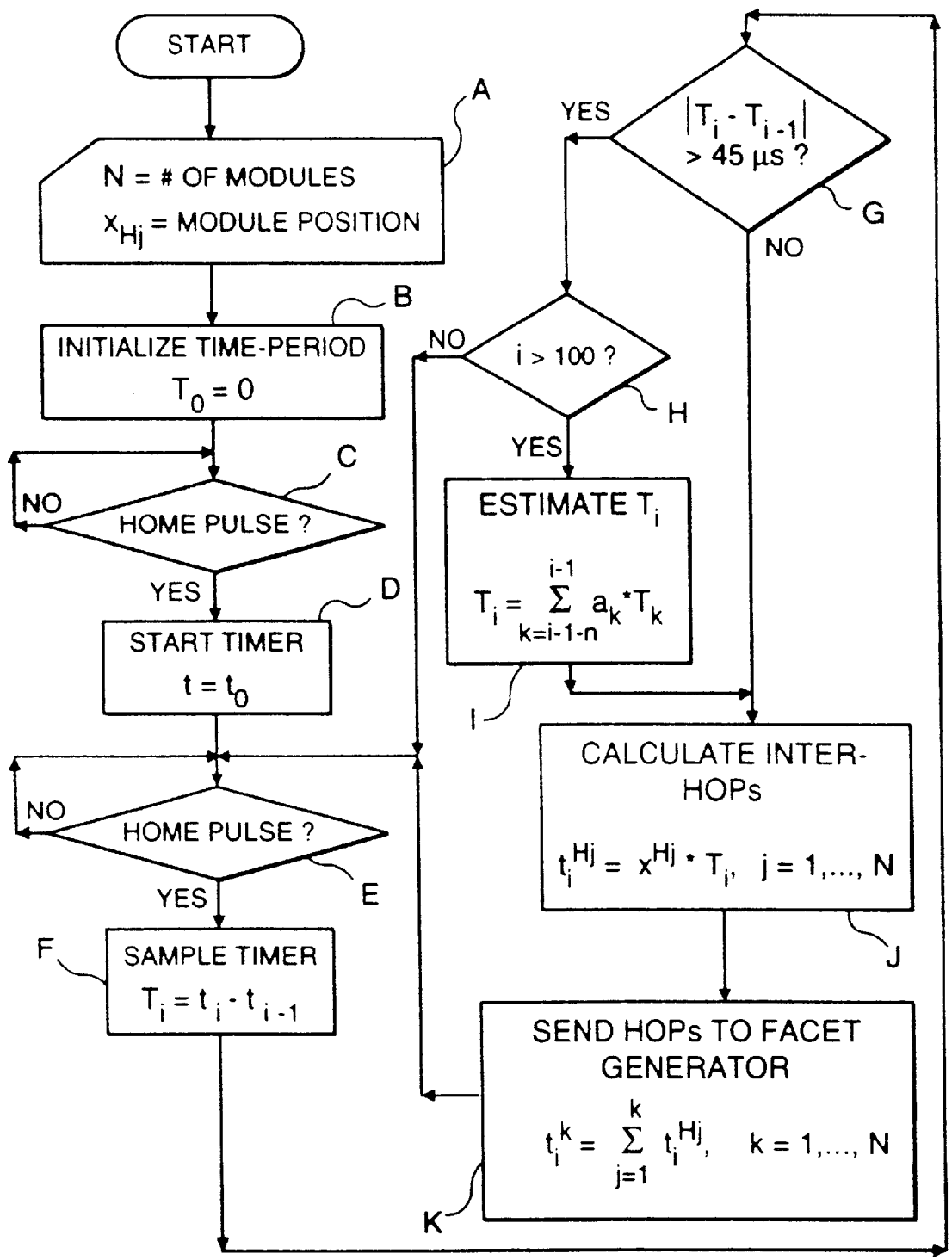
FIG. 14C is a flow chart describing the operation of the HOP generator on the control board associated with each holographic scanning disc, wherein home offset pulses (HOPs) are automatically generated from the HOP generator aboard the control board in each holographic laser scanning subsystem independent of the angular velocity of the holographic scanning disc employed therein.

As indicated at Block A in FIG. 14C, the process within the SFSP generation circuit 236A" defines N as the number of laser scanning stations (i.e. scanning modules) in the holographic scanner, and $x_{Hj}$ as the angular offset (i.e. position) of a laser scanning station from the home-pulse sensing module (i.e. pickup) 251. At Block B in FIG. 14C, the process involves initializing the time period or setting $T_0=0$. Then at Block C, the HOP generation circuit determines whether a home pulse (HP) has been detected at its input port. Until an HP is detected, the circuit remains at this control block. When an HP is detected, then at Block D the circuit starts the timer therewithin (i.e. $t=t_0$). Then at Block E, the circuit determines whether another HP has been detected. As shown, the circuit remains at this control block until the next HP is detected. When the HP is detected, then at Block F the circuit samples the timer. The time-period of rotation of the scanning disc is calculated from two consecutive home-pulse detections as follows:

$T_i=t_i-t_{i-1}$, where $T_i$ is the time-period for the $i^{th}$ rotation of the disc. Then at Block G, the circuit determines whether the time-period for the $i^{th}$ rotation is "close" to that for the $(i-1)^{th}$ rotation.

As indicated at Block G, a measure of "closeness" is defined as: $|T_i-T_{i-1}|<45$ uS. If the time measure is not close, i.e. $|T_i-T_{i-1}|>45$ uS, then if the time-period of rotation for the $i^{th}$ and $(i-1)^{th}$ rotation does not satisfy, $|T_i-T_{i-1}|<45$ uS, the circuit checks at Block H to determine whether the scanning disc has rotated at least a 100 times (experimental value). If the scanning disc has not rotated at least 100 times, then the circuit proceeds to Block E and waits for the next home-pulse and carries out the control process over again. Since it is critical to the performance of the scanner that every scan be associated with laser position information, the time-period has to be accurately predicted when for some reason the time-period between two consecutive rotations of the disc differs by more than, for example, 45_S (an experimental value). The assumption here is that the scanning motor speed cannot change suddenly between two rotations.

If the scanning disc has rotated at least a 100 times (i.e. i>100), then the circuit proceeds to Block I and estimates the time-period of the current rotation $T_i$ by using the time period data for the past n rotations of the disc, given by the following expression:

$$T_i = \sum_{k=i-1-n}^{i-1} a_k * T_k$$

Where the n coefficients $a_{i-1-n}$ through $a_{i-1}$ can be calculated beforehand (and offline) as follows:

If $T_i$ is the actual time-period of rotation i of the disc, at least squares estimate of the time-period for rotation i+1 can be calculated by minimizing the function, $$E = \sum_{k=i-1-n}^{i-1} \left( T_k^* - \sum_{j=1}^{n} a_j T_{k-j}^* \right)^2$$

with respect to each $a_j$ (j=1, ..., n)
The final expressions for the minimized "optimal" values of the coefficients aj are given by:

$$a_j = \left( \sum_k T_k^* T_{k-j}^* \right) / \left( \sum_k \sum_j T_{k-j}^* \right)$$

A good value for n with reasonable computational complexity was found to be 5.

As indicated at Block J, the circuit then calculates the "inter-HOPS" $t_i^{Hj}$ which is the time taken by the home-pulse mark to reach to scanning station j from scanning station j−1. This measure is given by the expression: $t_i^{Hj}=x^{Hj}*T_i$, j=1, ..., N Finally, at Block K, the circuit sends (i.e. transmits) HOPs to the SFSP generation circuit of each laser scanning station (for the $i^{th}$ rotation) at each instant of time given by the expression:

$$t_i^k = \sum_{j=1}^{k} t_k^{Hj}, k = 1, \dots, N$$

Thereafter, the control process returns to Block E as indicated in FIG. 14C. If at Block G, the time measure is "close" (i.e. $|T_i-T_{i-1}|<45$ uS), then the circuit proceeds directly to control Block J.

As described above, the HOP generation circuit 244'' on the control board 200 accurately predicts when the home-pulse mark on the scanning disc arrives at each scanning station and sends out a negative going pulse to each laser scanning station. In contrast, the SFP generation circuit 236A' (through 236F''') uses the HOPs to calculate when each facet/facet sector passes the laser module in each laser scanning station. Notably, an important assumption here is that the scanning motor speed does not vary too much between two consecutive rotations of the scanning disc.

Figure 14D:
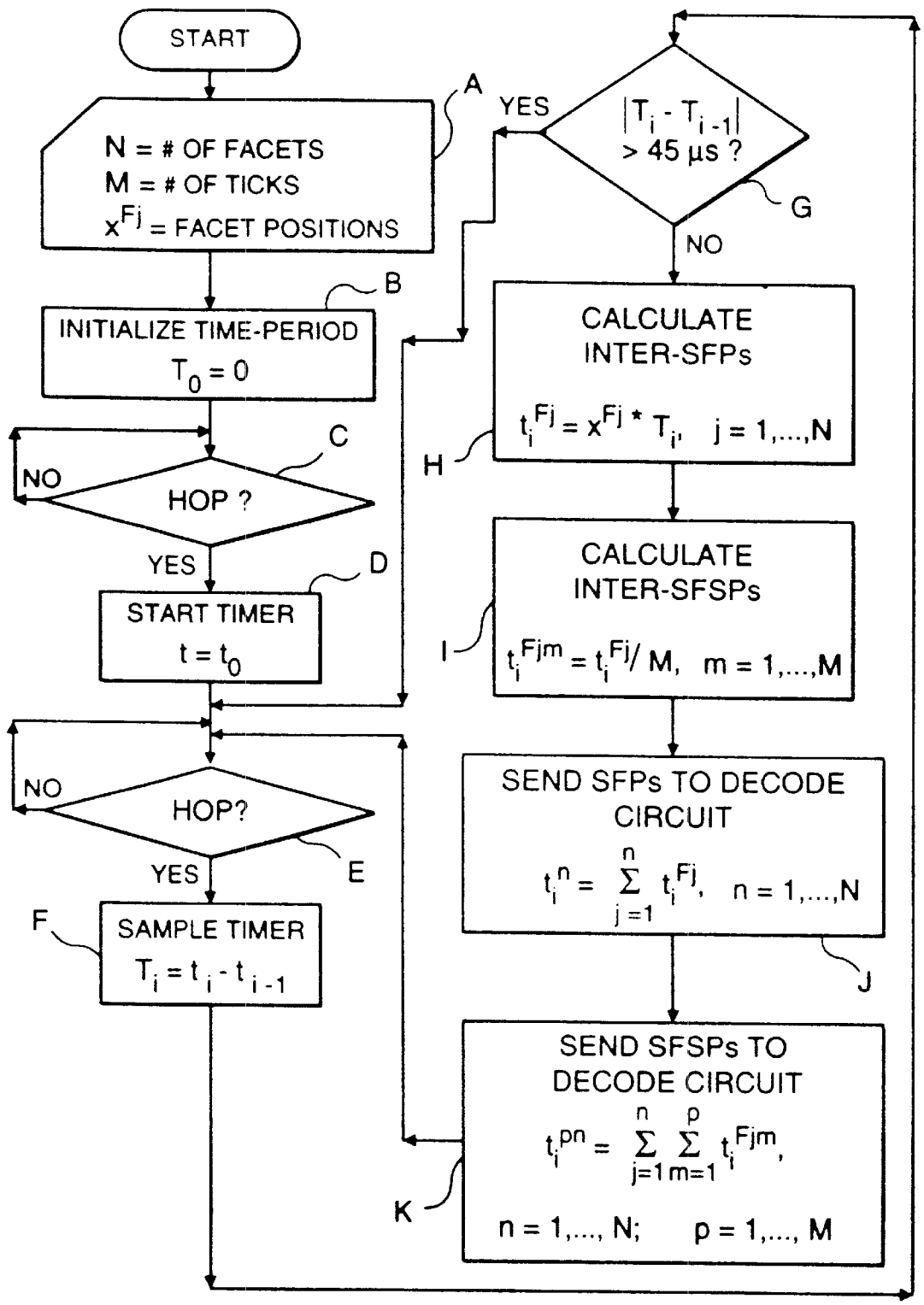
FIG. 14D is a flow chart describing the operation of the SFSP generator aboard each decode board, wherein start of facet pulses (SFPs) are automatically generated within the SFP generation module relative to the home-offset pulse (HOP) received by the control module in the SFSP generator independent of the angular velocity of the holographic scanning disc of the subsystem, and wherein start of facet sector pulses (SFSPs) are automatically generated within the SFSP generation module relative to SFPs generated by the SFP generation module, independent of the angular velocity of the holographic scanning disc of the subsystem.

As indicated at Block A in FIG. 14D, the process within the SFSP generation circuit 236A'' (through 236F''') defines the following parameters: N as the number of laser scanning facets on in the holographic scanning disk; M as the number of sectors (or "Ticks") on each facet of the scanning disc: $x^{Fj}$ as the angular width of facet j of the scanning disc; and $x^{Fjm}$ as the angular width of sector m of facet j of the scanning disc.

At Block B in FIG. 14D, the process involves initializing the time period or setting $T_0=0$. Then at Block C, the SFSP generation circuit determines whether a home pulse (HP) has been detected at its input port. Until an HP is detected, the SFSP generation circuit remains at this control block. When an HP is detected, then at Block D the SFSP generation circuit starts the timer therewithin (i.e. $t=t_0$). Then at Block E, the SFSP generation circuit determines whether another HP has been detected. As shown, the SFSP generation circuit remains at this control block until the next HP is detected. When the HP is detected, then at Block F the SFSP generation circuit samples the timer contained therewithin. The time-period of rotation of the scanning disc is calculated from two consecutive home-pulse detections as follows: $T_i=t_i-t_{i-1}$, where $T_i$ is the time-period for the $i^{th}$ rotation of the disc. Then at Block G, the SFSP generation circuit determines whether the time-period for the $i^{th}$ rotation is "close" to that for the (i−1)th rotation.

As indicated at Block G, a measure of "closeness" is defined as: $|T_i-T_{i-1}|<45$ uS. If the time measure is not close, then the time-period of rotation for the $i^{th}$ and $(j-1)^{th}$ rotation does not satisfy, $|T_i-T_{i-1}|<45$ uS, and the SFSP generation circuit returns to Block E, as indicated in FIG. 14D and looks for another HOP, without sending any SFP/SFSP. If the time-period of rotation for the $i^{th}$ and $(i-1)^{th}$ rotation does satisfy, $|T_i-T_{i-1}|<45$ uS, then the SFSP generation circuit proceeds to Block H where the time between start of facet pulses (SFSs) for facets j−1 and j of the disc for the $i^{th}$ rotation is calculated using the expression:

$t_i^{Fj}=x^{Fj}*T_i$, j=1, ..., N

Then at Block I, the SFSP generation circuit calculates the "inter-SFSPs" which are defined as the time between start of sector pulses m−1 and m for facet j, corresponding to rotation i of the disc. Such inter-HOPs are calculated by the expression:

$$t_i^{Fjm} = t_i^{Fj}/M, \quad m=1, \ldots, M$$

At Block J, the SFP generation circuit sends out (to the decode processor) SFPs at the times given by the expression:

$$t_i^n = \sum_{j=1}^n t_i^{Fj}, \quad n = 1, \ldots, N$$

Likewise, the SFSP generation circuit sends out (to the decode processor) SFSPs at the times given by the expression:

$$t_i^{pn} = \sum_{j=1}^n \sum_{m=1}^p t_i^{Fjm}, \quad n = 1, \ldots, N; \; p = 1, \ldots, M$$

Using the transmitted SFPs/SFSPs, correlated with bar code scan data at the digitizer circuit 239A (through 239F), the decode processor 240A (through 240F) can then specify the laser beam position in terms of the minimum and maximum angle of the scanning facet sector that generated the bar code scan data that has been correlated therewith using the dual-FIFO digitizer circuit 240 of the present invention. Typically, calculations for each SFP/SFSP will be performed in a pipelined fashion since the total computation time far exceeds the time between any two SFSPs. The laser beam position determination subsystem illustrated in FIGS. 14A through 14D and described hereinabove, has been built and tested in holographic tunnel scanning system employing holographic laser scanners having 5 laser scanning stations, scanning discs with 16 facets and 20 facet sectors/segments, and scanning motor speed variations within the range of between 4800 rpm and 5800 rpm. The system can handle small scanning-motor accelerations (and decelerations).

Notably, the above-described subsystem has limitations on the number of sectors (or segments) that each facet can be resolved into along the scanning disc. While a large number of sectors per facet will guarantee more accurate laser beam position information, the subsystem is limited by the computational time required to output each SFSP. Average computational times for outputting SFPs is found to be about 20 uS, and about 12 uS for SFSPs.

Figure 15A:
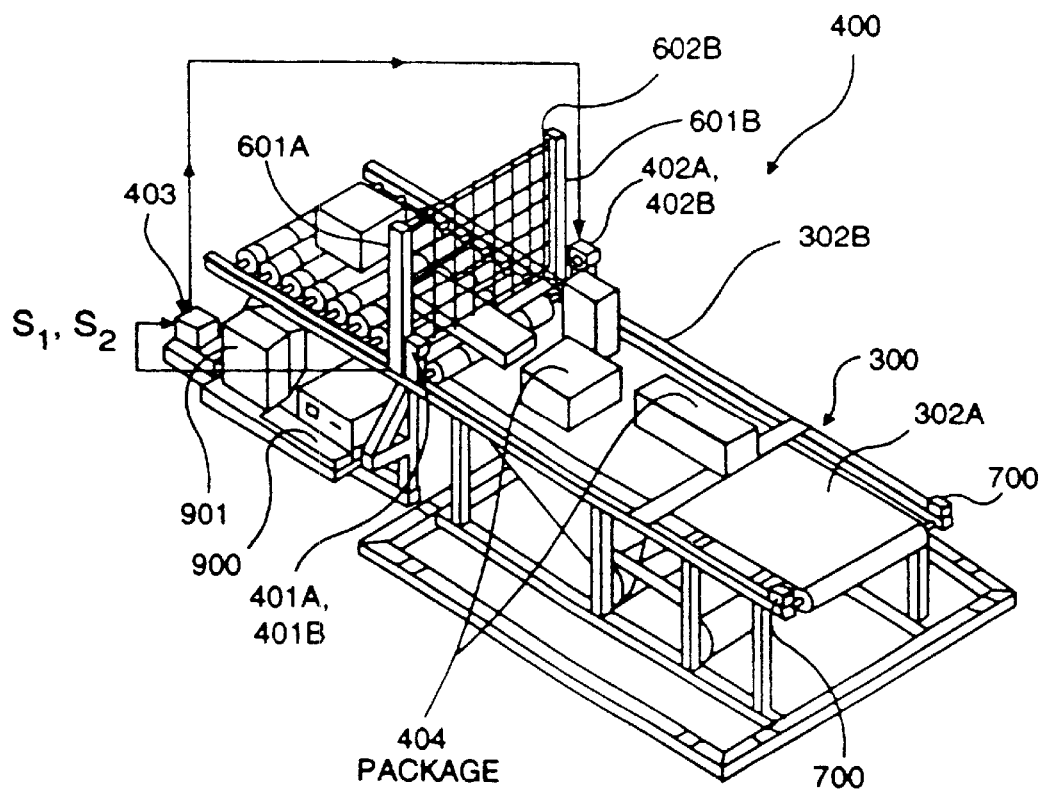
FIG. 15A is a schematic representation of the package velocity and length measurement subsystem of the present invention configured in relation to the tunnel conveyor and package height/width profiling subsystems of the system of the first illustrative embodiment of the present invention.

The Laser-based Package Velocity and Length Measurement Subsystem of the First Illustrative Embodiment of the Present Invention In FIG. 15A, the package velocity and length measurement subsystem 400 is configured in relation to the package in-tunnel indication subsystem 500 and package height/width profiling subsystem 600 of the illustrative embodiment. In FIGS. 15A and 15B1, a direct transmit/receive configuration of the dual-laser based package velocity and measurement subsystem 400 is installed at the location of the vertical and horizontal light curtains 601A, 601B and 602A, 602B, respectively, employed in the package height/width profiling subsystem 600. As shown in FIG. 15B1, subsystem 400 comprises a pair of laser diodes (D1 and D2) 401A and 401B, respectively, spaced apart by about 2 inches and mounted on one side of the conveyor belt; a pair of photo-diodes 402A and 402B spaced apart by about 2 inches and mounted on the other side of the conveyor belt, opposite the pair of laser diodes 401A and 401B; and electronic circuits, including a programmed microprocessor 403, for providing drive signals to the laser diodes 401A and 401B, and for receiving and processing the electrical data signals P1 and P2 produced by the photodiodes 402A and 402B so that information representative of the length (L) and velocity (V) of the package 404 moving on the conveyor belt is automatically computed in accordance with the flow chart shown in FIGS. 15D1 through 15D3.

Figure 5B:
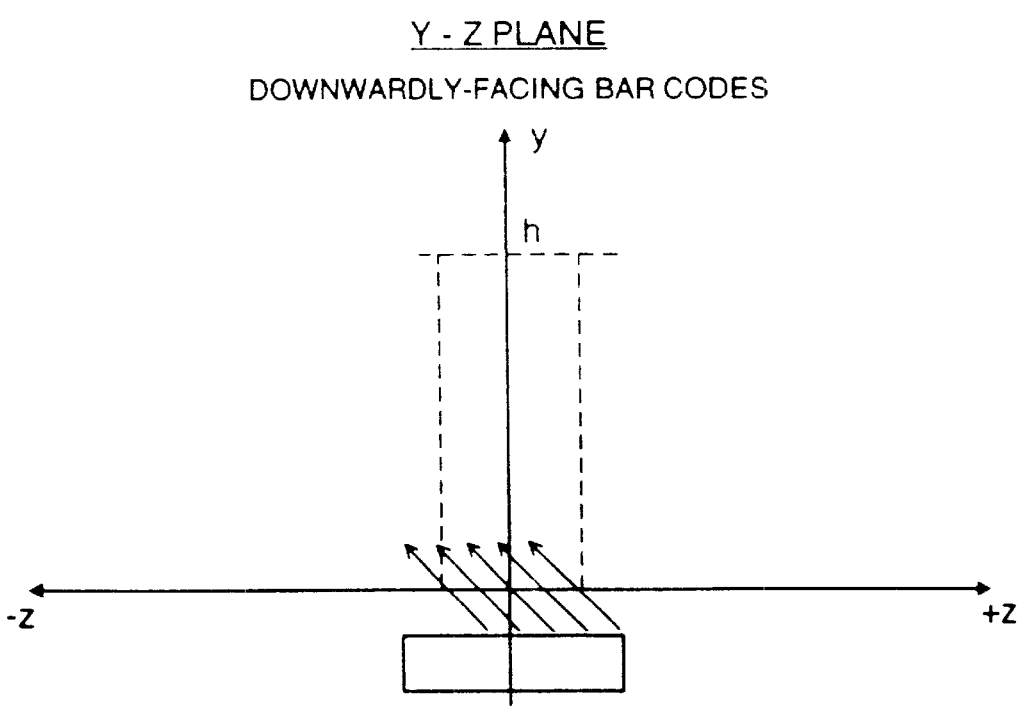
FIG. 5B is a schematic diagram showing the direction of omni-directional scanning provided in the Y-Z plane of the 3-D scanning volume of the tunnel scanning system of the first illustrative embodiment, by the bottom-mounted fixed-projection laser scanning subsystem employed therein.

In FIG. 15C1, a retro-reflection configuration of the dual-laser based package velocity and measurement subsystem 400 is shown installed at the location of the vertical and horizontal light curtains 601A, 601B and 602A, 602b, respectively, employed in the package height/width profiling subsystem 600. The dual laser diodes 405A and 405B used in the dual-laser based package velocity and length measurement subsystem 400 can be driven using the VLD driver circuitry 406A and 406B circuitry shown in FIG. 15B2. In FIGS. 15B4 through 15B5B is shown for conditioning the signals received by the photoreceivers 407A and 407B in this subsystem are shown in FIG. 15B2. The velocity (v) and length (L) of the package transported through the package velocity and measurement subsystem 400 can be computed using micro-computing system 409 carrying out the algorithm disclosed in FIGS. 15D1 through 15D3. As shown in FIG. 15C2, the laser beam transmitted from laser diode 405A is retro-reflected by retro-reflector 410A mounted on support structure 411 disposed opposite the support structure 412 supporting laser diodes 405A and 405B and photodiodes 408A and 408B. As shown in FIG. 15C1, the laser beam from laser diode 405A is reflected off retro-reflector 410A and is detected by photodiode 408A, whereas the laser beam from laser diode 405B is reflected off retro-reflector 410B and is detected by photodiode 408B. As shown in FIG. 15C1, the output signals from photodetectors 408A and 408B are provided to photoreceiving circuits 407A and 407B respectively, for processing and supply to micro-computing system 409 so that the Length (L) and Velocity (V) of the moving packages can be computed in accordance with the algorithm described in FIGS. 15D1 through 15D3. In the illustrative embodiment shown in FIGS. 15C1 and 15C2, laser diode 405A and photodiode 408A are packaged as a first laser transceiver module indicated at Block 413, whereas laser diode 405B and photodiode 408B are packaged as a second laser transceiver module 414. As shown in FIGS. 15C1 and 15C2, micro-computing system 409 comprises a microprocessor (CPU) 409A display device 409B, and keyboard 409C.

Figure 16A:
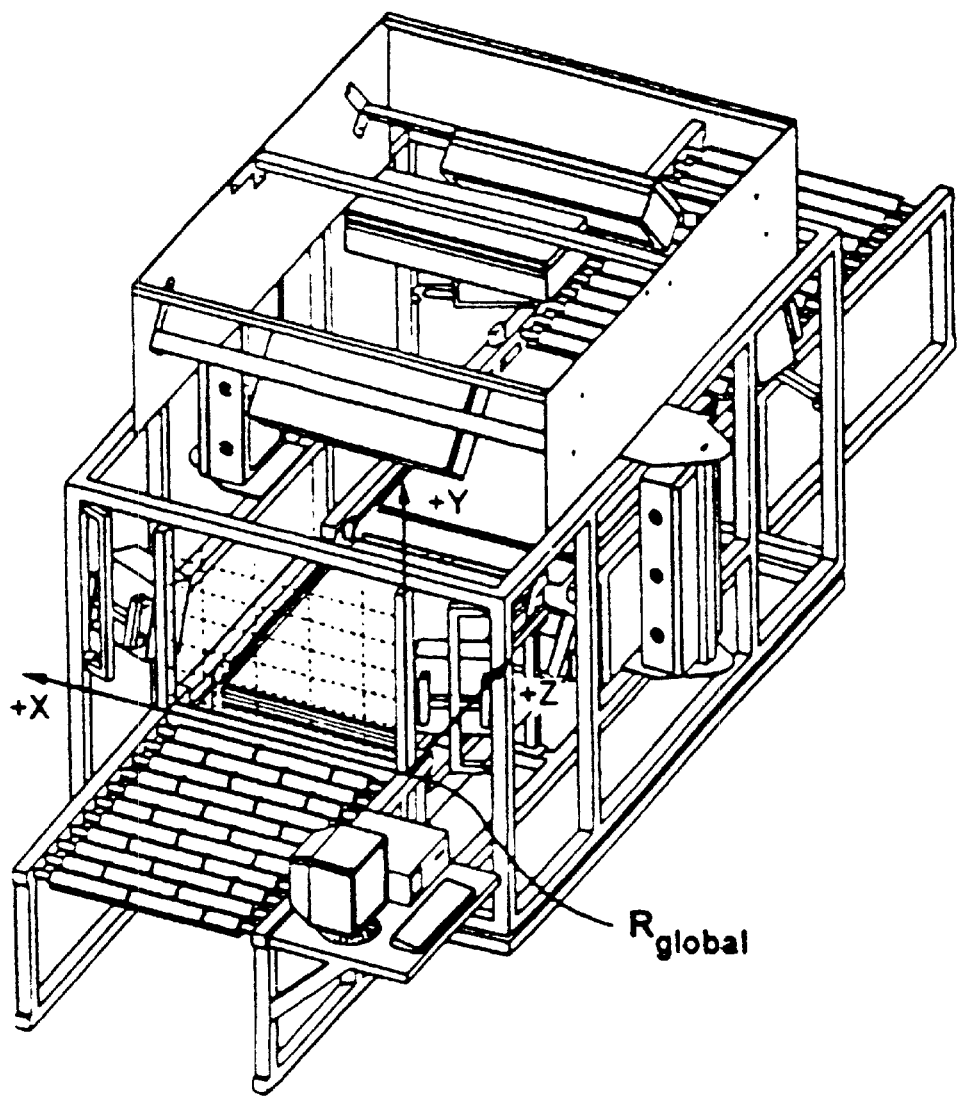
FIG. 16A is a perspective view of the automated package identification and measurement system of the present invention, showing the location of the package height/width profiling subsystem (and package-in-tunnel signaling subsystem) in relation thereto and the global coordinate reference system $R_{global}$ symbolically embedded within the structure thereof, as shown.
Figure 16B:
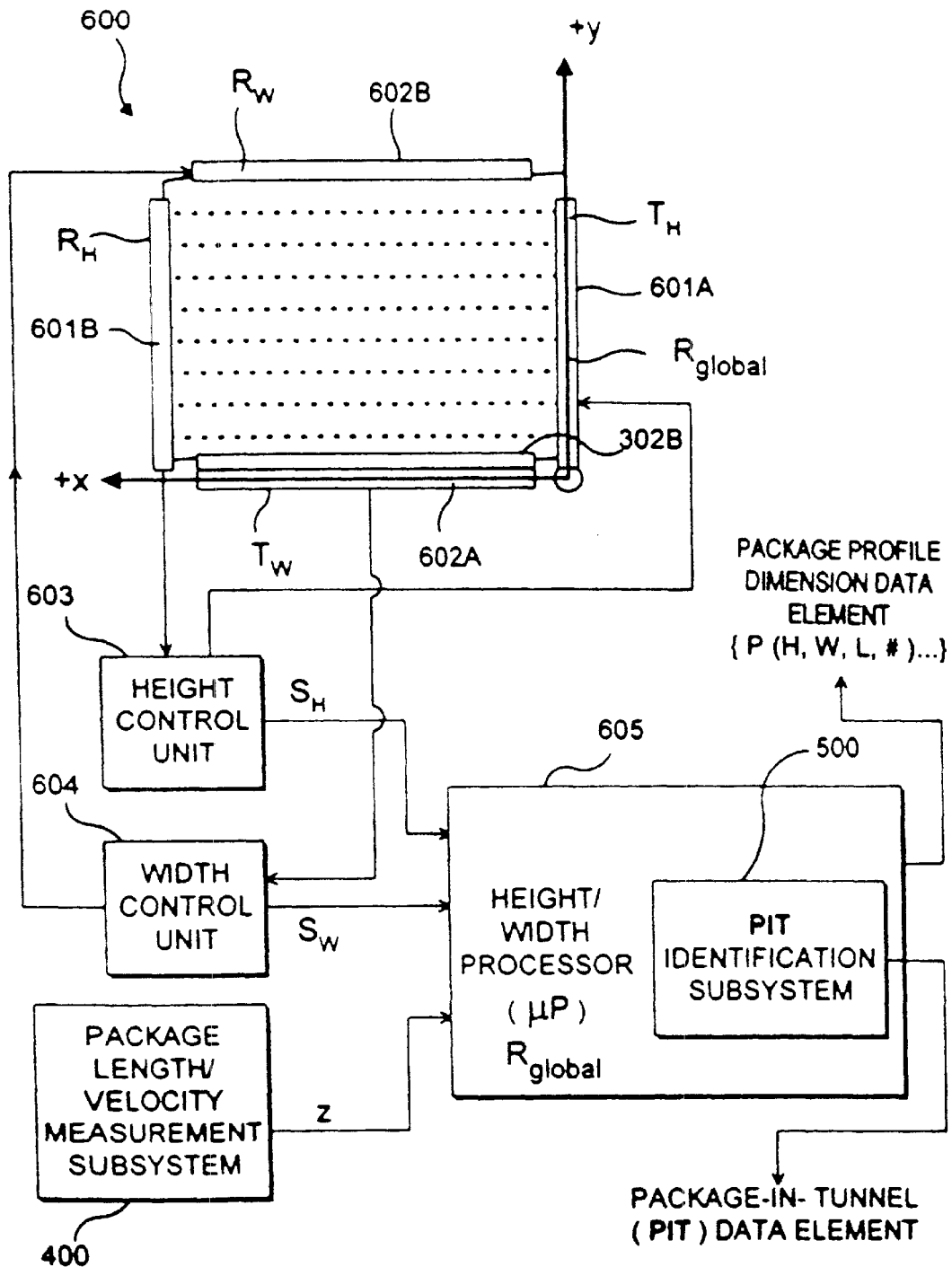
FIG. 16B is a schematic representation of the horizontally and vertically arranged light transmitting and receiving structures and subcomponents employed in the package height/width profiling subsystem in the system of the first illustrative embodiment of the present invention.

The Package Height/Width Profiling Subsystem of the First Illustrative Embodiment of the Present Invention As shown in FIGS. 16A and 16B, the global coordinate reference system $R_{global}$ is symbolically embedded within the structure of the package height/width profiling subsystem 600 (and also the package-in-tunnel signaling subsystem 500). As shown in FIG. 16B, the vertically arranged light transmitting and receiving structures 601A and 601B associated with the package height/width profiling subsystem, as well as horizontally arranged light transmitting and receiving structures 602A and 602B associated therewith, are arranged in a manner generally known in the package handling art. As shown in FIG. 16B, the vertically arranged light transmitting and receiving structures 601A and 601B are controlled by a height control unit 603, which produces, as output, a signal $S_H$ consisting of time-sampled package height data collected along the vertical extent of the scanning tunnel aperture. Similarly, horizontally arranged light transmitting and receiving structures are controlled by a width control unit 604, which produces, as output, a signal $S_w$, consisting of time-sampled package height data collected along the horizontal extent of the scanning tunnel aperture. The output data streams from height and width control units 603 and 604, and the package length/velocity measurement subsystem 400, are provided as input to an H/W data processor 605, programmed to produce (i) package profile dimension data element (e.g. height, weight, etc.) as well as (ii) a package-in-tunnel (PIT) Indication (token) Data Element for each package detected by subsystem 600.

In the illustrative embodiment, package height/width profiling subsystem 600 is realized by integrating (i) the profiler system (Model No. P101-144-200) from KORE, Inc. of Grand Rapids, Mich., and (ii) the package velocity and measurement subsystem 400 described above, and providing programmed H/W data processor 605 in accordance with the principles of the present invention. The primary function of the package height/width profiling subsystem 600 is to obtain x and y coordinates associated with the profile of each package as it passes through the light curtain arranged in the x-y plane of the global coordinate reference system $R_{global}$. The function of the package velocity and length measurement subsystem 400 is to obtain the z coordinate(s) (i.e. the run-length L) of the package relative to the global reference system, at the time of package height/width profiling (i.e. when the package has passed the dual laser beam transceiver of this subsystem). Notably, the package height/width profiling subsystem 600 carries out the function of the package-in-tunnel signaling subsystem 500. That is, each time a package is detected at the entry side of the scanning tunnel, the subsystem 600/500 automatically generates a package-in-tunnel (PIT) data element for transmission to the data element queuing, handling and processing subsystem 1000 to be described in greater detail below.

In the tunnel scanning system of the first illustrative embodiment, packages must be transported along the conveyor belt in a singulated manner (i.e. physically arranged so that one package is positioned behind the other package with a space disposed therebetween). In the event that this condition is not satisfied, the package height/width profiling subsystem 600 is designed to automatically detect that packages within the system have not been properly singulated (i.e. are arranged in a side-by-side and/or stacked configuration) and generate a control signal which causes a downstream package deflector to reroute the multiple packages through a package singulator unit and then rerouted through the scanning tunnel system without human intervention.

Figure 17A:
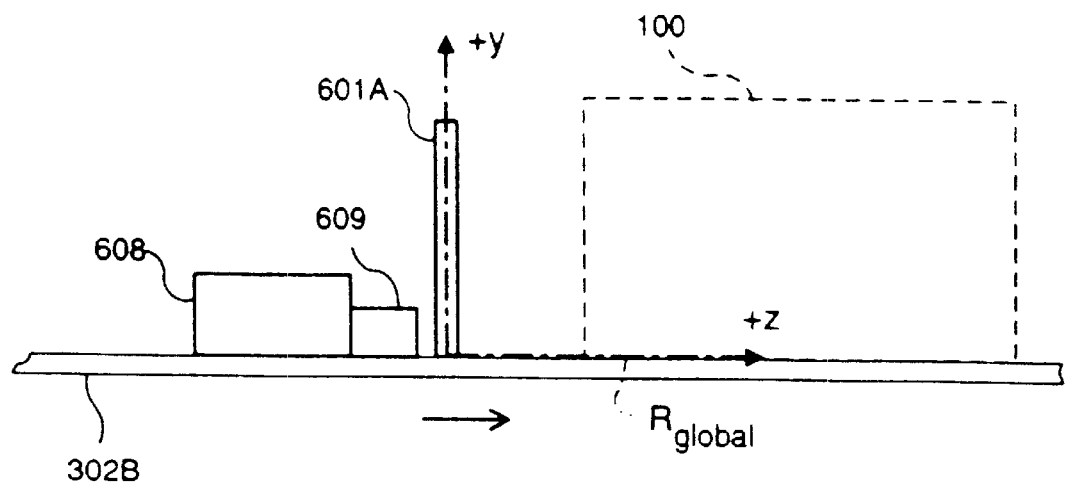
FIG. 17A is an elevated side view of a pair of packages, arranged in a side-by-side configuration, and about to be transported through the package height/width profiling subsystem of FIG. 16B.
Figure 17B:
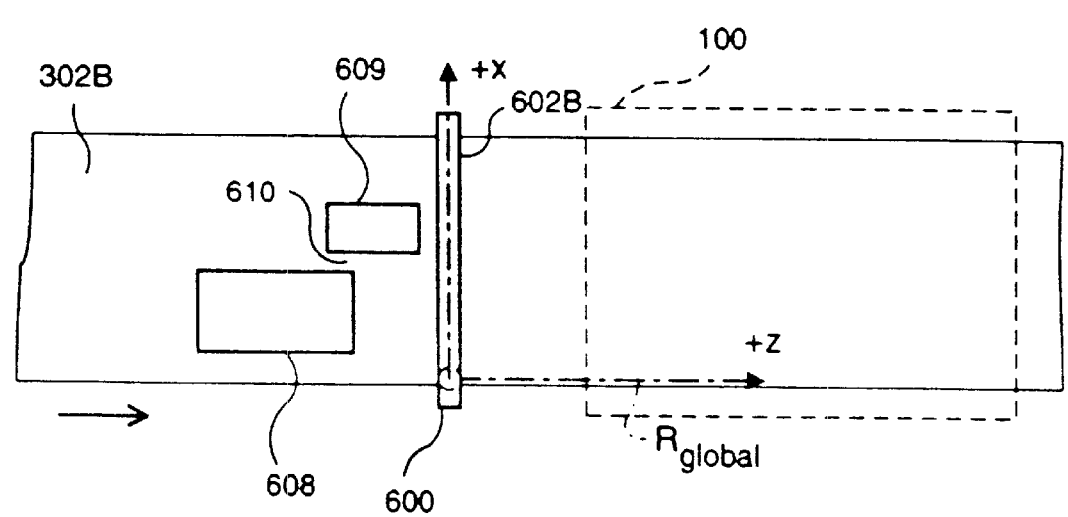
FIG. 17B is a plan view of a pair of packages, arranged in a side-by-side configuration, and about to be transported through the package height/width profiling subsystem of FIG. 16B.
Figure 17C:
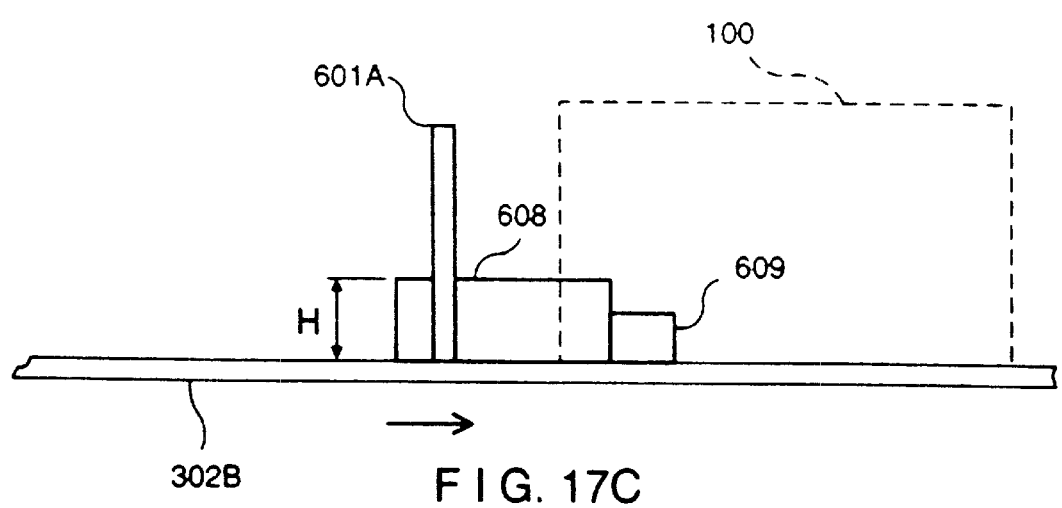
FIG. 17C is an elevated side view of a pair of packages, arranged in a side-by-side configuration, and being transported through and thus profiled by the package height/width profiling subsystem of FIG. 16B.

For example, as shown in FIGS. 17A through 17C, subsystem 600 can simultaneously detect when two boxes 608 and 609 moving along conveyor 302B, pass through non-singulated with a small gap or space 610 between the boxes. In this case, the horizontal light curtain $T_w$, $R_w$ of the package dimensioning subsystem 600 will automatically detect the gap 610.

Figure 18A:
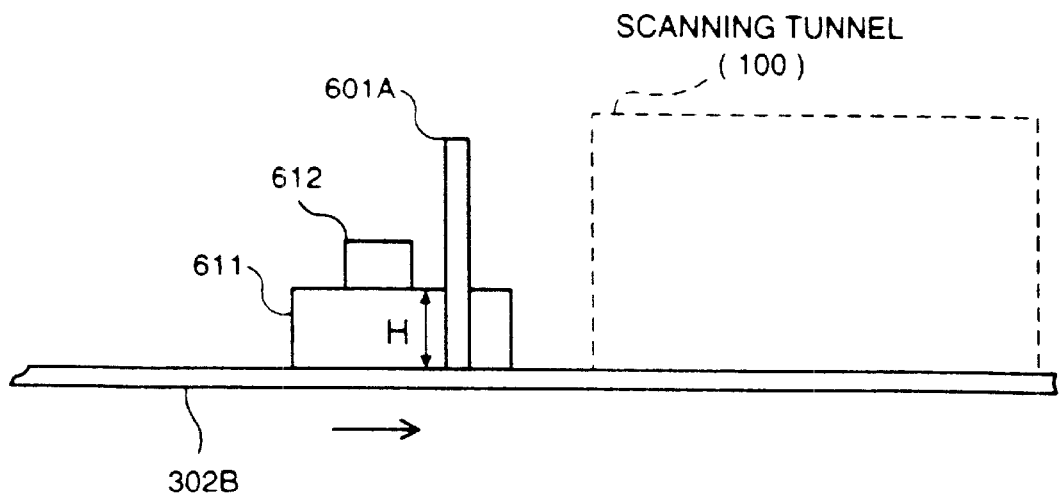
FIG. 18A is an elevated side view of a pair of stacked packages conveyed along the conveyor belt subsystem, wherein one package is being transported through and thus profiled by the package height/width profiling subsystem of FIG. 16B, while the other package has not yet been profiled by the subsystem.
Figure 18B:
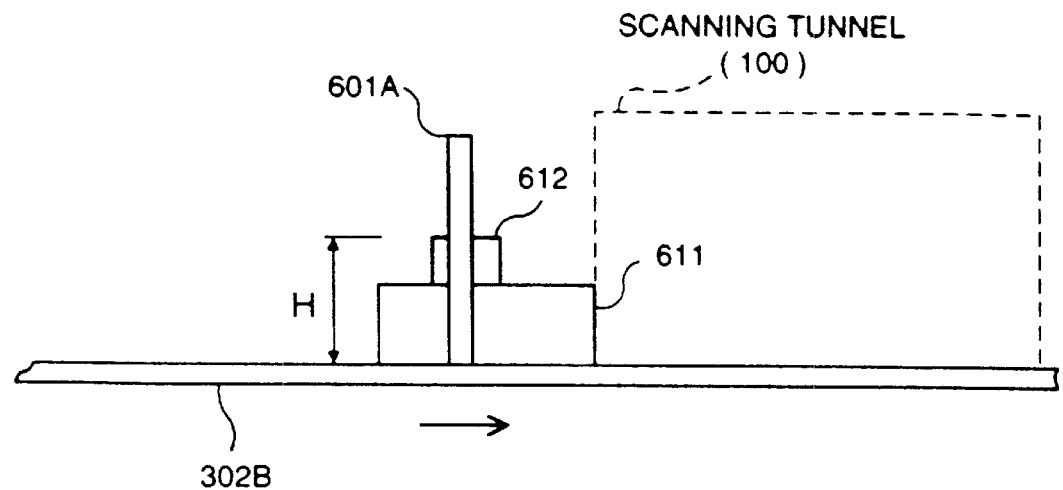
FIG. 18B is an elevated side view of a pair of stacked packages conveyed along the conveyor belt subsystem, wherein both packages are being transported through and thus profiled by the package height/width profiling subsystem of FIG. 16B.
Figure 18C:
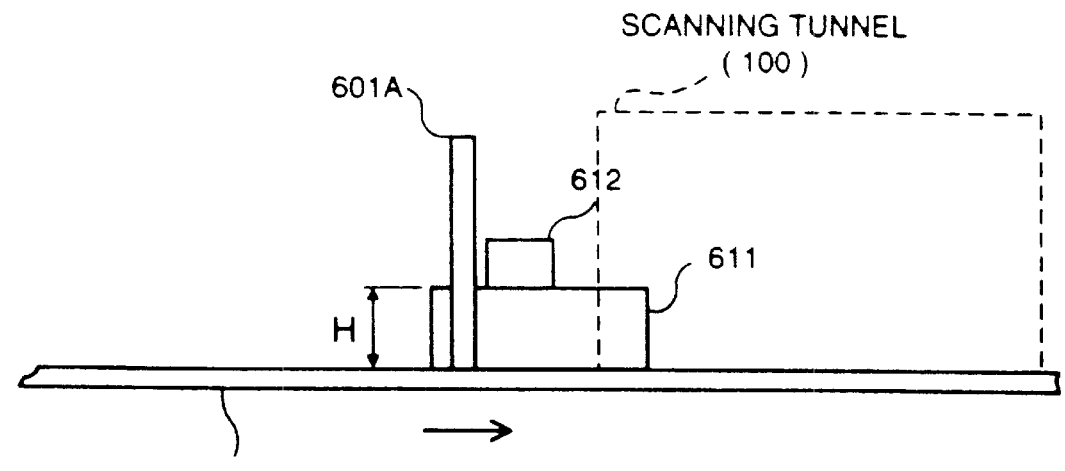
FIG. 18C is an elevated side view of a pair of stacked packages conveyed along the conveyor belt subsystem, wherein one package is being transported through and thus profiled by the package height/width profiling subsystem of FIG. 16B, while the other package has already been profiled by the subsystem.

As shown in FIGS. 18A through 18C, when the two boxes 611 and 612 are close to each other or when one is on top of the other, subsystem 600 employs a simultaneous package detection method based on package width (or height) measurements. This method of simultaneous package detection is best described by considering the width measurement taken by the subsystem over time as being expressible as $[x_1, x_2 \ldots x_n]$. According to the simultaneous package detection/tracking method hereof, the subsystem 600 employs a novel FIR digital filter system, as illustrated in FIGS. 19A through 19D.

In general, the FIR digital filter formulation has a transfer function which fits the linear operation of differentiation where $d/dt\ e^{iwt} = iwe^{iwt}$. In the frequency domain, this implies that the transfer function is of the form:

$$H(w) = iw.$$

Letting the digital filter be of the form
$Y_a = (N/Z_{K=-N})\ C_K x_{n-k}$ with coefficients $C_k = -C_k$, the transfer function can be expressed as:

$$H(w) = [2c_1 \sin w + 2c_2 \sin 2w + \ldots + 2c_N \sin Nw]i.$$

A Fourier Series approximation of the function can be expressed as:
$H(w) = \{iw\ |w| < w_c$
$\{c\ |w| > w_c$
The resulting filter will have a passband of $[o, w_c]$. This is a low pass (smoothing) differentiator for $w_c < \pi$. The filter coefficients can be computed using the formula $C_k = (a_k + ib_k)/2$ where $k=0$.

Where $a_k = v$ and $b_k = (1/\pi) I_{-\pi} \mu(w) \sin kw\, dw$
$b_k = (2/\pi) I_0^{wc} iw \sin kw\, dw$
$C_k = (-1/\pi)((\sin kw_c k) - (\omega_c \cos kw_c/k))$
Notably, $w_c$ is a value in the range of $[o, \pi\}$ when $w_c = \pi$, and also $$C_k = (1/k)(-1)^k$$

Using the above formulation, a digital filter can be designed for the simultaneous package detection method of subsystem 600. In order to take the $1^{st}$ spatial derivative, a filter having a low pass stop frequency of $f_c + o$ is used (1 is used where $w_c = 2\pi$). This will help filter out the noise during measurement operations in subsystem 600. For the 2nd derivative, an all pass band ($w_c = \pi$) is used. In order to take the $2^{nd}$ spatial derivative, an all pass band ($w_c = \pi$) filter is used. To improve the detection performance, in particular to reduce flash-alarm rate, the present invention teaches using a 3rd spatial derivative single to sample the $2^{nd}$ derivative zero crossings of the second spatial derivative signal, and thus ensure that false-alarms do not occur due to the lowering of the 1st derivative threshold in the digital filter design. The details of the FIR digital filter of the present invention will be described below with reference to FIG. 11A.

Figure 19A:
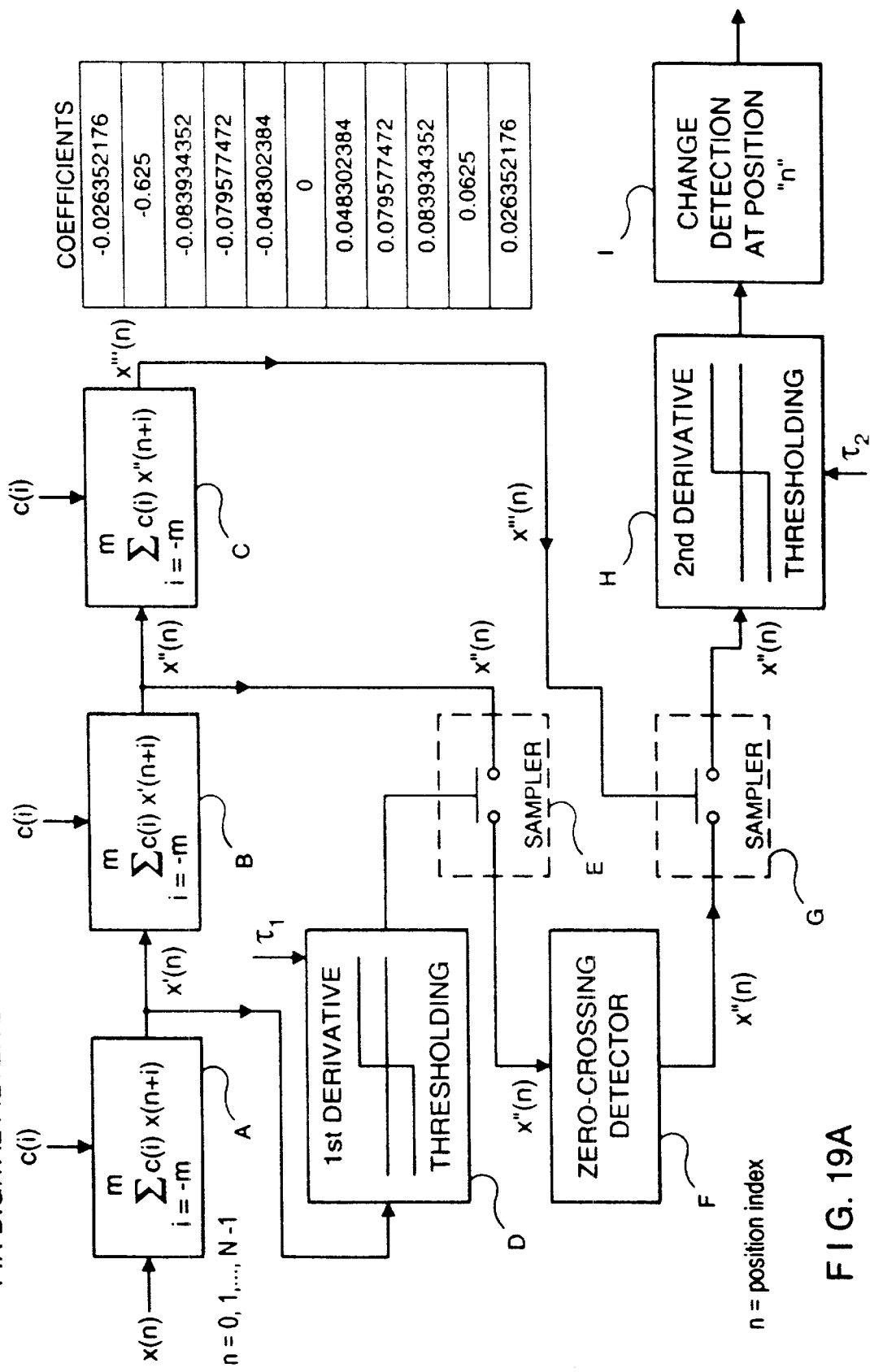
FIG. 19A is a schematic diagram of an improved third-order finite-impulse-response (FIR) digital filter system that can be used to filter data streams produced from the width and height profiling data channels of the package height/width profiling subsystem of FIG. 16B, in order to detect sudden changes in width and height profiles along the conveyor belt, within the context of a method of simultaneous package detection and tracking being carried out on a real-time basis in accordance with the principles of the present invention.

As illustrated in FIG. 19A, the digital filter method of the present invention comprises: (A) computing the $1^{st}$ spatial derivative (or gradient function) of x(n) for all spatial samples n; (B) computing the $2^{nd}$ spatial derivative of x(n) for all samples n; (C) computing the $3^{rd}$ spatial derivative of x(n) for all spatial samples n; (D) determine whether the 1st spatial derivative signal x'(n) is greater than the threshold $\tau_1$; (E) using the thresholded 1st spatial derivative signal x'(n) to sample the $2^{nd}$ spatial derivative signal x'(n); (F) detecting the zero-crossings of x"(n) to produce a zero-crossing signal; (G) sampling the detected zero-crossing signal using the $3^{rd}$ spatial derivative signal x'"(n) to produce a sampled zero-crossing signal; (H) thresholding the sampled zero-crossing signal against the threshold $\tau_2$ to detect sudden changes in the value of x(n); and (I) analyzing the changes in the value of x(n) over a number of time sampling periods in order to determine whether packages are configured in a side-by-side, stacked or singulated manner.

In FIG. 19B, the digital filter method the present invention is represented in a flow chart, indicating the particular operations carried out in a real-time sequential manner.

As indicated at Block A in FIG. 19B, a sampled position signal x(n) is obtained where n=0, 1, 2, ..., N−1; the digital filter coefficients c[i] are selected; and thresholds $\tau_1$ and $\tau_2$ are obtained using empirical methods. At Block B in FIG. 19B, the $1^{st}$ spatial derivative of x(n), denoted x'(n), is computed for all samples n. At Block C in FIG. 19B, the $2^{nd}$ spatial derivative of x(n), denoted x"(x), is computed for all samples n. At Block D in FIG. 19B, the $3^{rd}$ spatial derivative of x(n), denoted x'"(x), is computed for all samples n. At Block E in FIG. 19B, the position index n is set to zero. At Block F in FIG. 19B, the filter determines whether the 1st spatial derivative signal x'(n) is greater than the threshold $\tau_1$, whether sign (x"[x])≠sign (x"[n−1]) and whether x"[n]>$\tau_2$. If any one of these conditions are not satisfied, then at Block G the position index n is incremented by 1 (i.e. n=n+1) and then, at Block H, a check is made to determine whether the position index n is less than N. If not, then at Block I, no change is detected. If n<N, then the process flow returns to Block F. If at Block F, all three of the conditions listed therein are satisfied, then at Block J a change is detected at position n across the width of the conveyor belt.

Notably, the digital FIR filter system illustrated in FIGS. 19A and 19B is used as a basic filtering module within H/W Data Processor 605 of FIG. 16B. During the operation of the system of the present invention, the H/W Data Processor 605 carries out the simultaneous package detection process of the present invention to be described hereinbelow with reference to FIGS. 19C and 19D.

In general, there are two basic scenarios to consider when carrying out the simultaneous package detection method of the present invention: (1) when one box is disposed beside another, as shown in FIGS. 17A through 17C; and (2) when one box is disposed on top of another as shown in FIGS. 18A through 18C. The cases of more than 2 boxes can be easily extended from these two box scenarios.

Considering the side-by-side boxes case, shown in FIGS. 17A through 17C, it is noted that the light transmitting and receiving structures ($T_w$, $R_w$) 602A and 602B, respectively, are used to measure the width of the packages when they move through the light curtain structure of FIG. 16B, as it is often referred to by those skilled in the art. In the case of side-by-side boxes, the measurement of package width will change while packages are passing through the light curtain structure. The method of simultaneously detecting packages arranged in a "side-by-side" configuration is illustrated in the flow chart of FIG. 19C.

Figure 19C:
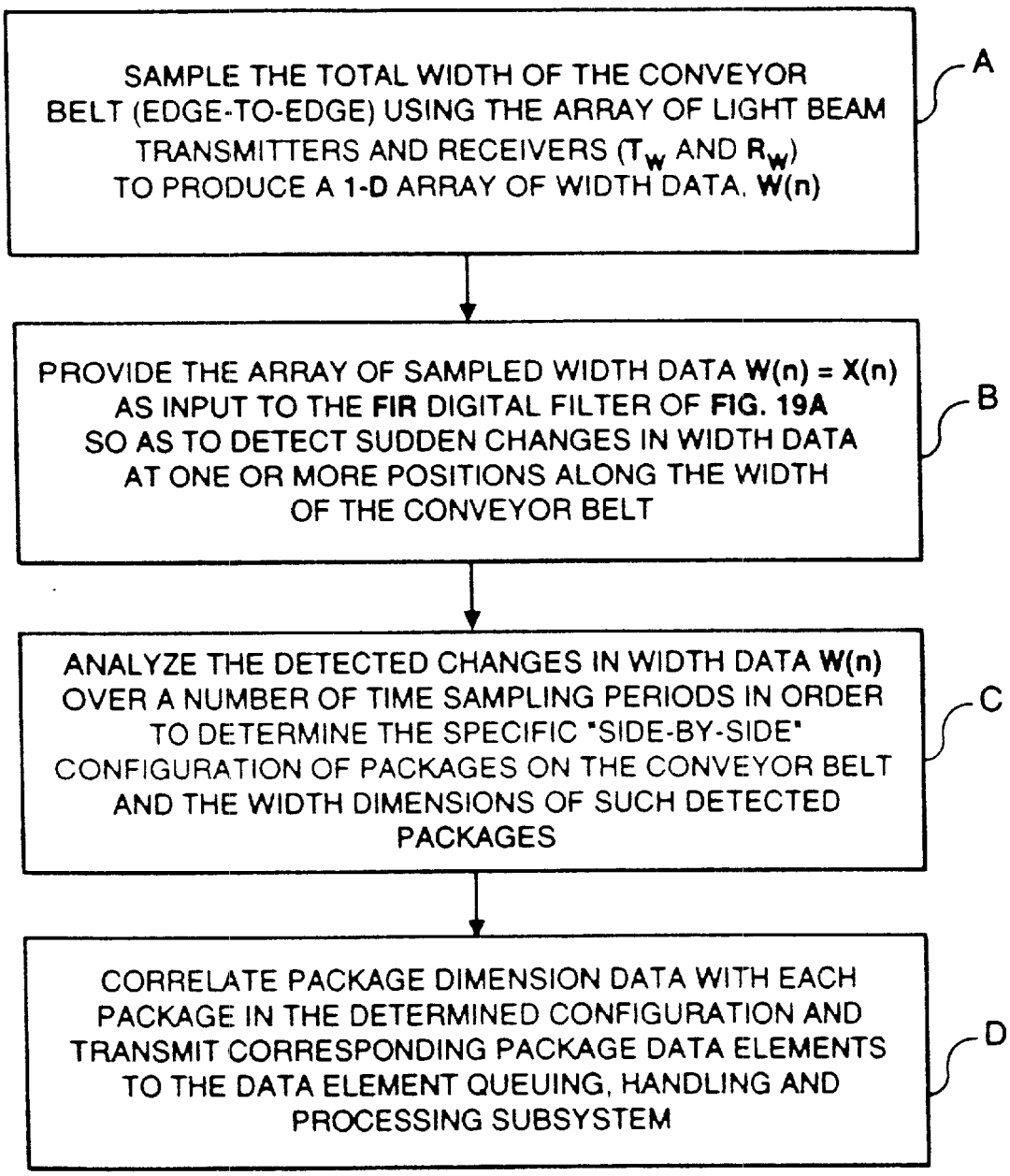
FIG. 19C is a flow chart describing the method of simultaneously detecting "side-by-side" configurations of packages along a conveyor belt using the FIR digital filter system of FIG. 19A to detect sudden changes in the width data streams produced by the package height/width profiling subsystem of FIG. 16B.

As indicated at Block A in FIG. 19C, the first step in the method involves obtaining an array of N sampled width measurements W(n) along the total width of the conveyor belt (i.e. edge to edge) as the conveyor belt with packages thereon is transported through the light curtain shown in FIG. 16B. Collection of the array of width data elements, denoted by W(n) for n=0, 1, 2, . . . , N−1, is achieved using the array of light beam transmitters and receivers 602A and 602B, shown in FIG. 16B. Naturally, the spatial sampling rate (and thus the number and position of the N samples along the conveyor belt) is selected so that enough width measurements are taken and gaps between packages can be detected.

As indicated at Block B in FIG. 19C, second step in the method involves providing the array of sampled width data W(n) as input to the digital filter system of FIG. 19A so as to detect sudden changes in width data at one or more positions along the width of the conveyor belt. The first spatial derivative of the discrete set of width samples W(n) is defined as W'(n)=W(n)−W(n−1) where n=1, 2, . . . N. The second spatial derivative of the discrete set of height samples W(n) is defined as W"(n)=W'(n) −W'(n−1) where n=1, 2, . . . N. The third spatial derivative of the discrete set of width samples W(n) is defined as W'"(n)=W"(n)−W"(n−1) where n=1, 2, . . . N. The digital filter system of FIG. 19A differentiates the sudden changes in values of W(n) from noise (e.g. measurement errors and slight irregularities in the box shape). As illustrated at Block F in FIG. 19B, the decision rules for the simultaneous detection method are:

(1) determine that the boxes are "side-by-side" if W'(n) >$\tau_1$, sign(W"[n])≠sign(W"[n−1]) and W"(n)>$\tau_2$, for any n; and (2) otherwise, determine that the boxes are singulated.

Notably, sign function indicated by the symbol () denotes the algebraic sign function which is used to find zero crossings in the 2nd spatial derivative signal W"(n). Simulations show that the above decision rules are work well with regard to noise, and always correctly locate abrupt changes in width data, which is necessary to determine that boxes are arranged in a side-by-side configuration.

As indicated at Block C in FIG. 19C, the third step of the method involves analyzing the detected changes in the width data array W(n) for n=0, 1, 2, . . . , N−1 for a number of time sampling periods, so as to determine the specific "side-by-side" configuration of packages on the conveyor belt.

As indicated at Block D in FIG. 19C, the fourth and last step of the method involves correlating the package dimension data (if collected) with each package in the detected "side-by-side" configuration, and transmitting a special "multiple-in-tunnel" package indicating data element (e.g. MPIT data element) to the data element queuing, handling and processing subsystem 1000 indicates that within subsystem 1000 there is either an irregular-shaped package in the tunnel or multiple side-by-side packages in the tunnel. Subsystem 1000 can then generate a control signal to cause a downstream package router to route such multiple packages through a package singulation unit, and then once again through the scanning tunnel system without human intervention. Considering the "stacked" boxes case, shown in FIGS. 18A through 18C, it is noted that the light transmitting and receiving structures ($T_w$, $R_w$) 601A and 601B, respectively, are used to measure the height of the packages when they move through the light curtain structure shown in FIG. 16B. In the case of stacked boxes, the measurement of the package height will change while packages are passing through the light curtain. The method of simultaneously detecting packages arranged in a "stacked" configuration is illustrated in the flow chart of FIG. 19D.

Figure 19D:
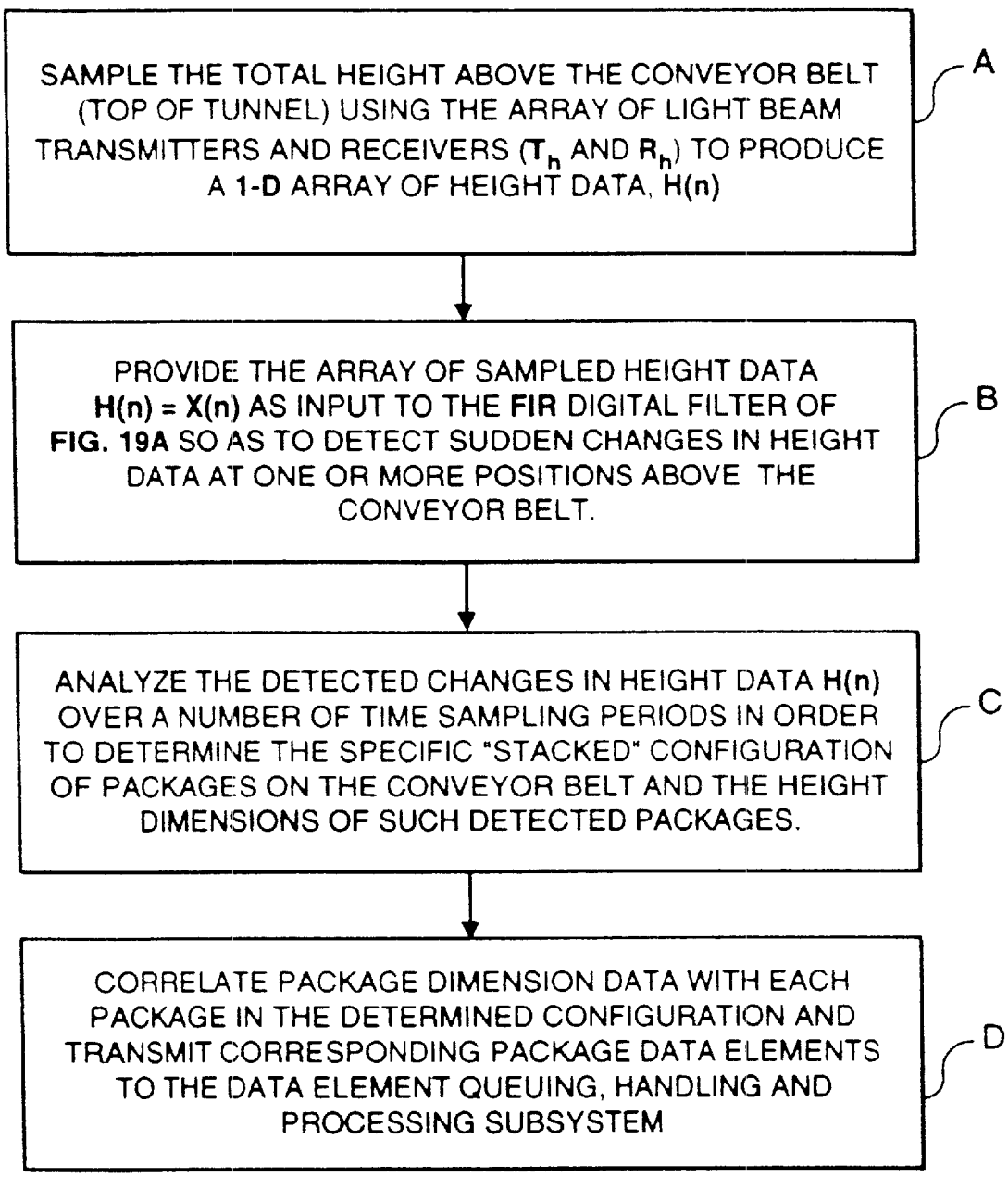
FIG. 19D is a flow chart describing the method of simultaneously detecting "stacked" configurations of packages along a conveyor belt using the FIR digital filter of FIG. 19A to detect sudden changes in the height data streams produced by the package height/width profiling subsystem of FIG. 16B.

As indicated at Block A in FIG. 19D, the first step in the method involves obtaining an array of N sampled height measurements H(n) along the total height of the tunnel aperture (i.e. top to bottom) as the conveyor belt with packages thereon is transported through the light curtain structure shown in FIG. 16B. Collection of the array of height data elements, denoted by H(n) for n=0, 1, 2, . . . , N−1, is achieved using the array of light beam transmitters and receivers 601A and 601B, shown in FIG. 16B. Naturally, the sampling rate (and thus the position of the N samples above the conveyor belt) is selected so that enough height measurements are taken.

As indicated at Block B in FIG. 19D, the second step in the method involves providing the array of sampled height data H(n) as input to the digital filter system of FIG. 19A so as to process the data array(s) and detect sudden changes in height data at one or more positions above the height of the conveyor belt. The first spatial derivative of the discrete set of height samples H(n) is defined as H'(n)=H(n)−H(n−1) where n=1, 2, . . . , N. The second spatial derivative of the discrete set of height samples H(n) is defined as H"(n)=H'(n)−H'(n−1) where n=1, 2, . . . N. The third spatial derivative of the discrete set of height samples H(n) is defined as H'''(n)=H''(n)–H''(n–1) where n=1, 2, ... N. The digital filter system of FIG. 19A differentiates the sudden changes in values of H(n) from noise (e.g. measurement errors and slight irregularities in the box shape). As illustrated at Block F in FIG. 19B, the decision rules for the simultaneous detection method operating on sampled height data, are:

(1) determine that the boxes are "stacked" if H(n)>$\tau_1$, sign(H''[n])≠sign(H''[n–1]) and H''(n)>$\tau_2$, for any n; and (2) otherwise, determine that the boxes are singulated.

Notably, sign function indicated by the symbol () denotes the algebraic sign function which is used to find zero crossings in the 2nd spatial derivative signal H''(n). Simulations show that the above decision rules work well with regard to noise, and always correctly locate abrupt changes in height data, which is necessary to determine that boxes are arranged in a stacked configuration.

As indicated at Block C in FIG. 19D, the third step of the method involves analyzing the detected changes in the height data array H(n) for n=0, 1, 2, ..., N–1 for a number of time sampling periods, so as to determine the specific "stacked" configuration of packages on the conveyor belt.

As indicated at Block D in FIG. 19D, the fourth and last step of the method involves correlating the package dimension data (if collected) with each package in the detected "stacked" configuration, and transmitting corresponding package indicating data elements (e.g. PIT data elements) to the data element queuing, handling and processing subsystem 1000. As will become apparent hereinafter, these PIT data elements enable detected packages to be tracked within the overall system and eventually linked up with corresponding package identification data acquired by the bar code symbol reading subsystems employed within the Tunnel Scanning System.

Using the package detection method described above, any arrangement of non-singulated boxes on the conveyor belt can be automatically detected and successfully tracked.

The sampling rate for the above described digital filtering method, denoted by T, can be determined as follows: Let the speed of the box/conveyor be denoted by υ, and the minimum tolerance for package separation be denoted as D. Then considering the necessary data points to perform the second spatial derivative, the following expression must hold true:

$$T \neq 3D\upsilon$$

Using this rule for a 600 ft/min. conveyor belt, if the minimum tolerance is 50 mm (2 in.), then the sampling period is computed to be about 5 ms, which corresponds to a sampling frequency of about 200 Hz.

The In-Motion Package Weighing Subsystem of the First Illustrative Embodiment of the Present Invention As shown in the FIGS. 20A and 20B, the in-motion package weighing subsystem 750 is preferably arranged about the package height/width profiling subsystem 600. As shown, the in-motion weighing subsystem 750 comprises: a scale platform 751 integrated with the conveyor subsystem 300, for producing analog or digital weight signals indicative of the weight of a package(s) 754 moving across the scale platform 751; a filtering circuit 752 for filtering the analog or digital weight signals in order to remove noise components and artifacts therefrom; and a signal processor 753 for processing the filtered weight signals in order to produce a digital word representative of the measured weight of the package. Notably, the in-motion weighing subsystem of the illustrative embodiment can be realized using the model 9480 EXPRESSWEIGHT™ In-Motion Variable Box and Package Weighing System from Mettler-Toledo, Inc. of Worthington, Ohio.

Figure 21:
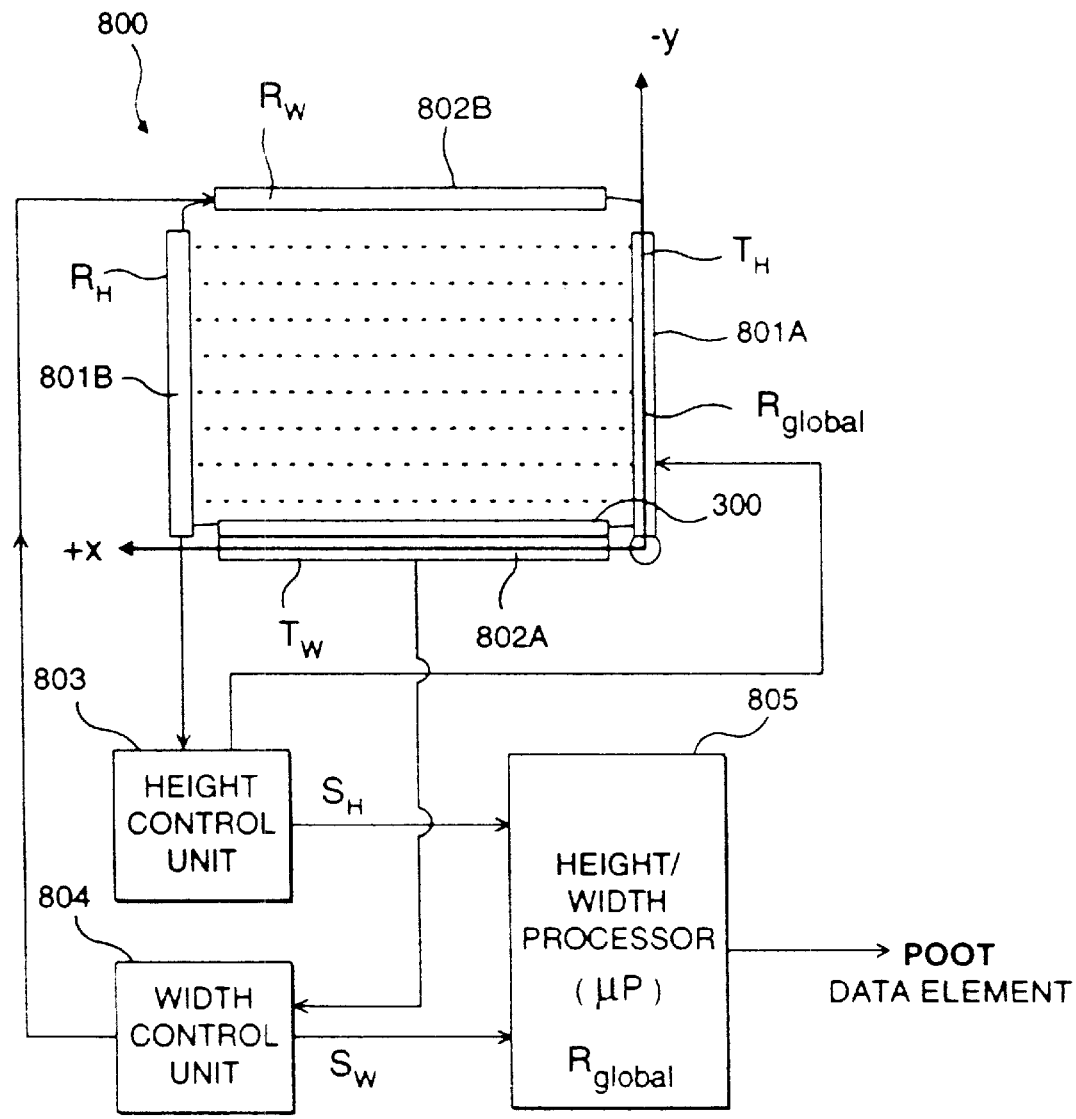
FIG. 21 is a schematic diagram of the package-in-tunnel signaling subsystem employed in the automated package identification and measuring system of the first illustrative embodiment of the present invention.

The Package-In-Tunnel Signaling Subsystem of the First Illustrative Embodiment of the Present Invention The package-in-tunnel indication subsystem 500 can be realized in a variety of ways. One way shown in FIG. 21, is to use a light transmitting/receiving structure as employed in package identification and measuring system 600, and generating a package-out-of-tunnel (POOT) data element upon detecting the exit of each package from the scanning tunnel. As shown in FIG. 21, the vertically arranged light transmitting and receiving structures 801A and 801B, as well as horizontally arranged light transmitting and receiving structures 802A and 802B, are arranged in a manner generally known in the package handling art. As shown in FIG. 21, the vertically arranged light transmitting and receiving structures 801A and 801B are controlled by a height control unit 803, which produces, as output, a signal $S_H$ consisting of time-sampled package height data collected along the vertical extent of the scanning tunnel aperture, similarly, horizontally arranged light transmitting and receiving structures 803 are controlled by a width control unit 804, which produces, as output, a signal $S_w$ consisting of time-sampled package height data collected along the horizontal extent of the scanning tunnel aperture. The output data streams from height and width control units 803 and 804, and the package length/velocity measurement subsystem 400, are provided as input to an H/J data processor 805, programmed to produce a package-out-of-tunnel (POOT) Indication (token) Data Element for each package detected by 800. In the illustrative embodiment, subsystem 800 is realized by integrating (i) the profiler system (Model No. P101-144-200) from KORE, Inc. of Grand Rapids, Mich., and providing programmed H/W data processor 805 which includes the digital filter system described in FIGS. 19A through 19D in order to simultaneously detect side-by-side configured packages, stacked packages, as well as singulated packages in the manner described in great detail hereinabove.

As shown in FIG. 21, the best location for this subsystem is at the exit plane of the scanning tunnel. The POOT data element is provided to the data element queuing, handling and processing subsystem 1000, in the manner similar to that of all other data elements generated from the package height/width profiling subsystem 600, scanning units associated with the tunnel scanning subsystem, and package-in-tunnel indication subsystem 500.

Figure 22B:
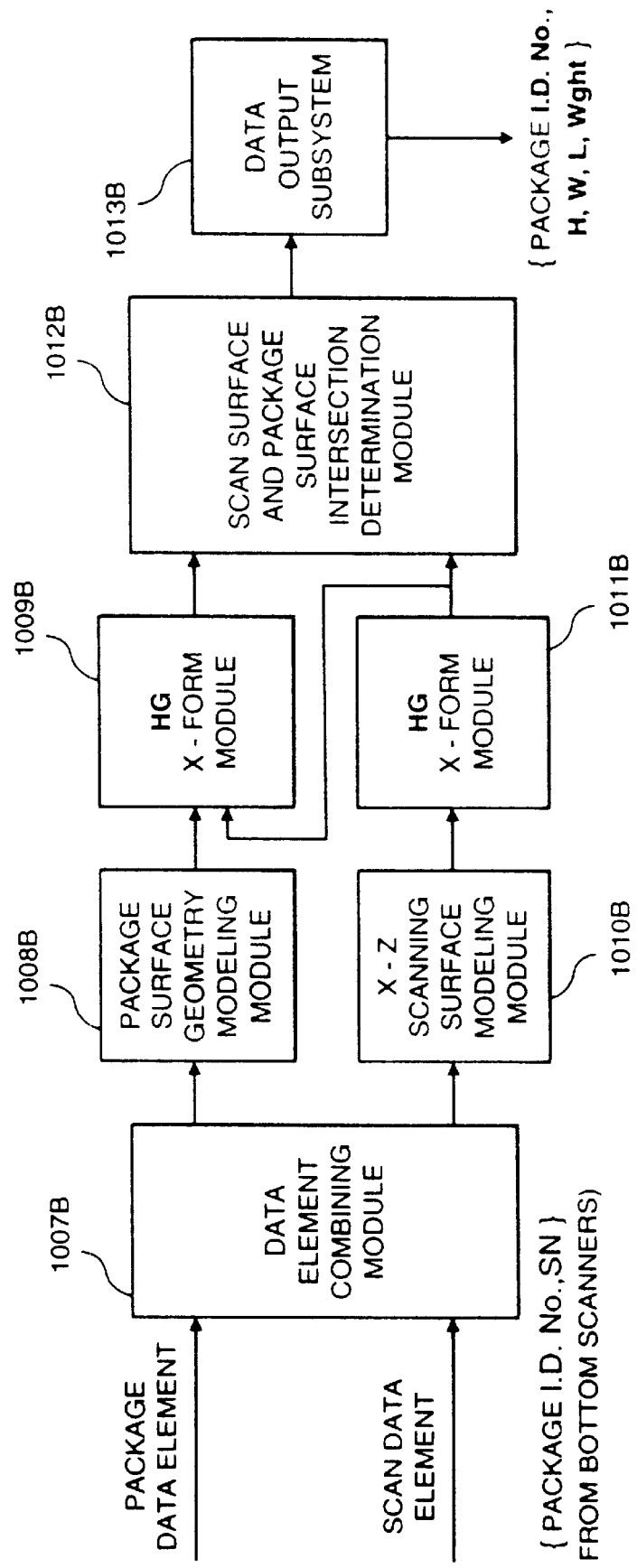

The Data Element Queuing, Handling and Processing Subsystem of the First Illustrative Embodiment of the Present Invention In FIGS. 22A1 and 22B, the structure and function of data element queuing, handling and processing subsystem 1000 is shown in greater detail. As shown in FIG. 22A1 and 22A2, all data elements entering subsystem 1000 are provided to an I/O subsystem 1001, the output port of which is connected to a data element time-stamping unit 1003 that is controlled by a timing/control unit 1002. In the illustrative embodiment, there are four possible types of data elements that might be loaded into the system event queue 1004, realized as a FIFO data structure known in the computing art. As shown in FIGS. 22A1 and 22A2, the four data element types manages by the subsysyem 1000 of the illustrative embodiment are: package (measurement) data elements; scan beam (i.e. package identification) data elements; package-in-tunnel (PIT) data elements; and package out-of-tunnel (POOT) data elements.

As shown in FIGS. 22A1 and 22A2, the data element queuing, handling and processing subsystem 1000 further comprises a number of other modules, namely: a moving package tracking queue 1005, realized as a FIFO data structure known in the computing art, for queuing package data elements, package-in-tunnel (PIT) data elements and package out-of-tunnel (POOT) data elements; and a data element analyzer 1006 (e.g. programmed microprocessor and associated memory structures) for reading the different types of data elements from the output of the system event queue 1004 and analyzing and handling the same according to the Data Element Handling Rules set forth in FIGS. 23A1 and 23A2.

As shown in FIGS. 22A1 and 22A2, scan beam data elements generated from "holographic type" laser scanning subsystems must be processed using a system of data processing modules. As shown in FIGS. 22A1 and 22A2, this system of data processing modules comprises a data element combining module 1007A for combining (i) each scan beam data element generated from "holographic-type" laser scanning subsystems and accessed from the system event queue 1004 with (ii) each and every package data element in the moving package tracking queue 1005, so as to produce a plurality of combined data element pairs; a package surface geometry modeling module 1008A for generating a geometrical model for the package represented by the package data element in each combined data element pair produced by the data element combining module 1007A; a homogeneous transformation (HG) module 1009A for transforming (i.e. converting) the coordinates of each package surface geometry model produced at the "dimensioning position" in the global coordinate reference frame $R_{global}$, into package surface geometry model coordinates at the "scanning position" within the scanning tunnel (i.e. displaced a distance z from the package dimensioning position); a scan beam geometry modeling module 1010A for generating a geometrical model for the laser scanning beam represented by the scan beam data element in each combined data element pair produced by the data element combining module 1007A; a homogeneous transformation (HG) module 1011A for transforming (i.e. converting) the coordinates of each scanning beam geometry model referenced to the local frame of reference symbolically embedded within the holographic laser scanning system, into scanning beam geometry model coordinates referenced to the global coordinate reference $R_{global}$ at the "scanning position" within the scanning tunnel; a scan beam and package surface intersection determination module 1012A for determining, for each combined data element pair produced from the data element combining module, whether the globally-referenced scan beam model produced by the HG transformation module 1009A intersects with the globally-referenced package surface model produced by the HG transformation module 1011A, and if so, then the data output subsystem 1013A produces, as output, package identification data, package dimension data (e.g. height, width data etc.), and package weight data, for use by auxiliary systems associated with the tunnel scanning system of the present invention.

As shown in FIGS. 22 and 22A, scan beam data elements generated from "non-holographic type" laser scanning subsystems must be processed using a different system of data processing modules than that shown in FIGS. 22A1 and 22A2. As shown in FIG. 22B, this system of data processing modules comprises: a data element combining module 1007B (similar to module 1007A) for combining (i) each scan beam data element generated from the "non-holographic-type" bottom-located laser scanning subsystems and accessed from the system event queue 1004 with (ii) each and every package data element in the moving package tracking queue 1005, so as to produce a plurality of combined data element pairs; a package surface geometry modeling module 1008B (similar to module 1008A) for generating a geometrical model for the package represented by the package data element in each combined data element pair produced by the data element combining module 1007B; a homogeneous transformation (HG) module 1009B (similar to module 1009A) for transforming (i.e. converting) the coordinates of each package surface geometry model produced at the "dimensioning position" in the global coordinate reference frame $R_{global}$, into package surface geometry model coordinates at the "scanning position" within the scanning tunnel (i.e. displaced a distance z from the package dimensioning position); a X-Z scanning surface (geometry) modeling module 1010B for generating a geometrical model for the laser scanning surface represented by the scan beam data element in each combined data element pair produced by the data element combining module 1007B; a homogeneous transformation (HG) module 1011B for transforming (i.e. converting) the coordinates of each x-z scanning surface geometry model referenced to the local frame of reference symbolically embedded within the non-holographic bottom laser scanning subsystem, into scanning beam geometry model coordinates referenced to the global coordinate reference $R_{global}$ at the "scanning position" within the scanning tunnel; a scan beam and package surface intersection determination module 1012B for determining, for each combined data element pair produced from the data element combining module, whether the globally-referenced scanning surface model produced by the HG transformation module 1009B intersects with the globally-referenced package surface model produced by the HG transformation module 1001B, and if so, then the data output subsystem 1013B produces, as output, package identification data, package dimension data (e.g. height, width data etc.), and package weight data, for use by auxiliary systems associated with the tunnel scanning system of the present invention.

Having described the overall structure and function of the data element queuing, handling and processing subsystem 1000, it is appropriate at this juncture to now briefly describe the operation thereof with reference to FIGS. 22A1, 22A2, and 22B.

Prior to loading into the system event queue 1004, each data element is time-stamped (i.e. $T_j$) by the timing stamping module 1003 driven by a master clock within timing/control unit 1002 referenced to the global reference frame $R_{global}$. All data elements in the system event queue 1004 are handled by a data element analyzer/handler 1006 which is governed by the table of Data Element Handling Rules set forth in FIGS. 23A1 and 23A2. In general, subsystem 1000 is best realized by a computing platform having a multi-tasking operating system capable of handling multiple "threads" at the same time.

Each package moving through the scanning tunnel will be represented by a data element (i.e. an object in an object-oriented programming environment e.g. Java programming environment) stored in a moving package tracking queue 1005 operably connected to the data element handler 1006.

Package data elements are placed in the moving package tracking queue 1005 and matched with each scan beam data element accessed from the system event queue 1004 using a data element combining module 1007A. Scan beam data elements generated from holographic-based scanning units are processed along the scan data processing channel illustrated by blocks 1008A, 1009A, 1010A, 1011A, 1012A, and 1013A set forth in the lower right hand corner of FIG. 22, whereas scan beam data elements generated from non-holographic based scanning units (e.g. from the bottom-located polygon scanners in the tunnel) are processed along a different scan data processing channel illustrated by blocks 1008B, 1009B, 1010B, 1011B, 1012B, and 1013B set forth on FIG. 22B. This is because scan beam data elements generated from holographic-based scanning units have been generated from laser scanning beams (or finite scanning sectors) which can be tracked with scan package identification data by tracking facet sectors on the scanning disc in issue. While a similar technique can be used for polygon-based scanners (e.g. tracking "mirror sectors" instead of HOE-based facet sectors), a different approach has been adopted in the illustrative embodiment. That is, the scanning surface (e.g. 3×5") of each polygon scanning unit along the bottom scanner is accorded a vector-based surface model, rather than a ray-type model used for package identification data collected using holographic scanning mechanisms.

Figure 24A:
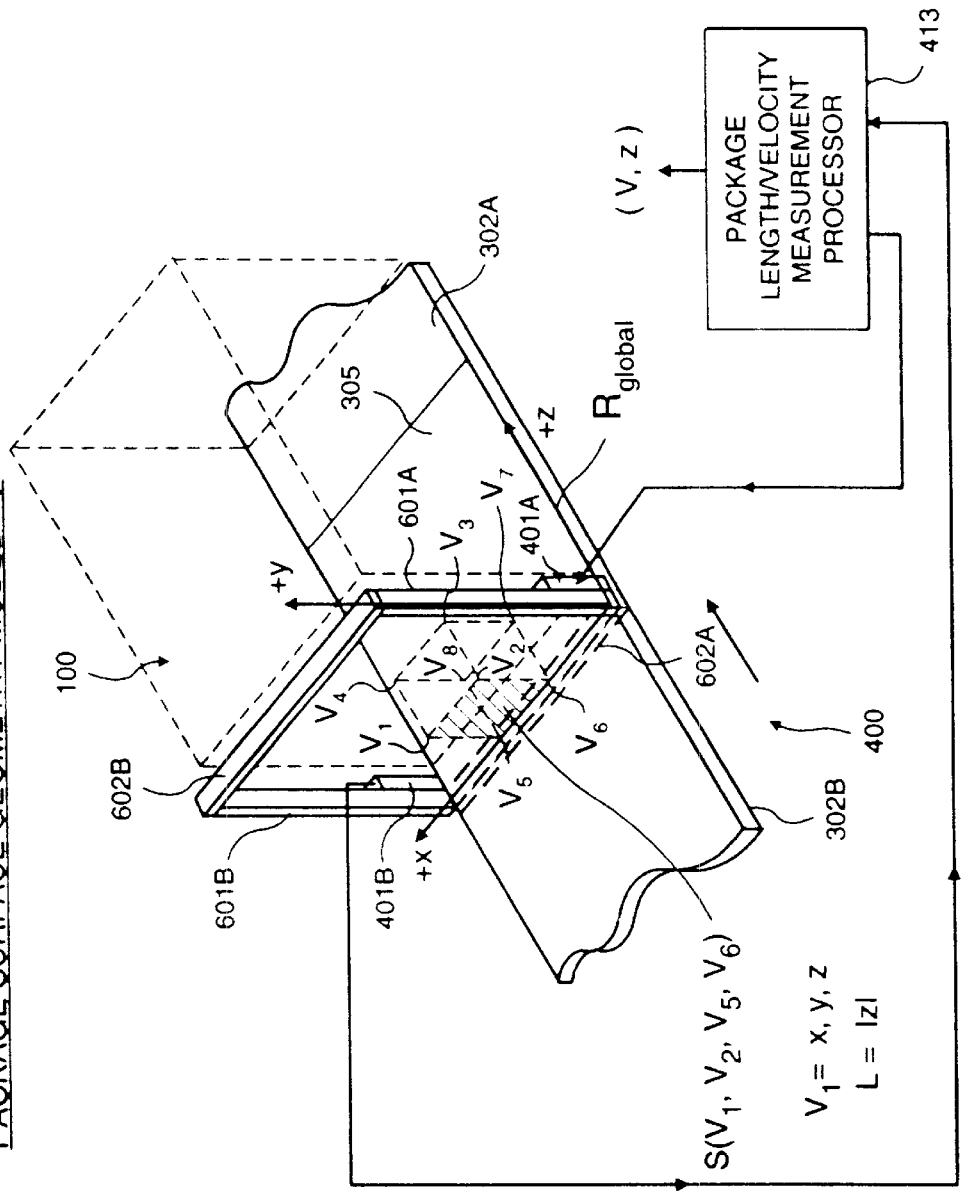
FIG. 24A is a schematic representation of the surface geometry model created for each package surface by the package surface geometry modeling subsystem (i.e. module) deployed with the data element queuing, handling and processing subsystem of FIGS. 22A1 through 22B, illustrating and showing how each surface of each package (transported through package dimensioning/measuring subsystem and package velocity/length measurement subsystem) is mathematically represented (i.e. modeled) using at least three position vectors (referenced to x=0, y=0, z=0) in the global reference frame $R_{global}$, and a normal vector drawn to the package surface indicating the direction of incident light reflection therefrom.

The Package Surface Geometry Modeling Subsystem of the First Illustrative Embodiment of the Present Invention As shown in FIG. 24A, a surface geometry model is created for each package surface by the package surface geometry modeling subsystem (i.e. module) 1008A deployed with the data element queuing, handling and processing subsystem 1000 of FIGS. 22A1 and 22A2. In the illustrative embodiment, each surface of each package transported through package dimensioning/measuring subsystem 600 and package velocity/length measurement subsystem 400 is mathematically represented (i.e. modeled) using at least three position vectors (referenced to x=0, y=0, z=0) in the global reference frame $R_{global}$, and a normal vector to the package surface indicating the direction of incident light reflection therefrom. The table of FIG. 24B describes a preferred procedure for creating a vector-based surface model for each surface of each package transported through the package dimensioning/measuring subsystem 600 and package velocity/length measurement subsystem of the system 400 hereof.

The Scan Beam Geometry Modeling Subsystem of the First Illustrative Embodiment of the Present Invention As shown in FIGS. 25A1 through 25A2, a vector-based model is created by the scan beam geometry modeling subsystem (i.e. module) 1010A of FIGS. 22A1 and 22A2, for the propagation of the laser scanning beam (ray) emanating from a particular point on the facet, to its point of reflection on the corresponding beam folding mirror, towards to the focal plane determined by the focal length of the facet.

The table set forth in FIGS. 25B1 through 25B3 define the parameters used to construct the diffraction-based geometric optics model of the scanning facet and laser scanning beam shown in FIGS. 25A1 and 25A2. Details of this modeling procedure is illustrated in FIGS. 25C1 and 25C2 and can be found in Applicant's copending application Ser. No. 08/726, 522 filed Oct. 7, 1996, now U.S. Letters Patent No. 6,073,846; and Ser. No. 08/573,949 filed Dec. 18, 1995, now abandoned.

Figure 26:
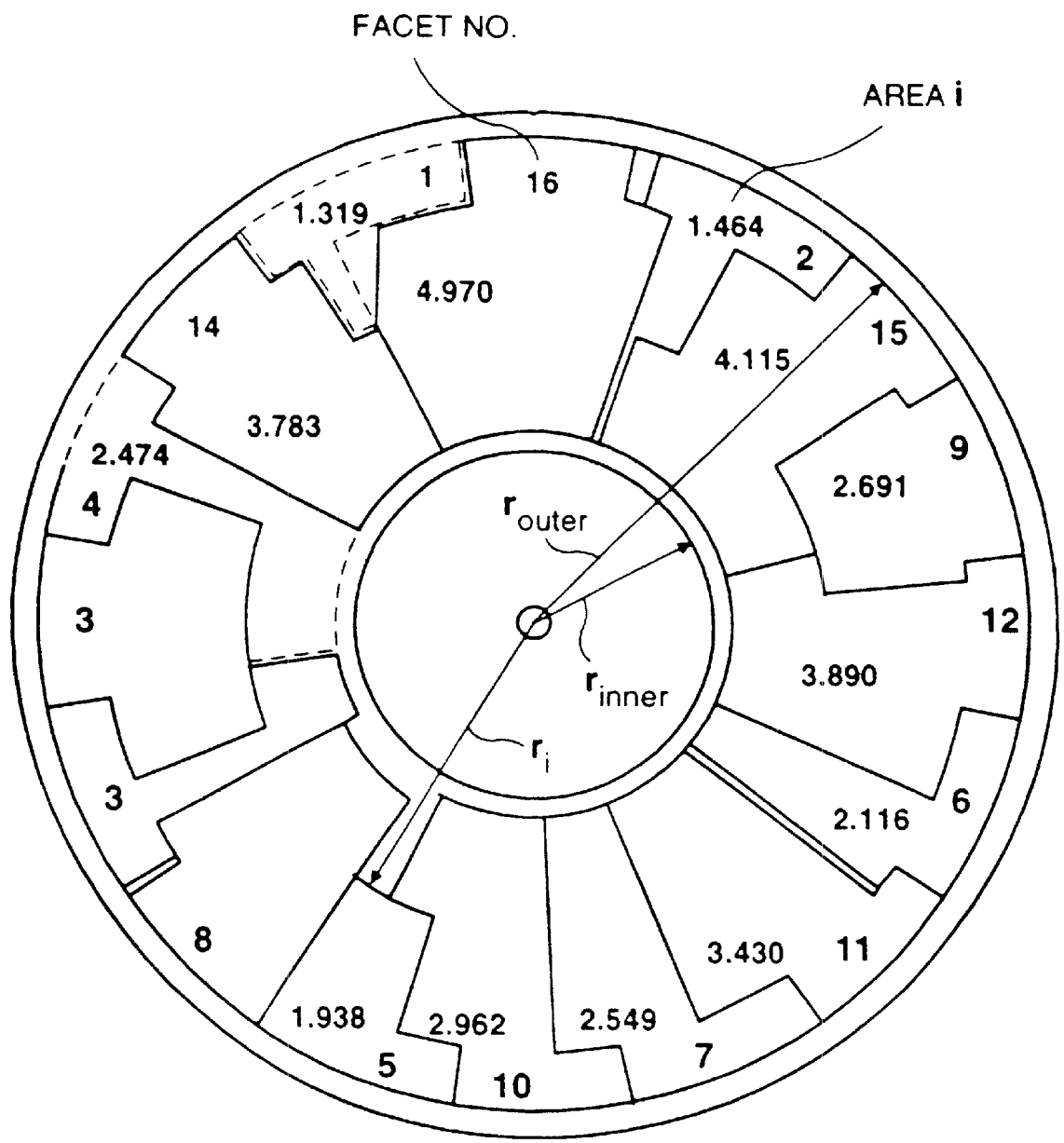
FIG. 26 is a schematic representation of the laser scanning disc labeled with particular parameters associated with the diffraction-based geometric optics model of FIGS. 25A1 and 25A2.

FIG. 26 provides a schematic representation of the laser scanning disc shown in FIGS. 25A1 and 25A2, labeled with particular parameters associated with the diffraction-based geometric optics model of FIGS. 25A1 and 25A2.

In FIG. 27, a preferred procedure is described for creating a vector-based ray model for laser scanning beams which have been produced by a holographic laser scanning subsystem of the system hereof, that may have collected the scan data associated with a decoded bar code symbol read thereby within the tunnel scanning subsystem.

Figure 28:
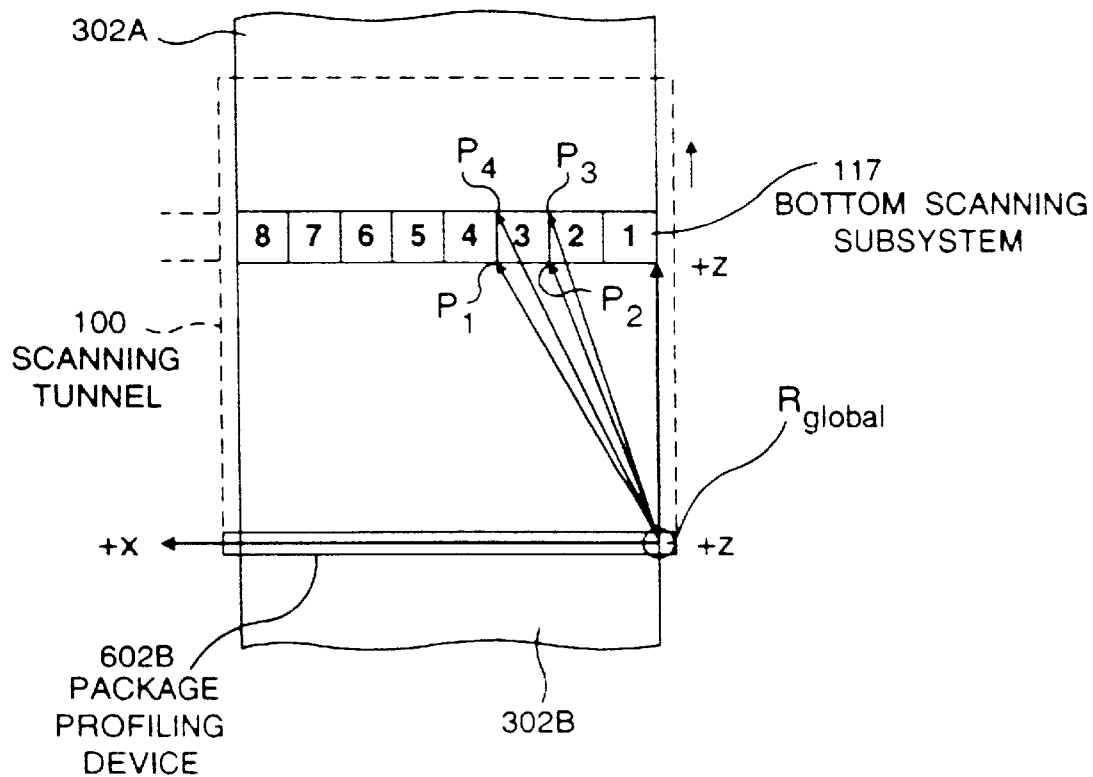
FIG. 28 is a schematic representation of the vector-based 2-D surface geometry model created for each candidate scan beam by the scan surface modeling subsystem (i.e. module) shown in FIG. 22B, and showing how each omnidirectional scan pattern produced from a particular polygon-based bottom scanning unit is mathematically represented (i.e. modeled) using four position vectors (referenced to x=0, y=0, z=0) in the global reference frame $R_{global}$, and a normal vector drawn to the scanning surface indicating the direction of laser scanning rays projected therefrom during scanning operations.

The Scan Surface Modeling Subsystem of the First Illustrative Embodiment of the Present Invention FIG. 28 schematically shows how the scan surface modeling subsystem (i.e. module) 1010B shown of FIG. 22B can be used to define a vector-based 2-D surface geometry model for each candidate scan beam generated by the polygonal-based bottom scanners in the tunnel scanning system. As shown in FIG. 28, each omnidirectional scan pattern produced from a particular polygon-based bottom scanning unit is mathematically represented (i.e. modeled) using four position vectors (referenced to x=0, y=0, z=0) in the global reference frame $R_{global}$ and a normal vector to the scanning surface indicating the direction of laser scanning rays projected therefrom during scanning operations.

Figure 29:
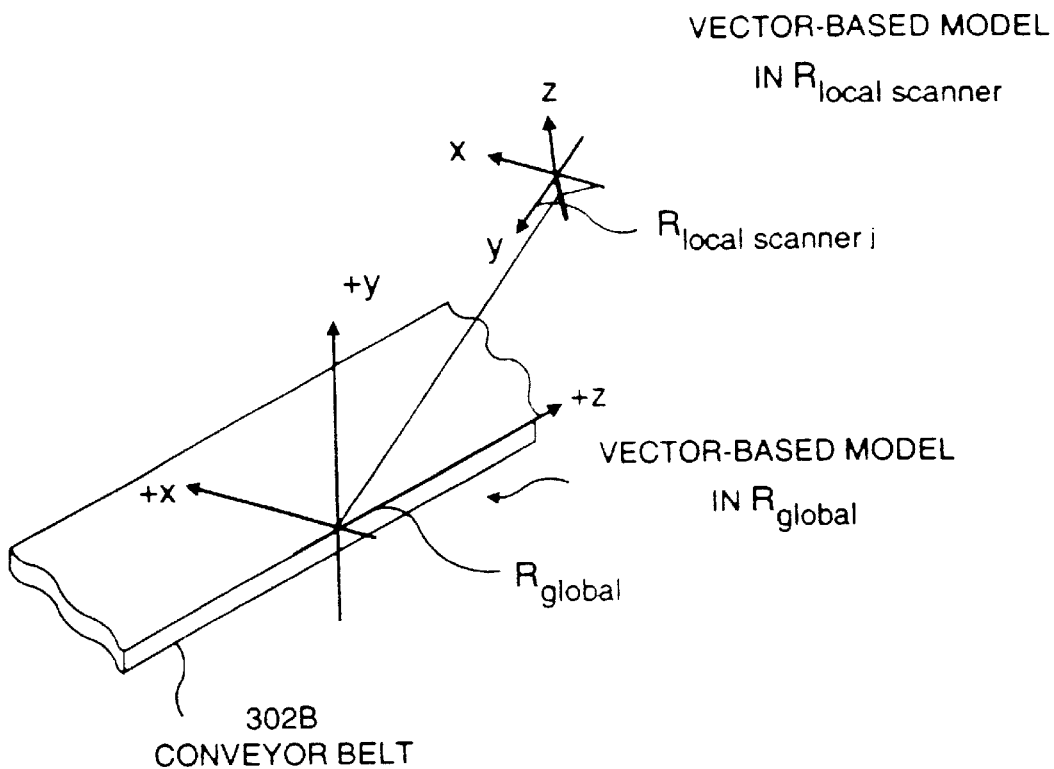
FIG. 29 is a schematic representation graphically illustrating how a vector-based model created within a local scanner coordinate reference frame $R_{localscannerj}$ can be converted into a corresponding vector-based model created within the global scanner coordinate reference frame $R_{global}$ using homogeneous transformations.

The Homogeneous (HG) Transformation Module of the First Illustrative Embodiment of the Present Invention FIG. 29 schematically describes how the homogeneous (HG) transformation module 1009A of FIGS. 22A1 and 22A2 uses homogeneous transformations to convert a vector-based model within a local scanner coordinate reference frame $R_{localscannerj}$ into a corresponding vector-based model created within the global scanner coordinate reference frame $R_{global}$. This mathematical technique is essential in that it converts locally-referenced coordinates used to represent a laser beam (which scanned a bar code symbol) into globally-referenced coordinates used to represent the same laser scanning beam.

Figure 30:
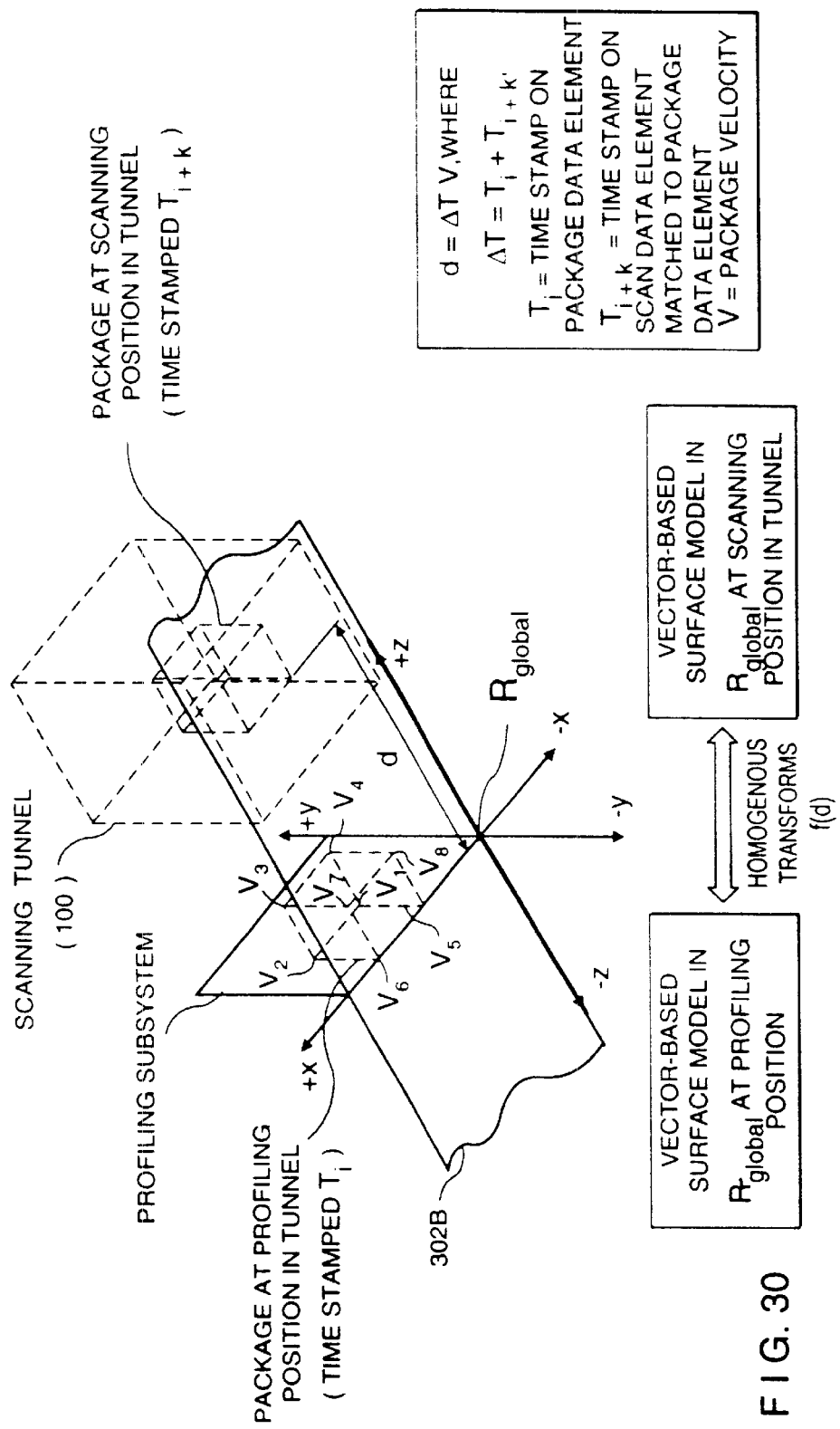
FIG. 30 is a schematic representation graphically illustrating how a vector-based package surface model created within the global coordinate reference frame $R_{global}$ at the "package height/width profiling position" can be converted into a corresponding vector-based package surface model created within the global scanner coordinate reference frame $R_{global}$ at the "scanning position" within the tunnel using homogeneous transformations, and how the package travel distance (d) between the package height/width profiling and scanning positions is computed using the package velocity (v) and the difference in time indicated by the time stamps placed on the package data element and scan beam data element matched thereto during each scan beam/package surface intersection determination carried out within the data element queuing, handling and processing subsystem of FIGS. 22A1, 22A2 and 22B.

FIG. 30 describes how the homogeneous (HG) transformation module 1009A of FIG. 22B uses homogeneous transformations to convert a vector-based package surface model specified within the global coordinate reference frame $R_{global}$ at the "package height/width profiling position", into a corresponding vector-based package surface model created within the global coordinate reference frame $R_{global}$ specified at the "scanning position" within the tunnel scanning system. This mathematical technique is essential in that it converts locally-referenced coordinates used to represent a package surface into globally-referenced coordinates used to represent the same package surface. Notably, this method of coordinate conversion involves computing the package travel distance (z=d) between the package height/width profiling and scanning positions using (1) the package or conveyor belt velocity (v) and the difference in time (i.e. $\Delta T = T1 - T2$) indicated by the time stamps (T1 and T2) placed on the package data element and scan beam data element, respectively, matched thereto during each scan beam/package surface intersection determination carried out within module 1012A in the data element queuing, handling and processing subsystem 1000 of FIG. 4. Notably, this package displacement distance z=d between the profiling and scanning positions is given by the mathematical expression $d = v\Delta T$.

Figure 31A:
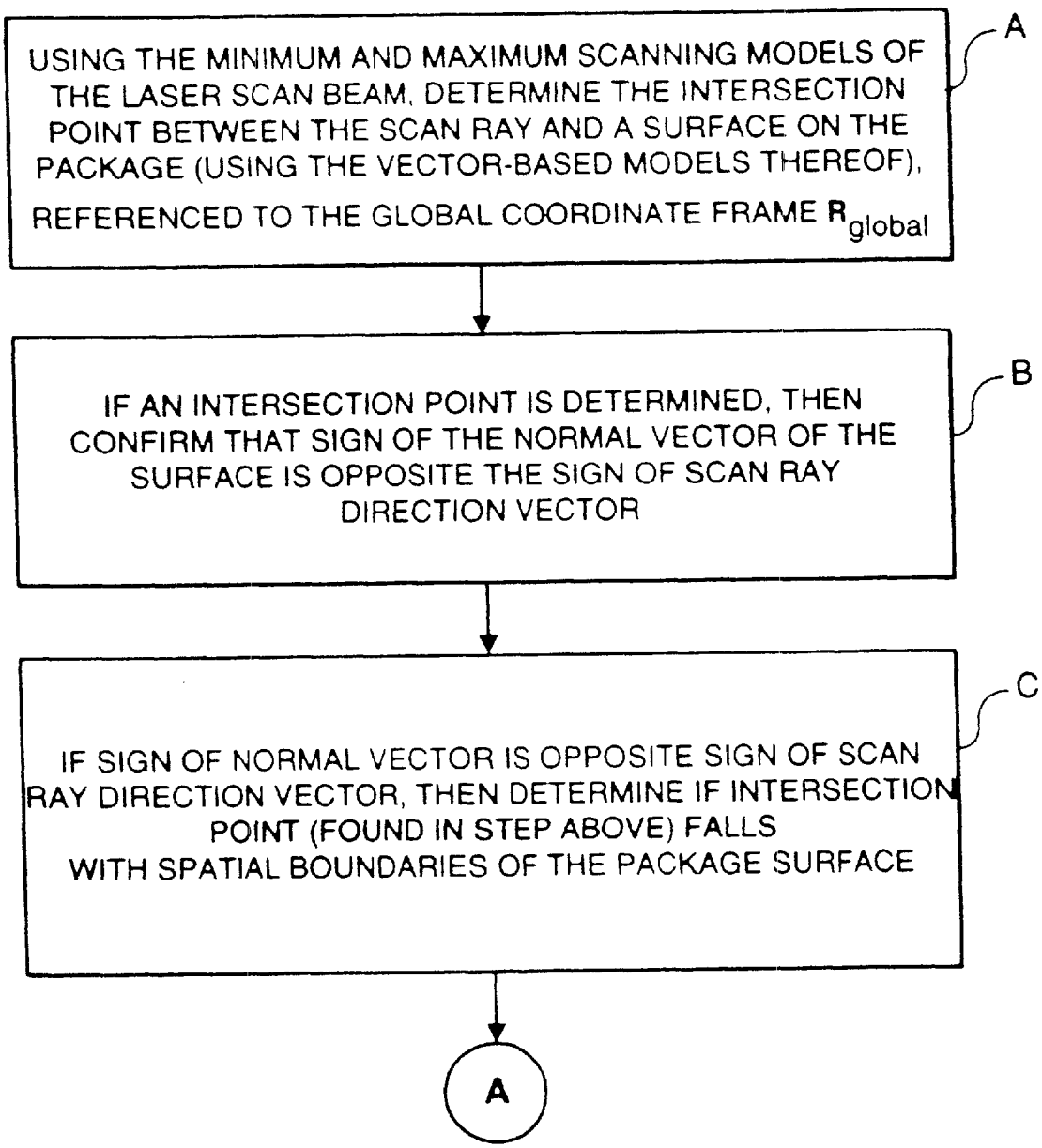
FIGS. 31A and 31B, taken together, provide a procedure for determining whether the scan beam (rays) associated with a particular scan beam data element produced by a holographic scanning subsystem intersects with any surface on the package that has been scanned at a particular scanning position, and thus whether to correlate a particular package identification data element with particular package measurement data element acquired by the system.
Figure 31B:
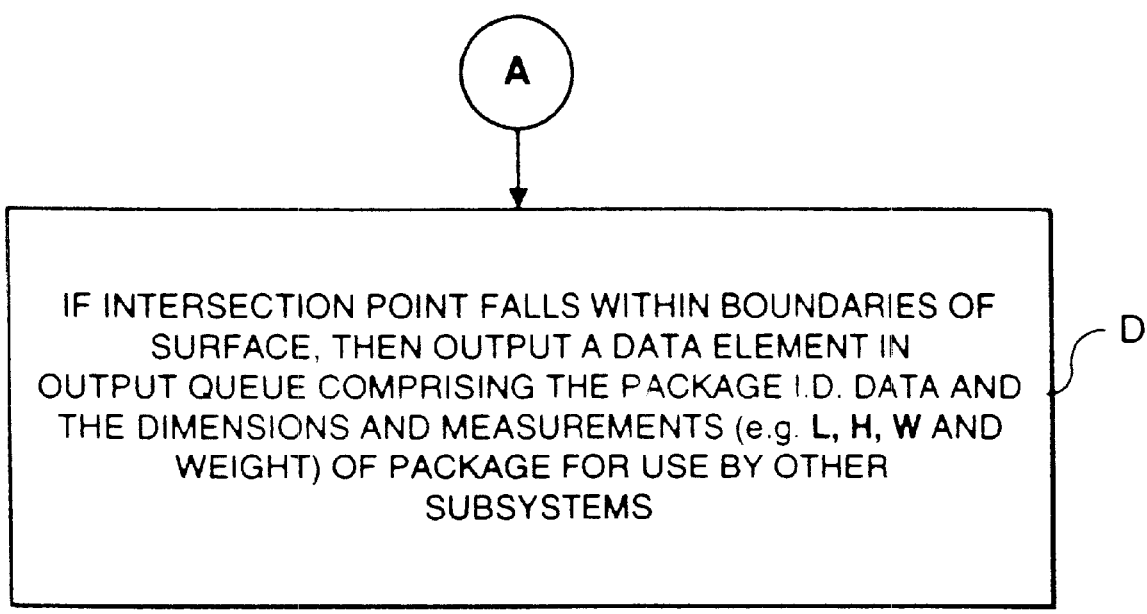

The Scan Beam and Package Surface Intersection
Determination Subsystem of the First Illustrative
Embodiment of the Present Invention for use with
Scan Beam Data Elements Produced by
Holographic Scanning Subsystems FIGS. 31A and 31B, taken together, describes a procedure which is carried out within the scan beam and package surface intersection determination module 1012A of the illustrative embodiment in order to determine whether (i) the scan beam (rays) associated with a particular scan beam data element produced by a holographic scanning subsystem intersects with (ii) any surface on the package that has been scanned at a particular scanning position, and thus whether to correlate a particular package identification data element with particular package measurement data element acquired by the system.

As indicated at Block A in FIG. 31A, the first step of the procedure involves using the minimum and maximum scan ray models of the laser scan beam to determine the intersection point between the scan ray and a surface on the package (using the vector-based models thereof) referenced to the global coordinate reference frame. As indicated at Block B in FIG. 31A, if an intersection point has been determined at Block A, then confirm that the sign of the normal vector of the surface is opposite the sign of the scan ray direction vector. As indicated at Block C in FIG. 31A, if the sign of the normal vector is opposite the sign of the scan ray direction vector, then determine if the intersection point (found at Block A) falls within the spatial boundaries of the package surface. As indicated at Block D in FIG. 31B, if the intersection point falls within the boundaries of the modeled package surface, then output a data element to the output queue in the data output subsystem 1013A, wherein the data element comprises package identification data and package measurement data representative of the dimensions and measurements of the package by the system for use by other subsystems. When a scan beam (i.e. package identification) data element taken from the system event queue 1004 is correlated with a package measurement data element using the above described method, then the queuing, handling and processing subsystem 1000 outputs a data element (in an output data queue 1013A) containing the package ID data and the package dimensional and measurement data. Such correlated data elements can be displayed graphically, printed out as a list, provided to sorting subsystems, shipping pricing subsystems, routing subsystems and the like.

Figure 32A:
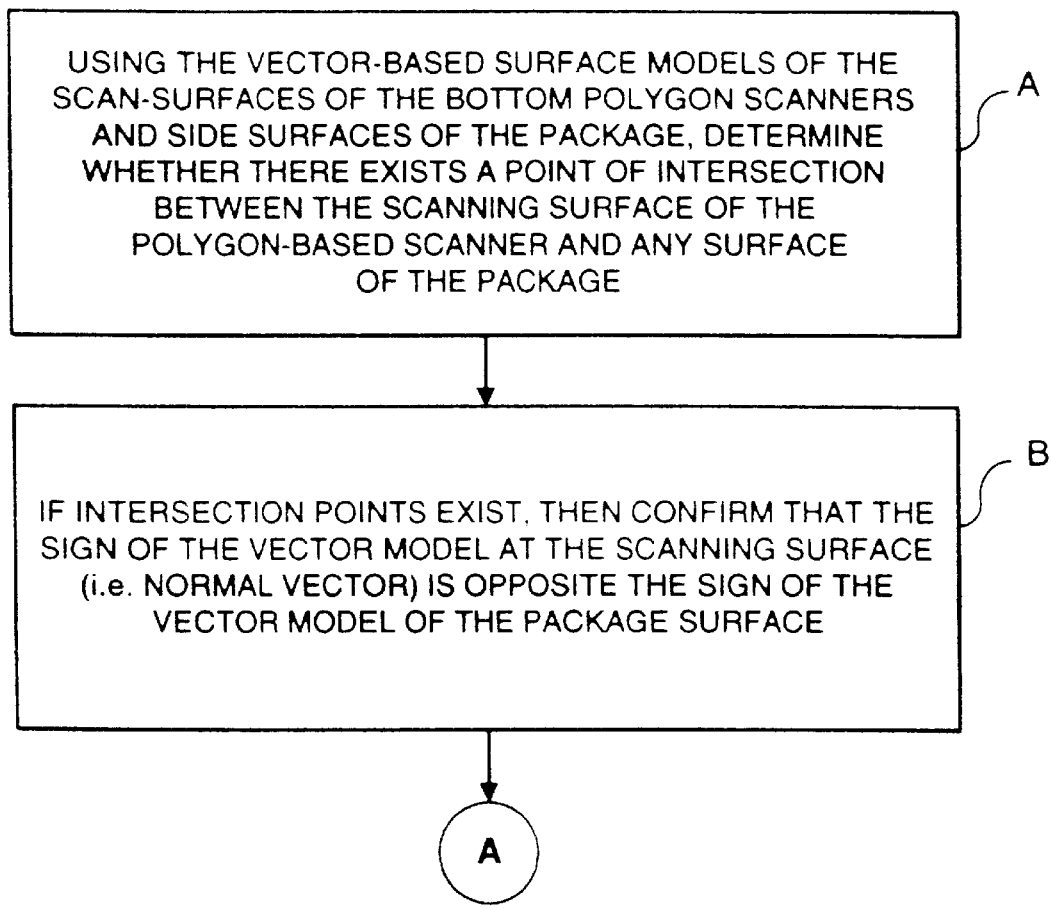
FIGS. 32A and 32B, taken together, provide a procedure for determining whether the scanning surface associated with a particular scan beam data element produced by a non-holographic (e.g. polygon-based) bottom-located scanning subsystem intersects with any surface on the package that has been scanned at a particular scanning position, and thus whether to correlate a particular package identification data element with particular package measurement data element acquired by the system.
Figure 32B:
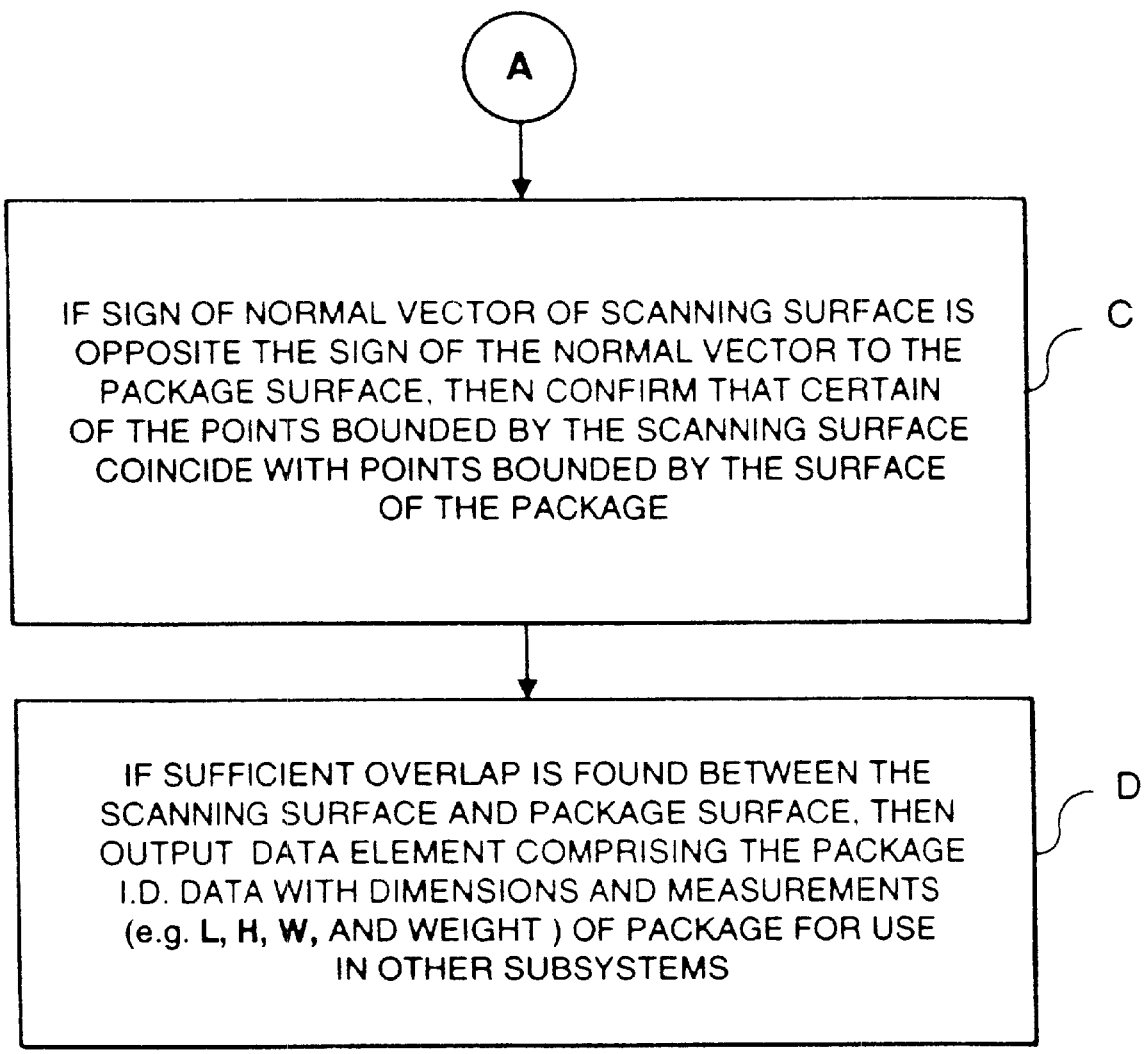

The Scan Surface and Package Surface Intersection
Determination Subsystem of the First Illustrative
Embodiment of the Present Invention for use with
Scan Beam Data Elements Produced by Non-
Holographic Scanning Subsystems FIGS. 32A and 32B, taken together, describes a procedure which can be carried out within the scan surface and package surface intersection determination module 1012B of FIG. 22B in order to determine whether the scanning surface associated with a particular scan beam data element produced by a non-holographic (e.g. polygon-based) "bottom-located" scanning subsystem spatially intersects with any surface on the package that has been scanned at a particular scanning position, and thus whether to correlate a particular package identification data element with particular package measurement data element acquired by the system.

As indicated at Block A in FIG. 32A, the first step of the procedure involves using the vector-based surface models of the laser scan surfaces of the bottom polygon scanners and side surfaces of the packages so as to determine whether or not there exists a point of intersection between the scanning surface of the polygon-based scanners and any surface of the package. As indicated at Block B in FIG. 32A, if an intersection point exists, then confirm that the sign of the vector model of the scanning surface (i.e. the normal vector) is opposite the sign of the vector model of the package surface. As indicated at Block C in FIG. 32B, if the sign of the normal vector of the scanning surface is opposite the sign of the normal vector to the package surface, then confirm that certain of the points bounded by the scanning surface coincide with points bounded by the surface of the package. As indicated at Block D in FIG. 32B, if sufficient overlap is found to exist between the scanning surface and the package surface, then output a data element to the output queue in the data output subsystem 1013B, wherein the data element comprises package identification data, and package measurement data representative of the dimensions and measurements of the package by the system for use by other subsystems. When a scan beam (i.e. package identification) data element taken from the system event queue 1004 is correlated with a package data element using the above described method, then the queuing, handling, and processing subsystem 1000 outputs a data element (in an output data queue 1013B) containing the package ID data and the package dimensional and measurement data. Such correlated data elements can be displayed graphically, printed out as a list, provided to sorting subsystems, shipping pricing subsystems, routing subsystems and the like.

Notably, the smaller the facet sectors on the scanning disc, then the better resolution the system hereof will have with regarding to correlating package identification data with package measurement data. As the facet sector gets smaller, the corresponding minimum and maximum facet angles generated from the decoder device hereof will get closer and closer, approaching a single scanning ray in the ideal situation.

Automated Tunnel-Type Laser Scanning Package
Identification and Weighing System Constructed
According to a Second Illustrated Embodiment of
the Present Invention Package Identification and
Measurement Referring now to FIGS. 33 through 34, the "dual-lane" automated tunnel-type laser scanning system of the second illustrated embodiment 2000 will now be described in detail. As in the first illustrative embodiment depicted in FIGS. 1A through 32B, the system of the second illustrative embodiment is designed to identify and measure packages that are singulated along a conveyor subsystem in a conventional manner.

Figure 34:
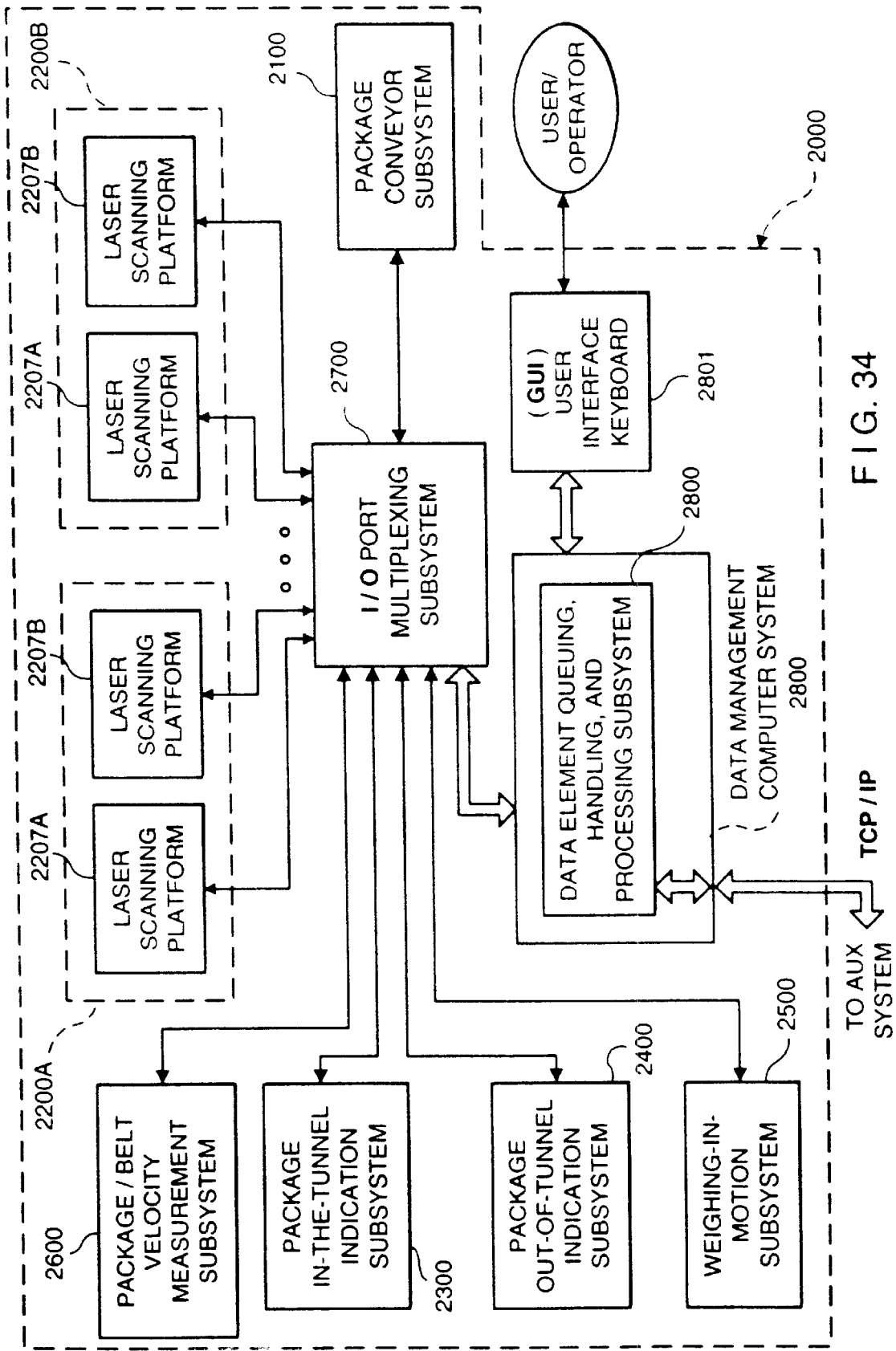
FIG. 34 is a schematic block diagram illustrating the holographic laser scanning subsystems, the package-in-tunnel indication subsystem, the package velocity measurement subsystem, the package-out-of-tunnel indication subsystem, the package weighing-in-motion subsystem, the data-element queuing, handling and processing subsystem, the input/output port multiplexing subsystem, and the package conveyor belt subsystem of the second illustrative embodiment.

Overview of the Tunnel Scanning System of the
Second Illustrative Embodiment of the Present
Invention As shown in FIGS. 33 and 34, the automated tunnel scanning system of the second illustrative embodiment indicated by reference numeral 2000 comprises an integration of subsystems, namely: a high-speed package conveyor subsystem 2100 having a conveyor belt 2101 having a width of at least 60 inches to support a pair of package transport lanes 2102A and 2102B along the conveyor belt; a pair of dual-disc holographic laser scanning bar code symbol reading subsystems 2200A and 2200B supported overhead above the conveyor belt 2101 by a support frame 2202 so as to produce a 3-D omnidirectional scanning volume 2103 thereabove, for scanning bar codes 2204 on packages 2205 transported therethrough; a package-in-the-tunnel indication subsystem 2300 realized as a pair of IR-based package detectors 2301A and 2301B directed over the first and second conveyor lanes (CL1 and CL2) 2102A and 2102B of the conveyor belt, respectively, for automatically detecting the presence of packages 2205 moving within lanes of the conveyor belt and into the scanning tunnel; a package-out-of-the-tunnel indication subsystem 2400 realized as a pair of IR-based package detectors 2401A and 2401B directed over the first and second conveyor lanes (CL1 and CL2) 2102A and 2102B of the conveyor belt, respectively, for automatically detecting the presence of packages moving within lanes of the conveyor belt and out of the scanning tunnel; a weighing-in-motion subsystem 2500 for weighing packages as they are transported along the conveyor belt 2101; a package/belt velocity measurement subsystem 2600 realized using a roller wheel 2601 engaged against the undersurface of the conveyor belt 2101, an optical shaft incremental encoder 2602 connected to the axle of the roller wheel 2601 and producing an electrical pulse output stream per revolution of the roller wheel, and a programmed microprocessor 2603 for processing the output pulse stream and producing digital data representative of the velocity of the conveyor belt (and thus package transported thereby) at any instant in time; an input/output subsystem 2700 for managing the data inputs to and data outputs from the system of FIG. 33; and a data management computer 2800, with a graphical user interface (GUI) 2801, for realizing a data element queuing, handling and processing subsystem 2900 shown in greater detail in FIGS. 41A and 41B, as well as other data and system management functions.

The High-Speed Conveyor Belt Subsystem of the Second Illustrative Embodiment As shown in FIGS. 33, the high-speed conveyor belt subsystem 2100 of the illustrative embodiment comprises: a plurality of rollers 2102 spaced apart and supported by support frame structure (not shown in FIG. 33); a belt structure 2101, extending between and supported by a belt support structure 2103, and having a width of at least 60 inches to provide a pair of package transport lanes CL1 and CL2 along the conveyor belt subsystem; a drive motor 2104 for imparting torque to the rollers; and a belt velocity controller 2106 for controlling the velocity of the belt and thus packages during system operation.

Figure 35:
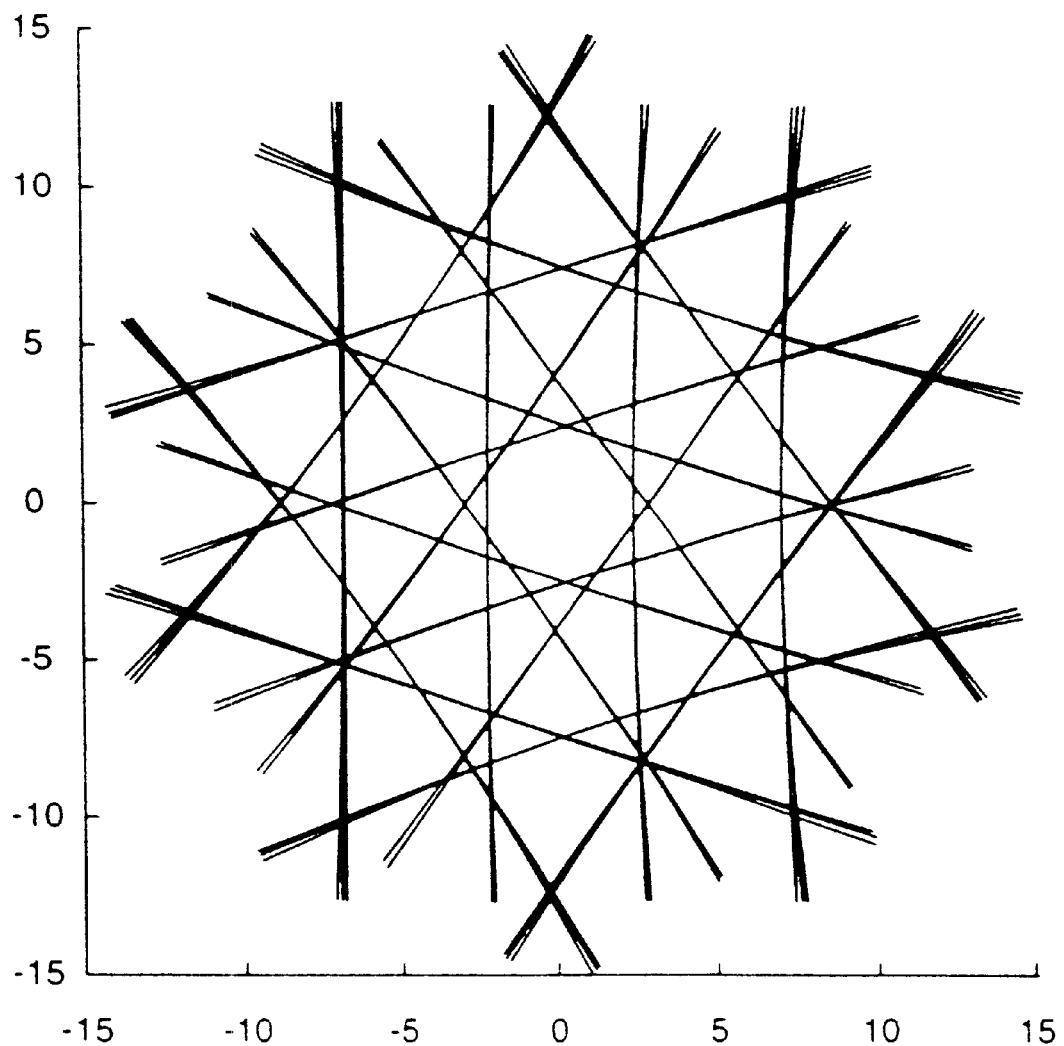
FIG. 35 is a schematic representation of the laser scanning pattern projected from each disc in the dual-disc holographic laser scanning subsystem employed in the tunnel-type scanning system of the second illustrative embodiment of the present invention.

Dual-Disc Holographic Laser Scanning Bar Code Symbol Reading Subsystems of the Present Invention As shown in FIG. 33, each dual-disc holographic laser scanning bar code symbol reading subsystem 2200A and 2200B is supported overhead above the conveyor belt 2101 by a support frame 2202. During system operation, each dual-disc holographic laser scanning subsystem 2200A and 2200B produces a 3-D omnidirectional scanning volume having four focal planes for omnidirectional scanning of bar codes on package transported therethrough. The omnidirectional laser scanning pattern projected from each scanning disc, within a particular focal plane of the scanning volume, is schematically depicted in FIG. 35. The subsystems comprising the scanning tunnel system of FIG. 33 are schematically depicted in FIG. 34.

Figure 37:
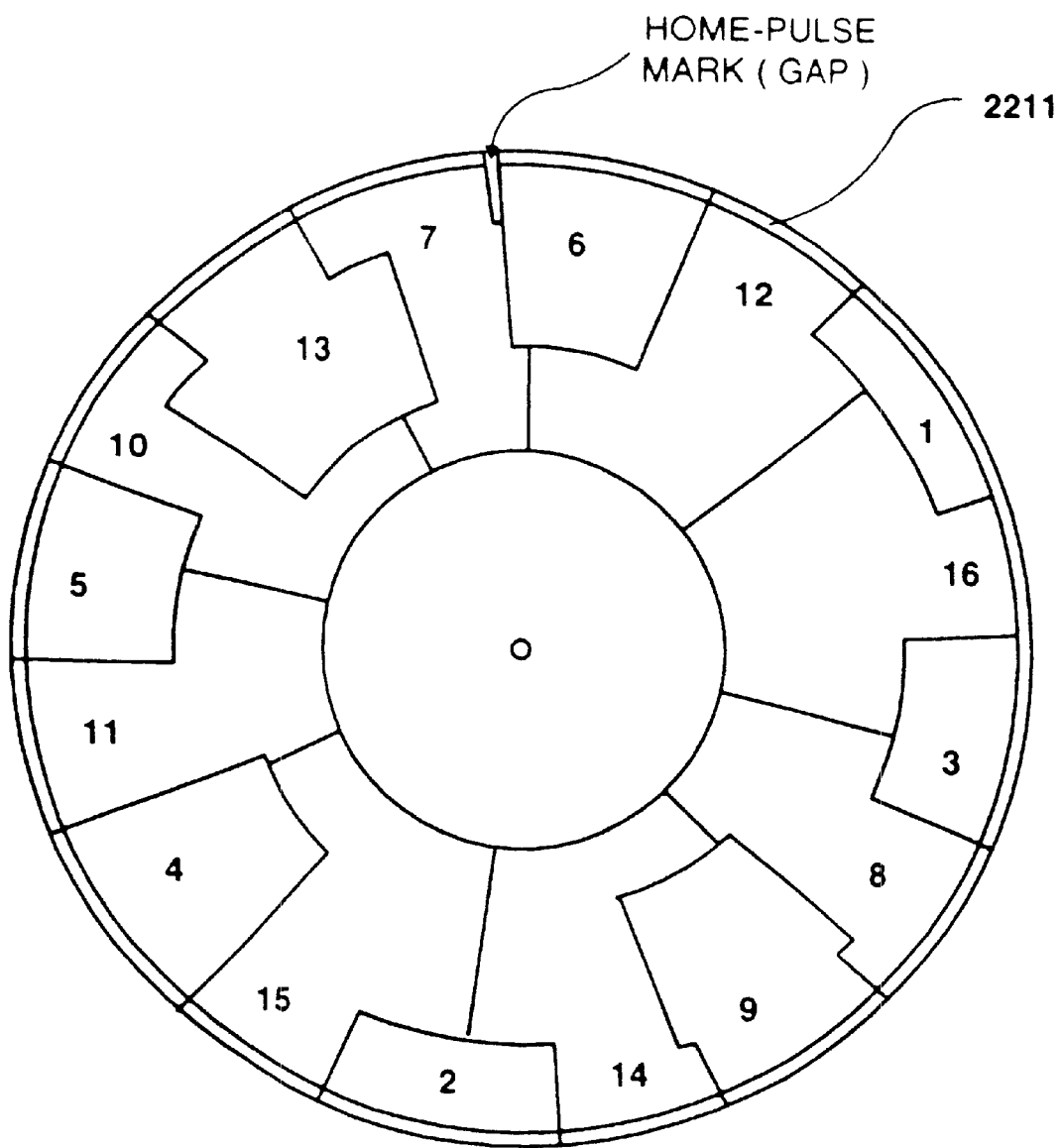
FIG. 37 is a schematic representation of each holographic laser scanning disc employed in the laser scanning subsystem of the present invention.
Figure 39A:
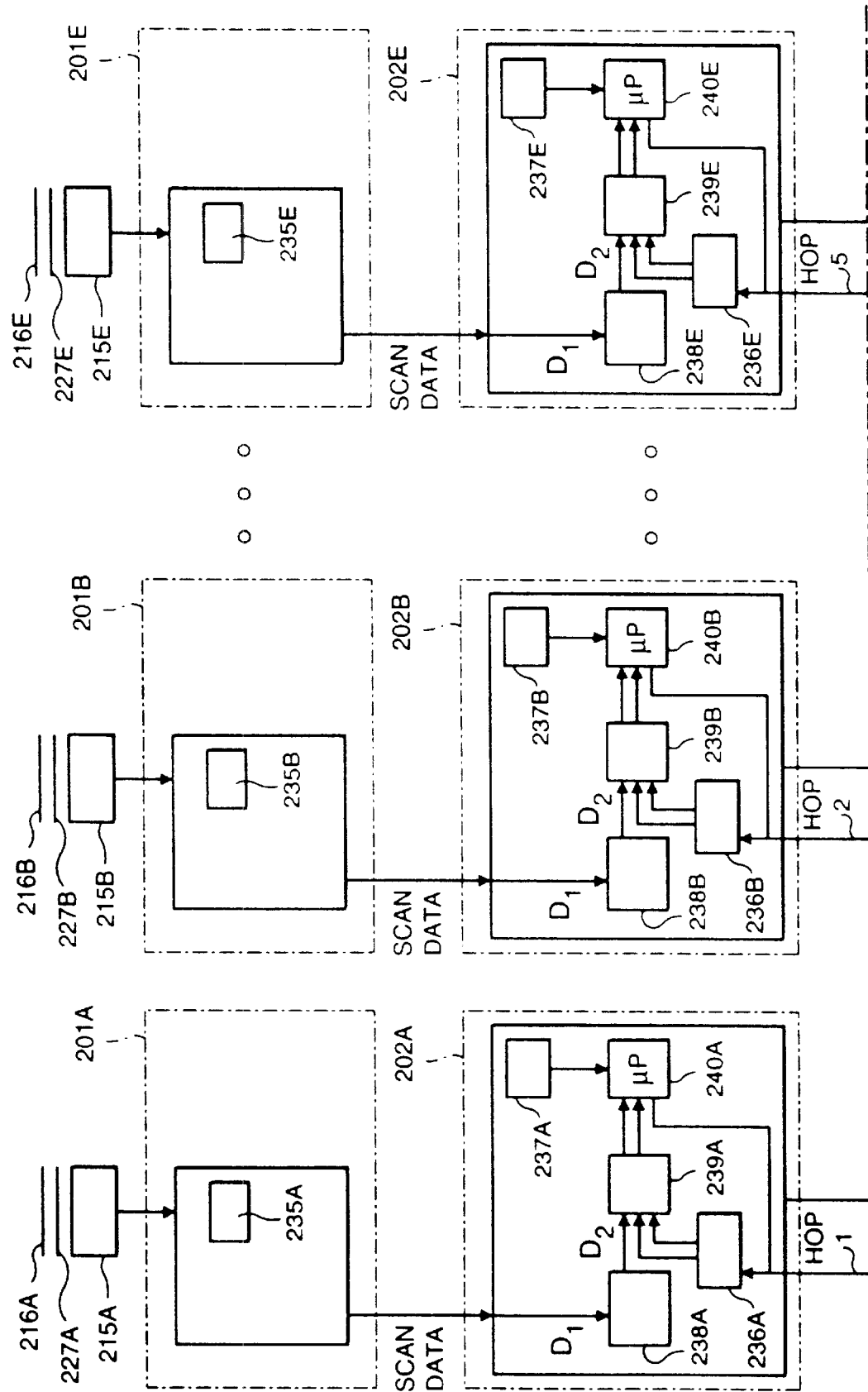
FIGS. 39A through 39C, taken together, show the subcomponents configured together on the analog signal processing boards, decode signal processing boards and within the housing of the single-disc holographic laser scanning subsystems of the second illustrative embodiment of the present invention.
Figure 39B:
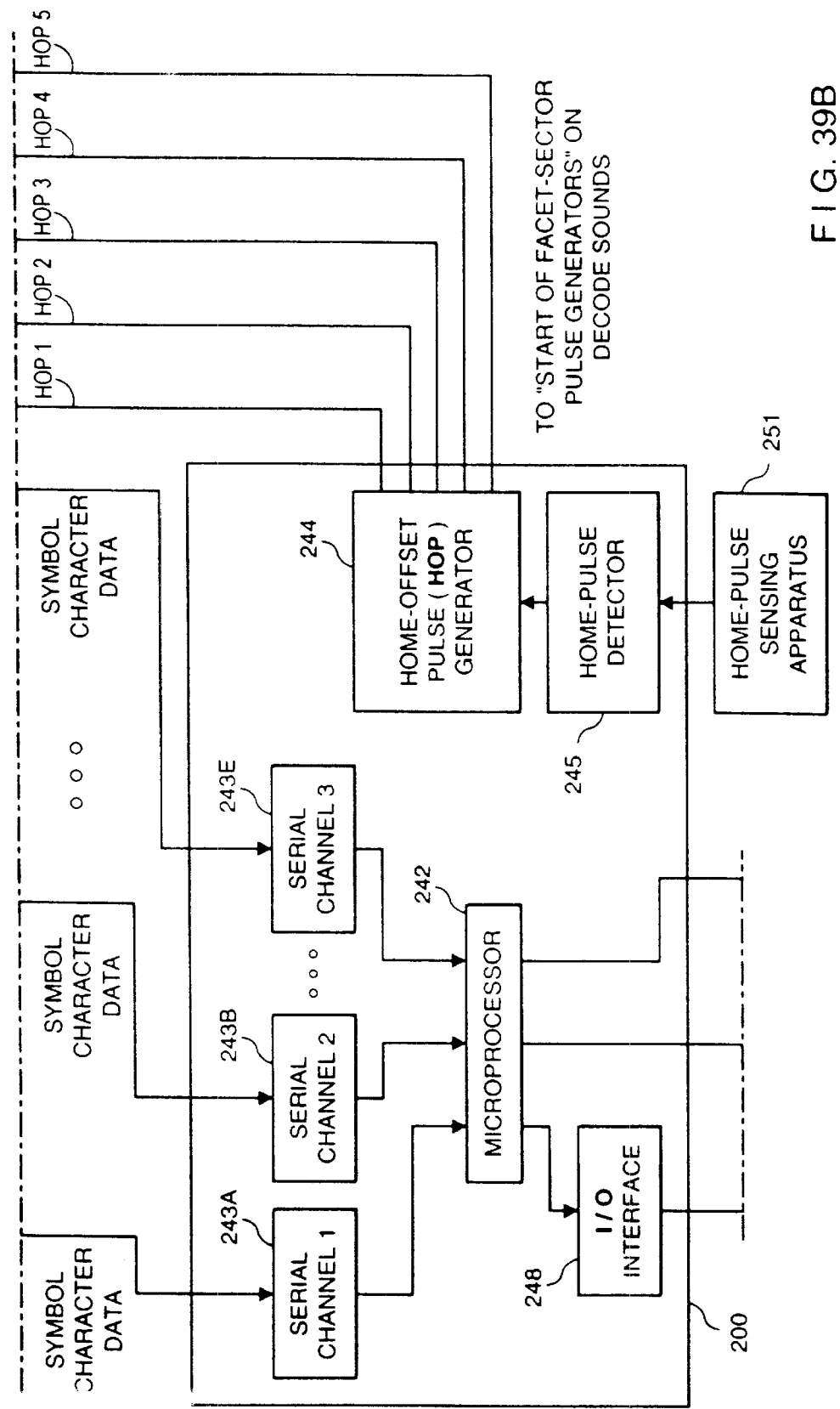
Figure 39C:
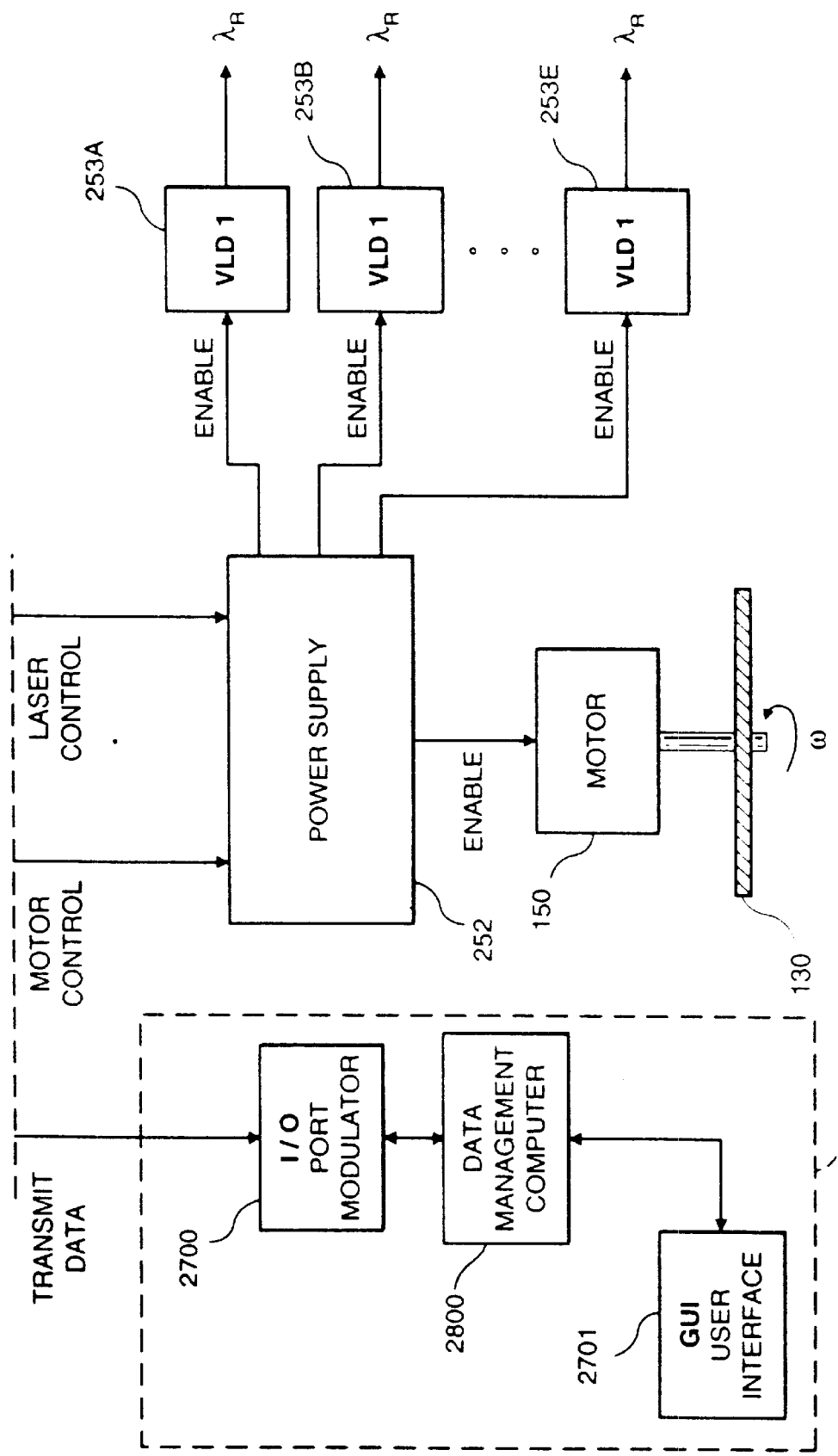
Figure 40A:
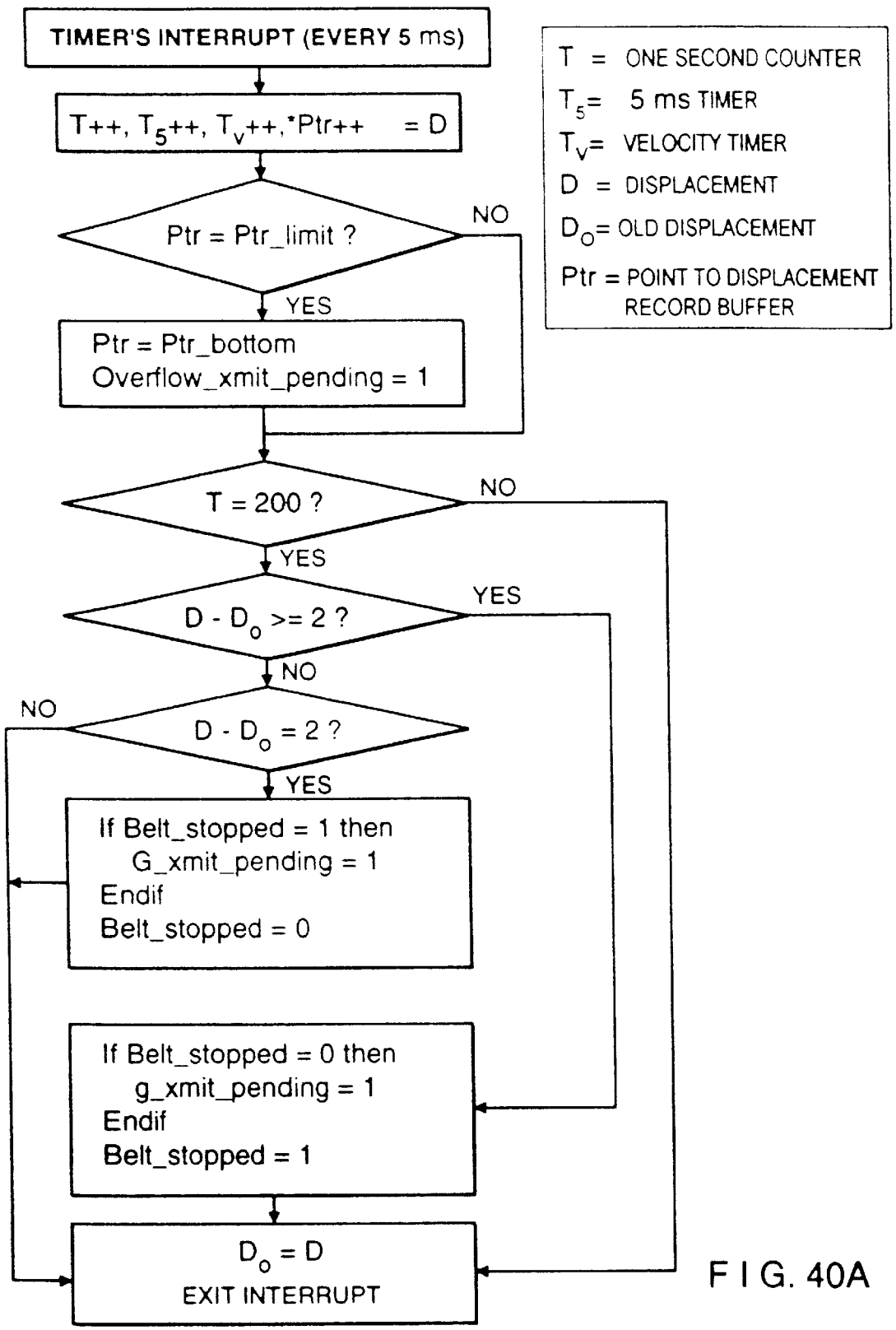
FIGS. 40A through 40C, taken together, set forth a flow chart describing the computational process used by the conveyor belt velocity measurement subsystem shown in FIG. 33, to compute the velocity of the conveyor belt of the system of the second illustrative embodiment of the present invention.
Figure 40B:
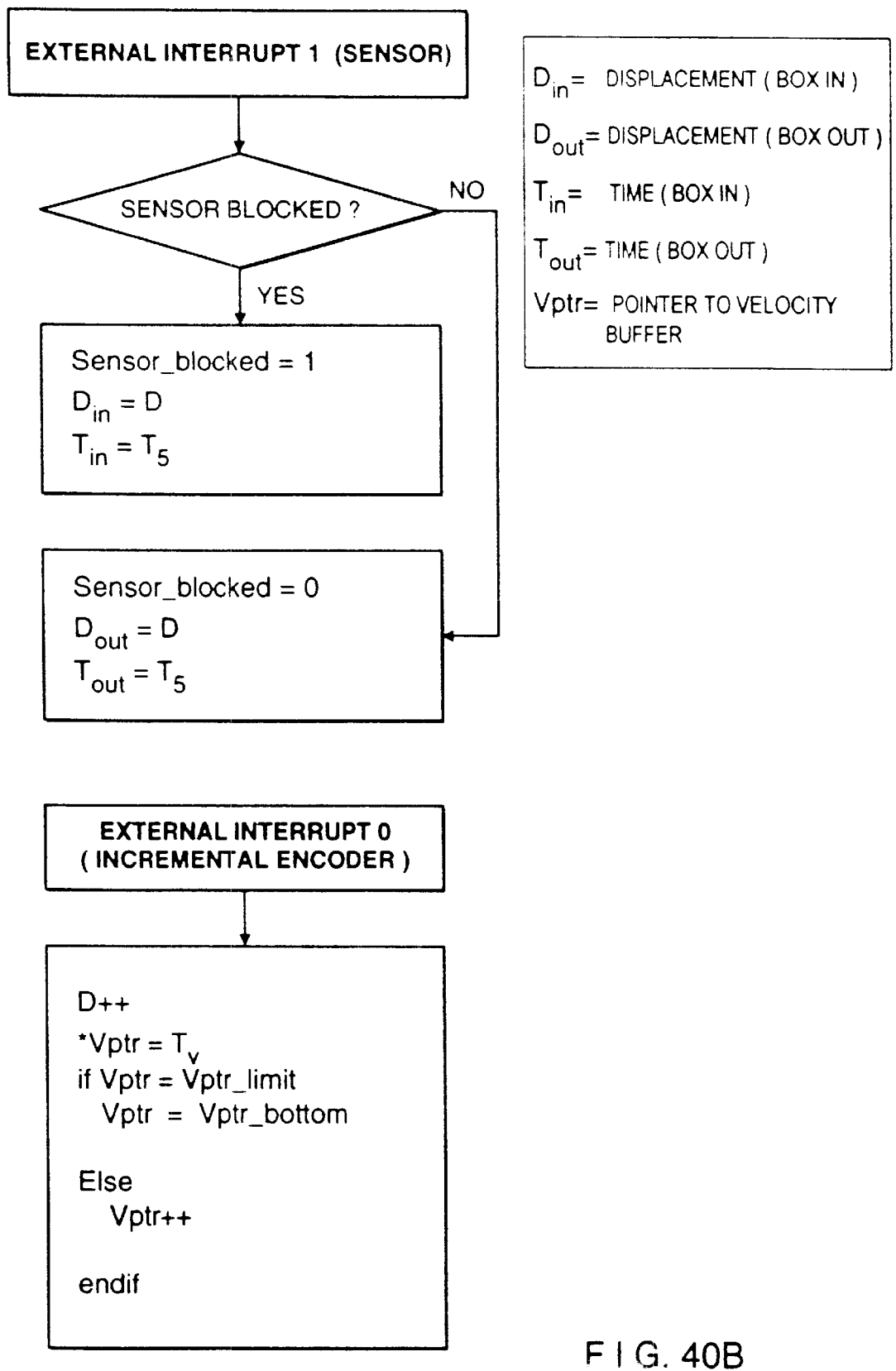
Figure 40C:
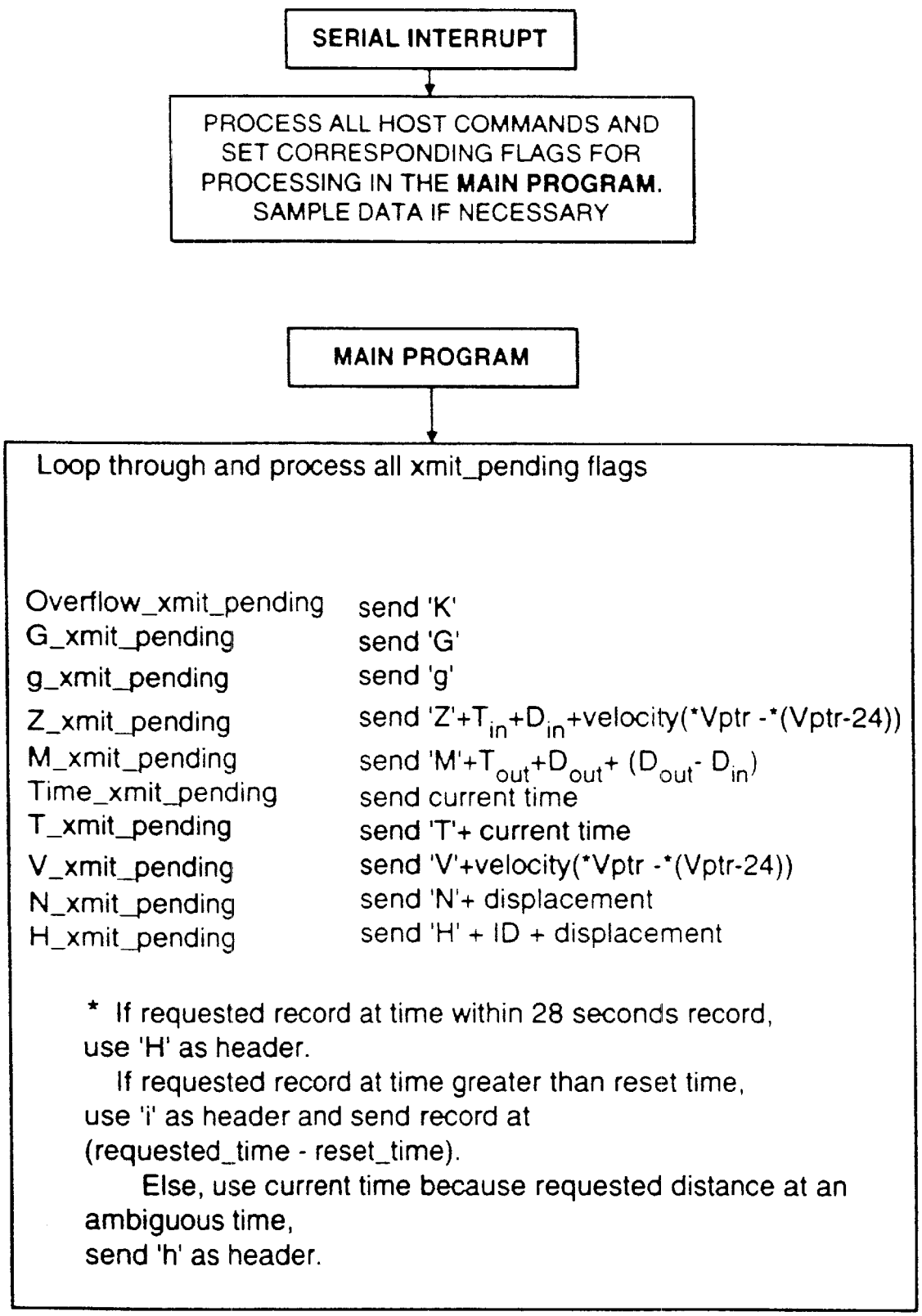

As shown in FIG. 36, each dual-disc holographic laser scanning subsystem 2200A, 2200B comprises a pair of laser scanning platforms 2207A and 2207B, each mounted within a common housing 2208. As shown in FIG. 36, each laser scanning platform 2207A, 2207B in the illustrative embodiment comprises five laser scanning stations 2210A through 2210E arranged about a holographic scanning disc 2211. It is understood, however, that in other embodiments of the present invention, more or less than five scanning stations may be arranged about the scanning disc in various ways as the particular application requires. As shown in FIG. 37, each holographic scanning disc 2211 employed in the laser scanning subsystem of FIG. 36 has sixteen holographic facets, each being realized as transmission-type volume holograms in the illustrative embodiments. As shown in FIGS. 39A through 39C, each single-disc holographic laser scanning platform 2210A through 2210E comprises essentially the same assembly of subcomponents as that depicted in FIGS. 3A7A through 3A7C, described in great detail hereinabove. Preferably, each holographic laser scanning platform employed therein is designed and constructed using the methods detailed in Applicant's copending application Ser. No. 08/949,915 filed Oct. 14, 1997, now U.S. Letters Pat. No. 6,085,978; Ser. No. 08/854,832 filed May 12, 1997, now Letter Pat. No. 6,085,978; Ser. No. 08/886,806 filed Apr. 22, 1997, now U.S. Letters Pat. No. 5,984,185; Ser. No. 08/726,522 filed Oct. 7, 1996; and Ser. No. 08/573,949 filed Dec. 18, 1995, now abandoned, each incorporated herein by reference. The design parameters for the holographic scanning facets on each holographic scanning disc in these subsystems are set forth in the Table of FIG. 38. Notably, the design parameters set forth in the table of FIG. 38 are defined in detail in the above-referenced US Patent Applications.

Package-In-The-Tunnel Indication Subsystem of the Second Illustrative Embodiment of the Present Invention The package-in-the-tunnel indication subsystem 2300 depicted in FIGS. 33 and 34 are realized as a pair of IR-based package detectors 2301A and 2301B which are mounted on the edges of the first and second conveyor lanes (CL1 and CL2) 2102A and 2102B of the conveyor belt, respectively. Each IR-based package detector 2301A and 2301B comprises an infrared (IR) transmitter 2302 in synchronous operation with an IR receiver 2303, as taught in U.S. Pat. No. 5,789,730 to Rockstein, et al., incorporated herein by reference. The function of each synchronous IR transmitter and receiver 2302 and 2303 is to automatically detect the presence of a package (i.e. object) moving into the scanning tunnel along the conveyor belt lane assigned thereto. Notably, in the illustrative embodiment, where there are dual package conveyor lanes, the IR range of each IR-based package detector is adjusted so that it extends only half the width of the conveyor belt. In alternative single-lane systems, only a single IR-based package detector is required to construct the package-in-the-tunnel indication subsystem 2300, and in such embodiments, the range of the IR-based package detector will extend across the entire length of the conveyor belt.

Package-Out-The-Tunnel Indication Subsystem of the Second Illustrative Embodiment of the Present Invention The package-out-of-the-tunnel indication subsystem 2400 depicted in FIGS. 33 and 34 are also realized as a pair of IR-based package detectors 2401A and 2401B which are mounted on the edges of the first and second conveyor lanes (CL1 and CL2) 2102A and 2102B of the conveyor belt, respectively. Each IR-based package detector 2401A and 2401B comprises an infrared (IR) transmitter 2402 in synchronous operation with an IR receiver 2403, as taught in U.S. Pat. No. 5,789,730, supra, incorporated herein by reference. The function of each synchronous IR transmitter and receiver 2402 and 2403 is to automatically detect the presence of a package (i.e. object) moving out of the scanning tunnel along the conveyor belt lane assigned thereto. Notably, in the illustrative embodiment, where there are dual package conveyor lanes, the IR range of each IR-based package detector 2401A and 2401B is adjusted so that it extends only half the width of the conveyor belt. In alternative single-lane systems, only a single IR-based package detector is required to construct the package-out-of-the-tunnel indication subsystem 2400, and in such embodiments, the range of the IR-based package detector will extend across the entire length of the conveyor belt.

Package/Belt Velocity Measurement Subsystem of the Second Illustrative Embodiment of the Present Invention As illustrated in FIG. 33, the package/belt velocity measurement subsystem 2600 of the illustrative embodiment is realized engaging a roller wheel 2601 (with a one linear foot circumference) against the undersurface of the conveyor belt 2101 and connecting a Model RG/RJ Optical Shaft Incremental encoder 2602 from PhotoCraft, Inc. of Elburn, Ill., to the axle of the roller wheel 2601. The function of the shaft encoder 2602 is to automatically generate a predetermined number of electrical pulses for each revolution of the roller wheel 2601 in order to indicate that the belt 2101 has undergone one linear foot of travel. These electrical pulses are provided to the high-speed input port of a programmed microprocessor 2603 which count the electrical pulses and generate a digital data element representative of the physical displacement of the conveyor belt, z=A. By timing the displacement of each linear foot of conveyor belt travel, the programmed microprocessor 2603 can calculate the instantaneous velocity of the conveyor belt and produce a digital data element representative thereof for use by the data element queuing, handling and processing subsystem 2900. In the illustrative embodiment, the programmed microprocessor 2603 also carries out the computational process depicted in the flow chart set forth in FIGS. 40A through 40C in order to compute the instantaneous velocity of the conveyor belt of the system of the second illustrative embodiment of the present invention.

Weighing-In-Motion Subsystem of the Second Illustrative Embodiment of the Present Invention As shown in FIGS. 33 and 34, the in-motion package weighing subsystem 2500 is preferably arranged about the package in-the-tunnel detection subsystem 2300. As shown, the in-motion weighing subsystem 2500 comprises: a pair of scale platforms 2501A and 2501B mounted along conveyor lanes CL1 and CL2, respectively, and each producing analog or digital weight signals indicative of the weight of a package(s) 2205 moving across the scale platforms 2501A and 2501B; a filtering circuit 2502 for filtering the analog or digital weight signals in order to remove noise components and artifacts therefrom; and a signal processor 2503 for processing the filtered weight signals in order to produce a digital data element representative of the measured weight of the package, for provision to the data element queuing, handling and processing subsystem 2900, via the I/O subsystem 2700. Notably, the in-motion weighing subsystem 2500 of the illustrative embodiment can be realized using the EXPRESSWEIGHT™ Model 9480 In-Motion Variable Box and Package Weighing System from Mettler-Toledo, Inc. of Worthington, Ohio.

Input and Output Subsystem of the Second Illustrative Embodiment of the Present Invention In the second illustrative embodiment shown in FIGS. 33 and 34, the function of the input/output (I/O) subsystem 2700 is to manage the data inputs to and the data outputs from the data management computer system 2800. In the illustrative embodiment, I/O subsystem 2700 can be realized using one or more rack-mounted I/O adapter boxes, such as the RocketPort Series RM16-RJ45 multiport serial controller having sixteen I/O ports, sold by the Control Corporation, of Saint Paul, Minn.

Data Element Queuing, Handling and Processing Subsystem of the Second Illustrative Embodiment of the Present Invention As illustrated in FIG. 34, data management computer 2800 is used to carry out the data element queuing, handling and processing subsystem 2900 in the second illustrative embodiment of the system of the invention. In FIGS. 41A and 41B, the structure and function of data element queuing, handling and processing subsystem 2900 is shown in greater detail.

As shown in FIGS. 41A and 41B, all data elements entering subsystem 2900 are provided to an I/O module 2901 having a plurality of input ports, and an output port which is connected to a data element time-stamping unit 2903 that is controlled by a timing/control unit 2902. In the illustrative embodiment, there are four (4) general types of data elements that might be loaded into the system event queue 2904, realized as a FIFO data structure known in the computing arts: (1) scan beam data elements; (2) package (weight) data elements; (3) package-in-tunnel (PIT) data elements; (4) package out-of-tunnel (POOT) data elements.

As shown in FIGS. 41A and 41B, the data element queuing, handling and processing subsystem 2900 further comprises a number of other modules, namely: a moving package tracking queue 2905 realized as a FIFO data structure known in the computing art, for queuing package (weight) data elements, package-in-tunnel (PIT) data elements, and package out-of-tunnel (POOT) data elements; and a data element analyzer 2906 (e.g. programmed microprocessor and associated memory structures) for reading the different types of data elements from the output of the system event queue 2904 and analyzing and handling the same according to the Data Element Handling Rules set forth in FIGS. 42A and 42B.

As shown in FIGS. 41A and 41B, scan beam data elements generated from the holographic laser scanning subsystems 2200A and 2200B are processed using a number of data processing modules, namely: a data element combining module 2907 for combining (i) each scan beam data element generated from holographic laser scanning subsystems 2200A and 2200B and accessed from the system event queue 2904 with (ii) each and every package data element in the moving package tracking queue 2905 so as to produce a plurality of combined data element pairs; a package location region (geometrical) modeling module 2908 for generating a vector-based (geometrical) model for the package location region indicated by the package data element in each combined data element pair produced by the data element combining module 2907; a scan beam geometry modeling module 2907 for generating a geometrical model for the laser scanning beam indicated by the scan beam data element in each combined data element pair produced by the data element combining module 2909; a homogeneous transformation (HG) module 2910 for transforming (i.e. converting) the coordinates of each scanning beam geometry model referenced to the local frame of reference (symbolically embedded within the holographic laser scanning system) into scanning beam geometry model coordinates referenced to the global coordinate reference $R_{global}$ at the "scanning position" within the scanning tunnel; a scan beam and package location region intersection determination module 2911 for determining, for each combined data element pair produced from the data element combining module 2907, whether the globally-referenced scan beam model produced by the HG transformation module 2910 intersects with the globally-referenced package location region model produced by the package location region modeling module 2908, and if so, then the data output subsystem 2912 produces, as output, package identification data and package measurement (e.g. weight and/or dimension) data for use by auxiliary systems associated with the tunnel scanning system of the second illustrative embodiment of the present invention.

Having described the overall structure and function of the data element queuing, handling and processing subsystem 2900 it is appropriate at this juncture to now briefly describe the operation thereof with reference to FIGS. 41A and 41B.

Prior to loading into the system event queue 2904 each data element is time-stamped (i.e. $T_j$) by the time-stamping module 2903 driven by a master clock within timing/control unit 2902 referenced to the global reference frame $R_{global}$. All data elements in the system event queue 2904 are handled by a data element analyzer/handler 2906 whose operation is governed by the Data Element Handling Rules set forth in the table of FIGS. 42A and 42B. In general, the data element queuing, handling and processing subsystem 2900 is best realized by an computing platform having a multi-tasking operating system (e.g. UNIX) capable of handling multiple "threads" at the same time.

Each package moving through the scanning tunnel shown in FIG. 33 will be represented by a data element (i.e. an object in an object-oriented programming environment e.g. Java programming environment) stored in the moving package tracking queue 2905. Package data elements are placed in the moving package tracking queue 2905 and matched with each scan beam data element accessed from the system event queue 2904 using the data element combining module 2907. Scan beam data elements generated from holographic-based scanning units 2200A and 2200B are processed along the scan data processing channel illustrated by blocks 2908, 2909, 2910 and 2911 set forth in FIGS. 41A and 41B.

The Package Location Region Modeling Subsystem of the Present Invention

As shown in FIG. 43, for each package scanned within the tunnel scanning subsystem, a vector-based model of the package location region is created by the package location region modeling subsystem (i.e. module) 2920 deployed with the data element queuing, handling and processing subsystem 2900 of FIG. 41. Notably, in the illustrative embodiment of FIG. 33, the "package location region" at the point of scanning within the tunnel is the subject matter of the package location region modeling subsystem 2908, rather than the geometry of the package itself as was the case in the system of the first illustrative embodiment shown in FIG. 1 through 32B. This is because the dimensions of the package are not determined in this illustrative embodiment, as they were in the first illustrative embodiment of the system of the present invention shown in FIG. 33. In the second illustrative embodiment, each package location region 2920 is mathematically represented (i.e. modeled) using a set of vectors (referenced to x=0, y=0, z=0) in the global reference frame $R_{global}$. The flow chart of FIGS. 44A and 44B describes a preferred modeling procedure for creating a vector-based model of the package location region at the point of package scanning within the tunnel scanning subsystem of FIG. 33.

As indicated at Block A in FIG. 44A, the first step in the modeling procedure involves determining whether the detected package is located in the first conveyor lane (CL1) or the second conveyor lane (CL2). As indicated at Block B in FIG. 44A, the second step uses (i) the time stamp (Tj) placed on the package data element associated with the detected package, and (ii) the time stamp (Tj+k) placed on the scan beam data element matched to the package data element by the data element combining module 2907.

As indicated at Block B in FIG. 44A, the above-identified time stamps (Tj) and (Tj+k) are used to compute the distance "d" traveled by the package using the following formula: d=ΔTV, where ΔT=(Tj+k)−(Tj), and v=package velocity determined by the package/belt velocity measurement subsystem 2600. As indicated at Block C in FIG. 44A, if the detected package resides in the first conveyor lane (CL1), then the subsystem assigns thereto a "package location region" model specified by the vector model: $0 \leq x \leq W/2$; $0 \leq y$; $d-\Delta d \leq z \leq d+\Delta d$ in the global reference system, wherein Δd is the prespecified focal zone depth associated with the laser scanning beam scanning the package at its scanning position at time (Tj+k).

As indicated at Block D in FIG. 44B, if the detected package resides in the second conveyor lane (CL2), then the subsystem assigns thereto a package location region model specified by the vector model: $W/2 \leq x \leq W$; $0 \leq y$; $d-\Delta d \leq z \leq d+\Delta d$ in the global reference system, wherein Δd is the prespecified focal zone depth associated with the laser beam scanning the package at its scanning position at time (Tj+k).

The Scan Beam Geometry Modeling Subsystem of the Second Illustrative Embodiment of the Present Invention In the tunnel scanning system of FIGS. 33 and 34, the scan beam geometry modeling subsystem 2909 (i.e. module) depicted in FIGS. 25A1 through 26 is employed in the subsystem 2909 shown in FIGS. 41A and 41B. Thus, the function of the scan beam geometry modeling subsystem (i.e. module) 2900 of FIGS. 41A and 41B is to create a vector-based model for the propagation of the laser scanning beam (ray) (i) emanating from a particular point on the facet, (ii) to its point of reflection on the corresponding beam folding mirror, and (iii) towards to the focal plane determined by the focal length of the facet. This modeling method is similar to the method illustrated in FIGS. 25B1 through 26 and described hereinabove, and therefore will not be repeated to avoid obfuscation of the present invention.

The Homogeneous (HG) Transformation Module of the Present Invention

FIG. 45 schematically describes how the homogeneous (HG) transformation module 2910 of FIGS. 41A and 41B uses homogeneous transformations to convert a vector-based "scanning beam" model referenced to a local scanner coordinate reference frame $R_{localscanner_j}$ into a corresponding vector-based "scanning beam" model referenced to the global scanner coordinate reference frame $R_{global}$ symbolically embedded within the system of FIG. 33. This mathematical technique is essential in that it converts locally-referenced coordinates used to represent the laser beam (which scanned a bar code symbol) into globally-referenced coordinates used to represent the same laser scanning beam. Notably, this method of coordinate conversion involves computing the package travel distance (z=d) between (i) the package detection position at which time stamp (Tj) is applied to the PIT data element, and (ii) the package scanning position at which time stamp (Tj+k) is applied to the scan beam data element. In the illustrative embodiment, this computation involves using (i) the package or conveyor belt velocity (v), and (ii) the difference in time (i.e. $\Delta T=$ (Tj+k)−(Tj)) indicated by the time stamps (Tj+k) and (Tj) placed on the scan beam data element and package data element, respectively, matched thereto during each scan beam/package location region intersection determination carried out within determination module 2911. Notably, this package displacement distance z=d, defined between the package detection and scanning positions, is given by the mathematical expression d=v$\Delta$T.

The Scan Beam and Package-Scanning Region Intersection Determination Subsystem of the Second Illustrative Embodiment of the Present Invention for use with Scan Beam Data Elements Produced by Holographic Scanning Subsystems The procedure carried out within the scan beam and package location region intersection determination module 2911 of FIGS. 41A and 41B is shown in FIG. 46. In general, the function of this computational module is to determine whether (i) the scan beam (rays) associated with a particular scan beam data element produced by a holographic scanning subsystem intersects with (ii) the package location region that has been modeled at a particular scanning position (i.e. specified by laser beam position information associated with the corresponding scan beam data element). If so, the module 2911 correlates the particular scan beam data element (i.e. package identification data element) with the package measurement data element corresponding to the modeled package location position.

As indicated at Block A in FIG. 46, the first step of the procedure involves using the minimum and maximum scan rays models of the laser scan beam (i.e. specified by the minimum and maximum facet scan angles) to determine the zone of coordinates about and within the focal planes of such scan rays models, expressed as: $X_{min} \pm \Delta x; y_{min} \pm \Delta y; z_{min} \pm \Delta z$; and $x_{max} \pm \Delta x; y_{max} \pm \Delta y; z_{max} \pm \Delta z$.

As indicated at Block B in FIG. 46, the next step of the method involves determining whether or not the zone of coordinates about and within the focal planes of the minimum and maximum scan rays fall within the spatial boundaries of the computed package location region located within either the first or second conveyor lane of the system. If the scan rays fall within the zone of coordinates specified at Block A, then, at Block C in FIG. 46, the method involves outputting a data element in the output queue comprising the package identification data and package measurement (e.g. weight and/or dimension) data for use by other auxiliary subsystems operably connected to the system. In general, such data elements can be displayed graphically, printed out as a list, provided to sorting subsystems, shipping pricing subsystems, routing subsystems and the like. If the scan rays do not fall within the zone of coordinates specified at Block A then, the method involves not outputting any data element in the output queue.

Automated Tunnel-Type Laser Scanning Package Identification and Weighing System Constructed According to a Third Illustrated Embodiment of the Present Invention Referring now to FIGS. 47 through 59B the automated laser scanning package identification and measurement system of the third illustrated embodiment 3000 will now be described in detail. In contrast with the capabilities of the systems of the first and second illustrative embodiments detailed above, the system of the third embodiment is capable of detecting, measuring, identifying and tracking multiple packages along the conveyor belt, regardless of their orientation or arrangement (e.g. stacked side-by-side and/or overlapping arrangements). As such, this novel system design, by incorporating many of the functionalities of the systems of the first and second illustrative embodiments, while providing several additional functionalities, enables simultaneous measurement and identification of non-singulated packages during transport along a high-speed conveyor subsystem so that auxiliary subsystems, operably connected to the tunnel-based system, can determine its safety and suitability for transport to its place of destination, and/or along its planned shipment route, with no human intervention.

Overview of the Tunnel Scanning System of the Third Illustrative Embodiment of the Present Invention As shown in FIGS. 47 and 48, the automated simultaneous package detecting, dimensioning and identifying system of the third illustrative embodiment is indicated by reference numeral 3000 and comprises an integration of subsystems, namely: a high-speed package conveyor subsystem having a conveyor belt 3101 having a width of at least 30 inches to support one or more package transport lanes along the conveyor belt; a tunnel or similar arrangement of bar code symbol readers 3201 including, in the illustrative embodiment, holographic and non-holographic (e.g. polygonal) laser scanning bar code symbol reading subsystems 3201A through 3201R supported overhead, alongside, and below the conveyor belt 3101 by a support frame 3202, for generating a 3-D "six-axis" type omnidirectional scanning volume 3203 thereabove, as depicted in FIGS. 5A through 9B, for scanning bar codes 3205 on packages 3204 transported therethrough; a first simultaneous multiple-package detection and dimensioning subsystem 3300 arranged on the input side of the tunnel scanning subsystem 3200, and including, in the illustrative embodiment, a laser-based scanning mechanism 3301 (shown in FIG. 49C) for generating an amplitude modulated laser beam that is repeatedly scanned across the width-wise dimension of the scanning tunnel while oriented in a direction substantially perpendicular to the surface of the conveyor belt, as shown in FIG. 49A and producing data representative of the height profile of packages entering the scanning tunnel, and processing the same to automatically detect the presence of each package moving along the conveyor belt and into the scanning tunnel, and generate a data element (i.e. data object) indicative thereof; a master clock 3400 for generating a global time reference used in connection with the time stamping of data elements generated within the system; a second simultaneous multiple-package detection and dimensioning subsystem 3300 arranged on the output side of the tunnel scanning subsystem 3200, and including, in the illustrative embodiment, a laser-based scanning mechanism 3301 for generating an amplitude modulated laser beam 3302 that is repeatedly scanned across the width-wise dimension of the scanning tunnel while oriented in a direction substantially perpendicular to the surface of the conveyor belt and producing data representative of the height profile of packages exiting the scanning tunnel and processing the same to automatically detect the presence of each package moving along the conveyor belt and out of the scanning tunnel, and generate a data element (i.e. data object) indicative thereof; a weighing-in-motion subsystem 3700, installed beneath the first simultaneous multiple-package detection and dimensioning subsystem 3500, along the conveyor belt structure, for weighing packages as they are transported therealong; a package/belt velocity measurement subsystem 3800 realized using a roller wheel 3801 engaged against the undersurface of the conveyor belt 3101, an optical shaft incremental encoder 3802 connected to the axle of the roller wheel 3801 and producing an electrical pulse output stream per revolution of the roller wheel, and a programmed microprocessor 3803 for processing the output pulse stream and producing digital data representative of the velocity of the conveyor belt (and thus package transported thereby) at any instant in time; an input/output subsystem 3900 for managing the data inputs to and data outputs from the system of FIG. 47; and a data management computer 3925, with a graphical user interface (GUI) 3926, for realizing a data element queuing, handling and processing subsystem 3950 as shown in FIGS. 48 and 49B2, as well as other data and system management functions.

The High-Speed Conveyor Belt Subsystem of the Third Illustrative Embodiment

As shown in FIGS. 47 and 48, the high-speed conveyor belt subsystem 3100 of the third illustrative embodiment comprises: a plurality of rollers 3102 spaced apart and supported by support frame structure (not shown in FIG. 47); a belt structure 3101, extending between and supported by a belt support structure 3103, and having a width of at least 30 inches to provide one or more package transport lanes along the conveyor belt subsystem; a drive motor 3104 for imparting torque to the rollers; and a belt velocity controller 3105 for controlling the velocity of the belt and thus packages during system operation.

First Simultaneous Multiple-Package Detection and Dimensioning Subsystem of the Third Illustrative Embodiment of the Present Invention As shown in FIG. 47, the first simultaneous multiple-package detection and dimensioning subsystem 3300 of the illustrative embodiment schematically depicted in FIG. 49A, is arranged on the input side of the tunnel scanning subsystem 3200, and comprises: a laser scanning unit 3301, mounted above the conveyor belt as shown in FIG. 47, and adapted for scanning the upwardly-facing surfaces of packages moving along the conveyor belt, using an amplitude modulated (AM) laser beam that is repeatedly swept across the entire width dimension thereof while oriented in substantially a perpendicular manner to the surface thereof, and generating an array of package height profile data $\{H_{n;i}\}$ where n=0, 1, 2, . . . , N-1 is the sampling index (i.e. position) along the widthwise dimension of the conveyor, and i is the sampling time index i=0, 1, 2, . . . , I indicative of when each array of height profile data $\{H_{n;i}\}$ is collected from the packages arranged on the conveyor belt using the laser scanning mechanism 3301; a height profile date queue 3302 for queuing height profile data elements $\{H_{n;i}\}$ for subsequent use and analysis; a data controller 3303 for transferring each linear array of height profile data $\{H_{n;i}\}$ to the height profile data queue 3302; a timing-stamping unit 3304, controlled by the master clock 3400 in FIG. 48, for generating time stamps $T_i$ to be symbolically linked to height profile data elements $\{H_{n;i}\}$ and the subelements thereof by way of the data controller 3303; a plurality of moving package tracking queues (FIFOs) 3305A through 3305D, each corresponding to different spatial location above the conveyor belt and adapted for buffering "data objects" representative of detected packages and their various attributes, in an object-oriented programming environment (e.g. a Java programming environment); a height profile data analyzer 3306 for removing a height profile data element $\{H_{n;i}\}$ from the output port of the height profile data queue 3302, and writing the same to the input port of one of the moving package tracking queues 3305A through 3305D, as well as removing one or more data objects (representative of detected/tracked packages) from the output ports of one or more moving package tracking queues 3305A through 3305D and writing the same to the input port of the I/O unit 3951A shown in FIG. 51A. Collectively, subcomponents 3302 through 3306 form the height profile data processor 3307 of the first simultaneous multiple-package detection and dimensioning subsystem 3300.

As shown in FIG. 49C, the laser beam scanning mechanism 3301 of the illustrative embodiment comprises: at least one visible laser diode VLD 3340 for producing a low power visible laser beam 3341; an amplitude modulation (AM) circuit 3342 for modulating the amplitude of the visible laser beam produced from the VLD at a frequency $f_0$; an optomechanical, an electro-optical or an acousto-optical mechanism 3343 for sweeping the modulated laser beam across a conveyor belt or like transport structure and collecting the reflected light from the scanned packages moving thereal-ong; an optical detector 3344 for converting received optical signal 3341' into an electrical signal 3341"; an amplifier and filter circuit 3345 for isolating the $f_0$ signal component and amplifying it; a phase detector 3346 for mixing the reference $f_0$ signal component from the AM circuit 3342 and the received go signal component reflected from the packages and producing a resulting signal which is equal to a DC voltage proportional to the Cosine of the phase difference between the reference and the reflected $f_0$ signals; an amplifier circuit 3347 for amplifying the phase difference signal; an A/D converter 3348 for converting the DC voltage into digital data element representative of the distance to a point on the surface of the scanned package moving along the conveyor belt (i.e. height profile of the scanned packages; and a sampling circuit 3349 for sampling the digital data elements so as to produce, at each sampling instant $T_i$, an array of N package height profile data elements $\{H_{n;i}\}$ taken along n=N equally spaced sampling positions (i.e. locations) along the width of the conveyor belt.

Notably, the CLC-based laser beam steering mechanisms disclosed in Published International Patent Application No. WO 95/24671 entitled "Electromagnetic Beam Scanning Arrays and Electro-Optical Image Display Systems Incorporating The Same" by Reveo, Inc., incorporated herein by reference, can be used to electronically sweep the amplitude modulated laser beam cross the width of the conveyor belt in an electronically controlled manner. This WIPO Patent Application Publication teaches how to construct laser beam steering and scanning devices utilizing beam steering cells having transmission and reflecting characteristics which are dependent upon the wavelength and polarization state of incident laser beams. Each beam steering cell includes a cholesteric liquid crystal material element and an electrically-controlled variable half-wave retarder. Depending on whether or not the retarder is actuated, the laser beam is either diverted along another orthogonal path or remains along the original path.

Alternatively, the laser beam scanning unit 3301 may be realized using the Cargoscan™ Model CS5900 Arm by Cargoscan, Inc., a Mettler Toledo Company. Notably, this laser based height measuring device is based on teachings disclosed in U.S. Pat. Nos. 5,742,068 and 5,528,517, each being incorporated herein by reference. In other embodiments, the laser beam scanning unit 3301 may be replaced with a stereoscopic camera subsystem in which stereoscopic-image pairs are captured from packages along the conveyor belt, and processed to determine the vertices of the imaged packages as well as the length, height and width dimensions thereof measured relative to a local coordinate referenced symbolically embedded in the stereoscopic camera subsystem.

In order to simultaneously detect and measure multiple packages arranged in either a stacked, side-by-side and/or hybrid configuration while moving through the first multiple-package detection and dimensioning subsystem 3300, a novel data processing structure is provided within the height profile data analyzer 3306 shown in FIG. 49A. As shown in FIGS. 49B1 and 49B2, the data processing structure of the illustrative embodiment comprises: a package height/run-length difference engine 3308 for processing, as input, each height profile data array $\{H_{n;i}\}$ of length N provided to its data input ports at sampling time $T_i$, and producing as output a height/width profile difference data array $\{\Delta H_{n,n-1;i}\}$ of length N−1 indicative of package height profile changes between position n and n−1 at sampling time $T_i$ with respect to the widthwise dimension of the conveyor belt; a package height/width difference engine 3309 for processing, as input, time-consecutive height profile data arrays $\{H_{n;i}\}$ and $\{H_{n;i+1}\}$ each of length N, and producing as output a height profile difference data array $\{\Delta H_{n;i,i-1}\}$ of length N−1, indicative of package height profile changes at sampling position n over sampling times $T_i$ and $T_{i-1}$ with respect to the run-lengthwise dimension of the conveyor belt; and a height profile data analyzer 3310 for processing, as input, each height/width profile difference data array $\{\Delta H_{n,n-1;i}\}$ and height/run-length difference data array $\{\Delta H_{n,n-1;i}\}$ produced by the difference engines 3308 and 3309, and producing as output, time-stamped PIT data elements as well as time-stamped Package Dimension Data Elements (PDEs) for buffering in moving package tracking queues 3305A through 3305D, shown in FIG. 49A.

In the illustrative embodiment of FIGS. 49B1 and 49B2, the package height/run-length difference engine 3308 comprises: a first data array buffering unit 3311 having N input data ports and N output data ports, and adapted for buffering the height profile data array $\{H_{n;i}\}$ captured from the conveyor belt at sampling time $T_i$, where n=0, 1, 2, ..., N−2, N−1; a second data array buffering unit 3312 having N input data ports and N output data ports, and adapted for buffering the height profile data array $\{H_{n;i}\}$ captured from the conveyor belt at sampling time $T_{i-1}$, where n=0, 1, 2, ..., N−2, N−1; a height data array differentiator unit 3313 for comparing time-consecutive height profile data arrays $\{H_{n;i}\}$ and $\{H_{n;i+1}\}$ captured at sampling times $T_i$ and $T_{i-1}$ at sampling position n along the run-lengthwise dimension of the conveyor belt, and producing as output a height profile difference data array $\{\Delta H_{n;i,i-1}\}$ of length N−1, indicative of package height profile changes at sampling position n over sampling times $T_i$ and $T_{i-1}$, with respect to the run-lengthwise dimension of the conveyor belt; a third data array buffering unit 3314 having N−1 input data ports and N−1 output data ports, and adapted for buffering the height profile difference data array $\{\Delta H_{n;i,i-1}\}$ of length N−1 produced from the height data array differentiator unit 3313, prior to transfer as input to the height profile data analyzer 3310. As shown in FIGS. 49B1 and 49B2, the operation of units 3311, 3312, 3313 and 3314 are each controlled by the height profile data analyzer 3310 which, in the preferred embodiment, is realized as a programmed microprocessor provided with a memory hierarchy for high-speed performance.

In the illustrative embodiment of FIGS. 49B1 and 49B2, the package height/width difference engine 3309 comprises: a first data array buffering unit 3315 having N input data ports and N output data ports, and adapted for buffering the height profile data array $\{H_{n;i}\}$ captured from the conveyor belt at sampling time $T_1$, where n=0, 1, 2, ..., N−2, N−1; an array of N−1 height data differentiation units 3316A through 3316C for comparing spatially-contiguous height profile data samples $H_{n;i}$ and $H_{n-1;i}$ captured at sampling time $T_i$ over sampling positions n and n−1, respectively, along the widthwise dimension of the conveyor belt, and producing as output a height profile difference data array $\{\Delta H_{n,n-1;i}\}$ of length N−1, indicative of package height profile changes between sampling positions n and n−1 at sampling time $T_i$ with respect to the widthwise dimension of the conveyor belt; a second data array buffering unit 3317 having N−1 input data ports and N−1 output data ports, and adapted for buffering the height profile difference data array $\{\Delta H_{n,n-1;i}\}$ produced from the array of height sample differentiator units 3316A through 3316C, prior to transfer as input to the height profile data analyzer 3310. As shown, the operation of units 3315, 3316A, 3316B, 3316C and 3317 are each controlled by the height profile data analyzer 3310 described above.

As shown in FIGS. 49B1 and 49B2, the height profile data analyzer 3310 receives, as input, height profile difference data arrays a$\{\Delta H_{n,n-1;i}\}$ and $\{\Delta H_{n;i,i-1}\}$ which are buffered and analyzed in order to automatically carry out the following functions in a programmed manner, namely: (1) detecting singulated, stacked and/or side-by-side configurations of packages on the conveyor belt about the enter the scanning tunnel and, for each detected package thereabout, generating one package-in-the-tunnel (PIT) data element (or token) and attaching thereto, a time-stamp ($T_i$) obtained from the underlying height profile data utilized in the package detection process; (2) obtaining (i.e. computing) accurate height, width and/or length dimension measurements for each detected package, and attaching thereto, a time-stamped obtained from the underlying height profile data utilized in the package measurement process; (3) loading each time-stamped PIT data element into the spatially correct moving package tracking queue 3305A through 3305D shown in FIGS. 49B1 and 49B2, based on dimensional data obtained for the corresponding package, so as to create a unique trackable "data object" therefor within the first multiple-package detection and dimensioning subsystem 3300; (4) loading time-stamped package dimension data elements (PDEs) into the spatially correct moving package tracking queue 3305A through 3305D shown in FIGS. 49B1 and 49B2, in order to link the same with and becoming an attribute of the corresponding package (i.e. object) in the moving package tracking queue; (5) transferring each data object in each moving package tracking queue 3305A through 3305D, into its corresponding moving package queues 3954A, 3954B, 3954C, or 3954D maintained in the data element queuing, handling and processing subsystem 3950 shown in FIGS. 51A1 and 51A2; and (6) resetting (i.e. flushing) the moving package tracking queues 3305A through 3305D each time the height data profile analyzer 3310 determines that one or more packages on the conveyor belt, arranged in a stacked and/or side-by-side configuration, appear in a singulated configuration with respect to a downstream arrangement of packages.

Preferably, the height profile data naalyzer 3310 employs six different types of data processing rules (i.e. expressed in the IF x, THEN y format) in order to carry out the six above-described functions. As illustrated in FIG. 49C, these data processing rules can be categorized in the following six classes: (1) Package Detection Rules; (2) Package Measurement Rules; (3) Add Package Object To Queue Rules; (4) Add Package Attributes To Queue Rules; (5) Remove Package Object From Queue Rules; and (6) Reset Package Tracking Queue Rules. It is understood that there are many different ways to analyze the package height profile data elements and implement the six above-described functions. Having the benefit of the present disclosure, one with ordinary skill in the art can write these rules in a straightforward manner so that the above-described functions of the height profile data analyzer 3310 are realized.

Second Simultaneous Multiple-package Detection and Dimensioning Subsystem of the Third Illustrative Embodiment of the Present Invention As shown in FIG. 47, the second simultaneous multiple-package detection and dimensioning subsystem 3500 of the illustrative embodiment schematically depicted in FIG. 50A, is arranged on the output side of the tunnel scanning subsystem 3200, and comprises: a laser scanning unit 3501, mounted above the conveyor belt as shown in FIG. 49, and adapted for scanning the upwardly-facing surfaces of packages moving along the conveyor belt, using an amplitude modulated (AM) laser beam that is repeatedly sweeping across the entire width dimension thereof while oriented in substantially perpendicular manner to the surface thereof, and generating an array of package height profile data $\{H_{n;i}\}$ where n=0, 1, 2, . . . , N−1 is the sampling position (i.e. index) along the widthwise dimension of the conveyor, and i is the sampling time index i=0, 1, 2, . . . , I indicative of when each array of height profile data $\{H_{n;i}\}$ is collected from the packages arranged on the conveyor belt using the laser scanning mechanism 3501; a height profile date queue 3502 for queuing height profile data elements $\{H_{n;i}\}$ for subsequent use and analysis; a data controller 3503 for transferring each linear array of height profile data $\{H_{n;i}\}$ to the height profile data queue 3502; a timing-stamping unit 3504, controlled by the master clock 3400 in FIG. 48, for generating time stamps $T_i$ to be symbolically linked to height profile data elements $\{H_{n;i}\}$ and the subelements thereof by way of the data controller 3503; a plurality of moving package tracking queues (FIFOs) 3505A through 3505D, each corresponding to different spatial location above the conveyor belt and adapted for buffering "data objects" representative of detected packages and their various attributes, in an object-oriented programming environment (e.g. a Java programming environment); a height profile data analyzer 3506 for removing a height profile data element $\{H_{n;i}\}$ from the output port of the height profile data queue 3502, and writing the same to the input port of one of the moving package tracking queues 3505A through 3505D, as well as removing one or more data objects (representative of detected/tracked packages) from the output ports of one or more moving package tracking queues 3505A through 3505D and writing the same to the input port of the I/O unit 3951A shown in FIG. 51A. Collectively, subcomponents 3502 through 3506 form the height profile data processor 3507 of the second simultaneous multiple-package detection and dimensioning subsystem 3500.

As shown in FIG. 50C, the laser beam scanning mechanism 3501 of the illustrative embodiment comprises: at least one visible laser diode VLD 3540 for producing a low power visible laser beam 3541; an amplitude modulation (AM) circuit 3542 for modulating the amplitude of the visible laser beam produced from the VLD at a frequency $f_0$; an opto-mechanical, an electro-optical or an acousto-optical mechanism 3543 for sweeping the modulated laser beam across a conveyor belt or like transport structure and collecting the reflected light from the scanned packages moving thereal-ong; an optical detector 3544 for converting received optical signal 3541' into an electrical signal 3541"; an amplifier and filter circuit 3545 for isolating the $f_0$ signal component and amplifying it; a phase detector 3546 for mixing the reference $f_0$ signal component from the AM circuit 3542 and the received $f_0$ signal component reflected from the packages and producing a resulting signal which is equal to a DC voltage proportional to the Cosine of the phase difference between the reference and the reflected $f_0$ signals; an amplifier circuit 3547 for amplifying the phase difference signal; an A/D converter 3548 for converting the DC voltage into digital data element representative of the distance to a point on the surface of the scanned package moving along the conveyor belt (i.e. height profile of the scanned packages; and a sampling circuit 3549 for sampling the digital data elements so as to produce, at each sampling instant $T_i$, an array of N package height profile data elements $\{H_{n;i}\}$ taken along n=N equally spaced sampling positions (i.e. locations) along the width of the conveyor belt. Notably, the CLC-based laser beam steering mechanisms disclosed in Published International Patent No. WO 95/24671 entitled "Electromagnetic Beam Scanning Arrays and Electro-Optical Image Display Systems Incorporating The Same" by Reveo, Inc., can be used to electronically sweep the amplitude modulated laser beam across the width of the conveyor belt in an electronically controlled manner.

Alternatively, the laser beam scanning unit 3501 may be realized using the Cargoscan™ Model CS5900 Arm by Cargoscan, Inc., a Mettler Toledo Company. Notably, this laser based height measuring device is based on teachings disclosed in U.S. Pat. Nos. 5,742,068 and 5,528,517, each being incorporated herein by reference.

In order to simultaneously detect and measure multiple packages arranged in either a stacked, side-by-side and/or hybrid configuration while moving through the second multiple-package detection and dimensioning subsystem 3500, the novel data processing structure employed in the height profile data processor 3507 in the height profile data analyzer 3306 shown in FIG. 49A, is also provided in the height profile data processor 3507 shown in FIG. 50A. As shown in FIGA. 50B1 and 50B2, the data processing structure of the illustrative embodiment comprises: a package height/run-length difference engine 3509 for processing, as input, each height profile data array $\{H_{n;i}\}$ of length N provided to its data input ports at sampling time $T_i$, and producing as output a height/width profile difference data array $\{\Delta H_{n,n-1;i}\}$ of length N−1 indicative of package height profile changes between position n and n−1 at sampling time $T_i$ with respect to the widthwise dimension of the conveyor belt; a package height/width difference engine 3509 for processing, as input, time-consecutive height profile data arrays $\{H_{n;i}\}$ and $\{H_{n;i+1}\}$ each of length N, and producing as output a height profile difference data array $\{\Delta H_{n;i,i-1}\}$ of length N–1, indicative of package height profile changes at sampling position n over sampling times $T_i$ and $T_{i-1}$ with respect to the run-lengthwise dimension of the conveyor belt; and a height profile data analyzer 3510 for processing, as input, each height/width profile difference data array $\{\Delta H_{n,n-1;i}\}$ and height/run-length difference data array $\{\Delta H_{n,n-1;i}\}$ produced by the difference engines 3508 and 3509, and producing as output, time-stamped PIT data elements as well as time stamped Package Dimension Data Elements (PDEs) for buffering in moving package tracking queues 3505A through 3505D, shown in FIG. 50A.

In the illustrative embodiment of FIGS. 50B1 and 50B2, the package height/run-length difference engine 3508 comprises: a first data array buffering unit 3511 having N input data ports and N output data ports, and adapted for buffering the height profile data array $\{H_{n;i}\}$ captured from the conveyor belt at sampling time $T_i$, where n=0, 1, 2, ... , N–2, N–1; a second data array buffering unit 3512 having N input data ports and N output data ports, and adapted for buffering the height profile data array $\{H_{n;i}\}$ captured from the conveyor belt at sampling time $T_{i-1}$, where n=0, 1, 2, ... , N–2, N–1; a height data array differentiator unit 3513 for comparing time-consecutive height profile data arrays $\{H_{n;i}\}$ and $\{H_{n;i+1}\}$ captured at sampling times $T_i$ and $T_{i-1}$ at sampling position n along the run-lengthwise dimension of the conveyor belt, and producing as output a height profile difference data array $\{\Delta H_{n;i,i-1}\}$ of length N–1, indicative of package height profile changes at sampling position n over sampling times $T_i$ and $T_{i-1}$ with respect to the run-lengthwise dimension of the conveyor belt; a third data array buffering unit 3514 having N–1 input data ports and N–1 output data ports, and adapted for buffering the height profile difference data array $\{\Delta H_{n;i,1-1}\}$ of length N–1 produced from the height data array differentiator unit 3513, prior to transfer as input to the height profile data analyzer 3510. As shown in FIGS. 50B1 and 50B2, the operation of units 3511, 3512, 3513 and 3514 are each controlled by the height profile data analyzer 3510 which, in the preferred embodiment, is realized as a programmed microprocessor provided with a memory hierarchy for high-speed performance.

In the illustrative embodiment of FIGS. 50B1 and 50B2, the package height/width difference engine 3509 comprises: a first data array buffering unit 3515 having N input data ports and N output data ports, and adapted for buffering the height profile data array $\{H_{n;i}\}$ captured from the conveyor belt at sampling time $T_i$, where n=0, 1, 2, ... , N–2, N–1; an array of N–1 height data differentiation units 3516A through 3516C for comparing spatially-contiguous height profile data samples $H_{n;i}$ and $H_{n-1;i}$ captured at sampling time $T_i$ over sampling positions n and n–1, respectively, along the widthwise dimension of the conveyor belt, and producing as output a height profile difference data array $\{\Delta H_{n,n-1;i}\}$ of length N–1, indicative of package height profile changes between sampling positions n and n–1 at sampling time $T_i$ with respect to the widthwise dimension of the conveyor belt; a second data array buffering unit 3517 having N–1 input data ports and N–1 output data ports, and adapted for buffering the height profile difference data array $\{\Delta H_{n,n-1;i}\}$ produced from the array of height sample differentiator units 3516A through 3516C, prior to transfer as input to the height profile data analyzer 3510. As shown, the operation of units 3515, 3516A, 3516B, 3516C and 3517 are each controlled by the height profile data analyzer 3510 described above.

As shown in FIGS. 50B1 and 50B2, the height profile data analyzer 3510 receives, as input, height profile difference data arrays $\{\Delta H_{n,n-1;i}\}$ and $\{\Delta H_{n;i,i-1}\}$ which are buffered and analyzed in order to automatically carry out the following functions in a programmed manner, namely: (1) detecting singulated, stacked and/or side-by-side configurations of packages on the conveyor belt exiting the scanning tunnel and, for each detected package exiting the same, generating one package-out-of-the-tunnel (POOT) data element (or token) and attaching thereto, a time-stamp ($T_i$) obtained from the underlying height profile data utilized in the package detection process; (2) obtaining (i.e. computing) accurate height, width and/or length dimension measurements for each detected package, and attaching thereto, a time-stamped obtained from the underlying height profile data utilized in the package measurement process; (3) loading each time-stamped POOT data element into the spatially correct moving package tracking queue 3505A through 3505D shown in FIG. 50A, based on dimensional data obtained for the corresponding package, so as to create a unique trackable "data object" therefor within the multiple-package detection and dimensioning subsystem 3500; (4) loading time-stamped package dimension data elements (PDEs) into the spatially correct moving package tracking queue 3505A through 3505D shown in FIG. 50A, in order to link the same (as an attribute) to the corresponding package (i.e. object) in the moving package tracking queue; (5) transferring each data object in each moving package tracking queue 3505A through 3505D, into its corresponding moving package queues 3954A, 3954B, 3954C, or 3954D maintained in the data element queuing, handling and processing subsystem 3950 shown in FIGS. 51A1 and 51A2; and (6) resetting (i.e. flushing) the moving package tracking queues 3505A through 3505D each time the height data profile analyzer 3510 determines that one or more packages on the conveyor belt, arranged in a stacked and/or side-by-side configuration, appear in a singulated configuration with respect to a downstream arrangement of packages.

Preferably, the height profile data analyzer 3510 employs six different types of data processing rules (i.e. expressed in the IF x, THEN y format) in order to carry out the six above-described functions. As illustrated in FIG. 50C, these data processing rules can be categorized in the following six classes: (1) Package Detection Rules; (2) Package Measurement Rules; (3) Add Package Object To Queue Rules; (4) Add Package Attributes To Queue Rules; (5) Remove Package Object From Queue Rules; and (6) Reset Package Tracking Queue Rules. It is understood that there are many different ways to analyze the package height profile data elements and implement the six above-described functions, it will be helpful for illustrative purposes, to provide below an example of a rule in each of the six above-described classes. Having the benefit of the present disclosure, one with ordinary skill in the art can write these rules in a straight-forward manner so that the above-described functions of the height profile data analyzer 3510 are realized.

Weighing-In-Motion Subsystem of the Third Illustrative Embodiment of the Present Invention As shown in the FIGS. 47 and 48, the in-motion package weighing subsystem 3700 is preferably arranged about the first simultaneous multiple package detection and dimensioning subsystem 3300. As in the first and second illustrative system embodiments, the in-motion weighing subsystem 3700 comprises: a scale platform integrated with the conveyor belt 3101, for producing analog or digital weight signals indicative of the weight of a package(s) 3204 moving across the scale platform; a filtering circuit for filtering the analog or digital weight signals in order to remove noise components and artifacts therefrom; and a signal processor for processing the filtered weight signals in order to produce a digital word representative of the measured weight of the package. Notably, the in-motion weighing subsystem of the illustrative embodiment can be realized using the 9480 EXPRESSWEIGHT™ In-Motion Variable Box and Package Weighing System from Mettler-Toledo, Inc. of Worthington, Ohio.

Package/Belt Velocity Measurement Subsystem of the Third Illustrative Embodiment of the Present Invention In the third illustrative system embodiment shown in FIGS. 47 and 48, the package/belt velocity measurement subsystem 3800 is realized as a number of subcomponents, namely: a roller wheel 3801 engaged against the undersurface of the conveyor belt 3101; an optical shaft incremental encoder 3802 connected to the axle of the roller wheel 3801 and producing an electrical pulse output stream per revolution of the roller wheel; and a programmed microprocessor 3803 for processing the output pulse stream and producing digital data representative of the velocity of the conveyor belt (and thus package transported thereby) at any instant in time. As shown in FIG. 47, the digital velocity information is provided to an assigned data input port provided by the I/O subsystem 3900.

Input/Output Subsystem of the Third Illustrative Embodiment of the Present Invention In the system shown in FIGS. 47 and 48, the function of the input/output subsystem 3900 is to manage the data inputs to and the data outputs from the data management computer system 3925. In the illustrative embodiment, I/O subsystem 3900 or can be realized using one or more rack-mounted I/O adapter boxes, such as the RocketPort Series RM16-RJ45 multiport serial controller having sixteen or thirty-two I/O ports, sold by the Control Corporation, of Saint Paul, Minn.

Data Management Computer of the Third Illustrative Embodiment of the Present Invention In the system shown in FIGS. 47 and 48, the function of the data management computer 3925, with a graphical user interface (GUI) 3926, is to provide a powerful computing platform for realizing the data element queuing, handling and processing subsystem 3950 in a real-time manner, in addition to carrying out other data and system management functions. In general, subsystem 3950 is best realized by an computing platform having a multi-tasking operating system capable of handling multiple "threads" at the same time.

Figure 51B:
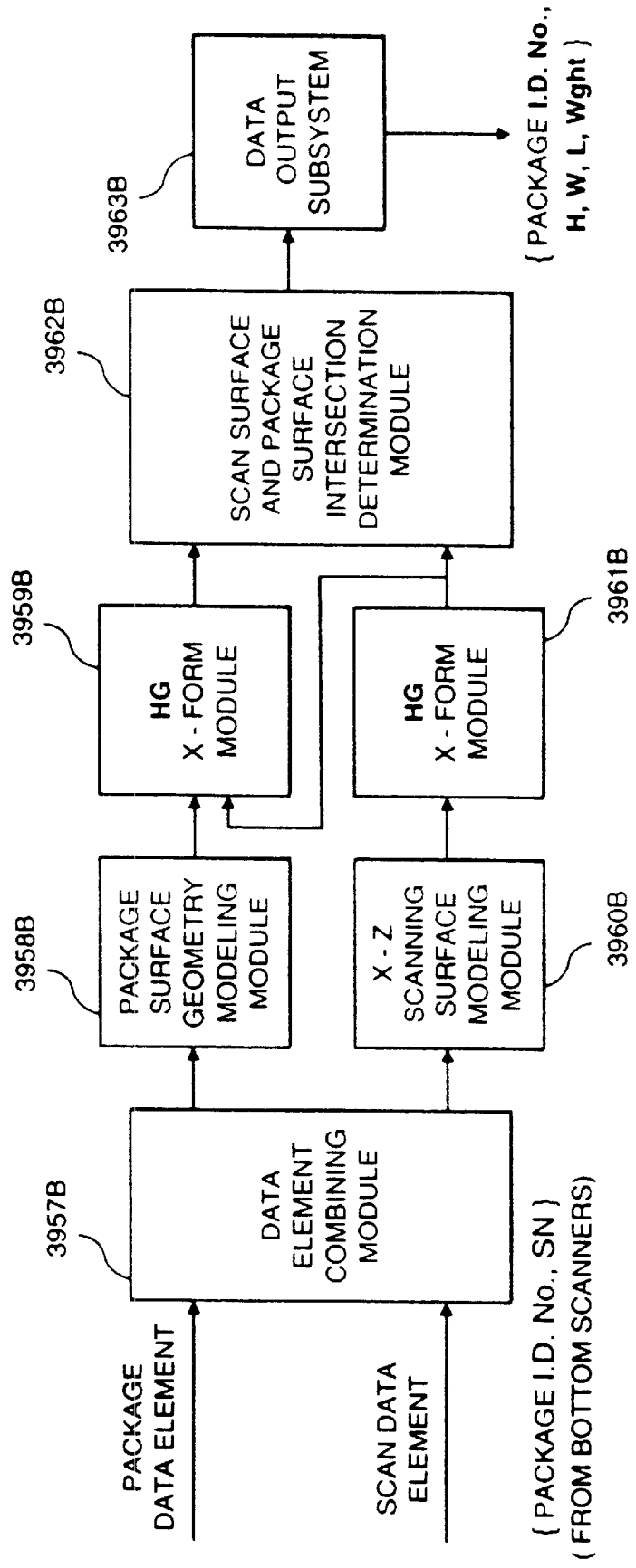

The Data Element Queuing, Handling and Processing Subsystem of the Third Illustrative Embodiment of the Present Invention In FIGS. 51A1, 51A2 and 51B, the structure and function of data element queuing, handling and processing subsystem 3950 is shown in greater detail. As shown in FIGS. 51A1 and 51A2, all time-stamped data objects, including PIT, POOT and package data elements associated therewith, are transferred from the moving package tracking queues 3305A through 3305D in subsystem 3300 and the moving package tracking queues 3505A through 3505D in subsystem 3500, to a first I/O unit 3951A provided in subsystem 3950. Also, all scan beam data elements (SBDEs) and belt/package velocity measurements are provided to a second I/O unit 3951B.

As shown in FIGS. 51A1 and 51A2, each data object entering the subsystem 3950 though I/O unit 3951A is directly loaded into the system event queue 3956 under the control of data controller 3952 without performing any form of time-stamping operation, as these data elements already carry time-stamps placed thereon when generated in the package detection and dimensioning subsystems 3300 and 3500. In the illustrative embodiment, the data controller 3952 is realized as a programmed microprocessor and associated memory structures, whereas the system event queue 3956 is realized as a FIFO data structure known in the computing art. Preferably, data objects obtained from the I/O unit 3951 A having earlier time-stamps are loaded into the system event queue 3956 before data objects having more recent time-stamps. All incoming scan beam data elements and velocity measurements passing through I/O unit 3951B are time-stamped by the data controller 3952 using time-stamping unit 3953 (referenced to the master clock 3400 shown in FIG. 48), and then loaded into the system event queue 3956 under the control of the data controller 3952, as shown in FIGS. 51A1 and 51A2.

In the data element queuing, handling and processing subsystem 3950, the function of the data element analyzer/handler 3955 is to read the data elements (including data objects) from the output port of the system event queue 3956, and analyze and handle the same according to the Data Element Handling Rules set forth in FIGS. 52A and 52B.

As shown in FIGS. 51A1 and 51A2, scan beam data elements generated from "holographic type" laser scanning subsystems in the scanning tunnel must be processed using a system of data processing modules illustrated in FIGS. 51A1 and 51A2. As shown in FIGS. 51A1 and 51A2, this system of data processing modules comprises a data element combining module 3957A for combining (i) each scan beam data element generated from "holographic-type" laser scanning subsystems and accessed from the system event queue 3956 with (ii) each and every data object (i.e. package data element) in the moving package tracking queues 3954A through 3954D, so as to produce a plurality of combined data element pairs; a package surface geometry modeling module 3958A for generating a geometrical model for the package represented by the package data element in each combined data element pair produced by the data element combining module 3957A; a homogeneous transformation (HG) module 3959A for transforming (i.e. converting) the coordinates of each package surface geometry model produced at the "dimensioning position" in the global coordinate reference frame $R_{global}$ into package surface geometry model coordinates at the "scanning position" within the scanning tunnel (i.e. displaced a distance "z" from the package dimensioning position); a scan beam geometry modeling module 3960A for generating a geometrical model for the laser scanning beam represented by the scan beam data element in each combined data element pair produced by the data element combining module 3957A; a homogeneous transformation (HG) module 3961A for transforming (i.e. converting) the coordinates of each scanning beam geometry model referenced to the local frame of reference symbolically embedded within the holographic laser scanning system, into scanning beam geometry model coordinates referenced to the global coordinate reference $R_{global}$ at the "scanning position" within the scanning tunnel; a scan beam and package surface intersection determination module 3962A for determining, for each combined data element pair produced from the data element combining module, whether the globally-referenced scan beam model produced by the HG transformation module 3961A intersects with the globally-referenced package surface model produced by the HG transformation module 3959A and if so, then the data output subsystem 3963A produces, as output, package identification data, package dimension data (e.g. height, length, width data etc.), and package weight data, for use by auxiliary systems associated with the tunnel scanning system of the present invention.

As shown in FIG. 51B, scan beam data elements generated from "non-holographic type" laser scanning subsystems must be processed using a different system of data processing modules than that shown in FIGS. 51A1 and 51A2. As shown in FIG. 51B, this system of data processing modules comprises: a data element combining module 3957B (similar to module 3957A) for combining (i) each scan beam data element generated from the "non-holographic-type" bottom-located laser scanning subsystems and accessed from the system event queue 3956 with (ii) each and every package data element in each of the moving package tracking queues 3954A through 3954D so as to produce a plurality of combined data element pairs; a package surface geometry modeling module 3958B (similar to module 3958A) for generating a geometrical model for the package represented by the package data object in each combined data element pair produced by the data element combining module 3957B; a homogeneous transformation (HG) module 3959B (similar to module 3959A) for transforming (i.e. converting) the coordinates of each package surface geometry model produced at the "dimensioning position" in the global coordinate reference frame $R_{global}$ into package surface geometry model coordinates at the "scanning position" within the scanning tunnel (i.e. displaced a distance z from the package dimensioning position); a X-Z scanning surface (geometry) modeling module 3961B for generating a geometrical model for the laser scanning surface represented by the scan beam data element in each combined data element pair produced by the data element combining module 3957B; a homogeneous transformation (HG) module 3961B for transforming (i.e. converting) the coordinates of each X-Z scanning surface geometry model referenced to the local frame of reference symbolically embedded within the non-holographic bottom laser scanning subsystem, into scanning beam geometry model coordinates referenced to the global coordinate reference $R_{global}$, at the "scanning position" within the scanning tunnel; a scan beam and package surface intersection determination module 3962B for determining, for each combined data element pair produced from the data element combining module 3957B, whether the globally-referenced scanning surface model produced by the HG transformation module 3960B intersects with the globally-referenced package surface model produced by the HG transformation module 3959B, and if so, then the data output subsystem 3963B produces, as output, package identification data, package dimension data (e.g. height, width data etc.), and package weight data, for use by auxiliary systems associated with the tunnel scanning system of the present invention.

Having described the overall structure and function of the data element queuing, handling and processing subsystem 3950, it is appropriate at this juncture to now briefly describe the operation thereof with reference to FIGS. 51A1 and 51A2.

Prior to loading into the system event queue 3956, each scan beam data element (SBDE) and each belt/package velocity measurement (v) is time-stamped (i.e. $T_j$) by timing stamping unit 3953 which is driven by a clock therewithin referenced to the master clock 3400 in FIG. 48. All data elements in the system event queue 3956 and moving package tracking queues 3954A through 3954D are handled by the data element analyzer/handler 3955 which is governed by the table of Data Element Handling Rules set forth in FIGS. 52A and 52B. In general, data element queuing, handling and processing subsystem 3950 is best realized by a computing platform having a multi-tasking operating system capable of handling multiple "threads" at the same time.

Package data objects removed from system event queue 3956 by data element analyzer/handler 3955 are placed into the appropriate moving package tracking queues 3954A through 3954D based on an analysis of the package dimension data elements associated with removed package data objects. As in the case of the first multiple package detection and dimensioning subsystem 3300, each package moving through the scanning tunnel is represented by an "object" in an object-oriented programming environment (e.g. Java programming environment) stored in a moving package tracking queue 3954A through 3954D operably connected to the data element analyzer/handler 3955. Package data objects placed in the appropriate moving package tracking queues 3954A through 3954D, are removed therefrom by the data element analyzer/handler 3955 in accordance with the data element handling rules set forth in the table of FIGS. 52A and 52B.

Scan beam data elements generated from holographic-based scanning units are processed along the scan data processing channel illustrated by blocks 3960A, 3961A and 3962A set forth in the lower right hand corner of FIGS. 51A1 and 51A2, whereas scan beam data elements generated from non-holographic based scanning units (e.g. from the bottom-located polygon scanners in the tunnel) are processed along a different scan data processing channel illustrated by blocks 3960B, 3961B and 3962B set forth in FIG. 51B. This bifurcation of data element processing is required because scan beam data elements generated from holographic-based scanning units are generated from laser scanning beams (or finite scanning sectors) which can be tracked with scan package identification data using the facet sectors on the scanning disc in issue. While a similar technique can be used for polygon-based scanners (e.g. tracking "mirror sectors" instead of HOE-based facet sectors), a different approach has been adopted in the illustrative embodiment. That is, the scanning surface (e.g. 3x5") of each polygon scanning unit along the bottom scanner is accorded a vector-based surface model, rather than ray-type model used for package identification data collected using holographic scanning mechanisms.

The Package Surface Geometry Modeling Subsystem of the Third Illustrative Embodiment of the Present Invention As shown in FIG. 53A, a surface geometry model is created for each package surface by the package surface geometry modeling subsystem (i.e. module) 3958A deployed with the data element queuing, handling and processing subsystem 3950 of FIGS. 51A1 and 51A2. In the illustrative embodiment, each surface of each package transported through multiple package detecting and dimensioning subsystem 3300 is mathematically represented (i.e. modeled) using at least three position vectors (referenced to x=0, y=0, z=0) in the global reference frame $R_{global}$, and a normal vector to the package surface indicating the direction of incident light reflection therefrom. The table of FIG. 53B describes a preferred procedure for creating a vector-based surface model for each surface of each package transported through the multiple package detecting and dimensioning subsystem 3300 in the system 3000 hereof.

The Scan Beam Geometry Modeling Subsystem of the Third Illustrative Embodiment of the Present Invention As described in FIG. 54, a vector-based model is created by the scan beam geometry modeling subsystem (i.e. module) 3960A of FIGS. 51A1 and 51A2, which is similar to structure and function as scan beam geometry modeling subsystem 1010A shown in FIGS. 22A1 and 22A2. The function of this subsystem is to geometrically model the propagation of the laser scanning beam (ray) emanating from a particular point on the facet, to its point of reflection on the corresponding beam folding mirror, towards to the focal plane determined by the focal length of the facet. Details of this modeling procedure can be found in Applicant's copending application Ser. No. 08/726,522 filed Oct. 7, 1996, now U.S. Letters Pat. No. 6,088,978; and Ser. No. 08/573,949 filed Dec. 18, 1995, now abandoned.

The Scan Surface Modeling Subsystem of the Third Illustrative Embodiment of the Present Invention FIG. 55 schematically shows how the scan surface modeling subsystem (i.e. module) 3960B of FIG. 51B can be used to define a vector-based 2-D surface geometry model for each candidate scan beam generated by the polygonal-based bottom scanners in the tunnel scanning system. As shown in FIG. 55, each omnidirectional scan pattern produced from a particular polygon-based bottom scanning unit is mathematically represented (i.e. modeled) using four position vectors (referenced to x=0, y=0, z=0) in the global reference frame $R_{global}$ and a normal vector to the scanning surface indicating the direction of laser scanning rays projected therefrom during scanning operations. This modeling subsystem is substantially the same as subsystem 1010B shown in FIG. 22B.

The Homogeneous (HG) Transformation Modules of the Third Illustrative Embodiment of the Present Invention FIG. 56 schematically describes how the homogeneous (HG) transformation module 3961A of FIGS. 51A1 and 51A2 uses homogeneous transformations to convert a vector-based model within a local scanner coordinate reference frame $R_{localscannerj}$ into a corresponding vector-based model created within the global scanner coordinate reference frame $R_{global}$. This mathematical technique is essential in that it converts locally-referenced coordinates used to represent a laser beam (which scanned a bar code symbol) into globally-referenced coordinates used to represent the same laser scanning beam. Module 3961A is similar to module 1011A in FIGS. 22A1 and 22A2.

FIG. 57 illustrates how HG transformation module 3959A is used to convert a vector-based package surface model specified within the global coordinate reference frame $R_{global}$, at the "package height/width profiling position", into a corresponding vector-based package surface model created within the global coordinate reference frame $R_{global}$ specified at the "scanning position" within the tunnel scanning system. This mathematical technique is essential in that it converts locally-referenced coordinates used to represent a package surface into globally-referenced coordinates used to represent the same package surface. Notably, this method of coordinate conversion, similar to that disclosed in FIG. 30, involves computing the package travel distance (z=d) between the package height/width profiling and scanning positions using (1) the package or conveyor belt velocity (v) and the (2) difference in time (i.e. $\Delta T=T1-T2$) indicated by the time stamps (T1 and T2) placed on the package data element and scan beam data element, respectively, matched thereto during each scan beam/package surface intersection determination carried out within module 3962A in the data element queuing, handling and processing subsystem 3950. Notably, this package displacement distance z=d between the profiling and scanning positions is given by the mathematical expression $d=v\Delta T$.

The Scan Beam and Package Surface Intersection Determination Subsystem of the Third Illustrative Embodiment of the Present Invention for use with Scan Beam Data Elements Produced by Holographic Scanning Subsystems FIGS. 58A and 58B, taken together, describes a procedure which is carried out within the scan beam and package surface intersection determination module 3962A of the illustrative embodiment in order to determine whether (i) the scan beam (rays) associated with a particular scan beam data element produced by a holographic scanning subsystem intersects with (ii) any surface on the package that has been scanned at a particular scanning position, and thus whether to correlate a particular package identification data element with particular package measurement data element acquired by the system.

As indicated at Block A in FIG. 58A, the first step of the procedure involves using the minimum and maximum scan rays models of the laser scan beam to determine the intersection point between the scan ray and a surface on the package (using the vector-based models thereof) referenced to the global coordinate reference frame. As indicated at Block B in FIG. 58A, if an intersection point has been determined at Block A, then confirm that the sign of the normal vector of the surface is opposite the sign of the scan ray direction vector. As indicated at Block C in FIG. 58A, if the sign of the normal vector is opposite the sign of the scan ray direction vector, then determine if the intersection point (found at Block A) falls within the spatial boundaries of the package surface. As indicated at Block D in FIG. 58B, if the intersection point falls within the boundaries of the surface, then output a data element to the output queue in the data output subsystem 3963A, wherein the data element comprises package identification data and data representative of the dimensions and measurements of the package by the system for use by other subsystems. When a scan beam (i.e. package identification) data element taken from the scan beam data element queue 3956 is correlated with a package (measurement) data element (i.e. object) using the above described method, then the subsystem 3963A outputs a data element (in an output data queue) containing the package ID data and the package dimensional and weight measurement data. Such data elements can be displayed graphically, printed out as a list, provided to sorting subsystems, shipping pricing subsystems, routing subsystems and the like.

The Scan Surface and Package Surface Intersection Determination Subsystem of the Third Illustrative Embodiment of the Present Invention for use with Scan Beam Data Elements Produced by Non-Holographic Scanning Subsystems FIGS. 59A and 59B, taken together, describes a procedure which can be carried out within the scan surface and package surface intersection determination module 3962B of FIG. 51B in order to determine whether the scanning surface associated with a particular scan beam data element produced by a non-holographic (e.g. polygon-based) "bottom-located" scanning subsystem spatially intersects with any surface on the package that has been scanned at a particular scanning position, and thus whether to correlate a particular package identification data element with particular package measurement data element acquired by the system.

As indicated at Block A in FIG. 59A, the first step of the procedure involves using the vector-based surface models of the laser scan surfaces of the bottom polygon scanners and side surfaces of the packages so as to determine whether or not there exists a point of intersection between the scanning surface of the polygon-based scanners and any surface of the package. As indicated at Block B in FIG. 59A, if an intersection point exists, then confirm that the sign of the vector model of the scanning surface (i.e. the normal vector) is opposite the sign of the vector model of the package surface. As indicated at Block C in FIG. 59B, if the sign of the normal vector of the scanning surface is opposite the sign of the normal vector to the package surface, then confirm that certain of the points bounded by the scanning surface coincide with points bounded by the surface of the package. As indicated at Block D in FIG. 59B, if sufficient overlap is found to exist between the scanning surface and the package surface, then output a data element to the output queue in the data output subsystem 3963B, wherein the data element comprises package identification data and data representative of the dimensions and measurements of the package by the system for use by other subsystems. When a scan beam data element taken from the system event queue 3956 is correlated with a package data element using the above described method, then the subsystem 3963B outputs a data element (in an output data queue) containing the package ID data and the package dimensional and measurement data. Such data elements can be displayed graphically, printed out as a list, provided to sorting subsystems, shipping pricing subsystems, routing subsystems and the like.

Notably, the smaller the facet sectors on the scanning disc, then the better resolution the system hereof will have with regarding to correlating package identification data with package measurement data. As the facet sector gets small, the corresponding minimum and maximum facet angles generated from the decoder device hereof will get closer and closer, approaching a single scanning ray in the ideal situation.

Applications of the System of the Present Invention

In general, the package identification and measuring systems of the present invention can be installed in package routing hubs, shipping terminals, airports, factories, and the like. There of course will be numerous other applications for such systems as new situations arise, and the capabilities of such systems become widely known to the general public.

As shown in FIG. 60, the system of the present invention (1, 2000, or 3000) described above can be connected to an information network 4000 supporting TCP/IP or other network protocol. As shown, the network includes at least one relational database management computer system (RDBMS) 4001 designed to receive information collected from each and every package identified, dimensioned and/or measured while passing through the scanning tunnel subsystem of the system. Notably, a package router 4005 is shown installed downstream from the system in order to route packages in an automated manner using control signals generated by the subsystem 900 in the system. It is understood that many systems 1, 2000 or 3000 could be assembled in various types of package routing networks in order to achieve a particular set of functions relating to automatic identification, routing, and sorting operations.

As shown in FIG. 60, the RDBMS 4001 is connected to a Java/Jini-enabled Internet (i.e. http) server 4002 by way of an information network supporting TCP/IP in a manner well known in the art. The HTTP server 4002, realized using a SUN® workstation supporting Java and Jini server components by Sun Microsystems, Inc. of Palo Alto, Calif., is accessible by any Java/Jini-enabled client machine 4003 equipped with a Java/Jini-enabled (http) browser program known in the art. Any client machine 4003 can be RF linked to Internet infrastructure 4004, connected thereto by a POTs line, ISDN line, DSL line, T1 line or any other means available presently or in the future. Typically, computer system 900, RDBMS 4001, and Internet server 4002 are located in close physical proximity with the automated package identification and measuring system 1, 2000 and 3000, and if no in close physical proximity, then reasonably close thereto in comparision to the distance of a remote client machine 4003 used to remote control and manage the system when required by trained service technicians.

In this illustrative embodiment, the data element management computer subsystem 900 within the system 1, 2000 or 3000 is also realized using a SUN® workstation running the SOLARIS version of Unix and supporting Java and Jini server components by Sun Microsystems, Inc. Each node in the network, including subsystem 900, and Internet server 4002, has an assigned static IP address on the Internet, and is provided with its own Jini™ interface for the purpose of enabling customers and other authorized personnel to use a Jini/Java-enabled client machine 4003 located anywhere around the globe so as to: (1) remotely access (from Internet server 4002) information about any packages transported through the system, as well as diagnostics regarding the system; and (2) remotely control the various subcomponents of the system in order to reprogram its subsystems, perform service routines, performance checks and the like, as well as carry out other forms of maintenance required to keep the system running optimally, while minimizing down-time or disruption in system operations.

While the above-described system employs Jini/Java-enabled remote control technology, it is understood that other forms of remote control technology, known in the computing arts, can be used to implement the remote-controlled diagnostics, management and servicing method of the present invention.

Modifications of the Illustrative Embodiments

While the package conveyor subsystems employed in the illustrative embodiments have utilized belt or roller structure to transport package, it is understood that this subsystem can be realized in many ways, for example: using trains running on tracks passing through the laser scanning tunnel; mobile transport units running through the scanning tunnel installed in a factory environment; robotically-controlled platforms or carriages supporting packages, parcels or other bar coded objects, moving through a laser scanning tunnel subsystem.

In the preferred embodiments of the present invention described above, holographic laser scanning subsystems have been used to generated robust 3-D omnidirectional scanning volumes employed in such systems. As such, the laser beam position tracking techniques disclosed herein have been applied to the holographic scanning disc used in such systems to produce facet and facet sector information generated and correlated with each and every line of scan data generated within each holographic scanning subsystem. It is understood, however, when using polygonal type scanning systems, the laser beam position tracking techniques taught herein can be directly applied to the rotating polygon, and in such cases, polygon mirror and mirror sector information would be automatically generated and correlated with each and every line of scan data generated within each polygonal-type laser scanning subsystem of the present invention.

While the various embodiments of the package identification and measuring system hereof have been described in connection with linear (1-D) and 2-D code symbol scanning applications, it should be clear, however, that the system and methods of the present invention are equally suited for scanning alphanumeric characters (e.g. textual information) in optical character recognition (OCR) applications, as well as scanning graphical images in graphical scanning arts. All that will be required is to provide image data storage buffers in each of the scanning units so that images of bar code symbols can be reconstructed during scanning operations, and then character recognition techniques, such as taught in U.S. Pat. No. 5,727,081 to Burges, et al, incorporated herein by reference.

Advantages and Other Features of the System of the Present Invention

Through proper programming, the automated package identification and measuring systems of the illustrative embodiments described hereinabove can read virtually any bar code symbology imaginable (e.g. Interleaved two of five, Code 128 and Code three of nine) and formats so as to sort and identify packages at various package rates required by USPS or other end-users. The systems of the illustrative embodiments can read the ZIP Code (six digits), Package Identification Code (PIC) (sixteen characters)' and Tray bar code (ten digits) symbols.

The tunnel scanning systems hereof can be configured so that all of the products passing through the "tunnel" shall be scanned and read for the valid USPS bar coded symbols regardless of the position of the bar code symbol on the surface of the product. This also includes the bottom surface of the product.

The tunnel scanning system hereof can be provided with additional equipment including, for example, tachometers, dimensioning units, support structures, special power units (if required), air compressors and any other support equipment required by an application at hand.

Preferably, the tunnel scanning systems of the illustrative embodiments are constructed using standard interfaces such that scanners, decoders, concentrator, etc. are interchangeable.

The tunnel scanning systems hereof can read bar coded symbols through the entire population of tray and tub label holders in use by the USPS, and other package or parcel carriers. In addition, the tunnel scanning systems can read bar code symbols on the package products when the bar code symbol label is placed under diaphanous materials.

There will be more than one bar code symbol on many of the packages found in the tunnel system hereof. Some of these symbols will not be valid USPS symbols. If there are multiple symbols on a package, the scanner logic can be set to automatically identify and process only the USPS valid symbols.

The tunnel scanning systems of the illustrative embodiments can process all types of products (e.g. trays and tubs having extremely large variance in surface types, colors, and plastics (e.g. Tyvek material, canvass, cardboard, polywrap, Styrofoam, rubber, dark packages). Some of these product types include: softpack-pillows, bags; packages having non-flat bottoms, such as flats, trays, and tubs with and without bands; cartons; rugs; duffel bags (without strings or metal clips); tires; wooden containers; and sacks.

It is understood that the laser scanning systems, modules, engines and subsystems of the illustrative embodiments may be modified in a variety of ways which will become readily apparent to those skilled in the art, and having the benefit of the novel teachings disclosed herein. All such modifications and variations of the illustrative embodiments thereof shall be deemed to be within the scope and spirit of the present invention as defined by the claims to Invention appended hereto.

What is claimed is:

1. An automated package identification and measuring system comprising:

an omni-directional holographic scanning tunnel subsystem for producing a plurality of laser scanning beams for reading bar code symbols on packages entering said omni-directional holographic scanning tunnel subsystem, and producing package identification data representative of each package identified by the bar code symbol read on said package;

a package dimensioning subsystem for capturing package measurement information about each said package prior to said package entering said omni-directional holographic scanning tunnel subsystem, and producing package measurement data representative of said captured package measurement information;

a computer subsystem for collecting and queuing package identification data and package measurement data, and creating, on a real-time basis, mathematical models for both the geometry of said package and the position of the laser scanning beam used to read the bar code symbol on said package;

wherein said mathematical models are analyzed using vector-based ray-tracing method, homogenous transformations, and object-oriented decision logic to determine if collected and queued package identification data is spatially and/or temporally correlated with package measurement data using vector-based ray-tracing methods, homogeneous transformations, and object-oriented decision logic so as to enable simultaneous tracking of multiple packages being transported through said omni-directional holographic scanning tunnel subsystem.

2. The automated package identification and measuring system of claim 1, wherein said omni-directional holographic scanning tunnel subsystem comprises a plurality of holographic laser scanning subsystems mounted from a scanner support framework, arranged about a high-speed conveyor structure, so that each holographic laser scanning subsystem projects a highly-defined 3-D omni-directional scanning volume with a large depth-of-field, above the conveyor structure so as to collectively provide omni-directional scanning within each of the three principal scanning planes of said omni-directional holographic scanning system.

3. The automated package identification and measuring system of claim 2, which further comprises a split-type conveyor having first and second conveyor platforms, and a gap disposed between said first and second conveyor platforms, for mounting an omni-directional projection-type laser scanning subsystem below said first and second conveyor platforms and extending substantially the entire width of said conveyor platforms.

4. The automated package identification and measuring system of claim 2, wherein said omni-directional holographic scanning tunnel subsystem comprises a plurality of holographic laser scanners arranged about a conveyor structure as to produce a bi-directional scanning pattern along the principal axes of a three-dimensional laser scanning volume.

5. The automated package identification and measuring system of claim 4, wherein each said holographic laser scanner employed in the system projects said three-dimensional laser scanning volume having multiple focal planes and a highly confined geometry extending about a projection axis extending from a scanning window in said holographic laser scanner and above the conveyor structure of the system.

6. The automated package identification and measuring system of claim 1, wherein singulated packages can be detected, dimensioned, and identified in a fully automated manner without human intervention, while being transported through said omnidirectional holographic scanning tunnel subsystem using a package conveyor subsystem.

7. The automated package identification and measuring system of claim 6, wherein said package dimensioning subsystem is disposed on the input side of said holographic omni-directional scanning tunnel subsystem, for detecting and dimensioning singulated packages passing through said package dimensioning subsystem.

8. The automated package identification and measuring system of claim 1, wherein said tunnel subsystem has an input side and an output side, and further comprises: data element queuing, handling and processing subsystem for queuing, handling and processing data elements representative of package identification, dimensions and/or weight; and a moving package tracking queue maintained in said data element queuing, handling, and processing subsystem, so that data elements comprising objects, representative of detected packages entering said scanning tunnel subsystem, can be tracked along with dimensional and measurement data collected on such detected packages.

9. The automated package identification and measuring system of claim 1, wherein said omnidirectional holographic scanning tunnel subsystem provided therein comprises a plurality of laser scanning subsystems, and each such laser scanning subsystem is capable of automatically generating, for each bar code symbol read by said laser scanning subsystem, information indicative of the precise point of origin of the laser scanning beam and its optical path to the read bar code symbol, as well as produced symbol character data representative of the read bar code symbol.

10. The automated package identification and measuring system of claim 1, wherein said omni-directional holographic scanning tunnel subsystem comprises a plurality of laser scanning subsystems generating an omnidirectional laser scanning pattern within a 3-D scanning volume, wherein a bar code symbol applied to any one side of a six-sided package (e.g. box) will be automatically scanned and decoded when passed through the 3-D scanning volume using a conveyor subsystem having a conveyor surface.

11. The automated package identification and measuring system of claim 10, wherein said laser scanning subsystems comprise a plurality of holographic laser scanning subsystems, and also a plurality of polygonal-type laser scanning subsystems for reading bar code symbols facing said conveyor surface.

12. The automated package identification and measuring system of claim 11, wherein each holographic laser scanning subsystem employed in said omni-directional holographic scanning tunnel subsystem comprises a holographic scanning disc having holographic scanning facets with multiple holographic facet sectors, and a device for generating information specifying which holographic scanning facet or holographic facet sector (or segment) produced the laser scanning beam used to read any bar code symbol by the subsystem.

13. The automated package identification and measuring system of claim 12, wherein said device generates information specifying which holographic scanning facet or holographic facet sector produced the laser scanning beam used to read any bar code symbol by the subsystem, independent of the angular velocity of the holographic scanning disc or variations in such angular velocity.

14. The automated package identification and measuring system of claim 11, wherein each non-holographic (e.g. polygonal-type) laser scanning subsystem employed in the tunnel scanning subsystem comprises a polygon scanning element having mirror facets with mirror facet sectors, and a device for generating information specifying which mirror facet or mirror facet sector produced the laser scanning beam used to read any bar code symbol by the subsystem.

15. The automated package identification and measuring system of claim 14, wherein said device generates information specifying which mirror facet or mirror facet sector produced the laser scanning beam used to read any bar code symbol by the subsystem, independent of the angular velocity of the polygon scanning element or variations in such angular velocity.

16. The automated package identification and measuring system of claim 8, wherein said data element queuing, handling and processing subsystem further comprises a scan beam geometry modeling subsystem for producing, relative to a local coordinate reference system symbolically embedded within a laser scanning subsystem, employed in said omni-directional holographic scanning tunnel subsystem, coordinate information comprising a geometric model of each laser scanning beam used to read a particular bar code symbol for which symbol character data has been produced by the laser scanning subsystem.

17. The automated package identification and measuring system of claim 16, wherein said data element queuing, handling and processing subsystem further comprises a first homogeneous transformation module for converting the coordinate information comprising the geometric model of each laser scanning beam used to read a particular bar code symbol on a detected package, from the local coordinate reference system symbolically embedded within said laser scanning subsystem, to a global coordinate reference system symbolically embedded within said omni-directional holographic scanning tunnel system.

18. The automated package identification and measuring system of claim 16, wherein said data element queuing, handling and processing subsystem further comprises a package surface modeling subsystem for producing, relative to a local coordinate reference system symbolically embedded within the laser scanning subsystem, coordinate information comprising a geometric model of each surface on each package dimensioned by the package dimensioning subsystem.

19. The automated package identification and measuring system 17, wherein said data element queuing, handling and processing subsystem further comprises a second homogeneous transformation module for converting the coordinate information comprising the geometric model of each surface on a detected package, from the local coordinate reference system symbolically embedded within the laser scanning subsystem, to a global coordinate reference system symbolically embedded within omni-directional holographic scanning tunnel system.

20. The automated package identification and measuring system of claim 16, which further comprises a laser scan beam and package surface intersection determination subsystem for determining which detected package was scanned by the laser scanning beam that read a particular bar code symbol, and for linking (i.e. correlating) package measurement data associated with the detected package with package identification data associated with the laser scanning beam that read a bar code symbol on a detected package.

21. The automated package identification and measuring system of claim 8, which further comprises a package velocity measurement subsystem for measuring the velocity of the package as it moves from said package dimensioning subsystem through said omni-directional holographic scanning tunnel subsystem.

22. The automated package identification and measuring system of claim 21, wherein said package velocity measurement subsystem is realized using a pair of spaced-apart laser beams projected over a conveyor structure so that when a package interrupts these laser beams, electrical pulses are automatically generated and processed using a clock in order to compute the instantaneous velocity of each and every package transported along said conveyor structure.

23. The automated package identification and measuring system of claim 8, wherein the package dimensioning subsystem is provided on the input side of said omni-directional holographic scanning tunnel subsystem and comprises a first pair of light transmitting and receiving structures arranged transmit a plurality of light beams along a direction parallel to a conveyor structure in order to collect data and measure the height of each singulated package passing through the package dimensioning subsystem, and a second pair of light transmitting and receiving structures arranged to transmit a plurality of light beams along a direction perpendicular to the conveyor belt in order to collect data and measure the width of each singulated package passing through the package dimensioning subsystem.

24. The automated package identification and measuring system of claim 23, wherein said package dimensioning subsystem is provided on the input side of omni-directional holographic scanning tunnel subsystem and said system further comprises a height data processor for processing arrays of height profile data collected from the first pair of light transmitting and receiving structures in order to detect stacked arrangements of packages transported through the package dimensioning subsystem, and a width data processor for processing arrays of width profile data collected from the second pair of light transmitting and receiving structures in order to detect side-by-side arrangements of packages transported through the package dimensioning subsystem, and upon detecting either a stacked configuration of packages or a side-by-side configuration of packages, automatically generating an unique data element indicative of such multiple package arrangements along the conveyor belt, and placing this unique data element in the moving package tracking queue in the data element queuing, handling and processing subsystem so that said data element queuing, handling and processing subsystem can cause an auxiliary subsystem to reroute such multiple packages through a singulation unit and then returned to pass once again through said system.

25. The automated package identification and measuring system of claim 8, which further comprises a package weighing-in-motion subsystem for weighing singulated packages moving through the package detection and dimensioning subsystem, and producing weight measurement information for assignment to each detected package.

26. An automated package identification and measuring system for detecting, dimensioning, and identifying
singulated packages in a fully automated manner without human intervention, comprising:
a laser scanning tunnel subsystem for reading bar code symbols on packages transported through said laser scanning tunnel subsystem, said laser scanning tunnel subsystem having an input side and an output side and producing data elements representative of package identification;
a package conveyor subsystem for transporting packages through said laser scanning tunnel subsystem;
a package detection and dimensioning subsystem provided on the input side of said laser scanning tunnel subsystem, for detecting and dimensioning singulated packages passing through said package detection and dimensioning subsystem, and producing data elements representative of package dimensions and/or weight; and
a data element queuing, handling and processing subsystem for queuing, handling and processing data elements representative of package identification, dimensions and/or weight, and
wherein a moving package tracking queue is maintained so that data elements comprising objects, representative of detected packages entering the laser scanning tunnel subsystem, can be tracked along with dimensional and measurement data collected on such detected packages.

27. The automated package identification and measuring system of claim 26, wherein a package detection subsystem is provided on the output side of said laser scanning tunnel subsystem.

28. The automated package identification and measuring system of claim 26, wherein said laser scanning tunnel subsystem comprises a plurality of laser scanning subsystems, and each said laser scanning subsystem is capable of automatically generating, for each bar code symbol read by said laser scanning subsystem, accurate information indicative of the precise point of origin of the laser scanning beam and its optical path to the read bar code symbol, as well as produced symbol character data representative of the read bar code symbol.

29. The automated package identification and measuring system of claim 28, wherein the plurality of laser scanning subsystems generate an omnidirectional laser scanning pattern within a 3-D scanning volume, wherein a bar code symbol applied to any one side of a six-sided package will be automatically scanned and decoded when passed through the 3-D scanning volume using said package conveyor subsystem.

30. The automated package identification and measuring system of claim 29, wherein said package conveyor subsystem has a conveyor surface and said laser scanning subsystems comprise holographic laser scanning subsystems, and also polygonal-type laser scanning subsystems for reading bar code symbols facing said conveyor surface.

31. The automated package identification and measuring system of claim 30, wherein each holographic laser scanning subsystem employed in said laser scanning tunnel subsystem comprises a holographic scanning disc having holographic scanning facets with multiple facet sectors, and a device for generating information specifying which holographic scanning facet or holographic facet sector produced the laser scanning beam used to read any bar code symbol by the subsystem.

32. The automated package identification and measuring system of claim 31, wherein said device generates information specifying which holographic scanning facet or holographic facet sector produced the laser scanning beam used to read any bar code symbol by the subsystem, independent of the angular velocity of the holographic scanning disc or variations in such angular velocity.

33. The automated package identification and measuring system of claim 30, wherein each non-holographic (e.g. polygonal-type) laser scanning subsystem employed in said laser scanning tunnel subsystem comprises a polygonal scanning element having mirror facets with multiple mirror facet sectors, and a device for generating information specifying which mirror facet or mirror sector produced the laser scanning beam used to read any bar code symbol by the subsystem.

34. The automated package identification and measuring system of claim 26, wherein said data element queuing, handling and processing subsystem further comprises a scan beam geometry modeling subsystem for producing, relative to a local coordinate reference system symbolically embedded within said laser scanning tunnel subsystem, coordinate information comprising a geometric model of each laser scanning beam used to read a particular bar code symbol for which symbol character data has been produced by said laser scanning tunnel subsystem.

35. The automated package identification and measuring system of claim 34, wherein said data element queuing, handling and processing subsystem further comprises a first homogeneous transformation module for converting the coordinate information comprising the geometric model of each laser scanning beam used to read a particular bar code symbol on a detected package, from the local coordinate reference system symbolically embedded within said laser scanning tunnel subsystem, to a global coordinate reference system symbolically embedded within said laser scanning tunnel system.

36. The automated package identification and measuring system of claim 34, wherein said data element queuing, handling and processing subsystem further comprises a package surface modeling subsystem for producing, relative to a local coordinate reference system symbolically embedded within said laser scanning tunnel subsystem, coordinate information comprising a geometric model of each surface on each package detected by said package detection and dimensioning subsystem.

37. The automated package identification and measuring system of claim 35, wherein said data element queuing, handling and processing subsystem further comprises a second homogeneous transformation module for converting the coordinate information comprising the geometric model of each surface on a detected package, from the local coordinate reference system symbolically embedded within said laser scanning tunnel subsystem, to a global coordinate reference system symbolically embedded within said laser scanning tunnel subsystem.

38. The automated package identification and measuring system of claim 36, which further comprises a laser scan beam and package surface intersection determination subsystem for determining which detected package was scanned by the laser scanning beam that read a particular bar code symbol, and for linking (i.e. correlating) package measurement data associated with the detected package with package identification data associated with the laser scanning beam that read a bar code symbol on a detected package.

39. The automated package identification and measuring system of claim 26, which further comprises a package velocity measurement subsystem for measuring the velocity of a package as it moves from said package detection and dimensioning subsystem through said laser scanning tunnel subsystem.

40. The automated package identification and measuring system of claim 39, wherein said package velocity measurement subsystem is realized using an roller wheel engaged in direct contact with a conveyor belt as it moves, generating electrical pulses as an optical encoder attached to the shaft of the roller wheel is caused to complete one revolution, during which the conveyor belt traveled one linear foot, and counting these generated electrical pulses with reference to a clock in order to compute the instantaneous velocity of the conveyor belt, and thus each and every package transported therealong without slippage.

41. The automated package identification and measuring system of claim 26, wherein said package conveyor subsystem comprises a conveyor structure, and wherein said package detection and dimensioning subsystem comprises a laser scanning mechanism that generates an amplitude modulated laser scanning beam that is scanned across the width of said conveyor structure while the laser scanning beam is disposed substantially perpendicular to the surface of said conveyor structure, and light reflected from scanned packages is collected, detected and processed to produce information representative of the package height profile across the width of said conveyor structure for each time sampling instant carried out by said package detection and dimension subsystem.

42. The automated package identification and measuring system of claim 41, wherein said package detection and dimensioning subsystem further comprises:

a first pair of light transmitting and receiving structures;

a height data processor for processing arrays of height profile data collected from the first pair of light transmitting and receiving structures in order to detect stacked arrangements of packages transported through the package detection and dimensioning subsystem; and a width data processor for processing arrays of width profile data collected from the second pair of light transmitting and receiving structures in order to detect side-by-side arrangements of packages transported through the package detection and dimensioning subsystem, and upon detecting either a stacked configuration of packages or a side-by-side configuration of packages, automatically generating an unique data element indicative of such multiple package arrangements along the conveyor belt, and placing this unique data element in the moving package tracking queue in said data element queuing, handling and processing subsystem so that said data element queuing, handling and processing subsystem can cause an auxiliary subsystem to reroute such multiple packages through a singulation unit and then returned to pass once again through said automated package identification and measuring system.

43. The automated package identification and measuring system of claim 26, which further comprises a package weighing-in-motion subsystem is provided for weighing singulated packages moving through said package detection and dimensioning subsystem, and producing weight measurement information for assignment to each detected package.

* * * * *